US009189143B2

(12) United States Patent
Jones et al.

(10) Patent No.: US 9,189,143 B2
(45) Date of Patent: Nov. 17, 2015

(54) SHARING SOCIAL NETWORKING CONTENT IN A CONFERENCE USER INTERFACE

(75) Inventors: Boland T. Jones, Atlanta, GA (US); David Michael Guthrie, Atlanta, GA (US); Daniel Owens, Atlanta, GA (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 436 days.

(21) Appl. No.: 12/790,110

(22) Filed: May 28, 2010

(65) Prior Publication Data
US 2011/0270923 A1    Nov. 3, 2011

Related U.S. Application Data

(63) Continuation of application No. PCT/US2010/033108, filed on Apr. 30, 2010.

(51) Int. Cl.
*G06F 3/0486* (2013.01)
*G06F 3/042* (2006.01)
*G06F 3/043* (2006.01)
*G06F 3/044* (2006.01)
*G06F 3/045* (2006.01)
*G06F 3/0481* (2013.01)
*G06F 3/0488* (2013.01)
*G06Q 30/02* (2012.01)
*H04N 7/15* (2006.01)

(52) U.S. Cl.
CPC .............. *G06F 3/0486* (2013.01); *G06F 3/043* (2013.01); *G06F 3/044* (2013.01); *G06F 3/045* (2013.01); *G06F 3/0421* (2013.01); *G06F 3/0481* (2013.01); *G06F 3/0488* (2013.01); *G06Q 30/02* (2013.01); *H04N 7/157* (2013.01)

(58) Field of Classification Search
None
See application file for complete search history.

(56) References Cited

U.S. PATENT DOCUMENTS

| | | | |
|---|---|---|---|
| 5,544,291 A | | 8/1996 | Gilley |
| 5,689,287 A | * | 11/1997 | Mackinlay et al. ........... 345/427 |
| 5,737,452 A | | 4/1998 | Schiller |
| 5,745,666 A | | 4/1998 | Gilley |
| 5,930,396 A | | 7/1999 | Fiala |
| 6,049,339 A | | 4/2000 | Schiller |
| 6,067,094 A | | 5/2000 | Schuster |
| 6,072,463 A | | 6/2000 | Glaser |

(Continued)

FOREIGN PATENT DOCUMENTS

| | | |
|---|---|---|
| JP | 2001016563 A1 | 1/2001 |
| KR | 10-2007-0019898 A | 2/2007 |

*Primary Examiner* — Greg C Bengzon
(74) *Attorney, Agent, or Firm* — Smith Risley Tempel Santos LLC

(57) ABSTRACT

Various embodiments of systems, methods, and computer programs are disclosed for incorporating a social networking feature in a conferencing system. One embodiment is a method comprising: a conferencing server establishing an audio conference between a plurality of computing devices connected via a communication network; the conferencing server presenting to the computing devices a user interface associated with the audio conference, the user interface comprising a social networking component for providing a social networking feature to a participant during the audio conference; a social networking server authenticating the participant as a member of a social networking system; and during the audio conference, the conferencing server enabling the authenticated participant to access the social networking feature via the social networking component in the user interface.

16 Claims, 140 Drawing Sheets

(56) References Cited

U.S. PATENT DOCUMENTS

| | | | |
|---|---|---|---|
| 6,072,502 A | 6/2000 | Gupta | |
| 6,167,432 A | 12/2000 | Jiang | |
| 6,208,355 B1 | 3/2001 | Schuster | |
| 6,233,389 B1 | 5/2001 | Barton | |
| 6,262,745 B1 | 7/2001 | Perani | |
| 6,278,478 B1 | 8/2001 | Ferriere | |
| 6,279,028 B1 | 8/2001 | Bradshaw, Jr. | |
| 6,304,677 B1 | 10/2001 | Schuster | |
| 6,411,742 B1 | 6/2002 | Peterson | |
| 6,477,240 B1 | 11/2002 | Lim | |
| 6,559,863 B1 | 5/2003 | Meggiddo | |
| 6,567,813 B1 | 5/2003 | Zhu | |
| 6,574,599 B1 | 6/2003 | Lim | |
| 6,584,493 B1 | 6/2003 | Butler | |
| 6,597,358 B2 * | 7/2003 | Miller | 345/427 |
| 6,598,075 B1 | 7/2003 | Johnson | |
| 6,601,087 B1 | 7/2003 | Zhu | |
| 6,643,362 B2 | 11/2003 | Hogan | |
| 6,646,655 B1 | 11/2003 | Brandt | |
| 6,654,032 B1 | 11/2003 | Zhu | |
| 6,691,154 B1 | 2/2004 | Zhu | |
| 6,721,446 B1 | 4/2004 | Wilensky | |
| 6,763,501 B1 | 7/2004 | Zhu | |
| 6,771,303 B2 | 8/2004 | Zhang | |
| 6,789,119 B1 | 9/2004 | Zhu | |
| 6,891,929 B2 | 5/2005 | Yang | |
| 6,901,448 B2 | 5/2005 | Zhu | |
| 6,925,645 B2 | 8/2005 | Zhu | |
| 6,954,216 B1 | 10/2005 | Dowling | |
| 6,961,736 B1 | 11/2005 | Amirghodsi | |
| 6,968,179 B1 | 11/2005 | De Vries | |
| 6,988,132 B2 | 1/2006 | Horvitz | |
| 6,990,252 B2 | 1/2006 | Shekter | |
| 7,003,061 B2 | 2/2006 | Wilensky | |
| 7,006,707 B2 | 2/2006 | Peterson | |
| 7,023,800 B1 | 4/2006 | McAuley | |
| 7,069,298 B2 | 6/2006 | Zhu | |
| 7,095,905 B1 | 8/2006 | Peterson | |
| 7,103,236 B2 | 9/2006 | Peterson | |
| 7,130,883 B2 | 10/2006 | Zhu | |
| 7,136,062 B1 | 11/2006 | Butler | |
| 7,143,132 B2 | 11/2006 | Klein et al. | |
| 7,146,577 B2 | 12/2006 | Hoffman | |
| 7,158,616 B2 | 1/2007 | Yang | |
| 7,167,182 B2 | 1/2007 | Butler | |
| 7,184,531 B2 | 2/2007 | Crouch | |
| 7,184,602 B2 | 2/2007 | Cohen et al. | |
| 7,200,213 B2 | 4/2007 | Morris | |
| 7,203,755 B2 | 4/2007 | Zhu | |
| 7,213,051 B2 | 5/2007 | Zhu | |
| 7,216,147 B2 | 5/2007 | Blagsvedt | |
| 7,216,172 B2 | 5/2007 | Yang | |
| 7,228,332 B2 | 6/2007 | Rust | |
| 7,236,926 B2 | 6/2007 | Scherpbier | |
| 7,260,278 B2 | 8/2007 | Zhang | |
| 7,272,658 B1 | 9/2007 | Edelman | |
| 7,302,594 B2 | 11/2007 | Di Benedetto | |
| 7,313,595 B2 | 12/2007 | Rust | |
| 7,317,826 B2 | 1/2008 | Wilensky | |
| 7,328,239 B1 | 2/2008 | Berberian | |
| 7,346,631 B2 | 3/2008 | Amirghodsi | |
| 7,349,944 B2 | 3/2008 | Vernon | |
| 7,352,858 B2 | 4/2008 | Stokes | |
| 7,355,622 B2 | 4/2008 | Clarke | |
| 7,355,623 B2 | 4/2008 | Cutler | |
| 7,360,152 B2 | 4/2008 | Capps | |
| 7,360,172 B2 | 4/2008 | Grossman | |
| 7,362,350 B2 | 4/2008 | Cutler | |
| 7,373,381 B2 | 5/2008 | Rust | |
| 7,386,188 B2 | 6/2008 | Peterson | |
| 7,386,784 B2 | 6/2008 | Capps | |
| 7,389,351 B2 | 6/2008 | Horvitz | |
| 7,395,312 B2 | 7/2008 | Kothari | |
| 7,398,295 B2 | 7/2008 | Shoroff | |
| 7,421,069 B2 | 9/2008 | Vernon | |
| 7,421,114 B1 | 9/2008 | Brandt | |
| 7,426,297 B2 | 9/2008 | Zhang | |
| 7,426,578 B2 | 9/2008 | Jones | |
| 7,428,330 B2 | 9/2008 | Blake | |
| 7,471,849 B2 | 12/2008 | Peterson | |
| 7,475,112 B2 * | 1/2009 | Sinclair et al. | 709/204 |
| 7,512,262 B2 | 3/2009 | Criminisi | |
| 7,512,883 B2 | 3/2009 | Wallick | |
| 7,515,173 B2 | 4/2009 | Zhang | |
| 7,518,623 B2 | 4/2009 | Dowling | |
| 7,518,631 B2 | 4/2009 | Hershey | |
| 7,529,798 B2 | 5/2009 | Rust | |
| 7,530,028 B2 * | 5/2009 | Mulcahy et al. | 715/772 |
| 7,583,287 B2 | 9/2009 | Cohen | |
| 7,587,509 B1 | 9/2009 | Edelman | |
| 7,596,498 B2 | 9/2009 | Basu | |
| 7,599,572 B2 | 10/2009 | Shekter | |
| 7,865,834 B1 * | 1/2011 | van Os et al. | 715/756 |
| 8,132,111 B2 * | 3/2012 | Baron et al. | 715/753 |
| 8,185,828 B2 * | 5/2012 | Liu et al. | 715/753 |
| 8,302,027 B2 * | 10/2012 | Chiu et al. | 715/789 |
| 8,375,397 B1 * | 2/2013 | Mendes da Costa et al. | 719/310 |
| 8,464,165 B2 * | 6/2013 | van Os et al. | 715/756 |
| 8,572,177 B2 * | 10/2013 | Goldman et al. | 709/205 |
| 8,595,299 B1 * | 11/2013 | Wang et al. | 709/205 |
| 8,667,402 B2 * | 3/2014 | Goldman et al. | 715/757 |
| 8,887,070 B1 * | 11/2014 | Hecht et al. | 715/753 |
| 2001/0043237 A1 * | 11/2001 | Schmieder | 345/839 |
| 2002/0085030 A1 * | 7/2002 | Ghani | 345/751 |
| 2003/0071810 A1 * | 4/2003 | Shoov et al. | 345/420 |
| 2003/0236835 A1 * | 12/2003 | Levi et al. | 709/204 |
| 2004/0051745 A1 | 3/2004 | Gargi | |
| 2004/0098456 A1 | 5/2004 | Krzyzanowski et al. | |
| 2004/0128350 A1 * | 7/2004 | Topfl et al. | 709/204 |
| 2004/0205091 A1 * | 10/2004 | Mulcahy et al. | 707/204 |
| 2005/0068905 A1 * | 3/2005 | Dorner et al. | 370/260 |
| 2005/0071427 A1 * | 3/2005 | Dorner et al. | 709/204 |
| 2005/0264648 A1 * | 12/2005 | Ivashin et al. | 348/14.09 |
| 2006/0064342 A1 * | 3/2006 | Frengut et al. | 705/10 |
| 2006/0089949 A1 | 4/2006 | Robbin | |
| 2006/0123052 A1 | 6/2006 | Robbin | |
| 2007/0011273 A1 | 1/2007 | Greenstein et al. | |
| 2007/0111716 A1 | 5/2007 | Leigh | |
| 2007/0165105 A1 | 7/2007 | Lengeling et al. | |
| 2008/0008458 A1 | 1/2008 | Gudipaty | |
| 2008/0222295 A1 * | 9/2008 | Robinson et al. | 709/227 |
| 2008/0235629 A1 * | 9/2008 | Porter et al. | 715/849 |
| 2008/0263460 A1 * | 10/2008 | Altberg et al. | 715/757 |
| 2008/0313714 A1 | 12/2008 | Fetterman | |
| 2009/0013264 A1 * | 1/2009 | Basawapatna et al. | 715/753 |
| 2009/0019078 A1 * | 1/2009 | Chisholm et al. | 707/102 |
| 2009/0080635 A1 | 3/2009 | Altberg | |
| 2009/0106347 A1 | 4/2009 | Harwood | |
| 2009/0132942 A1 * | 5/2009 | Santoro et al. | 715/765 |
| 2009/0144392 A1 | 6/2009 | Wang | |
| 2009/0144639 A1 * | 6/2009 | Nims et al. | 715/757 |
| 2009/0144837 A1 | 6/2009 | Huff | |
| 2009/0180763 A1 | 7/2009 | McCarthy | |
| 2009/0249244 A1 * | 10/2009 | Robinson et al. | 715/781 |
| 2009/0254842 A1 * | 10/2009 | Leacock et al. | 715/757 |
| 2009/0254843 A1 | 10/2009 | Van Wie et al. | |
| 2009/0259959 A1 | 10/2009 | Grotjohn | |
| 2009/0265428 A1 * | 10/2009 | Light et al. | 709/204 |
| 2009/0296535 A1 | 12/2009 | Jones | |
| 2010/0037151 A1 * | 2/2010 | Ackerman et al. | 715/753 |
| 2010/0042684 A1 | 2/2010 | Broms et al. | 709/204 |
| 2010/0050129 A1 * | 2/2010 | Li et al. | 715/849 |
| 2010/0085416 A1 * | 4/2010 | Hegde et al. | 348/14.08 |
| 2010/0088372 A1 * | 4/2010 | Shridhar et al. | 709/204 |
| 2010/0097441 A1 * | 4/2010 | Trachtenberg et al. | 348/14.08 |
| 2010/0115426 A1 * | 5/2010 | Liu et al. | 715/757 |
| 2010/0131478 A1 * | 5/2010 | Nielsen et al. | 715/758 |
| 2010/0157063 A1 * | 6/2010 | Basso et al. | 348/169 |
| 2010/0169798 A1 * | 7/2010 | Hyndman et al. | 715/757 |
| 2010/0169799 A1 * | 7/2010 | Hyndman et al. | 715/757 |
| 2010/0169837 A1 * | 7/2010 | Hyndman | 715/848 |
| 2010/0199340 A1 * | 8/2010 | Jonas et al. | 726/8 |
| 2010/0229105 A1 * | 9/2010 | Zaner et al. | 715/753 |
| 2010/0251119 A1 * | 9/2010 | Geppert et al. | 715/716 |

(56) References Cited

U.S. PATENT DOCUMENTS

| | | | |
|---|---|---|---|
| 2010/0251158 A1* | 9/2010 | Geppert et al. | 715/771 |
| 2010/0251177 A1* | 9/2010 | Geppert et al. | 715/821 |
| 2010/0280860 A1* | 11/2010 | Iskold et al. | 705/7 |
| 2010/0293105 A1* | 11/2010 | Blinn et al. | 705/319 |
| 2011/0041082 A1* | 2/2011 | Nguyen | 715/752 |
| 2011/0072366 A1* | 3/2011 | Spencer et al. | 715/757 |
| 2011/0072367 A1* | 3/2011 | Bauer | 715/757 |
| 2011/0119230 A1* | 5/2011 | Zuber | 707/608 |
| 2011/0154204 A1* | 6/2011 | Narayanaswamy | 715/727 |
| 2011/0175923 A1* | 7/2011 | Mahajan et al. | 345/522 |
| 2011/0239136 A1* | 9/2011 | Goldman et al. | 715/757 |
| 2011/0289224 A1* | 11/2011 | Trott | 709/227 |
| 2011/0302509 A1* | 12/2011 | Leacock et al. | 715/756 |
| 2012/0084188 A1* | 4/2012 | Zuber | 705/34 |
| 2012/0087367 A1* | 4/2012 | Anikin et al. | 370/352 |
| 2012/0246582 A1* | 9/2012 | Leacock et al. | 715/753 |
| 2012/0323704 A1* | 12/2012 | Steelberg et al. | 705/14.73 |
| 2013/0047123 A1* | 2/2013 | May et al. | 715/834 |
| 2013/0061158 A1* | 3/2013 | Leacock et al. | 715/757 |
| 2013/0198642 A1* | 8/2013 | Carney et al. | 715/738 |
| 2013/0216206 A1* | 8/2013 | Dubin et al. | 386/282 |
| 2013/0268874 A1* | 10/2013 | Pearson | 715/767 |
| 2014/0237393 A1* | 8/2014 | Van Wie et al. | 715/757 |

\* cited by examiner

CONFERENCING APP STORE
4402

CATEGORIES 4502

CATEGORY 4506a
CATEGORY 4506b
CATEGORY 4506c
CATEGORY 4506d
CATEGORY 4506e

TOP APPS 4504

APP. OBJECT 4508a
APP. OBJECT 4508b
APP. OBJECT 4508c
APP. OBJECT 4508d
APP. OBJECT 4506e

*FIG. 45*

PARTICIPANT IDENTIFIER 3802
NAME 3804
TITLE 3806
EMAIL 3808
PHONE NUMBER 3810
ADDRESS 3812
CURRENT LOCATION 3814
SOCIAL NETWORKING PROFILE 3816
GRAPHIC. REP. 128
VIRTUAL LOC. VIEW 124
CONF. APPS. 3818
ACCOUNT PROFILE 4602

CONFERENCING APP 4702

TITLE 4704

DESCRIPTION 4706

RANKING 4708

SCREEN SHOT(S)
4710

COMMENTS 4712

ADD APP 4714

CONFERENCING SYSTEM 106

AUDIO CONFERENCE
114

| PART. 120a | AUDIO STREAM 122a | OBJECT. 4004a |
| PART. 120b | AUDIO STREAM 122b | OBJECT. 4004b |
| PART. 120c | AUDIO STREAM 122c | OBJECT. 4004c |
| PART. 120d | AUDIO STREAM 122d | OBJECT. 4004d |
| PART. 120e | AUDIO STREAM 122e | OBJECT. 4004e |
| PART. 120f | AUDIO STREAM 122f | OBJECT. 4004f |
| PART. 120g | AUDIO STREAM 122g | OBJECT. 4004g |

AUDIO STREAMa 122a

AUDIO STREAMa 122b

AUDIO STREAMa 122c

CONFERENCE INTERFACE 3110     VIDEO     AUDIO     DOC

PARTICIPANTa INSERTED MEDIA 11602a     VIDEO     11712

PARTICIPANTb INSERTED MEDIA 11602b     11714     AUDIO

PARTICIPANTc INSERTED MEDIA 11602c     11716     DOC

CONFERENCE TIMELINE 11702     11704     11704     11704     11704

TIMESTAMP 11706
EVENT TYPE 11708
▶ EVENT IDENTIFIER 11710

11704

11700

CONFERENCE
INTERFACE 3110

INSERTED MEDIA
11602a          VIDEO         VIDEO         AUDIO         DOC         11716

MARKERS 11802a                11712         11714

FEEDS 11804a

CONFERENCE TIMELINE 11702    11704    11704    11704    11704    11704    11704

SHARING SOCIAL NETWORKING CONTENT IN A CONFERENCE USER INTERFACE

CROSS-REFERENCE TO RELATED APPLICATIONS

This application is filed under 35 U.S.C. 111(a) as a continuation of International Patent Application Serial No. PCT/US2010/33108, entitled "Sharing Social Networking Content in a Conference User Interface" and filed on Apr. 30, 2010 (Applicant: American Teleconferencing Services, Ltd.), which international patent application designates the United States and is hereby incorporated by reference in its entirety. This application is related by subject matter to the following concurrently-filed patent applications filed on Apr. 30, 2010, each of which is hereby incorporated by reference in its entirety: International Patent Application Serial No. PCT/US2010/33084, entitled "Systems, Methods and Computer Programs for Providing a Conference User Interface" (Applicant: American Teleconferencing Services, Ltd.); International Patent Application Serial No. PCT/US2010/33096, entitled "Conferencing Application Store" (Applicant: American Teleconferencing Services, Ltd.); International Patent Application Serial No. PCT/US2010/33122, entitled "Distributing Information Between Participants in a Conference via a Conference User Interface" (Applicant: American Teleconferencing Services, Ltd.); International Patent Application Serial No. PCT/US2010/33137, entitled "Record and Playback in a Conference" (Applicant: American Teleconferencing Services, Ltd.); U.S. patent application Ser. No. 12/771,979 entitled "Conferencing Alerts" (First Named Inventor: Boland T. Jones); U.S. patent application Ser. No. 12/771,920 entitled "Participant Profiling in a Conferencing System" (First Named Inventor: Boland T. Jones); U.S. patent application Ser. No. 12/771,827 entitled "Location-Aware Conferencing" (First Named Inventor: Boland T. Jones); U.S. patent application Ser. No. 12/771,400 entitled "Real-Time Speech-to-Text Conversion in an Audio Conference Session" (First Named Inventor: Boland T. Jones); U.S. patent application Ser. No. 12/789,993 entitled "Systems, Methods and Computer Programs for Providing a Conference User Interface" (First Named Inventor: Boland T. Jones); U.S. patent application Ser. No. 12/790,057 entitled "Conferencing Application Store" (First Named Inventor: Boland T. Jones); U.S. patent application Ser. No. 12/772,023 entitled "Managing Participants in a Conference via a Conference User Interface" (First Named Inventor: Boland T. Jones); U.S. patent application Ser. No. 12/772,069 entitled "Managing Conference Sessions via a Conference User Interface" (First Named Inventor: Boland T. Jones); U.S. patent application Ser. No. 12/790,153 entitled "Distributing Information Between Participants in a Conference via a Conference User Interface" (First Named Inventor: Boland T. Jones); U.S. patent application Ser. No. 12/772,068 entitled "Participant Authentication via a Conference User Interface" (First Named Inventor: Boland T. Jones); U.S. patent application Ser. No. 12/771,172 entitled "Location-Aware Conferencing with Participant Rewards" (First Named Inventor: Boland T. Jones); U.S. patent application Ser. No. 12/771,668 entitled "Location-Aware Conferencing with Graphical Representations That Enable Licensing and Advertising" (First Named Inventor: Boland T. Jones); U.S. patent application Ser. No. 12/771,253 entitled "Location-Aware Conferencing with Graphical Interface for Communicating Information" (First Named Inventor: Boland T. Jones); U.S. patent application Ser. No. 12/771,942 entitled "Location-Aware Conferencing with Entertainment Options" (First Named Inventor: Boland T. Jones); U.S. patent application Ser. No. 12/771,366 entitled "Location-Aware Conferencing with Graphical Interface for Participant Survey" (First Named Inventor: Boland T. Jones); U.S. patent application Ser. No. 12/790,193 entitled "Record and Playback in a Conference" (First Named Inventor: Boland T. Jones); U.S. patent application Ser. No. 12/771,522 entitled "Transferring a Conference Session Between Client Devices" (First Named Inventor: Boland T. Jones); and U.S. patent application Ser. No. 12/771,742 entitled "Location-Aware Conferencing with Calendar Functions" (First Named Inventor: Boland T. Jones).

BACKGROUND

Currently, there are a number of conference solutions for enabling people to conduct live meetings, conferences, presentations, or other types of gatherings via the Internet, the public switched telephone network (PSTN), or other voice and/or data networks. Participants typically use a telephone, computer, or other communication device that connects to a conference system. The meetings include an audio component and a visual component, such as, a shared presentation, video, whiteboard, or other multimedia, text, graphics, etc. These types of convenient conference solutions have become an indispensable form of communication for many businesses and individuals.

Despite the many advantages and commercial success of existing conference, meeting, grouping or other types of gathering systems, there remains a need in the art for improved conference, meeting, grouping or other types of gathering systems, methods, and computer programs.

SUMMARY

Various embodiments of systems, methods, and computer programs are disclosed for incorporating a social networking feature in a conferencing system. One embodiment is a method comprising: a conferencing server establishing an audio conference between a plurality of computing devices connected via a communication network; the conferencing server presenting to the computing devices a user interface associated with the audio conference, the user interface comprising a social networking component for providing a social networking feature to a participant during the audio conference; a social networking server authenticating the participant as a member of a social networking system; and during the audio conference, the conferencing server enabling the authenticated participant to access the social networking feature via the social networking component in the user interface.

Another embodiment comprises a method for sharing social networking content in an audio conference. One such method comprises: a conferencing server establishing an audio conference between a plurality of computing devices connected via a communication network; the conferencing server presenting to the computing devices a conference user interface associated with the audio conference, the conference user interface comprising a social networking component; a participant specifying content, during the audio conference, via the social networking component; a social networking server authenticating the participant as a member of a social networking system; sending the content to the social networking server; and the social networking server adding the content to a communication channel associated with the member.

Yet another embodiment comprises a method for incorporating social networking content in an audio conference. One such method comprises: a conferencing server establishing an audio conference between a plurality of computing devices connected via a communication network; the conferencing server presenting to the computing devices a conference user interface associated with the audio conference, the conference user interface comprising a social networking component; a social networking server authenticating the participant as a member of a social networking system; and the computing device associated with the authenticated participant providing a social networking communication channel, during the audio conference, in the social networking component.

BRIEF DESCRIPTION OF THE DRAWINGS

FIG. 45 is a screen shot of another embodiment of a conference interface for implementing aspects of the conferencing app store for enabling participants to browse available conference applications during an audio conference.

FIG. 46 is a diagram illustrating an exemplary data structure implemented by the conference app store and/or the participant application control modules in FIG. 43.

FIG. 47 is a screen shot of another embodiment of the conference interface for implementing aspects of the conference app store for enabling participants to purchase or otherwise access conferencing applications.

FIG. 104 is a combined block/data diagram illustrating the main conference session prior to the initiation of the breakout session.

FIG. 117 is a data diagram of an embodiment of a recorded conference illustrating a plurality of synchronized conference channels.

FIG. 118 is a data diagram illustrating additional embodiments of conference channels in the recorded conference of FIG. 117.

FIG. 119 is a user interface screen shot illustrating an embodiment of a conference interface implemented in the conference record/playback system of FIG. 115.

FIG. 120 illustrates an implementation of an interactive participant object in the conference interface of FIG. 119.

FIG. 121 illustrates another implementation of an interactive participant object in the conference interface of FIG. 119.

FIG. 122 illustrates an embodiment of an "invite" menu in the conference interface of FIG. 119 for enabling a participant to invite additional participants.

FIG. 123 illustrates an embodiment of a "share" menu in the conference interface of FIG. 119 for enabling a participant to share information resources with participants.

FIG. 124 illustrates the conference interface of FIG. 119 after the participant has inserted a web video.

FIG. 125 illustrates an embodiment of an "apps" menu in the conference interface of FIG. 119 for enabling participants to access conference apps.

FIG. 126 illustrates the conference interface of FIG. 119 after the participant has launched a conference notes application.

FIG. 127 illustrates an embodiment of a "record" menu in the conference interface of FIG. 119 for enabling a participant to launch a record/playback controller and configure record and alert options.

FIG. 128 illustrates an embodiment of a "record options" menu in the conference interface of FIG. 119.

Figure 119:
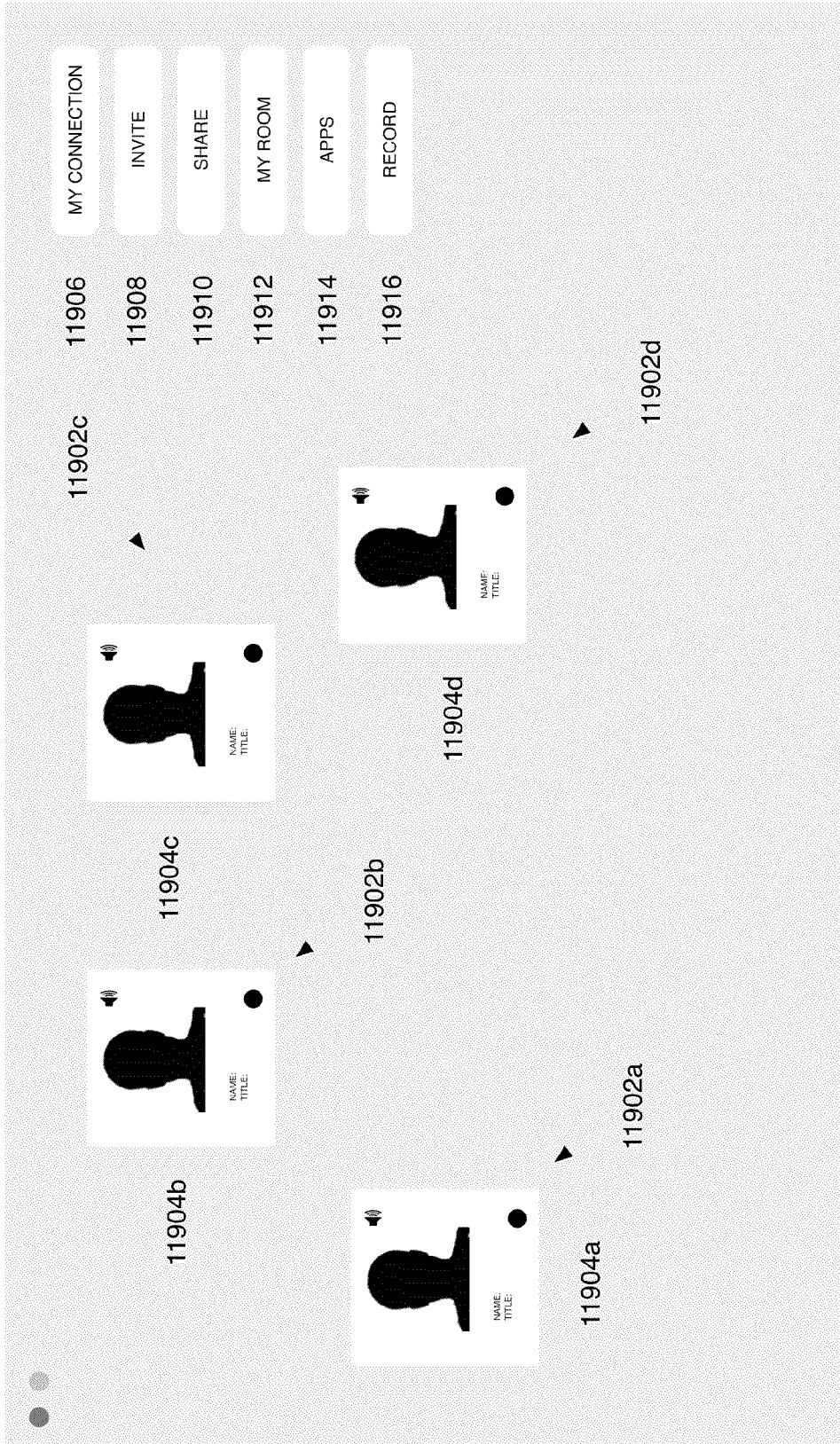
Figure 120:
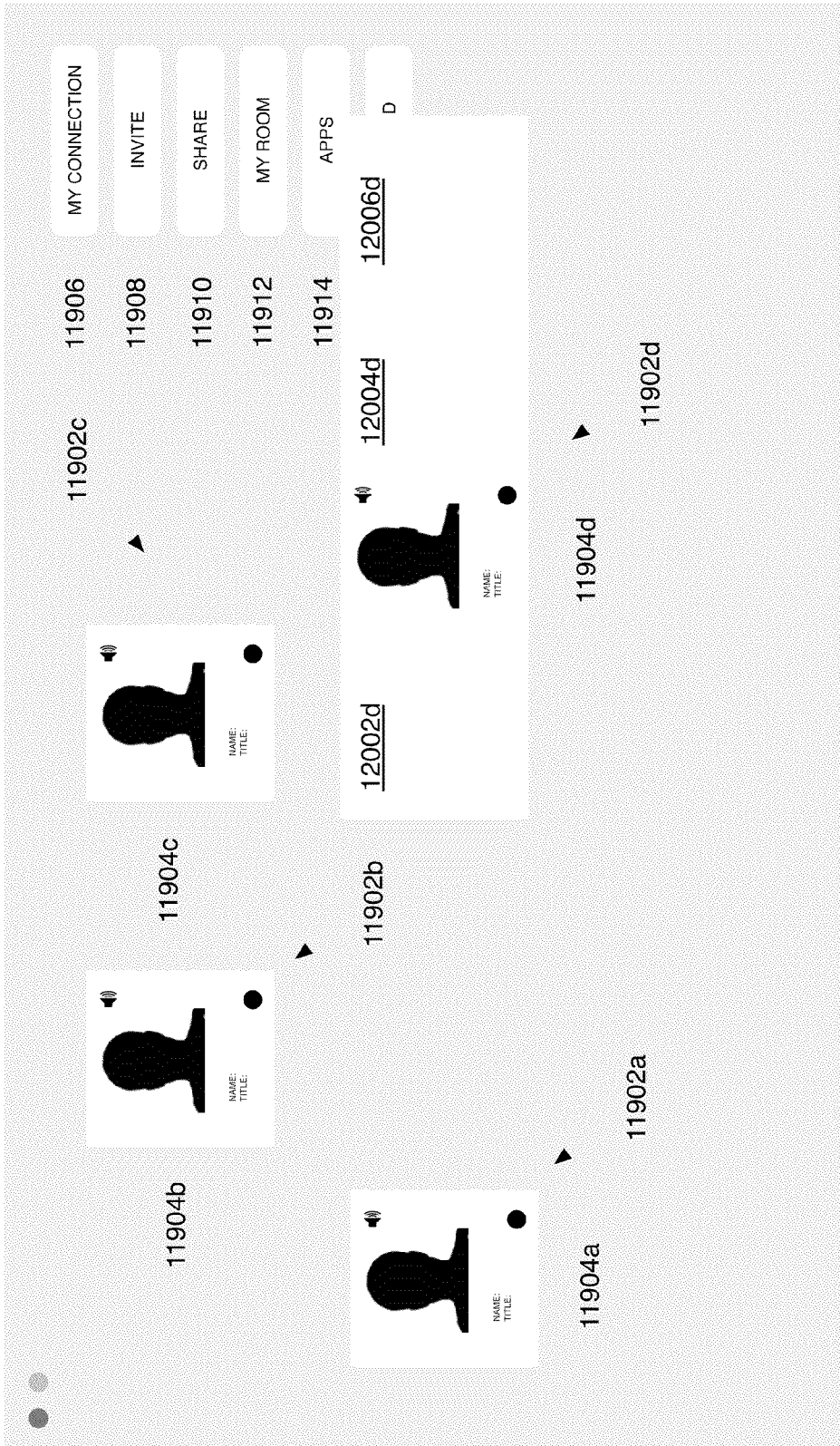
Figure 129:
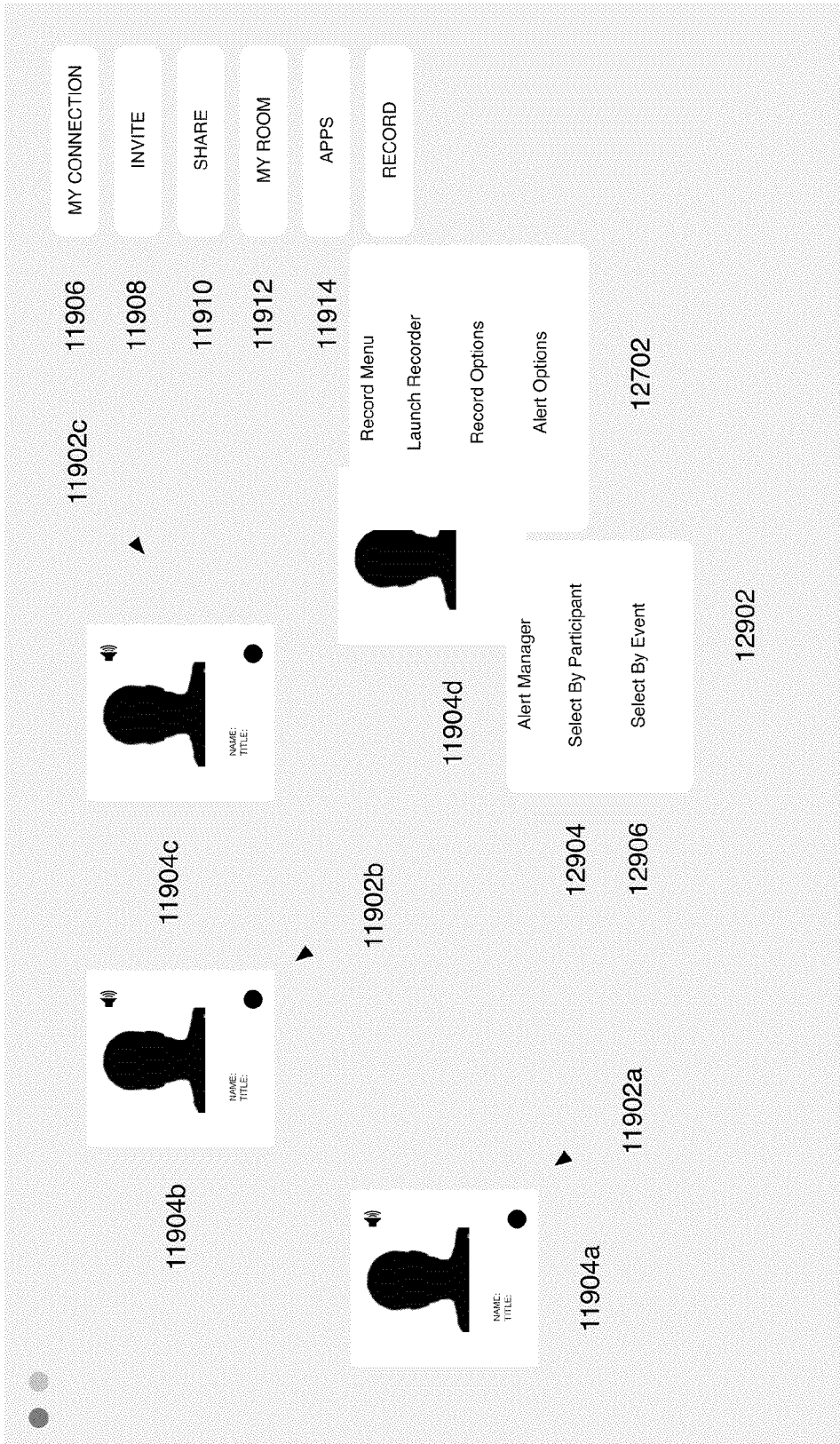

FIG. 129 illustrates an embodiment of an "alert options" menu in the conference interface of FIG. 119.

Figure 130:
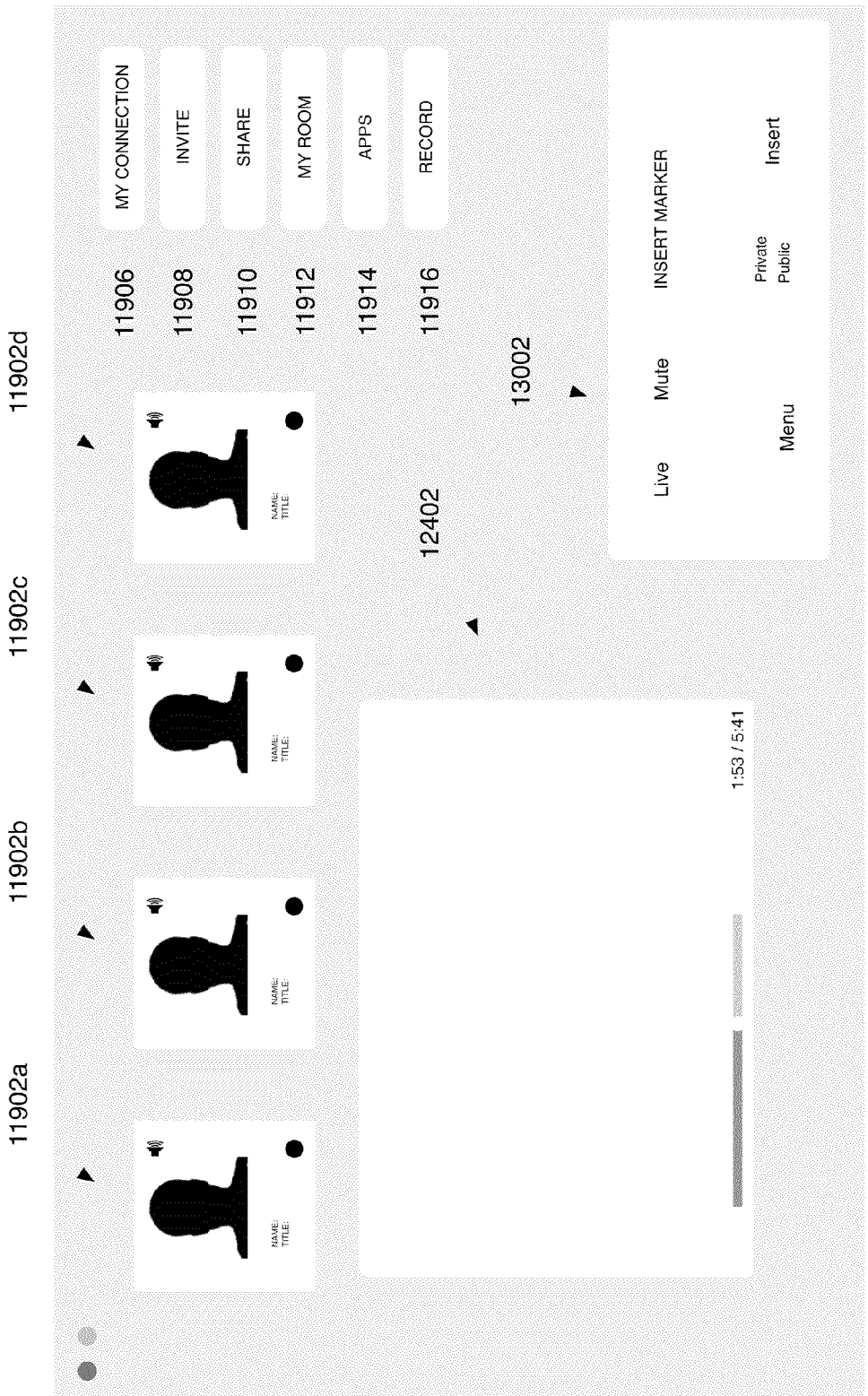

FIG. 130 illustrates the conference interface of FIG. 119 with a record/playback navigation controller.

Figure 131:
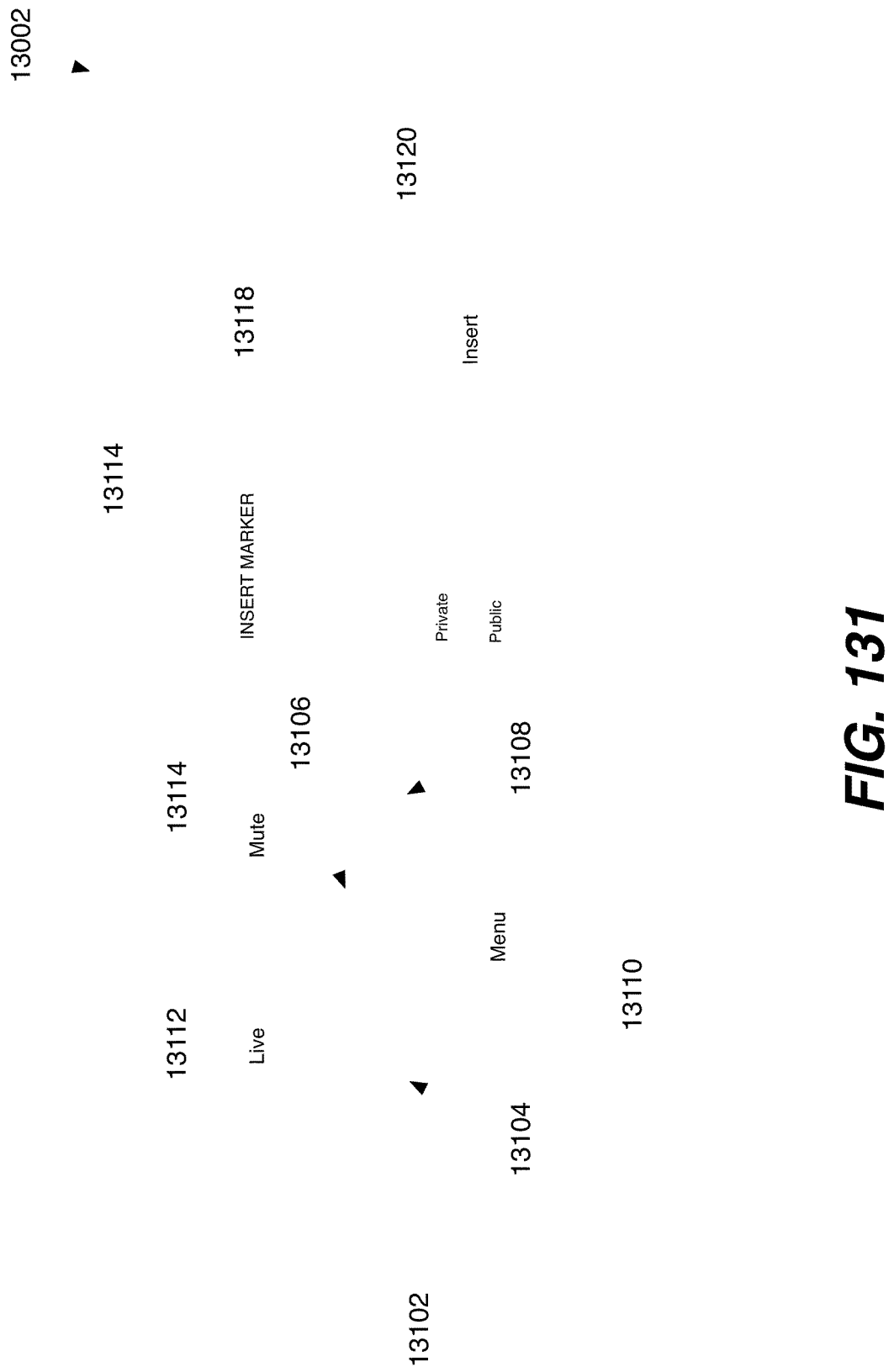

FIG. 131 is a more detailed illustration of the record/playback navigation controller of FIG. 130.

Figure 115:
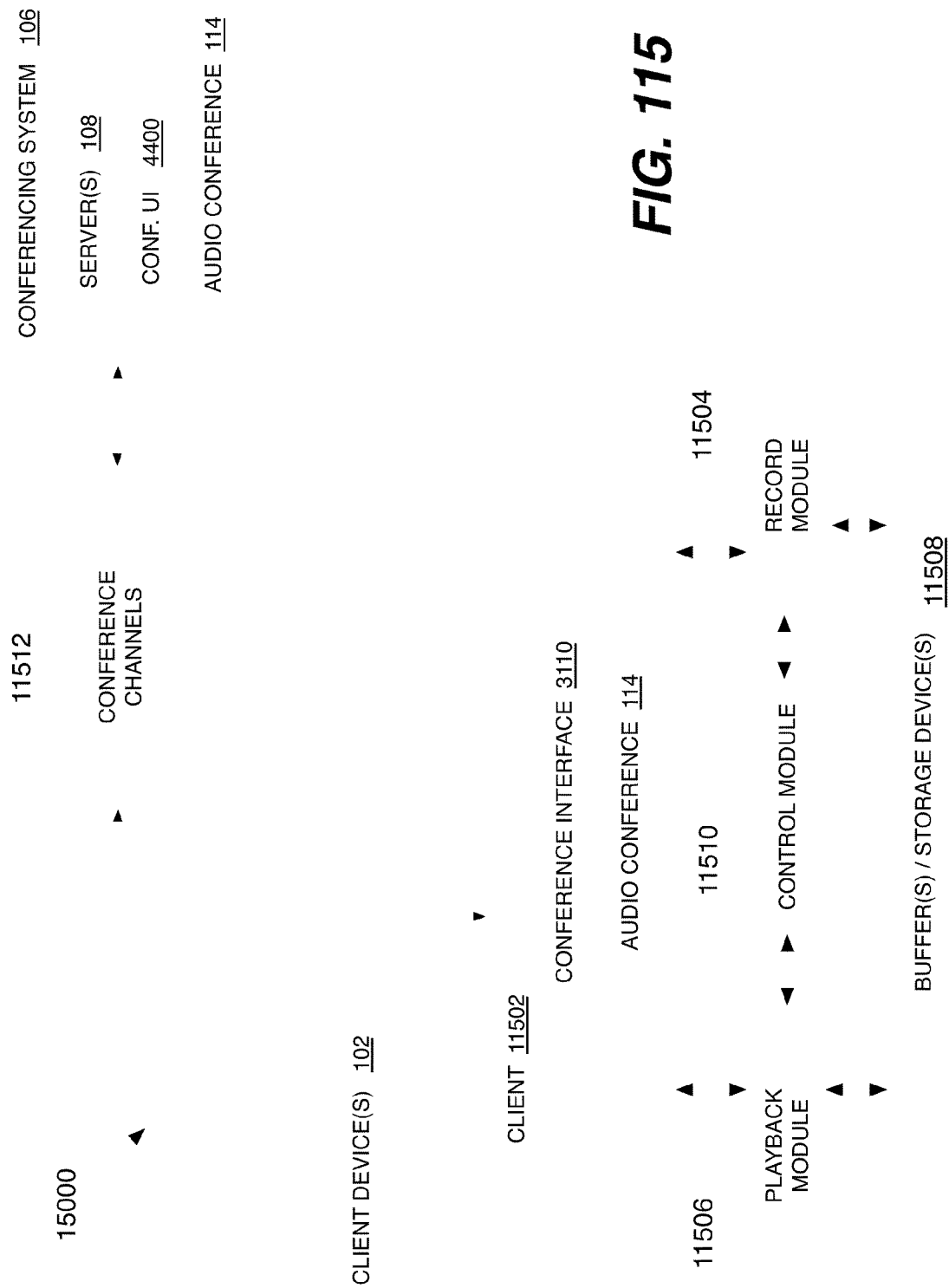
FIG. 115 is a block diagram illustrating an embodiment of a conference record/playback system.
Figure 132:
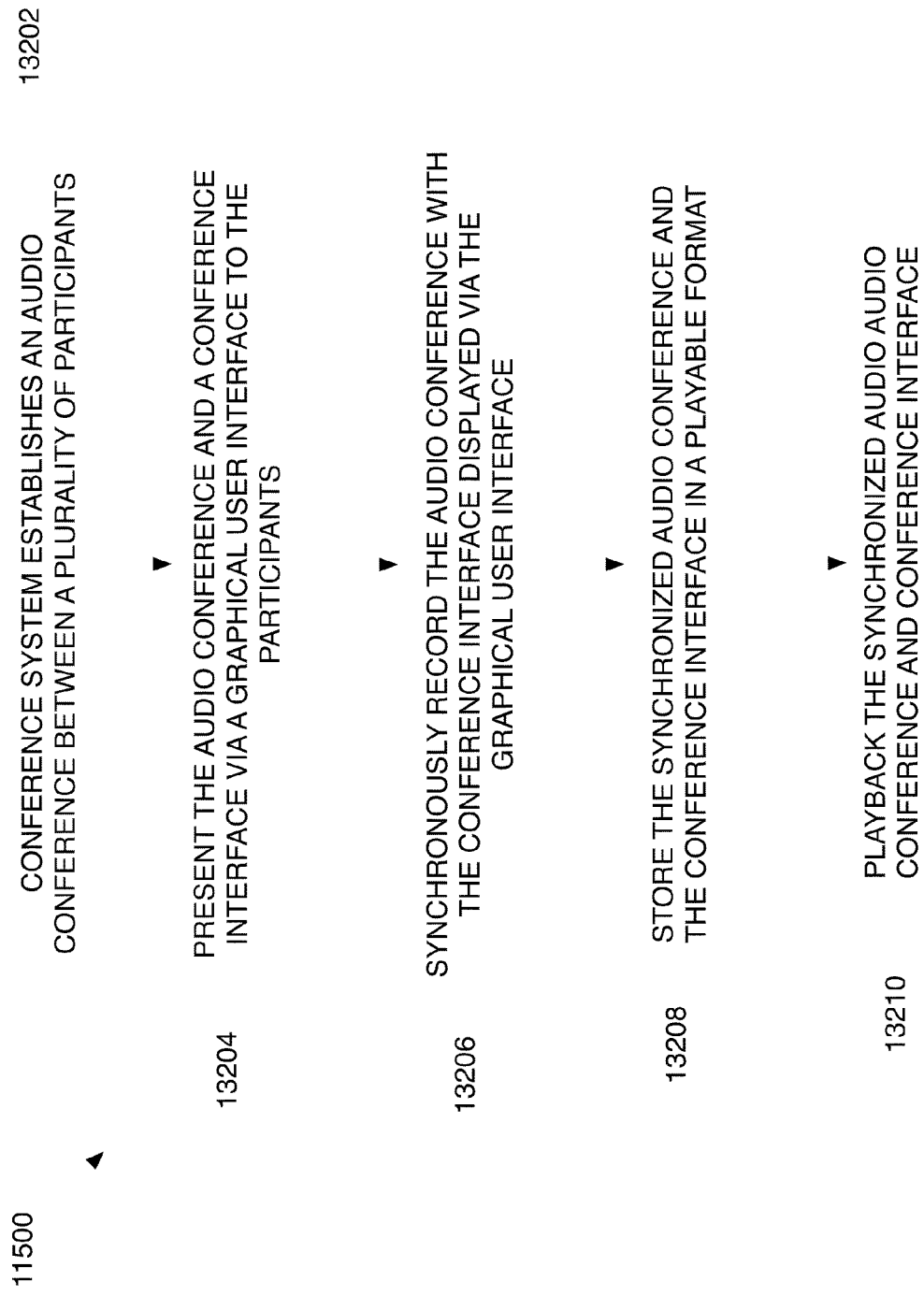

FIG. 132 is a flowchart illustrating the architecture, operation, and/or functionality of an embodiment of the conference record/playback system of FIG. 115.

Figure 133:
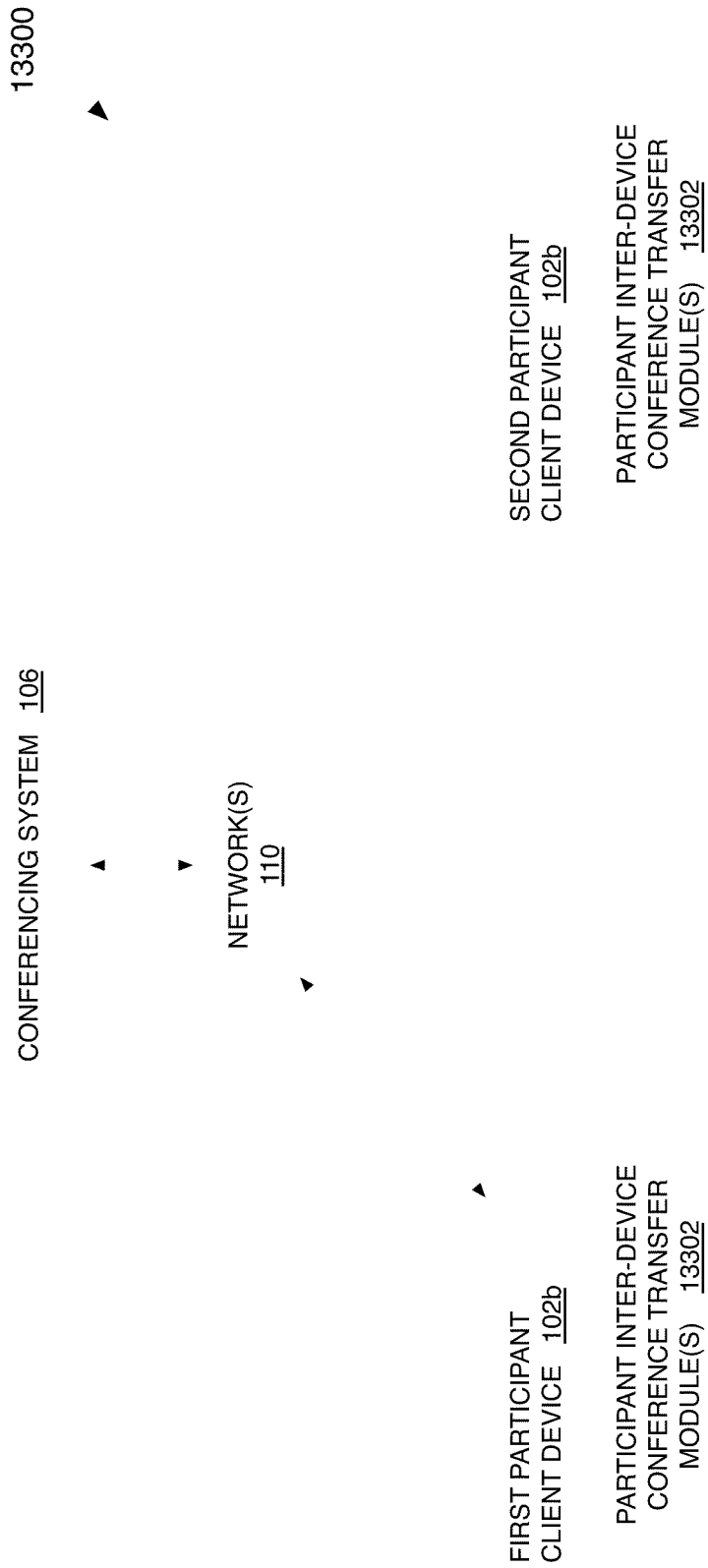

FIG. 133 is a block diagram illustrating an embodiment of a participant inter-device conference transfer system for enabling a participant to seamlessly change devices during a conference.

Figure 134:
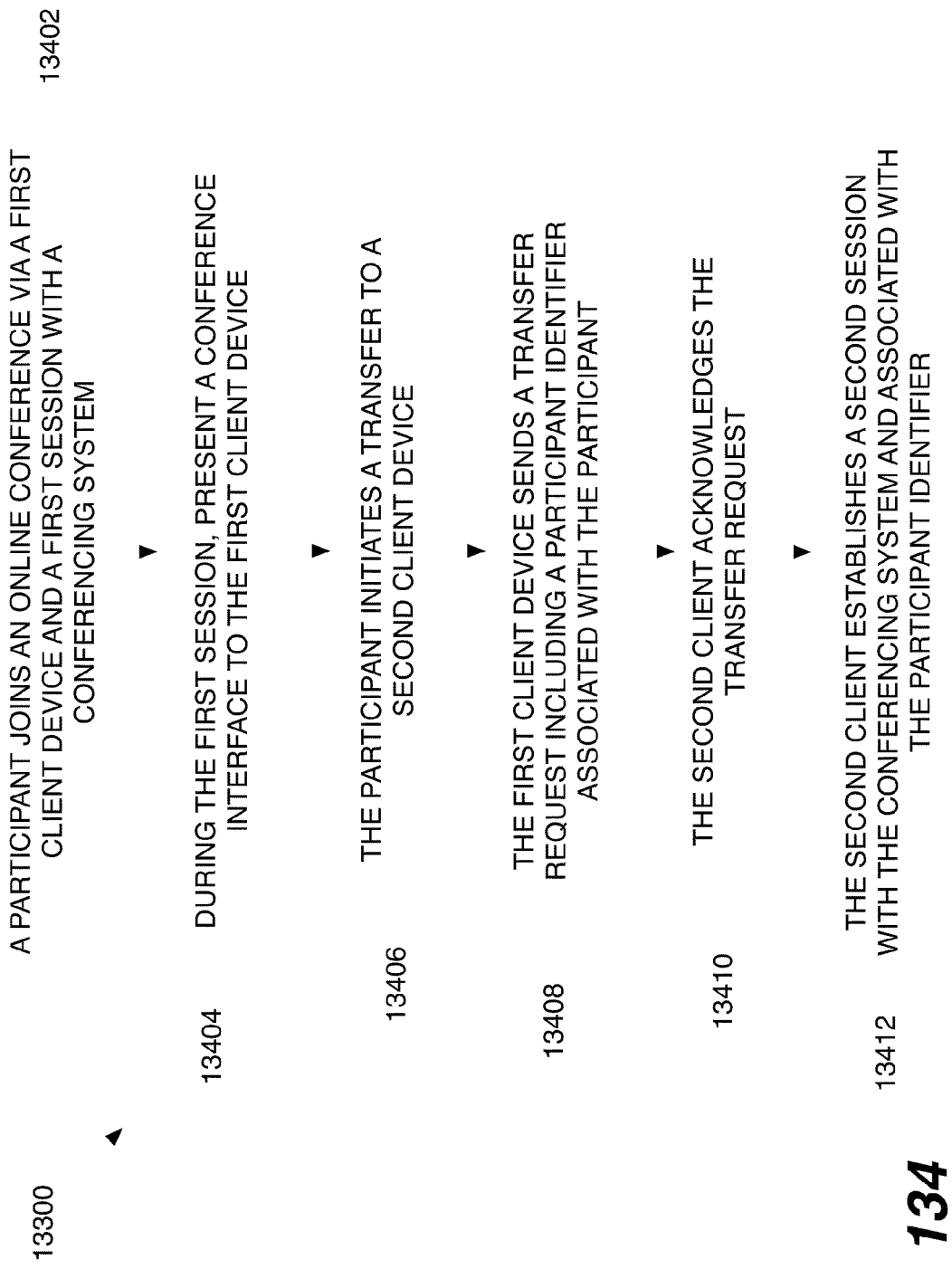

FIG. 134 is a flowchart illustrating the architecture, operation, and/or functionality of an embodiment of the participant inter-device conference transfer system of FIG. 133.

Figure 135:
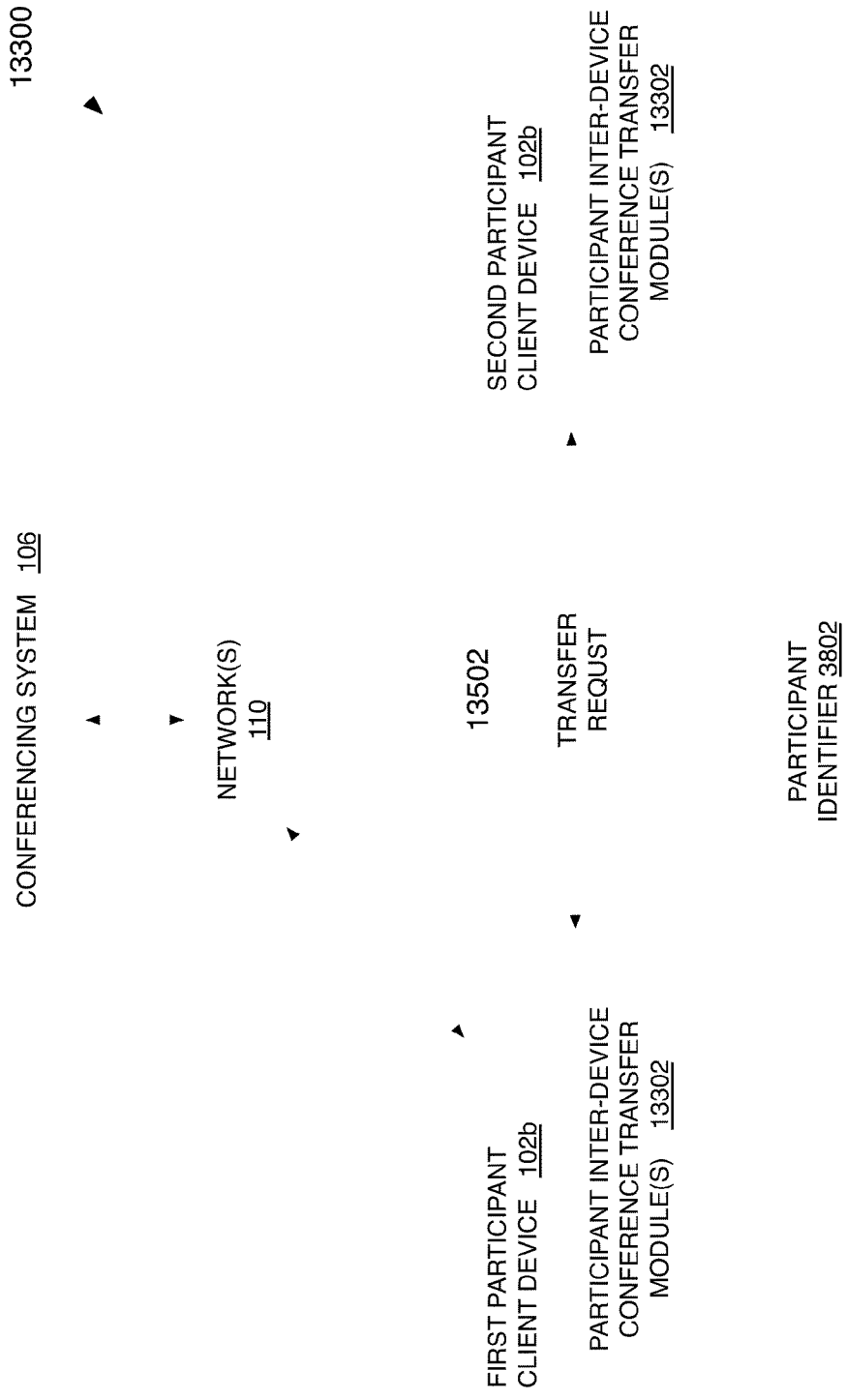

FIG. 135 illustrates an embodiment of a method for initiating the transfer to the second client device in the participant inter-device conference transfer system of FIG. 133, in which the first client device sends a transfer request to the second device via a local communication network.

Figure 136:
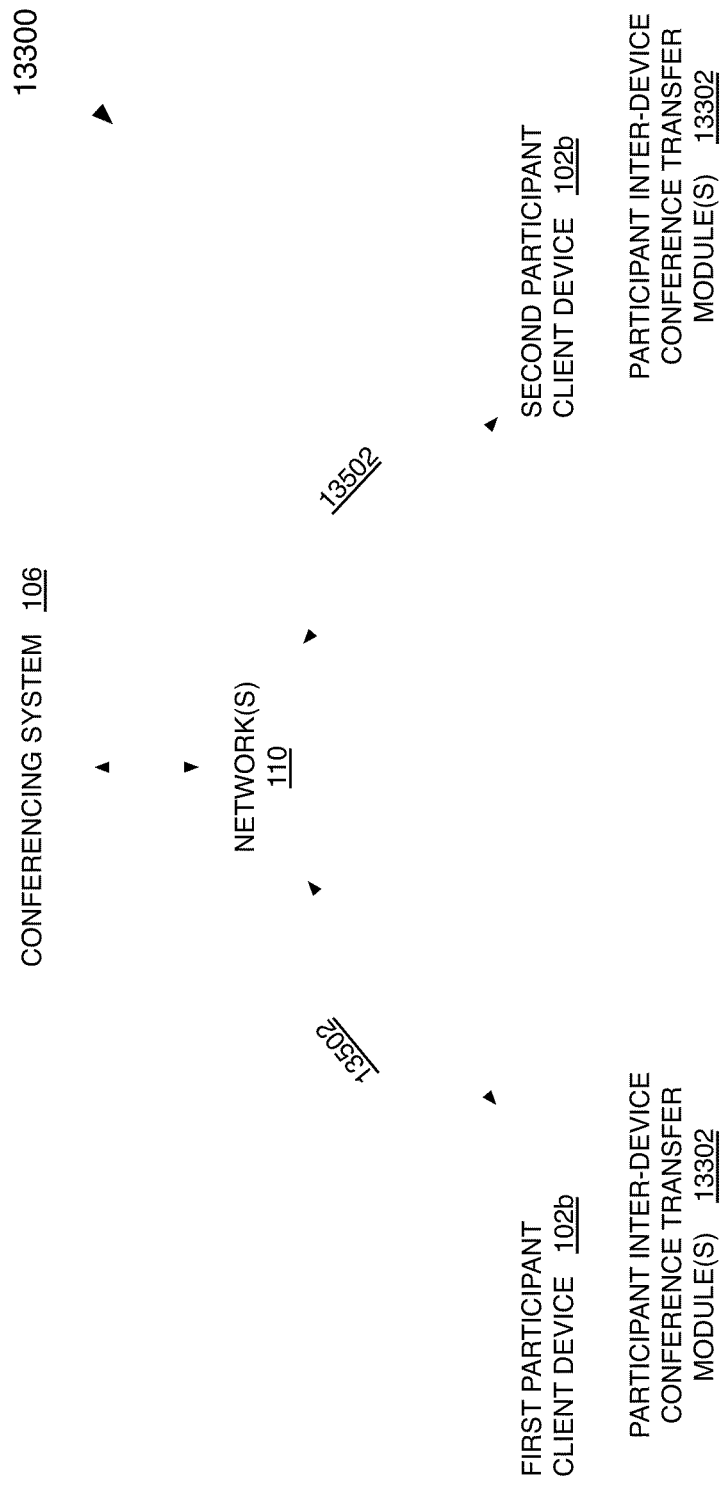

FIG. 136 illustrates another embodiment of a method for initiating the transfer to the second client device in the participant inter-device conference transfer system of FIG. 133, in which the first client device sends a transfer request to the second client device via the conferencing system.

Figure 137:
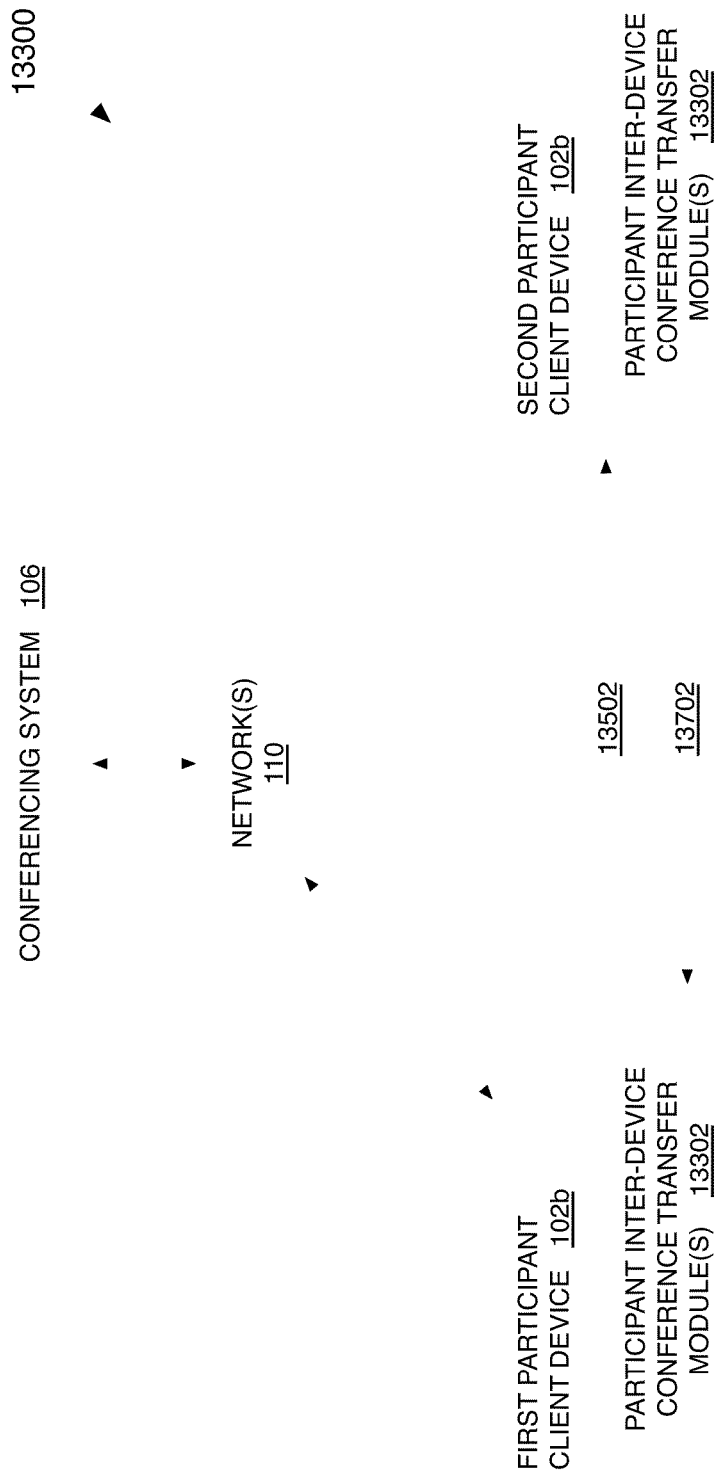

FIG. 137 illustrates one implementation of a method for the second client device acknowledging the transfer request from the first client device.

Figure 138:
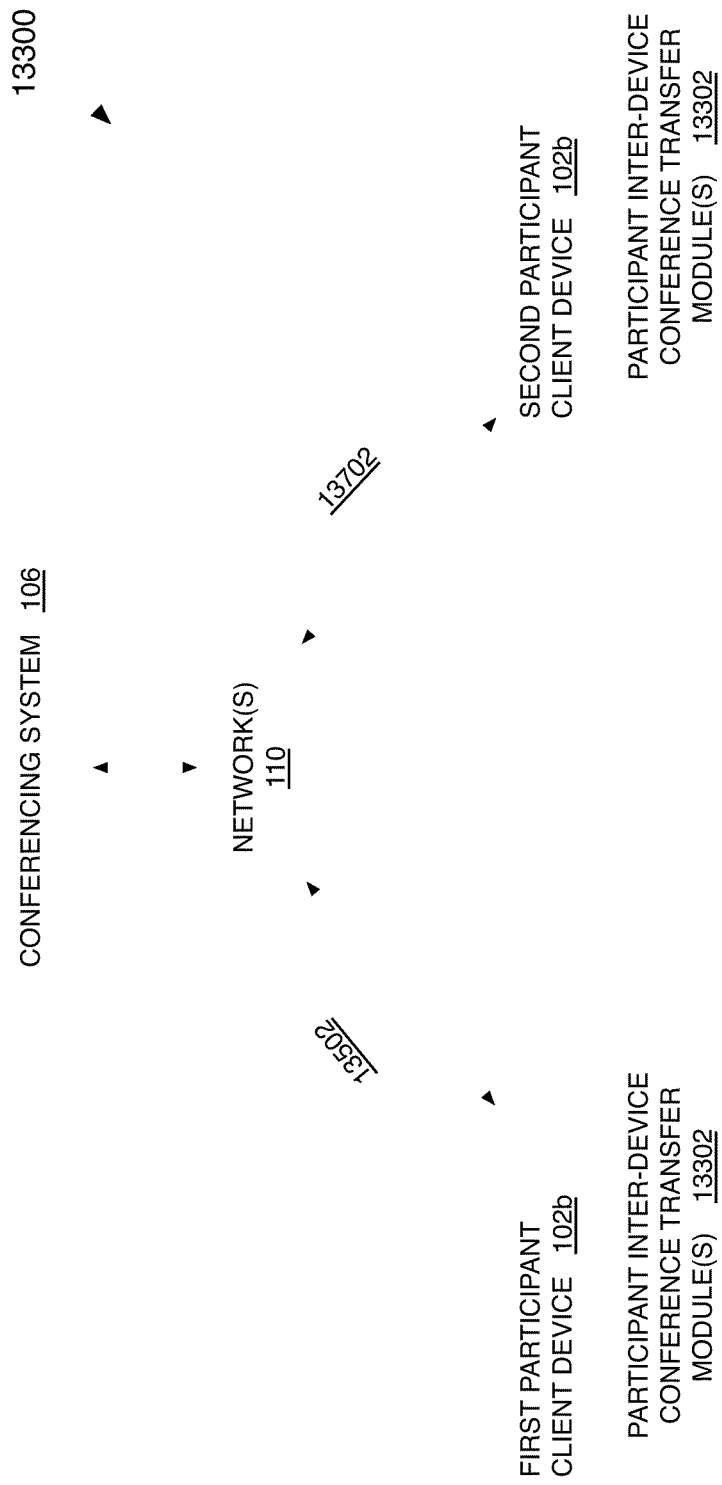

FIG. 138 illustrates another implementation of a method for the second client device acknowledging the transfer request from the first client device.

Figure 139:
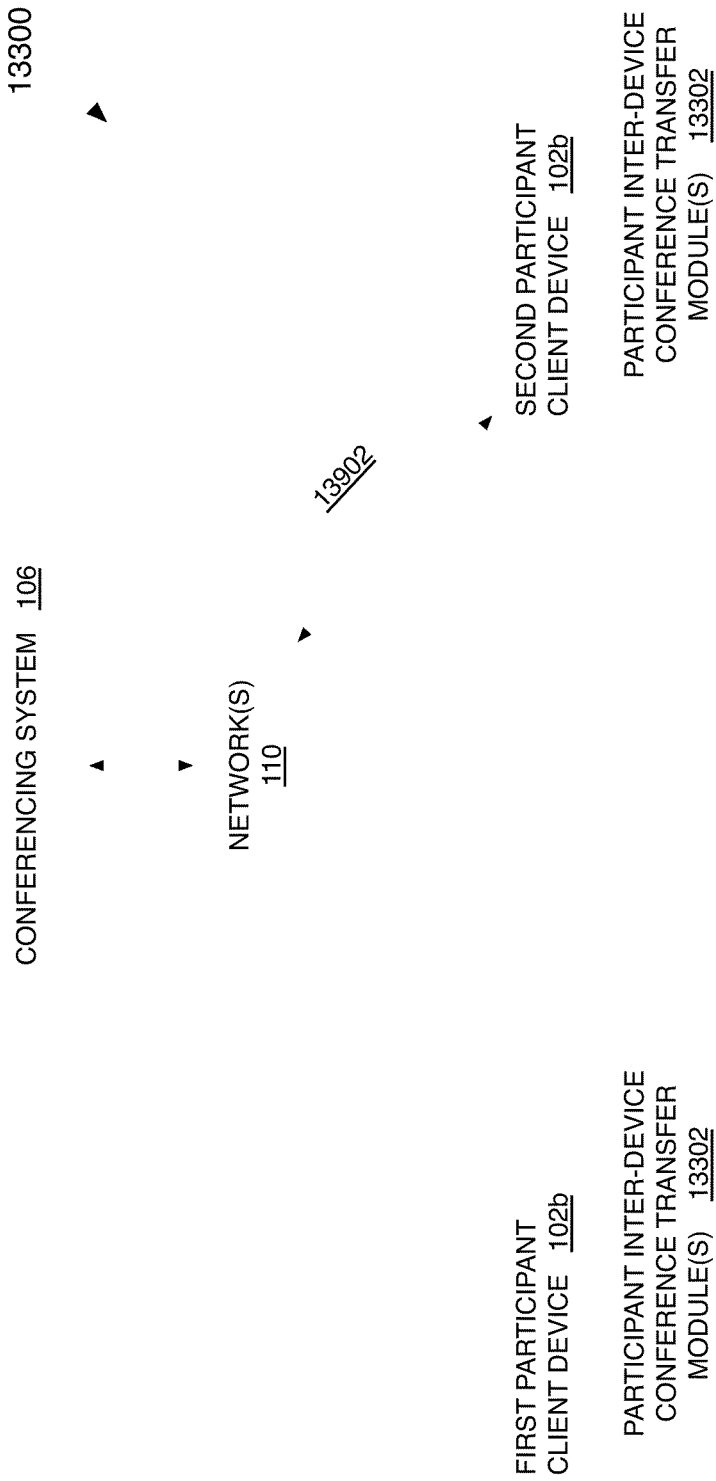

FIG. 139 illustrates the second client device establishing a connection with the conferencing system and seamlessly joining the online conference without indicating the inter-device transfer to the other participants.

DETAILED DESCRIPTION

Various embodiments of systems, methods, and computer programs are disclosed for providing a visually engaging conference experience to participants of a conference via a conference user interface presented to a client device. The conference interface may be used for conferences, meetings, groupings or other types gatherings (collectively, a "conference" with a system that provides the conference interface for a conference being referred to herein as a "conferencing system") for any variety of purposes of one or more people, groups or organizations (including combinations thereof and collectively referred to as "participants") with or without an audio component, including, without limitation, enabling simulcast audio with such conference for the participants. As mentioned above and described below in detail with reference to one or more of the embodiments illustrated in the drawings, the conference interface may be configured to provide any desirable content and/or functionality and may support various user interface and conferencing features. In some embodiments, the conference interface comprises a computer-simulated virtual conference location that is presented to one or more of the participants of an audio conference via a graphical user interface.

Figure 1:
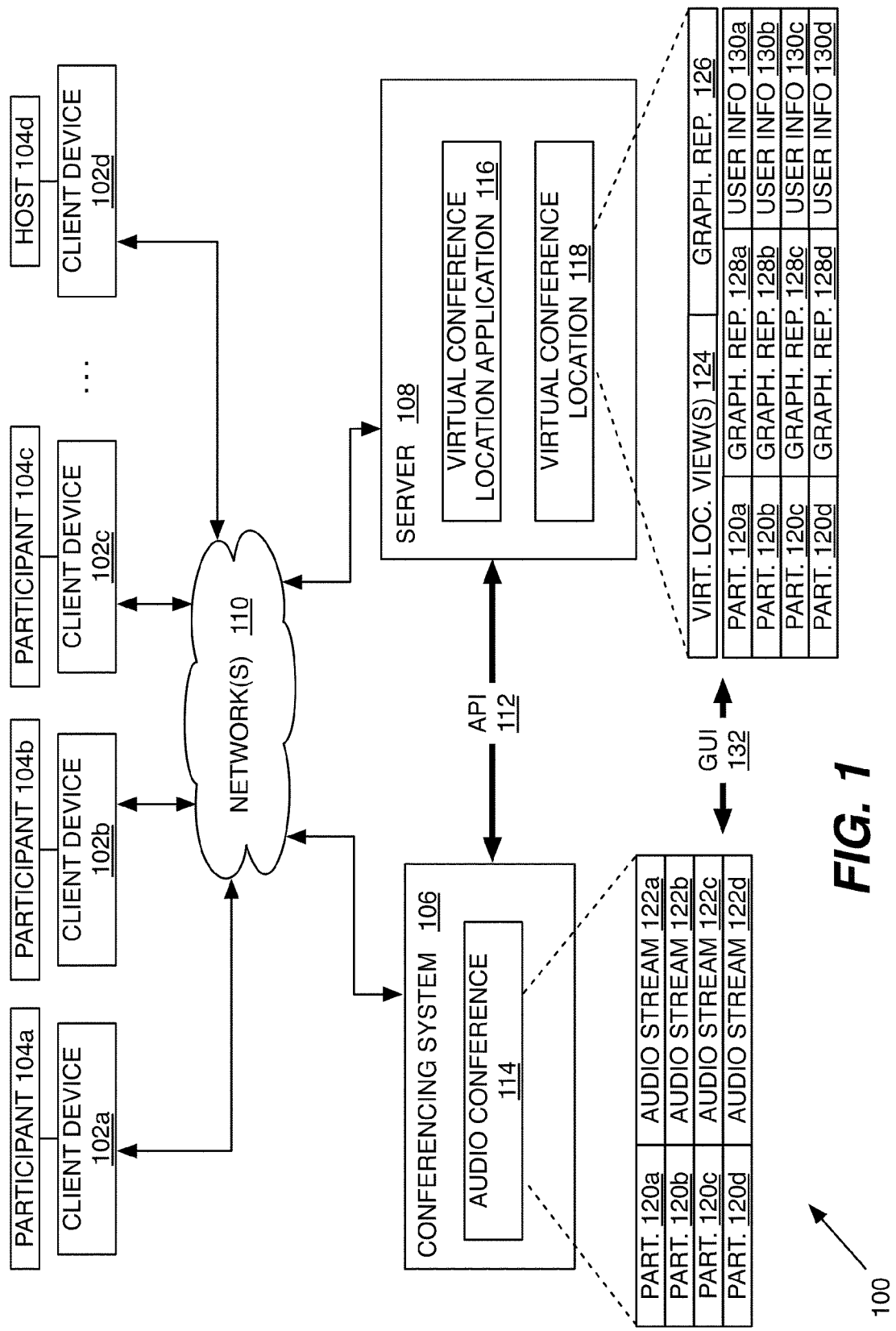
FIG. 1 is a block diagram illustrating an embodiment of a computer system for integrating a conference interface with an audio conference.

FIG. 1 illustrates a computer system 100 representing an exemplary working environment for providing a virtual conference location with an audio conference. The computer system 100 comprises a plurality of client devices 102a-102d in communication with a conferencing system 106 and server(s) 108 via one or more communication networks 110. The network(s) 110 may support wired and/or wireless communication via any suitable protocols, including, for example, the Internet, the Public Switched Telephone Network (PSTN), cellular or mobile network(s), local area network(s), wide area network(s), or any other suitable communication infrastructure. The client devices 102a-102c may be associated with participants 104a-104c, respectively, of the audio conference, and the client device 102d may be associated with a host 104d of the audio conference. The terms "host" and "participant" merely refer to different user roles or permissions associated with the audio conference. For example, the "host" may be the originator of the audio conference and, consequently, may have user privileges that are not offered to the participants, and the conference interface may provide additional functionality not available to the other participants. Nonetheless, it should be appreciated that the terms "host," "participant," and "user" may be used interchangeably depending on the context in which it is being used.

The client devices 102 may comprise any desirable computing device, which is configured to communicate with the conferencing system 106 and the server 108 via the networks 110. The client device 102 may comprise, for example, a personal computer, a desktop computer, a laptop computer, a mobile computing device, a portable computing device, a smart phone, a cellular telephone, a landline telephone, a soft phone, a web-enabled electronic book reader, a tablet computer, or any other computing device capable of communicating with the conferencing system 106 and/or the server 108 via one or more networks 110. The client device 102 may include client software (e.g., a browser, plug-in, or other functionality) configured to facilitate communication with the conferencing system 106 and the server 108. It should be appreciated that the hardware, software, and any other performance specifications of the client device 102 are not critical and may be configured according to the particular context in which the client device 102 is to be used.

The conferencing system 106 generally comprises a communication system for establishing an audio conference 114 between the client devices 102. The conferencing system 106 may support audio via a voice network and/or a data network. In one of a number of possible embodiments, the conferencing system 106 may be configured to support, among other platforms, a Voice Over Internet Protocol (VoIP) conferencing platform such as described in U.S. patent application Ser. No. 11/637,291 entitled "VoIP Conferencing," filed on Dec. 12, 2006, which is hereby incorporated by reference in its entirety. It should be appreciated that the conferencing system 106 may support various alternative platforms, technologies, protocols, standards, features, etc. Regardless of the communication infrastructure, the conferencing system 106 may be configured to establish an audio connection with the client devices 102*a*-102*d*, although in some embodiments the audio portion may be removed. As illustrated in FIG. 1, the conferencing system 106 may establish the audio conference 114 by combining audio streams 122*a*-122*d* associated with the client devices 102*a*-102*d*, respectively.

In the embodiment of FIG. 1, the server 108 comprises a virtual conference location application 116 that generally comprises the logic or functionality for configuring and presenting, via the graphical user interface 132, a virtual conference location 118 (or other conference user interface) with the audio conference 114 to the client devices 102. One of ordinary skill in the art will appreciate that the virtual conference location application 116 (and any associated or other modules described herein) may be implemented in software, hardware, firmware, or a combination thereof. In one embodiment, the systems are implemented in software or firmware that is stored in a memory and that is executed by a suitable instruction execution system. In software or firmware embodiments, the logic may be written in any suitable computer language. In hardware embodiments, the systems may be implemented with any or a combination of the following, or other, technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As mentioned above, the virtual conference location 118 comprises a computer-simulated conference location that is presented to the client devices 102. The virtual conference location 118 may be presented to the participants 104*a*-104*d* via a graphical user interface 132. The virtual conference location 118 may store in an associated memory various forms of data for managing and presenting the computer-simulated conference locations. In the embodiment illustrated in FIG. 1, the virtual conference location 118 comprises graphical representations 128 of one or more virtual location views 124. The same virtual location view 124 may be provided to each of the participants 104. In some embodiments, the participants 104 may customize a virtual location view 124 or other aspects of the conference interface, in which case the system may present different location views 124 across the client devices 102. The virtual conference location 118 may further comprise graphical representations 128 of the participants 104, as well as user-related information 130 associated with each participant 104. In this manner, the virtual conference location 118 graphically represents the participants on the audio conference 114 in a simulated conference location via the GUI 132.

Figure 3:
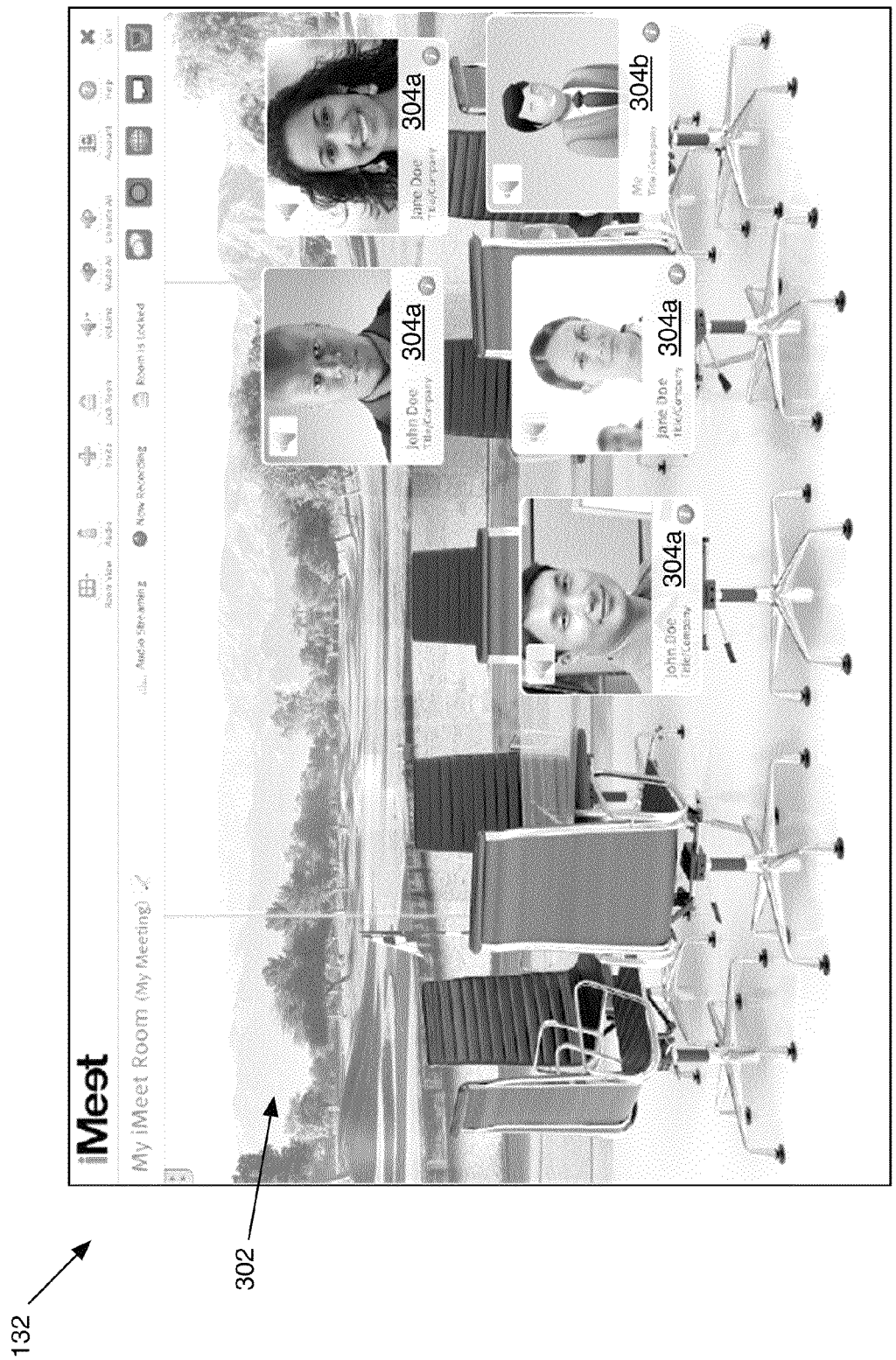
FIG. 3 is a screen shot illustrating an embodiment of a conference interface presented via the graphical user interface in the computer system of FIG. 1.

It should be appreciated that the graphical representations 128 of the participants 104 may comprise, for example, a 2-D graphic, a 3-D graphic, an avatar, an icon, an uploaded image, or any other suitable graphics, emblems, designs or other marks (each a "graphical representation") for uniquely or otherwise identifying the participants 104. The user-related information 130 (e.g., name, address, email, telephone number, profile information, etc.) may be displayed in association with, or separately from, the graphical representations 128. FIG. 3 illustrates an exemplary implementation of a virtual conference location 118 presented in the graphical user interface 132 as one of a number of possible embodiments of a conference interface. In the embodiment of FIG. 3, the virtual location view 124 comprises an image 302 of an office conference table with chairs and a background of a golf course. The participants 104 are visually represented with participant objects (e.g., tiles 304*a* and 304*b*). The image 302 may generally comprise any background or visual backdrop or functionality for the tiles 304. The graphical representation 128 in the tiles 304*a* comprises a picture or photograph of the corresponding participant 104, although any content, audio, video, media, or functionality may be presented. The graphical representation 128 in the tiles 304*b* comprises an avatar-like image, which may be uploaded to the server 108 or selected and/or customized from predefined images.

Figure 2:
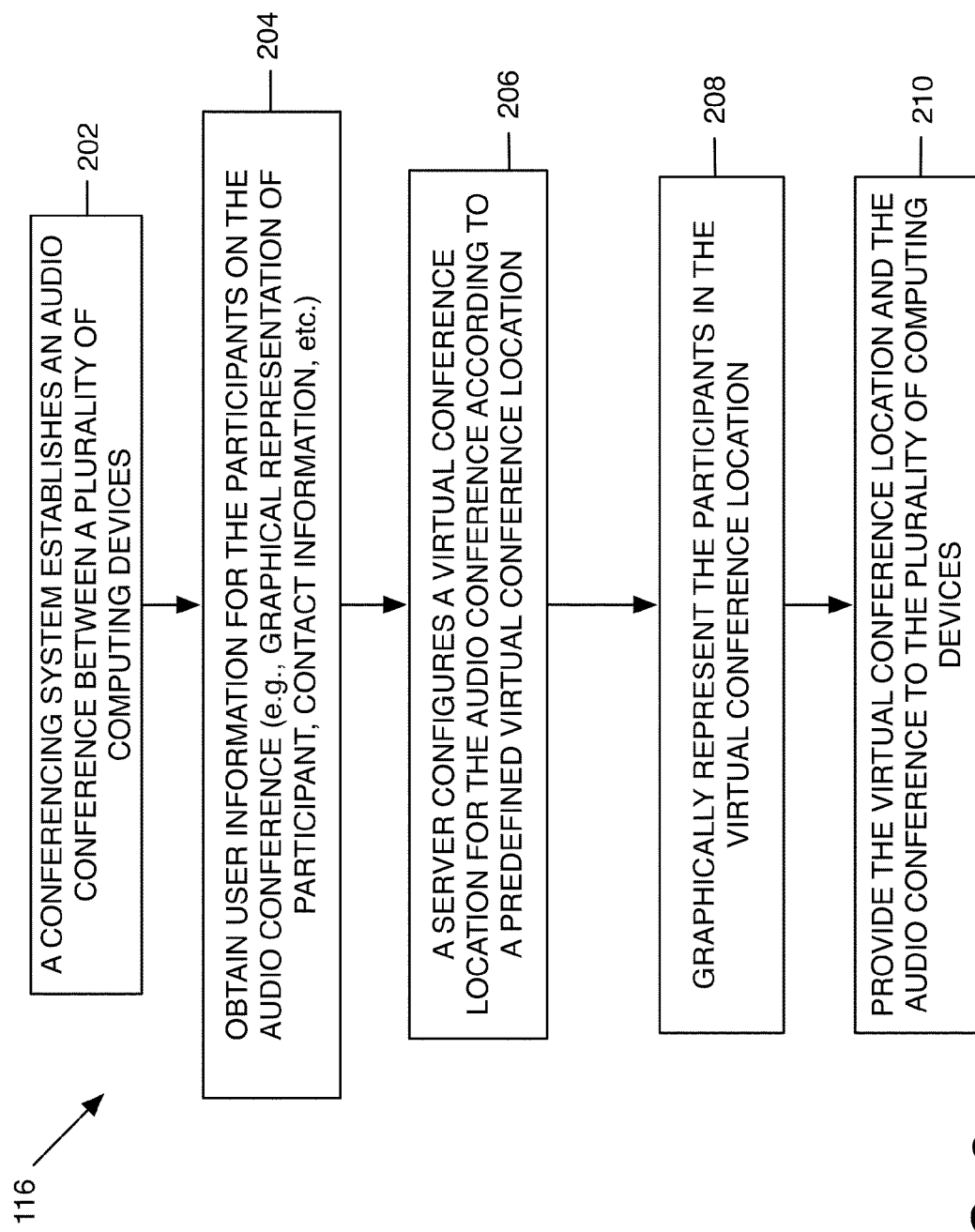
FIG. 2 is a flowchart illustrating an embodiment of the operation of the computer system of FIG. 1.

FIG. 2 illustrates an embodiment of a method for providing the virtual conference location 118. At block 202, the conferencing system 106 establishes the audio conference 114 between the client devices 102. As known in the art, the conferencing system 106 may establish a separate audio stream 122 (FIG. 1) for each client device 102. The audio streams 122*a*-122*d* may be combined into a single audio stream for presentation to the client devices 102 as the audio conference 114. One of ordinary skill in the art will appreciate that audio conference 114 may be established in various ways depending on the particular conferencing technologies being employed. At block 204, the virtual conference location application 116 may obtain information from the participants 104 via the graphical user interface 132. The information may be obtained via the conferencing system 106 and/or the server 108. For example, the participants 104 may provide or select the graphical representations 128 and/or 126 and the user-related information 130, or other media. At block 206, the server 108 configures the virtual conference location 118 according to the virtual location view(s) 124. It should be appreciated that the virtual location view(s) 124 may be specified by the participants 104 or automatically generated by the server 108 based on, for example, known or acquired characteristics of the participants 104, locations of the participants 104, the identity of organization(s) associated with the conference, planned subject matter for the conference, or any other desirable information for manually or automatically matching a virtual location view 124 to the conference. In some embodiments, the virtual location view 124 may be modified or replaced, either manually or automatically, during the conference by participants 104 or the server 108. At block 208, the virtual conference location 118 may be populated with the participants 104, for example, by graphically representing the participants 104 in the participant objects (e.g., tiles 304) according to the graphical representations 128 and/or the user-related information 130. The graphical representations 128 may be logically associated with a corresponding audio stream 122 to visually distinguish a participant 104 while he/she is talking. As illustrated in FIG. 3, the graphical representations 128 may include a microphone image that is visually altered when a participant 104 is talking. At block 210, the virtual conference location 118 and the audio conference 114 are provided to the client devices 102.

As further illustrated in the embodiment of FIG. 3, the conference interface may further comprise various user interface control(s) for enabling a participant to access any of the following, or other, features: a drop down menu for selecting and/or changing the virtual conference location 118, view, etc.; an invite control for inviting additional participants 104 to the audio conference 114; a lock room control for locking the current conference; an audio control for managing aspects of the audio conference 114 (e.g., recording the audio conference 114); a volume control; a mute/unmute control; and an account control for accessing and managing the participant's account with the conferencing system 106.

Figure 4:
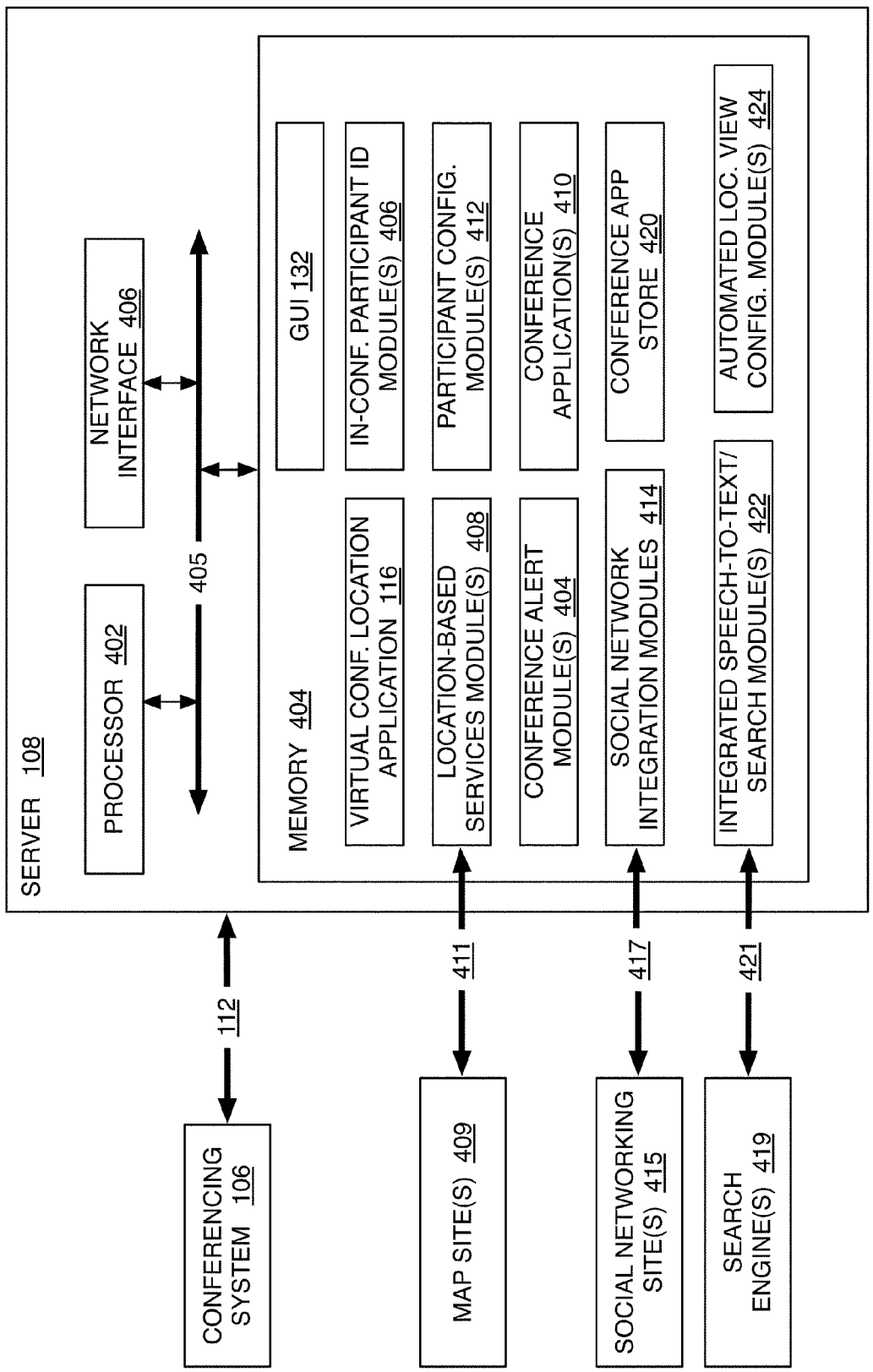
FIG. 4 is a block diagram illustrating an embodiment of the server of FIG. 1 for integrating a conference interface with an audio conference.

FIG. 4 is a block diagram illustrating the general structure and architecture of an embodiment of the server 108 for supporting the virtual conference location application 116 (or other conference interface(s) or application(s) presented to or residing at the client device 102 or server(s) 108) and associated features, functionality, etc. The server 108 may comprise one or more processors 402, a network interface 406, and memory 404 in communication via, for example, a local interface 405. The network interface 406 is configured to communicate with the conferencing system 106 and other computer systems or servers (e.g., server(s) hosting or otherwise providing map sites 409, social networking sites 415, search engines 418, etc.) via the network(s) 110. The server 108 and the virtual conference location application 116 may support various services, features, applications, etc. that may be implemented via computer programs stored in memory 404 and executed via processors 402. In the embodiment illustrated in FIG. 4, memory 404 includes virtual conference location application 116 and various additional modules for implementing associated features, including location-based services module(s) 408, conference alert module(s) 404, social network integration module(s) 414, in-conference participant identification module(s) 406, participant configuration module(s) 412, conferencing application(s) 410, automated location view configuration module(s) 424, integrated speech-to-text/search module(s) 422, and a conference app store functionality 420.

As described below in more detail with reference to FIGS. 50-64, conference alert module(s) 404 support a conference alert or notification feature, which may be provided to client devices 102. An alert application (or other software) residing on a client device 102 may be configured to notify the host 104d that a conference (e.g., audio conference 114, an online conference, a virtual conference location 118, or other conference interface) has started and manages who has joined by showing the name and number of participants 104 via, for example, a push from the application. As participants join, the notification may maintain a count of the number of participants 104. It may also allow the host 104d to quickly enter the conference from the application, modify settings prior to an audio conference 114 starting, and provide easy access to account numbers. The application may display, for example, an icon or other user interface control or feature in a system application tray of the client device 102, which exposes a menu or other functionality that enables users to modify certain settings, configurations, options, etc.

While the conference alert application is running, it communicates with the conferencing infrastructure using, for example, a conferencing API 112 (FIG. 4). The communications may comprise, for example, status checks of the user's conferencing bridges or locations to determine if there are any active participants 104. In the event that someone has entered the user's location or joined one of their bridges via a phone, this activity may be transmitted to the alert application as a status update. The update may include other information about the newly joined participant 104 such as the incoming phone number, email address, name, or other identifiable details (e.g., user-related information 130—FIG. 1) that may determined using, for example a caller ID database.

The application alerts the user by displaying a message on a display of the client device 102. The message may appear for a pre-determined amount of time, which may be configurable in the application's settings. The content of the message may further include the details transmitted in the status update mentioned above. The message display may also provide a mechanism for the user to acknowledge the message by either cancelling or joining a location. If the user chooses to cancel a particular message, subsequent messages will appear as new members join a location or audio bridge, with a running tally indicating the total number of participants. If the user chooses to join their own location, the alerts will cease until the event has ended.

The in-conference participant identification module(s) 406 generally support various techniques for developing and operating a database (e.g., participant ID database 2018—FIG. 20) for identifying participants in an audio conference 114. The conferencing system 106 and/or servers 108 may employ caller identification (ID) databases to capture information about who has dialed into, or otherwise accessed, the audio conference 114. For callers who dial in without joining via a web presence, the system can capture the dial-in number (ANI). There are numerous databases that store information such as name, location, etc. about that ANI. In order to better identify the caller in the audio conference 114, data may be pulled from various databases and made visible in the virtual conference location 118. Once obtained, that data may be stored to be used when that caller dials-in again. In this manner, the virtual conference location application 116 may create and manage a proprietary caller ID database 2018 (FIG. 20) for participants 104, which may provide more information about them.

Figure 20:
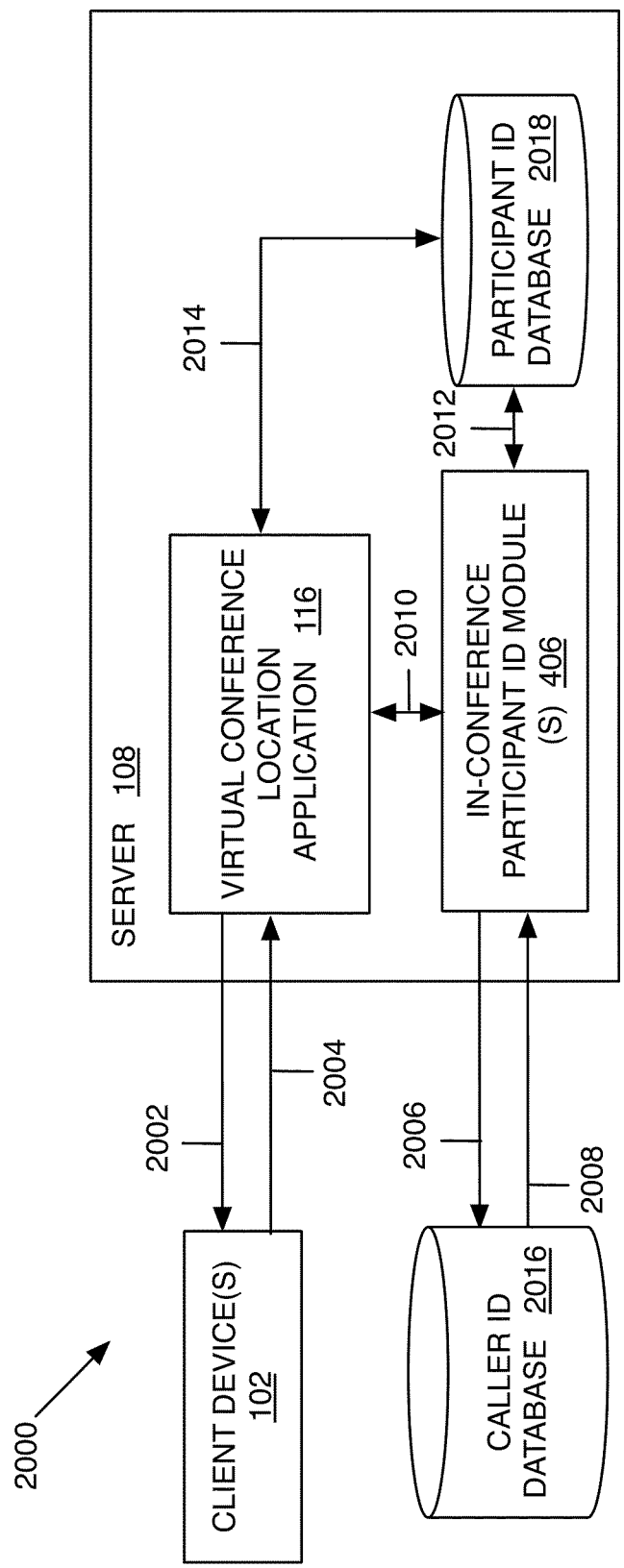
FIG. 20 is a functional block diagram illustrating an embodiment of the in-conference participant identification modules(s) in the server of FIG. 4.

As illustrated in the embodiment of FIG. 20, the virtual conference location application 116 may obtain information about participants 104 by sending a request 2002 to the client device(s) 102 or otherwise enabling the participants 104 to submit information 2004 (either about themselves or other participants 104) to the virtual conference location application 116. For example, the GUI 132 (FIG. 1) may include various UI mechanisms for enabling the user to provide the information 2004. During the audio conference 114, a participant 104 may recognize an unidentified participant's voice and provide appropriate contact information, which may then be stored in the database 2018 via interface 2014. Participants 104 may also specify additional information about themselves by, for example, supplementing user info 130 (FIG. 1) or providing new information. This information may be specified manually or the participants 104 may authorize the server 108 to access user information stored in remote servers. For example, a participant 104 may authorize the server 108 to access data stored on a social networking site 415 (FIG. 4), or the information may automatically be obtained via, for example, search engine(s) 419 based on the currently-available user info 130. As illustrated in FIG. 20, user information may be obtained from caller ID databases 2016 (or other server(s)) via requests 2006 and responses 2008 between the server 108 and the databases 2016. The information obtained from the databases 2016 or servers may be stored in the participant identification database 2018 (via interface 2012).

Figure 37:
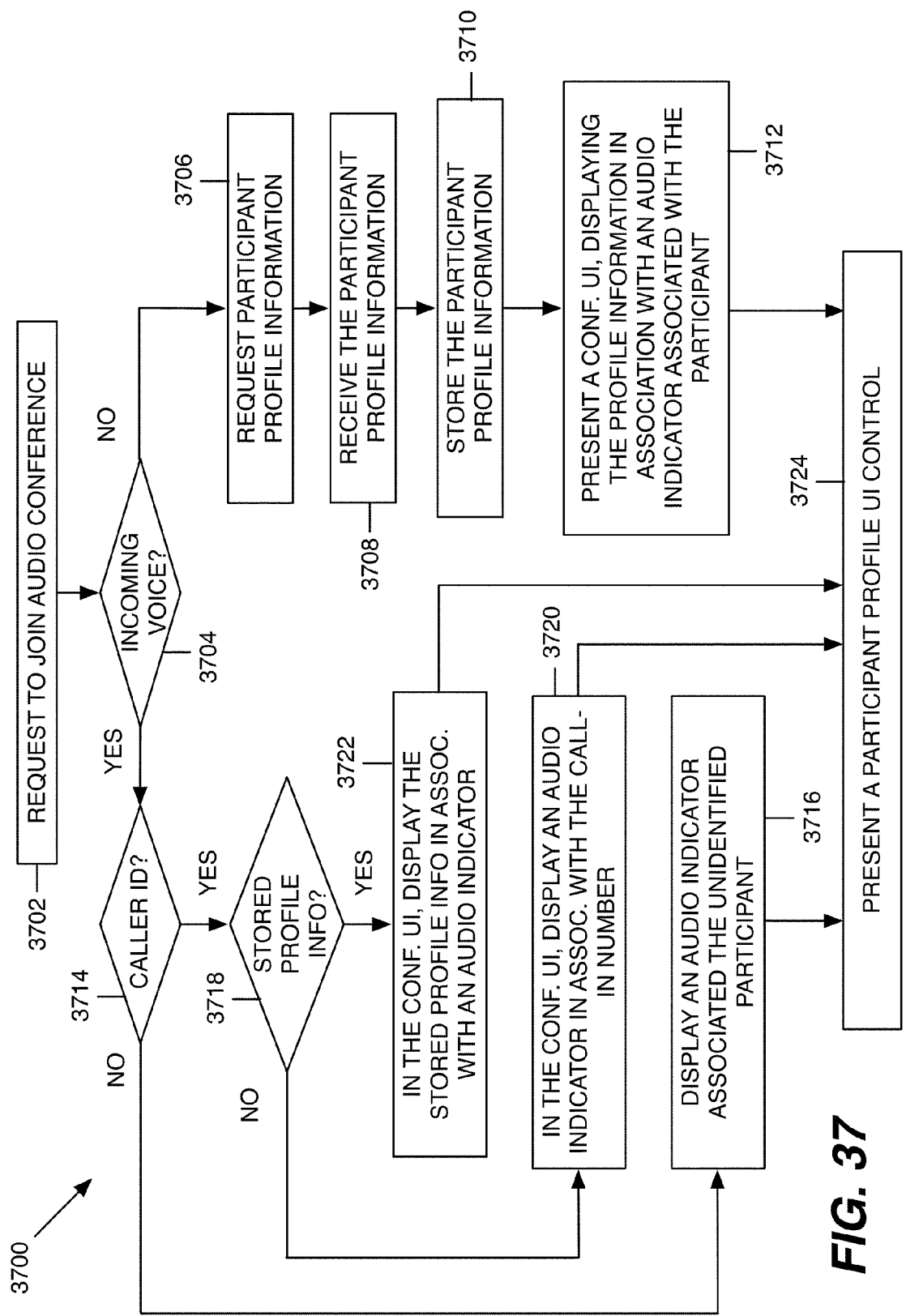
FIG. 37 is a flowchart illustrating an embodiment of a method for gathering participant information for the participant database in the system of FIG. 20.

FIG. 37 illustrates an embodiment of a method 3700 for obtaining participant information in an audio conference 114 via a conference interface. At block 3702, a participant 104 requests to join an audio conference 114. The request may originate from the client device 102 and be sent to the conferencing system 106 via, for example, a voice network, a data network, any combination thereof, or any other network. In this regard, it should be appreciated that, in some embodiments, the participant 104 may be requesting to join the audio conference 114 via a voice call originating from a client device having a telephone number. The voice call may be carried over a mobile telephone system, the PSTN, etc. The voice call may originate from the computing device 102 as an incoming voice call to the conferencing system 106 or, as described above, the participant 104 may request an outgoing voice call to the computing device 102. Alternatively, the participant 104 may join the audio conference 114 by establishing an audio session via, for instance, a VoIP session, a web-based connection, or any other data connection.

Figure 38:
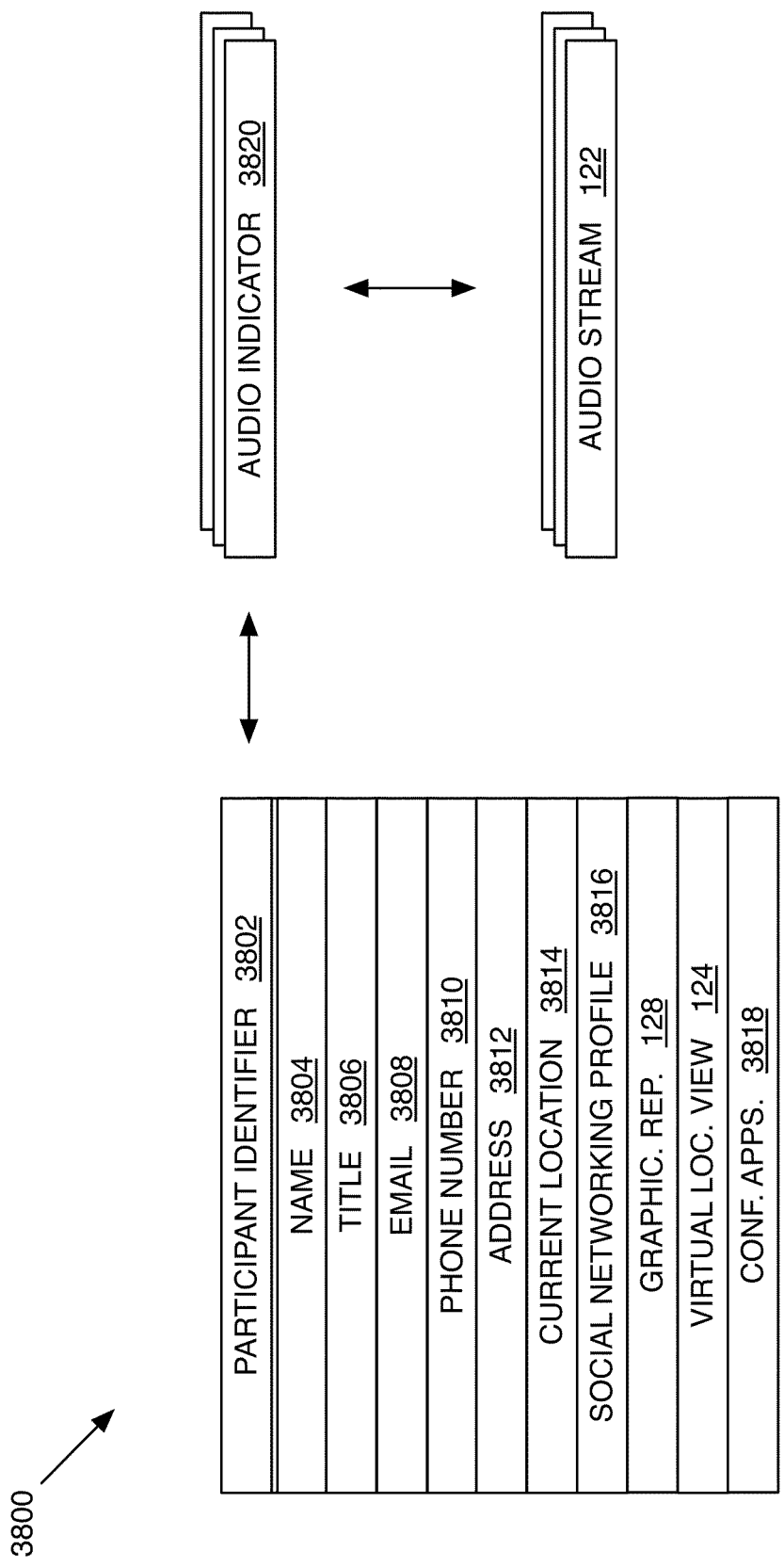
FIG. 38 is a diagram illustrating an exemplary data structure implemented in the participant database of FIG. 20.

At decision block 3704, the conferencing system 106 may determine whether the participant 104 is joining the audio conference 114 via an incoming voice call. If the participant 104 is not joining the audio conference 114 via an incoming voice call (e.g., the participant is joining via a web presence), the system may request that the participant 104 provide participant profile information (block 3706). The participant profile information may comprise any desirable parameters identifying the participant 104 or other information related to the participant 104 (e.g., the parameters identified in the exemplary screen shots of FIGS. 6-8). At block 3708, the conferencing system 106 receives the specified parameters and, at block 3710, stores them in a database (e.g., database 2018). FIG. 38 illustrates an embodiment of a data structure 3800 for storing various participant profile parameters associated with a particular participant 104. Each participant 104 in an audio conference 114 may be identified with a unique participant identifier 3802 and may include any of the following, or other, parameters; a name 3804; a title 3806; an email address 3808; a phone number 3810; a resident and/or home address 3812; a current location 3814 (which may be obtained by GPS coordinates from the client device, from an IP address, etc.); social networking profile parameters 3816; a graphical representation 124 (FIG. 1); a virtual location view 124 (FIG. 1); and conference applications 3818 that the participant 104 has purchased, selected, or are otherwise accessible to the participant during an audio conference 114.

At block 3712, the conferencing system 106 may present a conference user interface to the computing device 102 associated with the participant 104 (as well as the other devices/participants in the audio conference 114). To identify the participant 104, the conference user interface may display one or more of the specified participant profile parameters in association with an audio indicator 3820 (FIG. 38). The audio indicator 3820 comprises a user interface control that indicates when the participant 104 is speaking. In this regard, each participant identifier 3802 may have a corresponding audio indicator 3820. In an embodiment, the conference user interface may be configured as a virtual conference location 118, as described above, although it should be appreciated that the term conference user interface or conference interface refers to any graphical user interface associated with the audio conference 114, an online conference, or any other conference, which presents information, data, multimedia, etc. and/or functionality or applications (e.g., conferencing applications 3818) to the participants.

Figure 40:
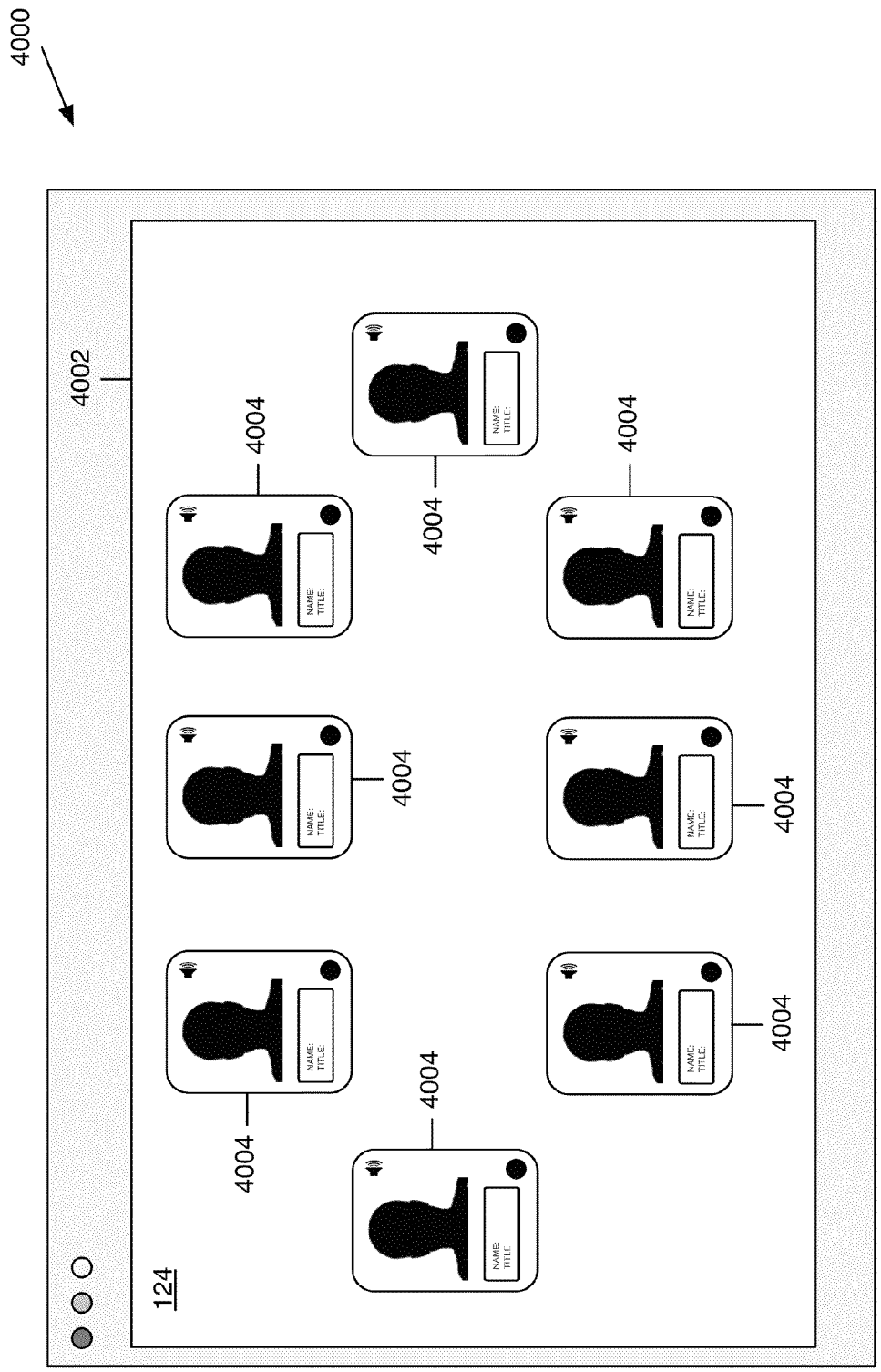
FIG. 40 is a user interface screen shot illustrating an embodiment of a conference interface for implementing aspects of the in-conference participant identification module(s).

FIG. 40 illustrates an embodiment of a conference user interface 4000 for displaying the participant profile parameters. The conference user interface generally comprises a screen portion 4002 that displays a participant object 4004 for each participant 104. The objects 4004 may be arranged in any of the ways described below in connection with FIGS. 9-14. The screen portion 4002 may further comprise a virtual location view 124. An object 4004 may comprise a graphical representation 4102, profile information 4104, an audio indicator 4106 (which corresponds to the audio indicator identifier 3820 in FIG. 38), and a business card component 4108. The graphical representation 4102 comprises a picture, photograph, icon, avatar, etc. for identifying the corresponding participant 104. The graphical representation 4004 may be similar to the graphical representation 128, and may comprise an image that is uploaded to the server 108 or selected and/or customized from predefined images.

Figure 41B:
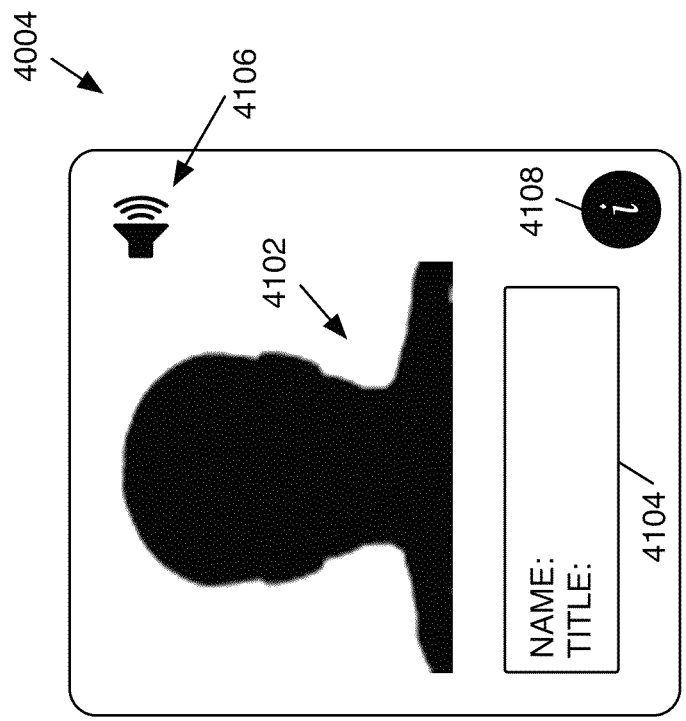
FIG. 41*b* illustrates the participant object of FIG. 41*a* with the audio indicator in a speaking state.
Figure 41A:
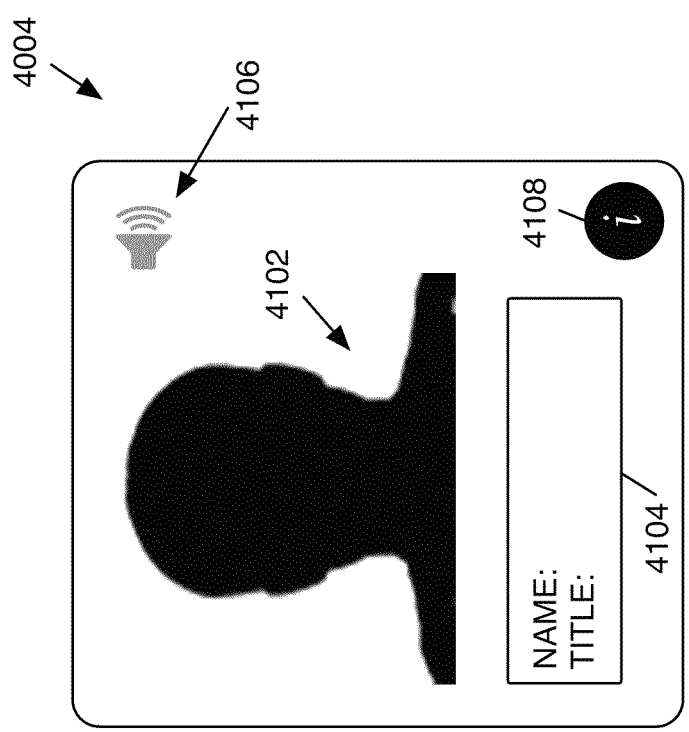
FIG. 41*a* is a more detailed view of one of the participant objects in the conference interface of FIG. 40.

The profile information 4104 may comprise one or more of the participant profile parameters. The audio indicator 4106 visually identifies when the associated participant 104 is speaking during the audio conference 114. By monitoring the audio streams 122 for certain audio characteristics, the conferencing system 106 may determine when a participant 104 is speaking. The audio stream 122 may be logically mapped to the corresponding audio indicator 4106 according to the participant identifier 3802 and/or the audio indicator identifier 3820 (FIG. 38). When a participant is speaking, the audio indicator 4106 may be displayed in a first visual state (FIG. 41a), such as, by graying out the audio indicator 4106. When the participant 104 is speaking, the audio indicator 4106 may be displayed in a second visual state (FIG. 41b), such as, by blacking out the audio indicator 4106. It should be appreciated that any visual and/or audio distinctions may be employed to identify a speaking participant in the conference interface.

Figure 42B:
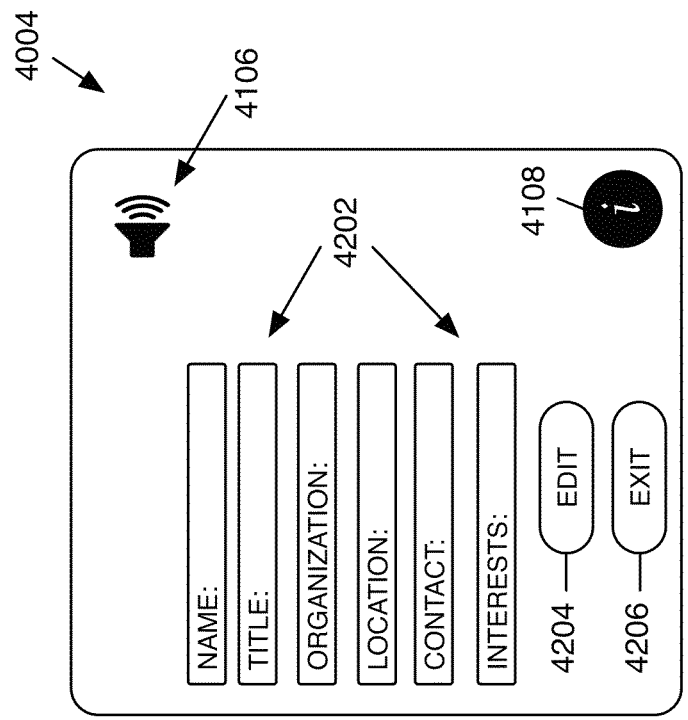
FIG. 42*b* illustrates an embodiment of a user interface screen for implementing a participant profile user interface control.

The business card component 4108 comprises a user interface control that, when selected, displays further information about the participant 104. The business card component 4108 may trigger the display of any additional participant profile parameters. In the embodiment illustrated in FIG. 42b, the business card component 4108 "flips" the object 4004 to display additional parameters 4202. As further illustrated in FIG. 42b and at block 3724 (FIG. 37), the object 4004 may further comprise a participant profile control 4204, which comprises a user interface control for enabling the participants 104 to edit their own, or another participant's, participant profile parameters during the audio conference 114.

Figure 42A:
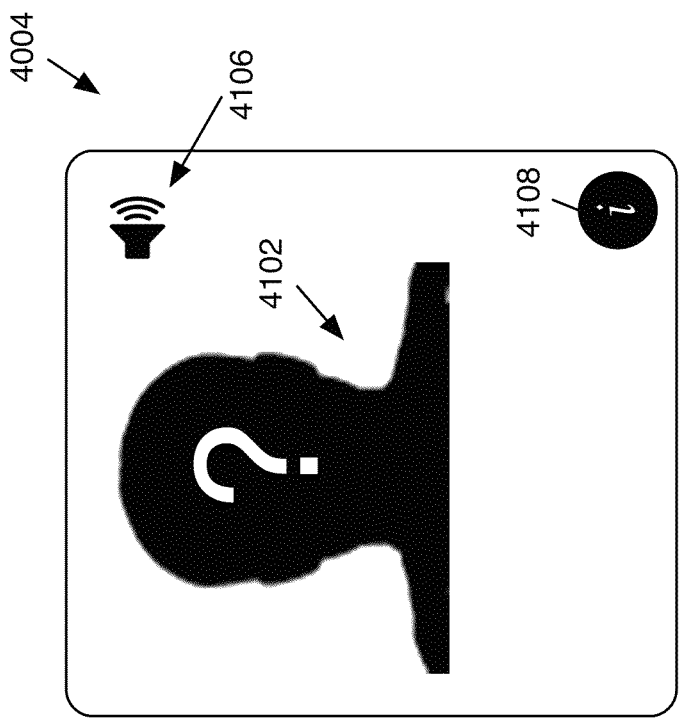
FIG. 42*a* illustrates an embodiment of a participant object for an unidentified participant.

Referring again to FIG. 37, if the participant 104 is joining the audio conference 114 via an incoming voice call (decision block 3704), a caller ID database, resource, or service may be used to automatically identify the originating telephone number (block 3714). If an originating telephone number is not available, the participant 104 may be added to the audio conference 104 and displayed in the conference user interface as an unidentified participant (FIG. 42a). Where an originating telephone number is available, at decision block 3718, the number may be used as an input to a look-up table, database, service, etc. to determine additional information. In an embodiment, the originating telephone number may reference a stored participant profile, such as, the data structure 3800 (FIG. 38). If additional information is not available (either in a stored participant profile or a response 2008), the participant 104 may be identified in the conference user interface based on the originating telephone number and the associated audio indicator 4106. Regardless the availability of participant information, telephone numbers, etc., at block 3724, the objects 4004 may be presented with the participant profile edit control 4204.

Figure 39:
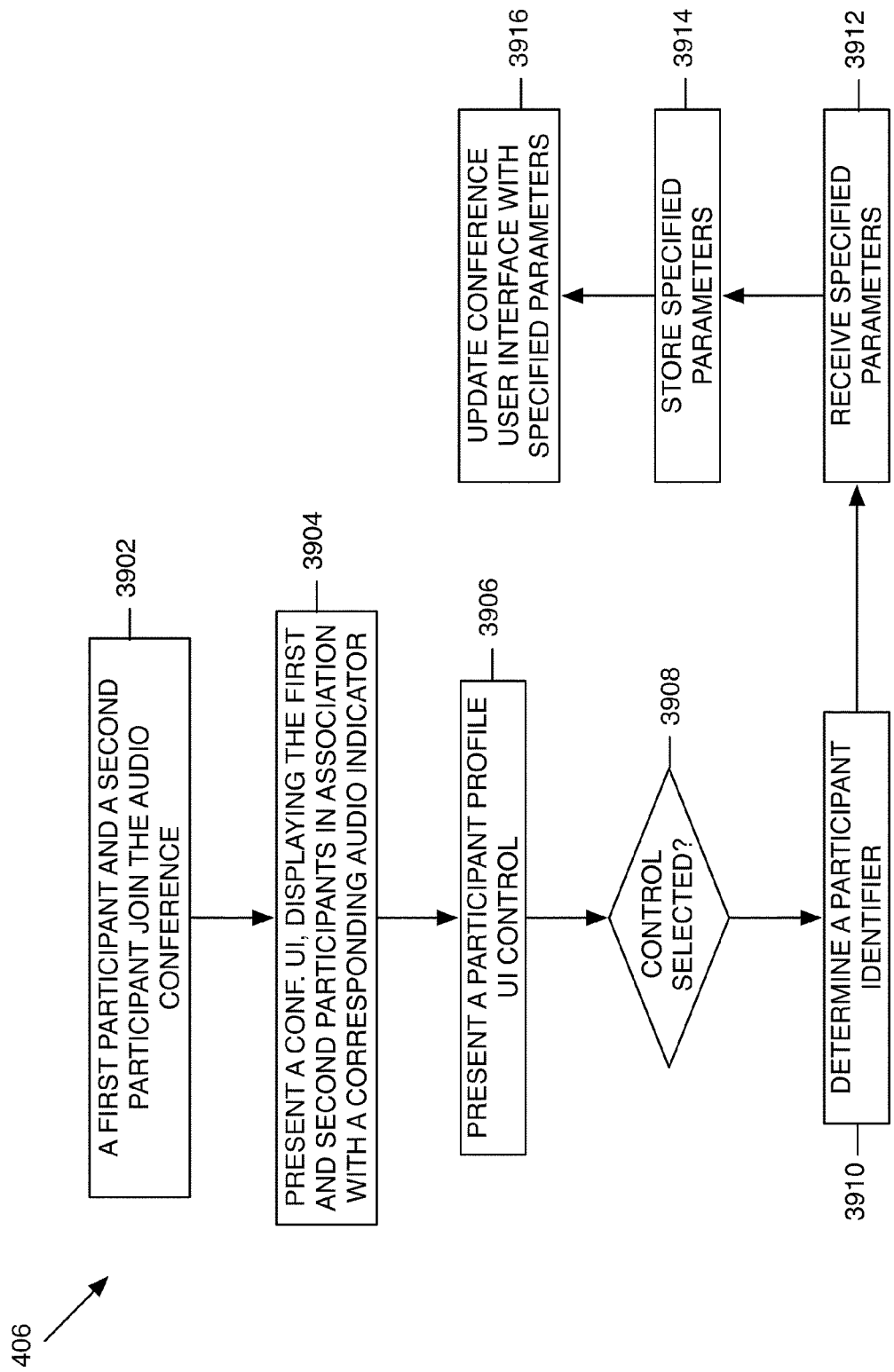
FIG. 39 is a flowchart illustrating the architecture, operation, and/or functionality of an embodiment of the in-conference participant identification module(s) in the server of FIG. 4.

It should be appreciated that the participant profile control 4204 provides a convenient mechanism for enabling participants 104 to specify, during the audio conference 114, additional profile information about themselves and/or other participants 104 via the conference user interface. In this manner, the conferencing system 106 may develop a proprietary database (e.g., participant database 2018) for identifying participants 104. FIG. 39 illustrates an embodiment of a simplified method for operating the participant profile control 4204 to develop or supplement a participant database 2018. At block 3902, a first participant 104 and a second participant 104 join an audio conference 114. At block 3904, the conference user interface displays an object 4004 associated with the first and second participants 104. The objects 4004 may comprise no profile information (i.e., an unidentified participant) or any level of profile details, as described above. Regardless the existence of, or level of, profile information, each object 4004 displays a corresponding audio indicator 4106 to indicate when the participant 104 is speaking. Each object 4004 may further display a corresponding participant profile control 4902 for specifying information about the participant 104. The participant profile control 4902 may be selected (decision block 3908) by any participant 104 in the audio conference 114, enabling participants 104 to specify information about themselves or any of the other participants. This mechanism may be particularly useful when, for example, the participant 104 is an unidentified participant, the participant 104 specified minimal information at log-in, or there is otherwise minimal and/or incorrect profile information.

For example, assume that a first participant 104 is an unidentified participant. During the audio conference 114, a second participant 104 may recognize the identity of the first participant 104 based on the speaker's voice and the state of the audio indicator 4106 in the object 4004. The second participant 104 may select the participant profile edit control 4204 in the object 4004 associated with the first participant 104. In response, the conference user interface 4000 may enable the second participant 104 to specify profile parameters, such as those described above. When selected, the conference user interface may prompt the participant 104 to enter known parameters. In another embodiment, the conference user interface may be configured to enable the second participant 104 to specify information via, for example, a search engine results page, a local or remote contact application, a social networking system, or any other source of profile information. At block 3910, the specified profile parameters may be linked to the participant identifier 3802 (FIG. 38). At block 3912, the conferencing system 106 receives the specified profile parameters and, at block 3914, stores the parameters in the participant database 2018, according to the participant identifier 3802. At block 3916, the specified parameters may be added or updated to the participant object 4004 displayed in the conference user interface.

Figure 19:
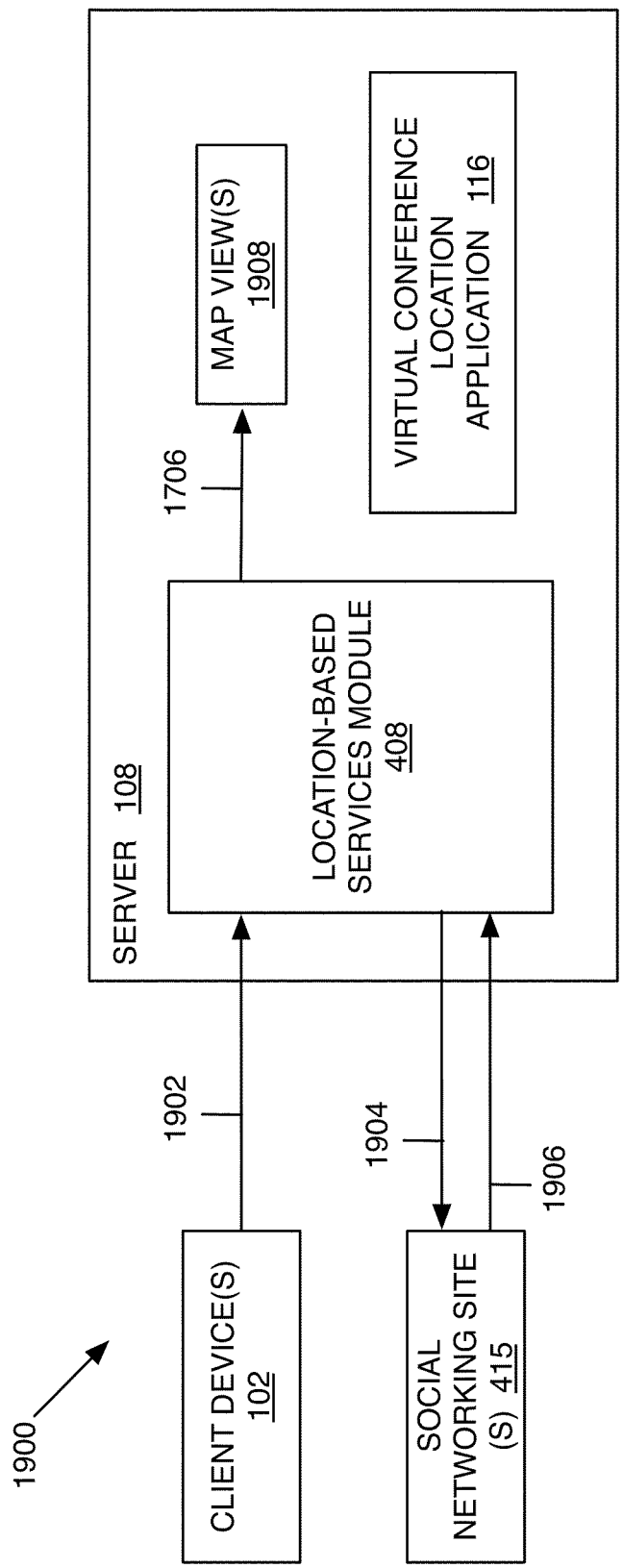
FIG. 19 is a functional block diagram illustrating an embodiment of the location-based services module(s) in the server of FIG. 4.

Referring again to FIG. 4 and the various modules located in the server memory 404, the location-based services module(s) 408 comprise the logic and/or functionality for supporting various location-based services provided by the conferencing system 106. As illustrated in the embodiment of FIG. 19, the location-based module(s) 408 may receive location information from the client devices 102 (arrow 1902). It should be appreciated that the location information may be obtained in various ways. As described below in more detail, when a participant 104 joins an audio conference 114, an online conference, or otherwise accesses the conferencing system 106, the location information may be captured from GPS information, caller ID, IP address, sign-in profiles, etc.

The client device 102 may include a GPS transceiver that acquires GPS signals. When the client device 102 accesses the conferencing system 106, the GPS coordinates may be passed to the location-based module(s) 408. The conferencing system 106 may also obtain caller ID information in the manner described herein. The caller ID information may be automatically obtained by the conferencing system 106 when the participant 104 joins an audio conference 114. The conferencing system 106 may perform various look-ups to determine the location associated with the telephone number. The conferencing system 106 may translate the area code into a corresponding geographic area. In other embodiments, the conferencing system 106 may use the telephone numbers as an input to a look-up table, web service query, etc. to determine if there is an associated location. The location may be a stored current location associated with a participant identifier (e.g., current location 3814—FIG. 38). The stored current location may be a previously stored location specified by a user or acquired as described herein. The conferencing system 106 may also query the client device 102 for (or otherwise obtain) an IP address of the client, which may be used to determine the current location of the device.

Figure 31:
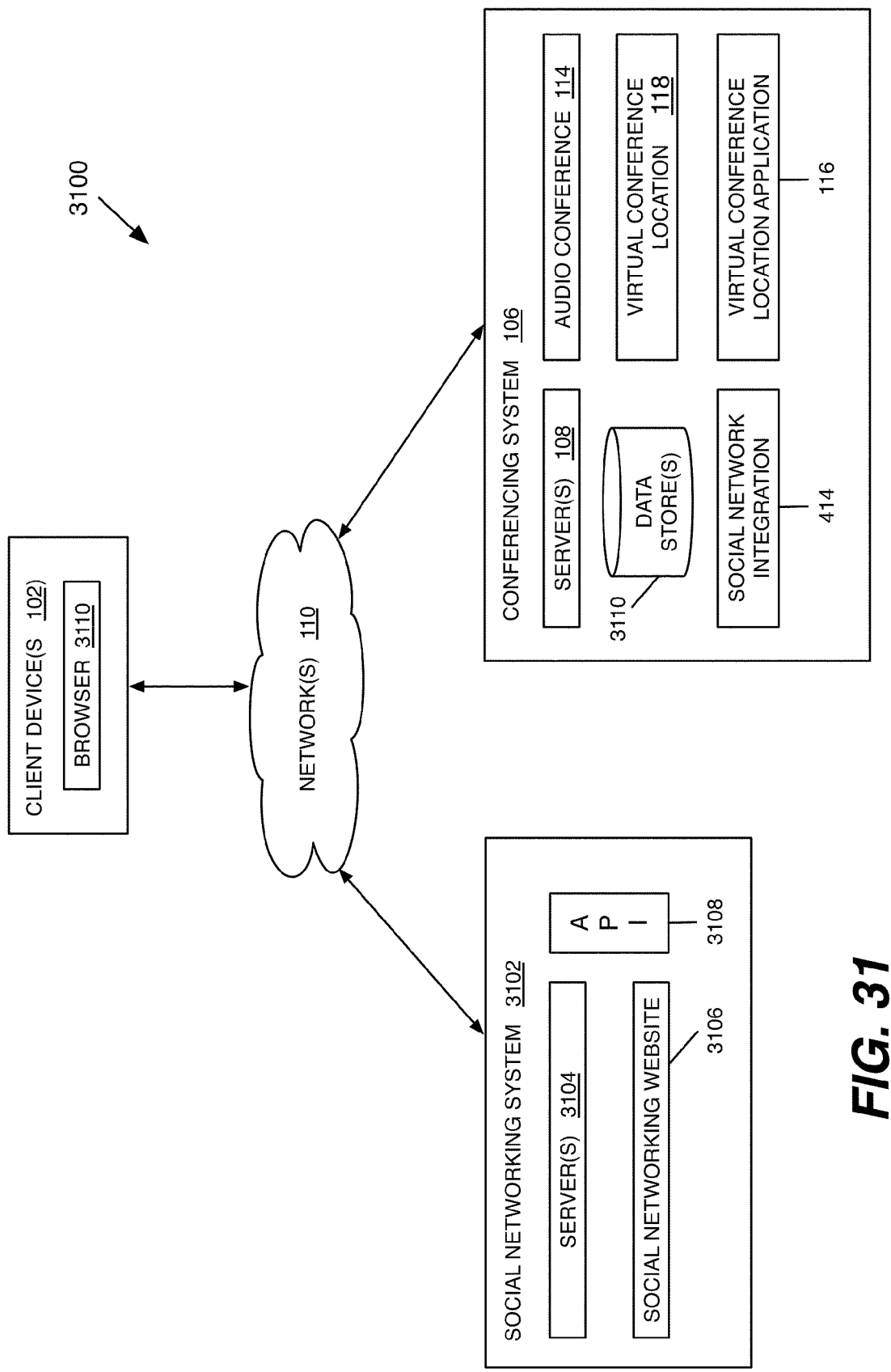
FIG. 31 is a block diagram illustrating an embodiment of a computer system for sharing social networking content in a conference interface.
Figure 32:
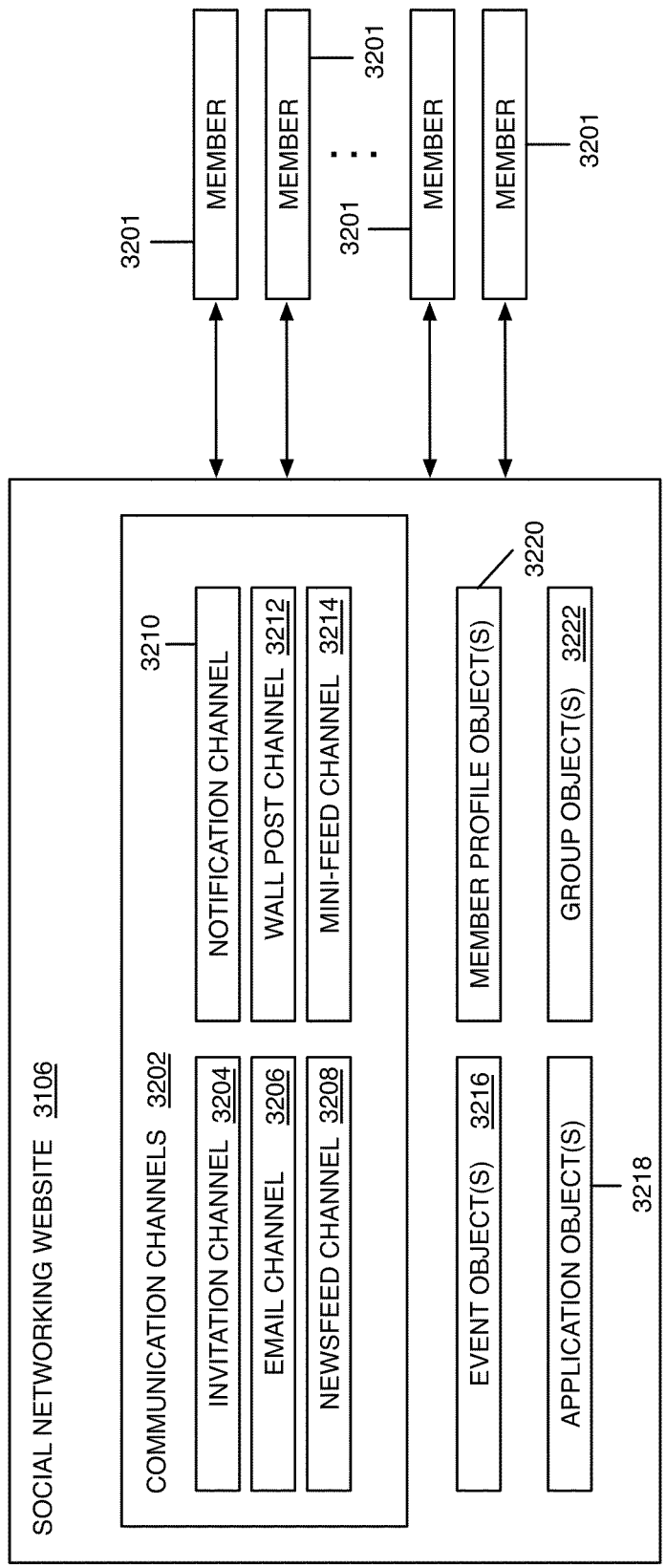
FIG. 32 is a block diagram illustrating an exemplary social networking system.

In additional embodiments, the location information may be obtained from the participant's social networking data via a request 1904 and response 1906 to a social networking system 3102 (FIG. 31). For example, as described below, the participant may be a member of the social networking system 3102 and provide location information to a communication channel 3202 (FIG. 32). This information may be automatically acquired by the social networking system 3102 from the client device 102, or specified by the user. Regardless of the manner in which the location information is acquired by the social networking system 3102, it should be appreciated that the conferencing system 106 may obtain this information via the API 3108 and associated social networking integration module(s) 414 (FIG. 4), as described below.

Figure 64:
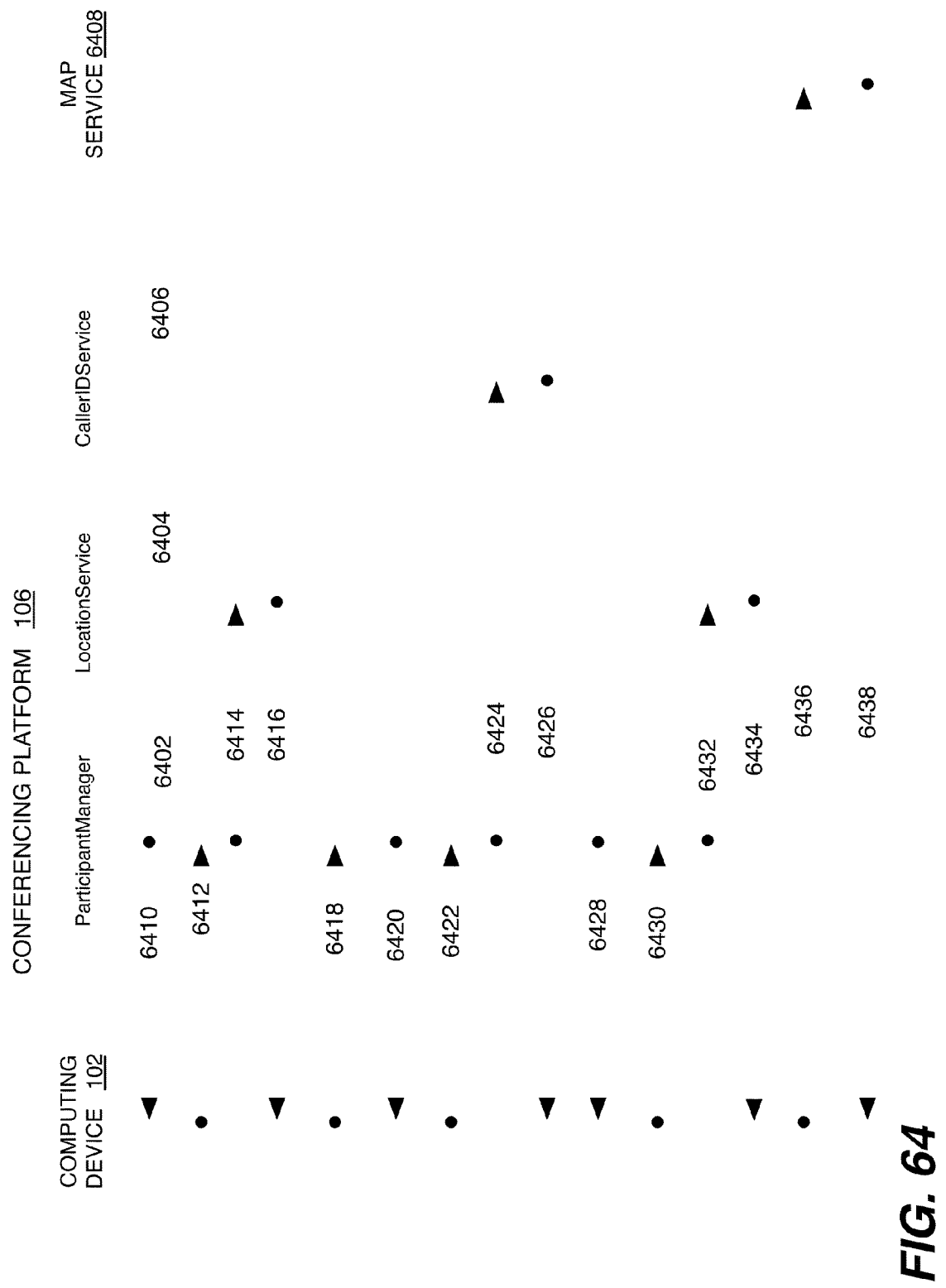
FIG. 64 is a combined block/flow diagram illustrating exemplary embodiments for enabling a conferencing system to obtain location information.

As illustrated in FIG. 64, the conferencing system 106 may implement various software mechanisms to obtain the location information from the client device 102. In the embodiment of FIG. 64, the conferencing system 106 comprises a Participant Manager Service 6402, a Location Service 6404, and a Caller ID Service 6406. In operation, the computing device 102 may access the conferencing system 106 by visiting a particular web site. The Participant Manager Service 6402 may send a getClientIPAddress( ) message 6410 to the computing device 102. In response, the client device 102 may send a ClientIP response 6412 containing an IP address associated with the device. It should be appreciated that the IP address may be associated with the client device 102 or other communication devices associated with the client device 102. The Participant Manager Service 6402 may send a getLocationbyIP( ) request 6414 to the Location Service 6404, which returns a response 6416 to the client device 102. The response 6416 may specify location according to, for example, latitude and longitude, or any other means.

In another embodiment, the client device 102 may access the conferencing system 106 and send a Login Request 6418 to the Participant Manager Service 6402. The Participant Manager Service 6402 may authenticate the participant 104. If the login is successful, the Participant Manager Service 6402 may send a getClientPhoneNumber( ) request 6416 to the client device 102. The participant 104 may provide the information via, for example, a conferencing user interface, such as those described herein or others. The entered telephone number may be provided to the Participant Manager Service 6402 as a PhoneNumber response 6422. The Participant Manager Service 6402 may send a getLocationbyPhoneNumber( ) request 6424 to the Caller ID Service 6406, which contains the entered phone number. The Caller ID Service 6406 may provide corresponding location information to the client device in a response 6426.

Figure 18:
FIG. 18 is a screen shot illustrating an embodiment of a map view of the participants in the conference interface.

It should be appreciated that additional information may be requested from the client device 102. For example, the Participant Manager Service 6402 may send a getClientCurrentLocation( ) request 6428, and receive a City/State response 6430 containing the entered city, state, zipcode, etc. The Participant Manger Service 6402 may send a getLocationByCity( ) request 6432 (which may include any of the entered information) to the Location Service 6404. The Location Service 6404 may provide corresponding location information to the client device in a response 6434. Regardless of the manner in which the location information is obtained, the client device 102 may send a getMapParticipantLocation( ) request 6436 to a map service 6408. The map service 6408 may return a showMapWithParticipantDetails response 6438. The conferencing system 106 may perform this process for each participant 104 and then present the combined location information in a map view 1908. An exemplary embodiment of a map view 1908 is illustrated in FIG. 18, although it should be appreciated that the location information may be presented in the conference interface in any manner.

Based on the location information, the conference interface may customize the presentation of the interface with location-based information associated with one or more participants 104. For example, the conferencing system 106 may provide a unique conference interface to each participant 104 based on the participant's corresponding location. The customization may involve providing location-based resources, services, functionality, etc. to the participant 104 (e.g., news, weather, traffic, events, etc.). Furthermore, in some embodiments, a virtual location view 124 may be selected by the conferencing system 106 to match the location information obtained from the participant 104 (e.g., a participant 104 in San Francisco may be presented a virtual location view 124 including the Golden Gate Bridge).

In further embodiments, the location information may be used to provide an intelligent conference dial-out and/or dial-in feature, which dynamically provides guidance to the participants 104 on how to join the audio conference 114 (e.g., via a login screen 604 (FIG. 6) or setup screens 702 (FIGS. 7 & 8)) or automatically configures an appropriate dial-out from the conferencing system 106 to the participant 104. When a participant 104 accesses the conferencing system 106, the location information may be obtained. Based on the participant location, the conferencing system 106 may recommend a dial-in number, taking into consideration customer data and/or voice plans and carrier provider rates, or automatically determine a desirable dial-out number. For example, based on this information, the conferencing system 106 may select a dial-in number for a more cost-effective incoming call from the participant 104. Furthermore, it should be appreciated that the location information may be used to present an optimal (e.g., lowest cost, highest quality) dial-in option, as well as the optimal dial-out. The conferencing system 106 may dial-out to the participant 104 after checking, for example, a routing database and then initiating the dial-out from the optimal node on the network based on the acquired location information.

Figure 63:
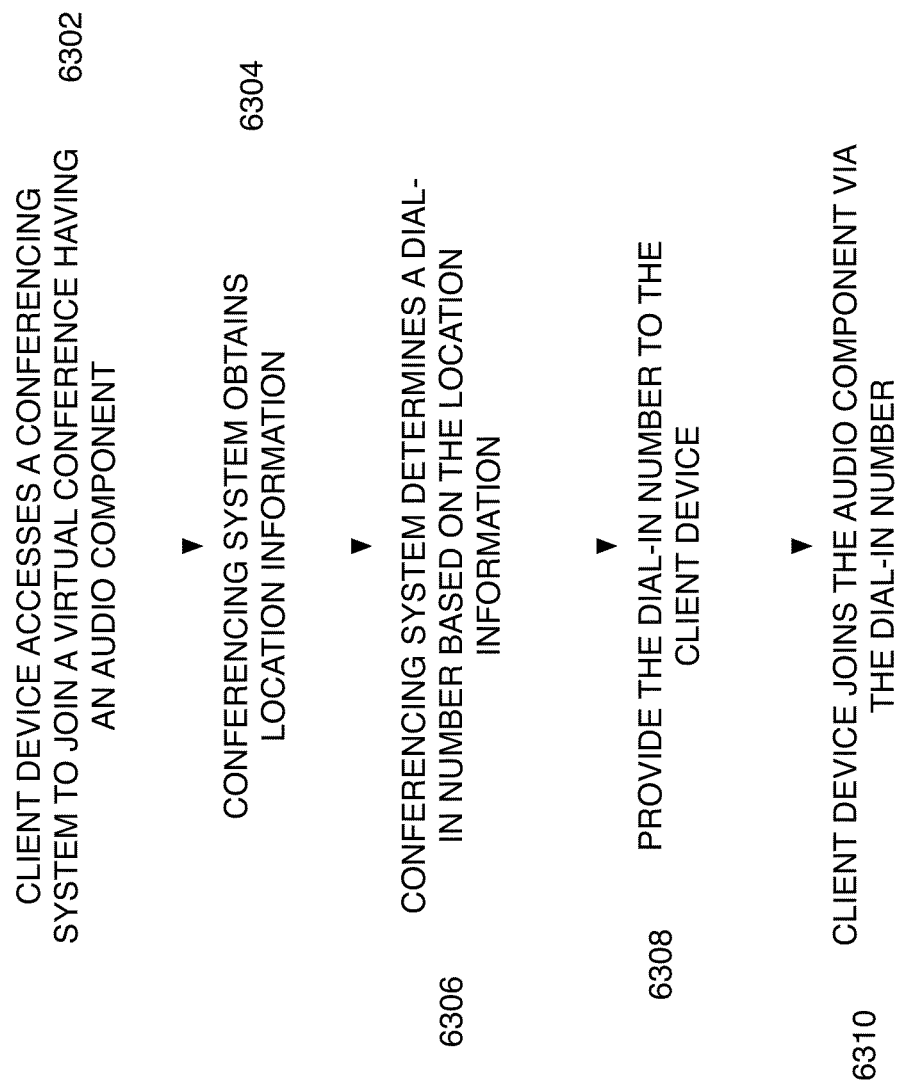
FIG. 63 is a flowchart illustrating the architecture, operation, and/or functionality of another embodiment of the location-based services module(s) of FIG. 19.

FIG. 63 illustrates an embodiment of a method for implementing certain aspects of the location-based services module(s) 408. At block 6202, the conferencing system 106 obtains location information from a plurality of participants 104. At block 6204, the conferencing system 106 associates the unique location information with a corresponding participant identifier 3802 (FIG. 38). At block 6206, the conferencing system 106 establishes an audio conference 114 with the plurality of participants 104. At block 6208, the conferencing system 106 presents a conference interface (e.g., conference interface 4100 or 4400, virtual location view 116, etc.) to the plurality of participants 104. At block 6210, the conference interface selectively displays a map view 1902, which identifies a location of each of the plurality of participants 104.

FIG. 64 illustrates another embodiment of a method for implementing aspects of the location-based services module(s) 408. At block 6302, a client device 102 accesses a conferencing system 108 to join a conference having an audio component. At block 6304, the conferencing system 106 obtains location information associated with the client device 102. At block 6306, the conferencing system 106 determines a telephone number for enabling the participant 104 to access the audio component of the conference. The telephone number is determined based on the location information to provide the most cost-effective means of enabling the participant 104 to access the audio conference 114. It should be appreciated that the telephone number may comprise a dial-in number which is provided to the participant 104 (block 6308) and used by the participant 104 to access the audio conference. In other embodiments, the telephone number may comprise a dial-out number which is used by the conferencing system 106 to initiate an outgoing call to the participant 104. At block 6310, the client device joins the audio conference 114 via the telephone number determined by the conference system.

The virtual conference location application 116 (or other conference interface applications) may support a real-time speech-to-text functionality that may automatically convert speech from the audio streams 122 (FIG. 1) into text. As described below in more detail, the output text is processed by one or more algorithms to identify keywords, topics, themes, or other subject matter being discussed during the audio conference 114. The keywords are used as input to a search engine, knowledge base, database, etc. for the purpose of identifying resources related to the keywords, which may be presented, in real-time, to the participants 104 during the audio conference 114 via the conference interface (e.g., virtual conference location 118). In this manner, the participants 104 may be provided with additional materials, information, educational material, etc. (collectively referred to as "resources") based on the subject matter being discussed during the audio conference 114. It should be appreciated that the resources may be embodied in any desirable format, including, for example, audio, video, graphics, text, or any other medium presentable via the conference interface and/or the audio conference session.

Figure 17:
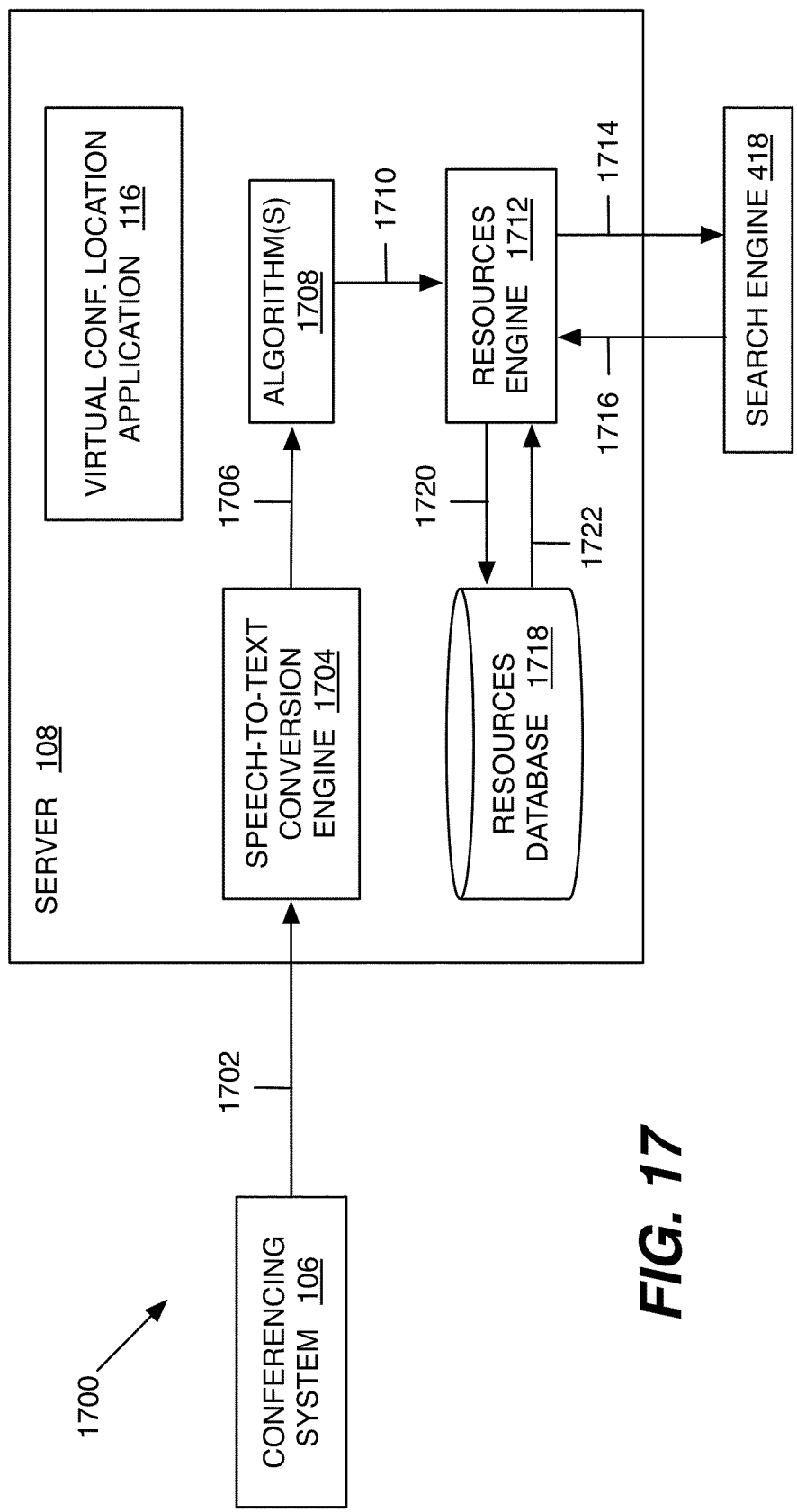
FIG. 17 is a functional block diagram illustrating an embodiment of the integrated speech-to-text/search module(s) in the server of FIG. 4.

As illustrated in the embodiment of FIG. 17, the server 108 may comprise a speech-to-text conversion engine 1704 that processes the audio streams 122 from the conferencing system 106. The speech-to-text conversion engine 1704 may output the text to one or more algorithm(s) 1708 (via interface 1706). The algorithm(s) 1708 may be configured to identify, based on the words spoken in the audio conference 114, relevant keyword(s) or topics of interest being discussed. The identified keywords or other identified terms (i.e., output of the algorithm(s) 1708) may be received by a resources engine 1712 (via interface 1710). The resources engine 1712 may be configured to select additional information, data, or other resources related to the identified terms and provide the information to the participants in the conference interface. The resources engine 1712 may make requests 1720 to, and receive responses 1722 from, a resources database or knowledge base 1718. The resources engine 1712 may also make calls 1714 to, and receive responses 1716 from, a search engine via, for example, an API 421 (FIG. 4).

Figure 27:
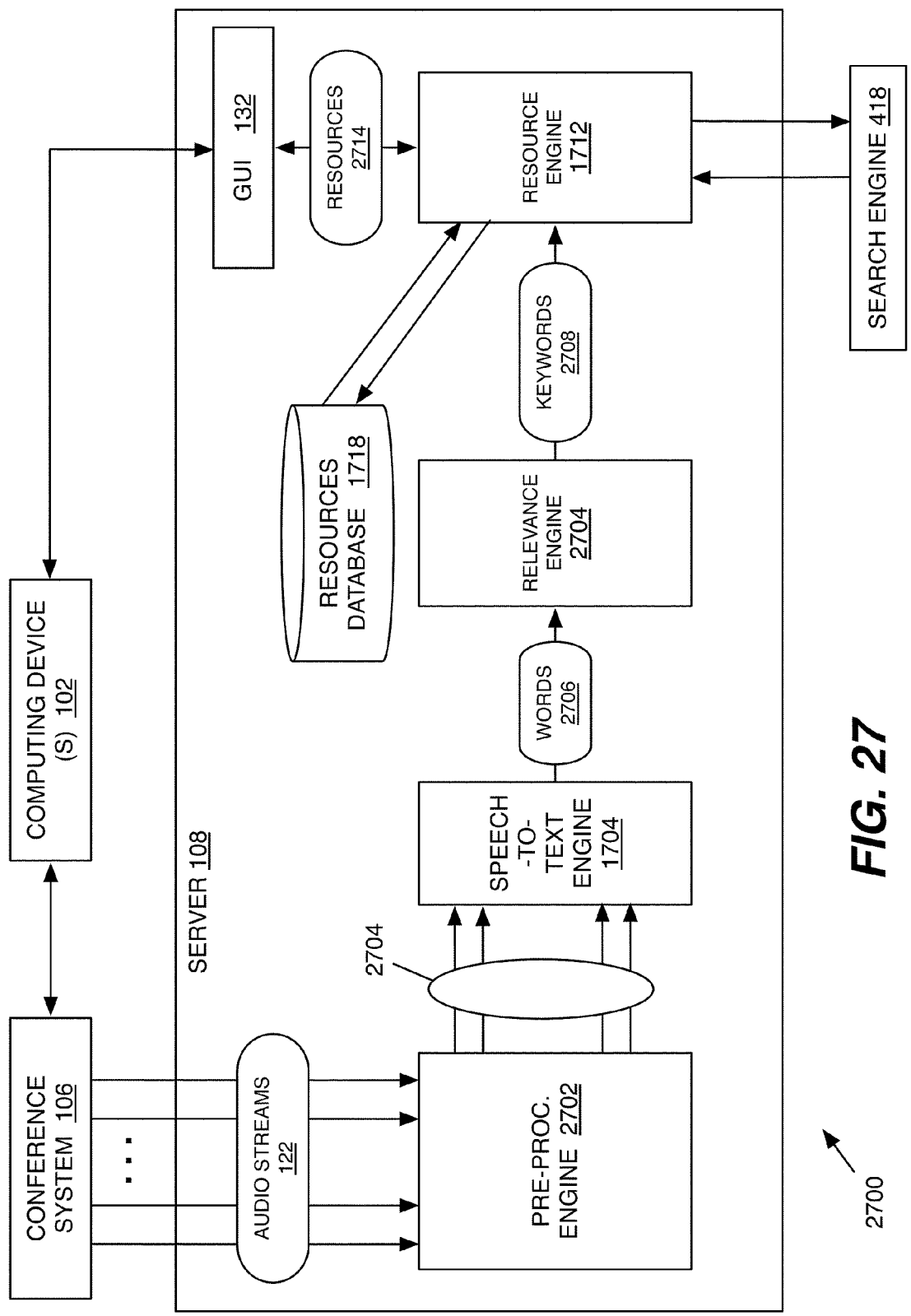
FIG. 27 is block diagram illustrating a server for implementing another embodiment of the integrated speech-to-text/search module(s) of FIG. 4

FIG. 27 illustrates another embodiment of a computer system 2700 for implementing real-time speech-to-text conversion in an audio conference 114. The computer system 2700 comprises a conference system 106 and one or more server(s) 108. The conference system 106 may be configured in the manner described above, or otherwise, for establishing an audio conference 114 between a plurality of participants 104 operating client devices 102 via a communication network. The conferencing system 106 controls an audio stream 122 for each computing device 102 in the audio conference 114. The audio streams 122 are combined by the conference system 106 to comprise the audio conference 114.

The server 108 comprises one or more functional processors for implementing aspects of the overall speech-to-text conversion process. It should be appreciated that the functional processors may be implemented in hardware, software, firmware, or any combination thereof. The overall speech-totext conversion process and any associated processes are preferably performed in real-time during the audio conference 114. In an embodiment, the functional processors comprise a pre-processing engine 2702, a speech-to-text conversion engine 1704, a relevance engine 2704, and a resource engine 1712. The pre-processing engine 2702 communicates with the conference system 106, which may be integrated with the server(s) 108 or remotely located. The pre-processing engine 2702 receives the audio streams 122 from the conference system 106, extracts a speech signal 2704 from each audio stream 122, and provides the speech signals 2704 to the speech-to-text conversion engine 1704. The speech-to-text conversion engine 1704 receives the speech signals 2704, extracts words 2706 from the speech signals, and provides the words 2706 to the relevance engine 2704. It should be appreciated that any desirable conversion algorithms, models, processes, etc. may be used to quickly and accurately extract the words 2706.

The relevance engine 2704 processes the words 2706 according to, for example, heuristic algorithms, to determine relevant keywords 2708 spoken in the audio conference 114. The relevance engine 2704 provides the relevant keywords 2708 to the resource engine 1712. It should be appreciated that the relevant keywords 2708 may represent, for example, frequently spoken words, statistically significant words, topics, etc. The keywords 2708 may comprise one or more of the words 2706 or, in alternative embodiments, may comprise related words based on the subject matter of the audio conference 114.

The resource engine 1712 receives the keywords 2706 and determines resources 2714. The resources 2714 are selected with the purpose of providing to the participants 104 during the audio conference any desirable information, material, data, or other subject matter related to the keywords 2708. As illustrated in FIG. 27 and described below in more detail, the resources 2714 may be selected from a remote search engine 418 and/or a local resources database 1718 by sending a query 2720 and receiving a response 2722 to the query 2720.

Figure 26:
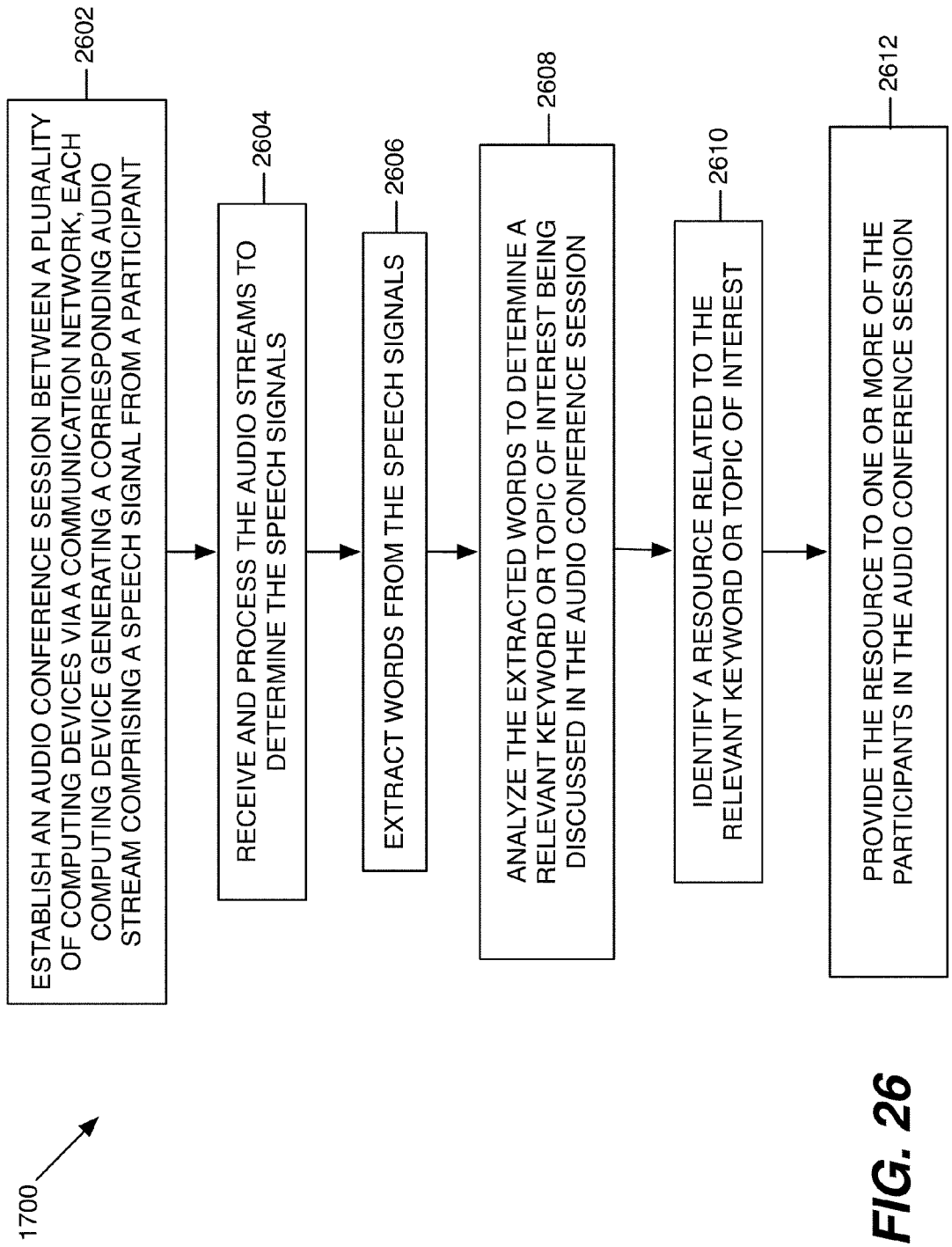
FIG. 26 is a flow chart illustrating an embodiment of a method for providing real-time resources to participants in a conference interface.

FIG. 26 illustrates an embodiment of a method implemented by the computer system 2700 for providing real-time resources 2714 to participants 104. In general, the real-time resources 2714 are identified based on the content being discussed in the audio conference 114 and provided to the participants 104 during the audio conference 114 via the conference interface. At block 2602, an audio conference session, such as audio conference 114, is established between a plurality of computing devices 102 via a communication network 110. Each computing device 102 participating in the audio conference session has an associated audio stream 122 that includes a speech signal for the corresponding participant 104. During the audio conference session, the audio streams 122 are provided to one or more server(s) 108 or, in alternative embodiments, may be established by or under the control of the server(s) 108. In real-time during the audio conference session, the server(s) 108 process the audio streams 122. It should be appreciated that, in some embodiments, the processing may be advantageously performed as fast as possible to minimize any delay in the feedback loop associated with blocks 2604-2612, while also ensuring suitable performance of the associated algorithm(s).

At block 2604, the audio streams 122 are received and processed by, for example, a pre-processing engine 2702, which converts the audio streams 122 into the corresponding speech signals 2704. At block 2606, words 2706 are extracted from the speech signals 2704 using any suitable algorithms for converting the speech signals 2704 into computer-readable data identifying the words 2706. The words 2706 may be extracted in a real-time stream, in batch mode, or otherwise. At block 2608, the words 2706 are analyzed, either individually or in groups, to determine relevant keyword(s) 2708 being discussed in the audio conference session. The relevant keyword(s) 2708 may comprise an identification of frequently spoken word(s), determination of a particular topic, or otherwise identify meaningful subject matter being spoken in the audio conference session and/or related to one or more extracted words 2706. In this regard, it should be appreciated that, in an embodiment, a keyword 2708 may comprise an extracted word 2706 which is repeated a certain number of times, either in absolute terms or relative to a period of time (e.g., a word occurrence or usage density). A keyword 2708 may also comprise an extracted word 2706 which appears to be of particular importance based on, for example, the identity of the participant 104 speaking the extracted word 2706, the waveform characteristics of the speech signal 2704, etc.

Figure 28:
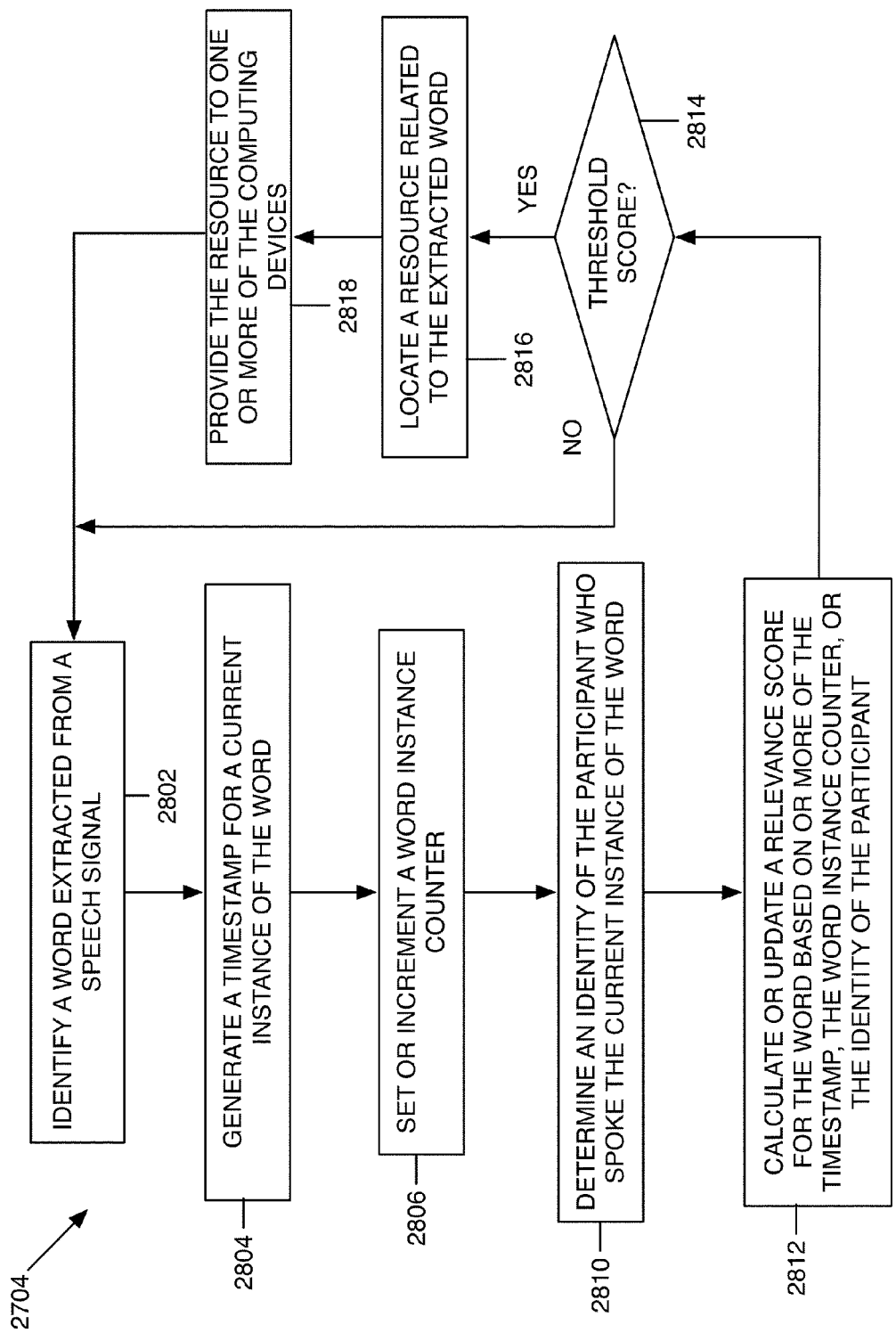
FIG. 28 is a flowchart illustrating the architecture, operation, and/or functionality of an embodiment of the relevance engine in the server of FIG. 27.

The keyword(s) 2708 may be determined using various algorithms. In the embodiment illustrated in FIG. 28, the keyword(s) 2708 are determined based on a relevance score that is calculated as the words 2706 are analyzed by, for example, the relevance engine 2704. At block 2802, one or more extracted words 2706 are identified. The extracted word(s) 2706 may be identified by a word identifier stored in a database. In this regard, it should be appreciated that the database may store a record or other data structure for maintaining data associated with a relevance score for one or more words 2706.

Figure 29:
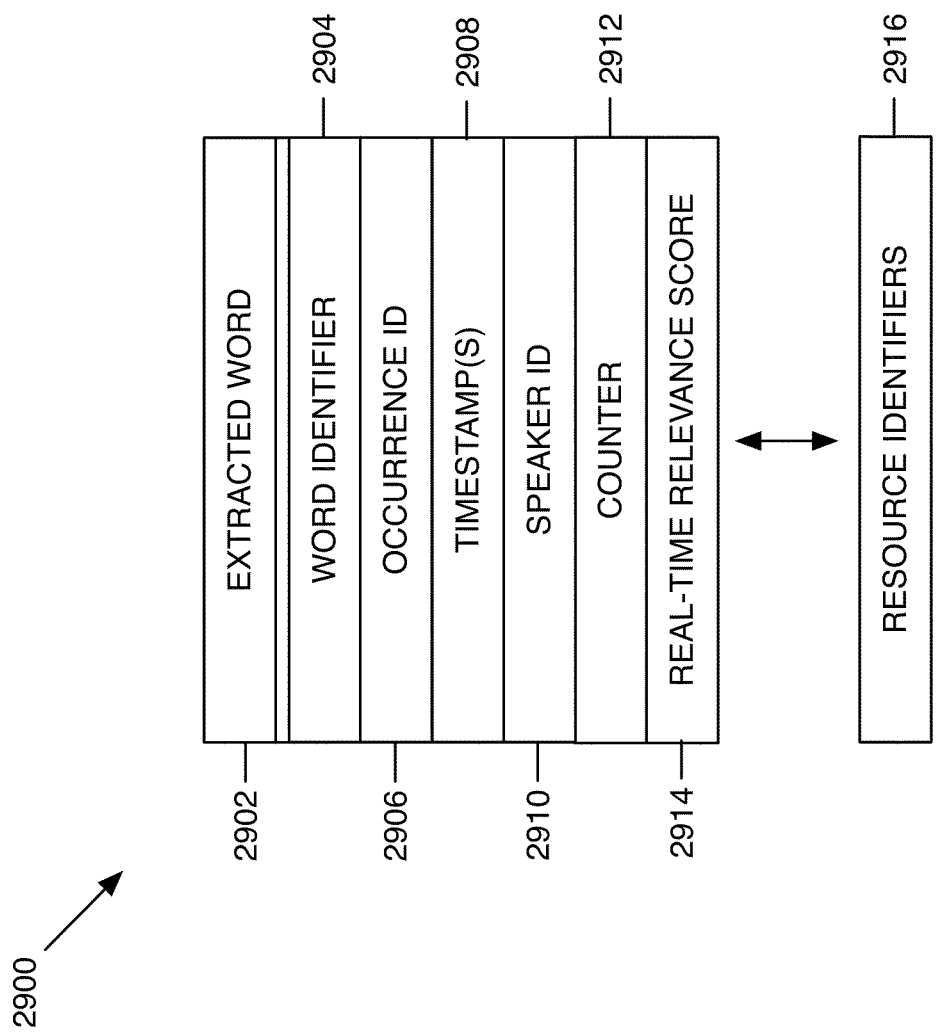
FIG. 29 is a diagram illustrating an exemplary data structure implemented by the relevance engine of FIG. 28.

FIG. 29 illustrates an exemplary data structure 2900 comprising the following data fields: an extracted word 2902, a word identifier 2904, an occurrence identifier 2906, one or more timestamps 2908, a speak identifier 2910, a counter 2912, and a real-time relevance score 2914. The extracted word 2902 identifies a particular word or combination of words that have been extracted from the speech signals 2704 with a corresponding identifier 2904. To keep track of occurrences or instances of the extracted word 2902, the data structure 2900 may comprise an occurrence identifier 2906. Each occurrence of the extracted word 2902 may include a timestamp 2908 indicating a temporal location within the audio conference 114 at which the extracted word 2902 was spoken. For any given occurrence, a speaker identifier 2910 may identify which participant 104 spoke the extracted work 2902. The speaker identifier 2910 may include a weighting or other priority scheme for determining the relevance of the participants 104, in terms of identifying keyword(s) 2708. For example, a host may be given higher priority than other participants 104. The priority scheme may incorporate one or more roles or categories of participants. In an embodiment, the roles may be based on, for example, an organizational hierarchy, whether a participant is an employee, vendor, or a "friend" on a social networking site. The counter 2912 may keep track of the number of occurrences of the extracted word 2902, either in absolute terms or relative to time based on the timestamps 2908.

Referring again to FIG. 28, as words 2706 are extracted, at block 2804, a timestamp 2908 may be generated for each instance of the extracted word 2902 and stored in the associated record according to the word identifier 2904. At block 2806, the counter 2912 may be set or incremented. At block 2808, the identity of the speaker may be determined and stored in the database. At block 2810, a relevance score may be calculated, according to various desirable algorithms, based on one or more of the following, or other types of data: timestamps 2908; speaker identifiers 2910; and counter 2912. The relevance score at any point in the audio conference may be stored in real-time score 2914.

At decision block 2814, it may be determined whether the relevance score exceeds a predetermined or calculated threshold. If the threshold is not exceeded, flow returns to block 2802. If the threshold is exceeded, at block 2816, it is determined that the extracted word 2902 is relevant, and the system attempts to locate a desirable resource related to the extracted word 2902. At block 2818, the resources 2714 are provided to the participants, in real-time during the audio conference 114.

It should be appreciated that, in an embodiment, the resource(s) 2714 may be identified by, for example, matching the extracted words 2902 to predetermined resources, according to resource identifiers 2916 associated with the extracted word 2902 (FIG. 29). The resource identifiers 2916 may link to records in the resources database 1718. In another embodiment, a resource 2714 may be determined by querying the resources database 1718 or a search engine 418 (query 2720 and response 2722—FIG. 27).

Figure 30:
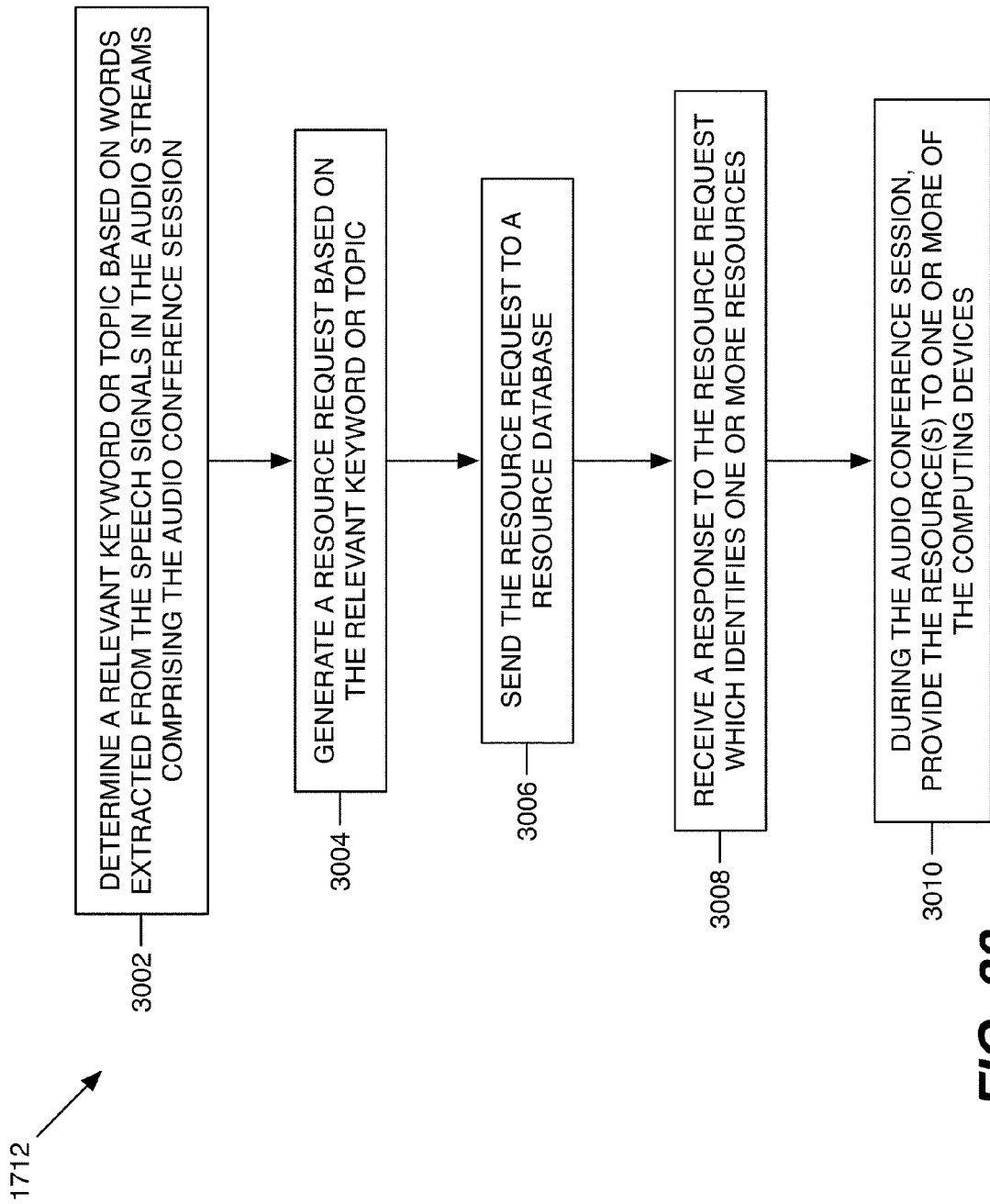
FIG. 30 is a flowchart illustrating the architecture, operation, and/or functionality of an embodiment of the resources engine of FIG. 27.

FIG. 30 illustrates an embodiment of a method for performing a search to determine the resources 2714. At block 3002, the relevant keyword(s) 2708 are received from, for example, the relevance engine 2704. At block 3004, a resource request 2722 is generated. The resource request 2722 may include the keyword(s) 2708 or other search term(s) using any desirable searching methods, APIs, etc. At block 3006, the resource request 2722 is provided to the search facility or database (e.g., database 1718, search engine 418, etc.). At block 3008, a response 2722 is received, which identifies one or more resources 2714. The response 2722 may include, for example, links to the resources 2714 (e.g., resource identifier 2916, a URL) or the actual information embodying the resources 2714. At block 3010, the resources 2714 are provided to one or more of the computing devices 102. The resources 2714 are provided to the participants 104 via the audio conference 114 and/or the conference interface. In an embodiment, the results of the resource request 2722 may be provided to the participants, thereby enabling the participants 104 to select and/or navigate the results. For example, the search engine results may be passed on, or otherwise exposed to the participants 104, via the graphical user interface 132. Referring again to FIG. 26, the resources 2714 are identified (block 2610) and provided to the participants 104 (block 2612) in the manner described above.

Various embodiments of the conference app store functionality 420 (FIG. 4) will be described with reference to FIGS. 43-49. The conference app store functionality 420 generally comprises an online store or marketplace (referred to as a "conferencing application store" or "conferencing app store") that offers various audio and/or web conferencing applications 416 or other desirable applications (collecting referred to "conferencing applications" or "conferencing apps") to participants 104. The conferencing app store may be provided to participants 104 via a conference interface (e.g., conferencing user interface 4400) presented to the computing devices 102 during the audio conference 114. The conferencing applications may include, for example, web-based applications, widgets, or other computer programs made available to participants 104 via the conferencing system 106 and/or servers 108. The conferencing applications may be provided by a host associated with the conferencing system 106 or, in some cases, may also be provided by and/or developed by third party developers 4310. In these embodiments, the conferencing system 106 may include an associated API (e.g., API 4302) and/or a software developer kit (SDK) for enabling developers to develop various conferencing applications that may be included in the conferencing app store and made available to the participants 104.

Figure 43:
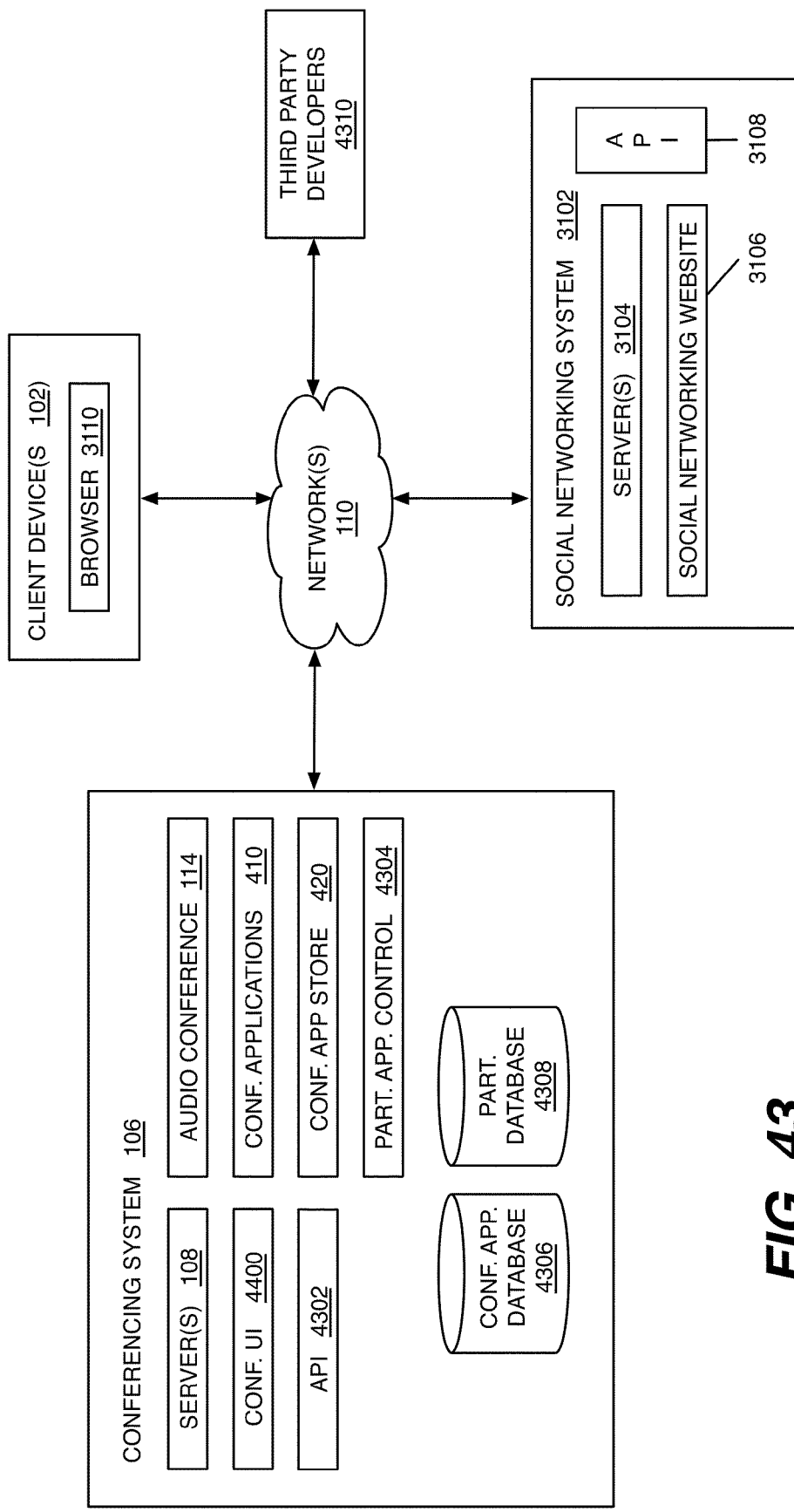
FIG. 43 is a block diagram illustrating an embodiment of a computer system for implementing a conferencing app store in a conferencing system.

As illustrated in FIG. 43, the conferencing application store may be integrated with a social networking system 3102, such as those described below in connection with FIGS. 31-36 or others. The social networking system 3102 may include various social networking applications 3218 (FIG. 32) that are provided to members 3201. In an embodiment, the conferencing system 106 may be configured to communicate with the social networking system 3102 (e.g., via API 3108, API 4302, etc.), access the social networking applications 3218, and include access to the social networking applications 3218 in the conferencing application store. In this manner, a member 3201 who is also a participant 104 in an audio conference 114 may conveniently access their social networking applications 3218 via the conferencing system 106. Similarly, the social networking system 3102 may access the conferencing system 106 and make them available to members 3102 via the social networking website 3106.

To facilitate certain aspects of the conferencing application store, the conferencing system 106 may comprise a conference application database 4306, a participant database 4306, a participant application control module 4304, and a conference user interface 4400. The conference application database 4306 may store information related to the conferencing applications 410, such as, for example, links to the application code or the application code itself. In this regard, it should be appreciated that the conferencing system 106 need not, but may, store the code associated with the conferencing applications. In some embodiments, the conferencing applications may be served by, for example, a third party system. Regardless, within the conference application database 4306, each conferencing application may be identified by a unique application identifier.

The participant database 4306 may store information related to the participants 104 and their corresponding conferencing applications. An exemplary data structure 4600 is illustrated in FIG. 46. Each participant 104 in an audio conference 114 may be identified with a unique participant identifier 3802 and may include any of the following, or other, parameters; a name 3804; a title 3806; an email address 3808; a phone number 3810; a resident and/or home address 3812; a current location 3814 (which may be obtained by GPS coordinates from the client device, from an IP address, etc.); social networking profile parameters 3816; a graphical representation 124 (FIG. 1); a virtual location view 124 (FIG. 1); conference applications 3818; and an account profile 4602. The conferencing applications 3818 may be identified with a corresponding unique application identifier as described above. The account profile 4602 may include account information associated with the participant 104, including, for example, account numbers, credit card numbers, etc. to facilitate online transactions that enable the participant 104 to purchase conferencing application.

The participant application control modules 4304 comprise the logic, functionality, etc. for performing various features associated with the conferencing application store. The participant application control module(s) 4304 enable the conferencing system to manage which conferencing applications a user has purchased or selected, and presents the appropriate applications via the conference interface when the user joins an audio conference 114. In this regard, it should be appreciated that the conferencing system 106 may provide enterprise-level conferencing services to corporations, organizations, government agencies, etc. In such embodiments, the control modules 4304 may manage access, permissions, etc. for enterprise employees. For example, the enterprise may specify which conferencing applications a particular employee may access based on title, organization role, organizational level, employee ID, etc. This information may be stored in an enterprise database and used by the control modules 4304 to select which conferencing applications are to be made available to the employee.

Figure 44:
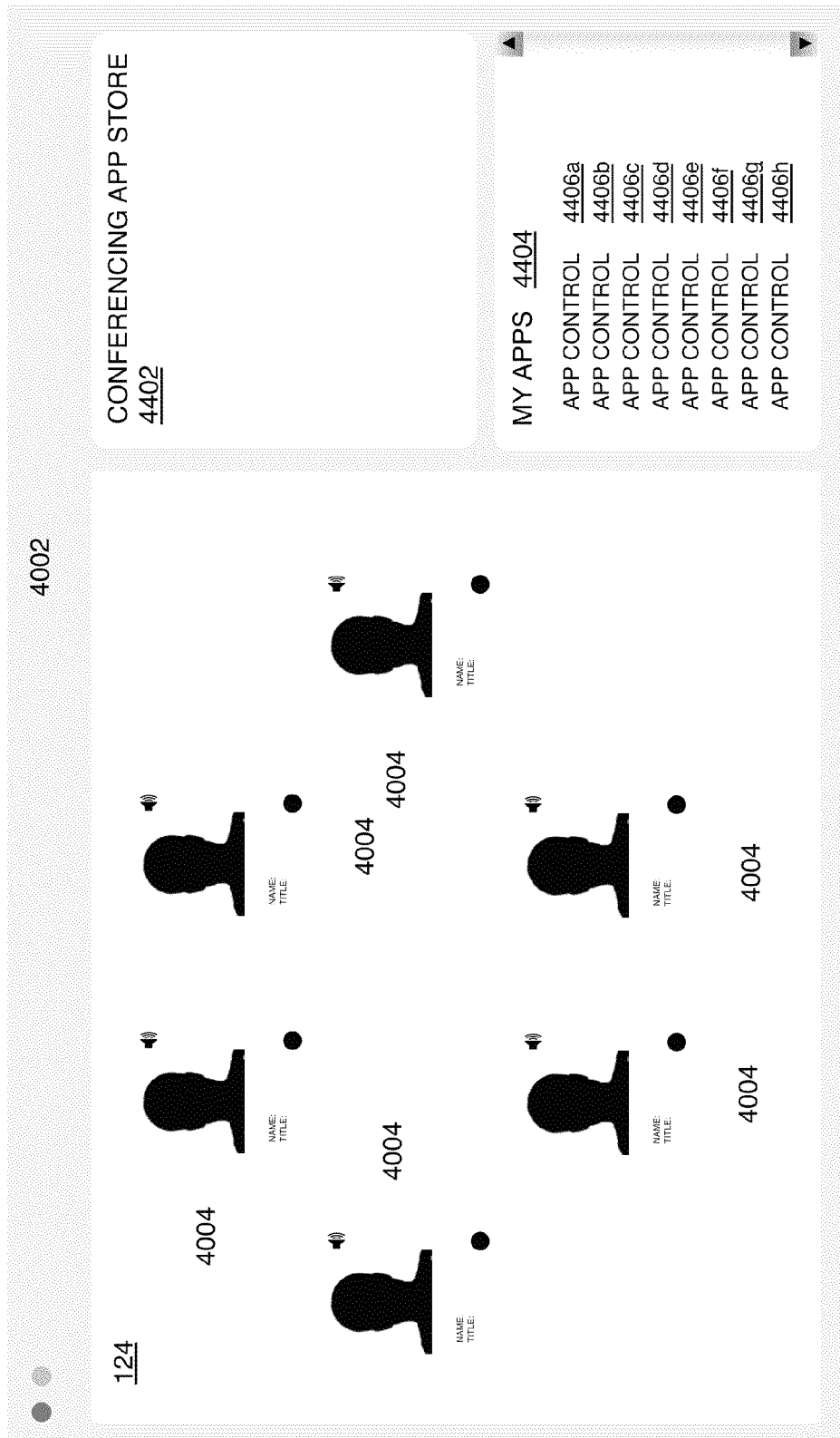
FIG. 44 is screen shot illustrating an exemplary embodiment of a conference interface for implementing certain aspects of the conferencing app store for enabling participants to interact with conferencing applications during an audio conference.

FIG. 44 illustrates an embodiment of a conference user interface 4400 for presenting the conferencing application store to participants 104 during an audio conference 114. The conference user interface 4400 generally comprises a screen portion 4002, which may display participant objects 4004 for each participant 104 in the audio conference 114, as described above. The conference user interface 4400 further comprises conferencing app store component 4402 and my apps component 4404. The conferencing app store component 4402 generally comprises the user interface mechanism(s) for presenting the app store functionality. The conferencing app store component 4402 may be accessed by the participants 104 in various ways, such as, for example, via a menu system or any other user interface inputs, controls or objects. The conferencing app store component 4402 need not be simultaneously displayed with the screen portion 4002. The conferencing application store may include a large number of conferencing applications organized into categories or otherwise organized to present a desirable browsing experience to the participants.

As illustrated in FIG. 45, the conferencing app store component 4402 may display a categories menu 4502 and a top apps menu 4504. Categories menu 4502 comprises a scrollable list displaying a plurality of categories. Each category may be selected using a category object or control 4506. When selected, the control 4506 may present a further user interface for enabling the participants to browse applications in that particular category. The conferencing application store may provide other browsing, navigation, or other mechanisms for enabling the participants 104 to view the conferencing applications in the conference interface. In one embodiment, a search engine may be provided via a search text box displayed in the conference user interface 4400. The conferencing application store may also implement a recommendations feature that automatically displays suggested applications to participants based on, for example, current applications, usage characteristics, profile parameters, social networking profiles, etc. In further embodiments, the conferencing application store may enable the participants 104 to recommend or share conferencing applications with other participants 104 and/or members 3102.

The top apps menu 4504 may display another scrollable list of application objects 4508 organized based on, for example, a ranking algorithm. Each application object 4508 is associated with a further user interface screen (e.g., component 4702—FIG. 47) for displaying information about the corresponding conferencing application. As illustrated in the embodiment of FIG. 47, when selected, one or more of the following types of information may be displayed: an application title 4704; a description 4706 of the conferencing application; a user ranking 4708; one or more screen shots 4710 of the conferencing application; and comments 4712 provided by other participants 104. Anywhere within the conference user interface 4400, an add app object 4714 (FIG. 47) may be displayed or otherwise presented. The add app object 4714 provides a user interface control for enabling the participant 104 to select the corresponding conferencing application. When selected, the conferencing application may be automatically added to the participant's profile and made available to the participant 104. Some conferencing applications may be made available for purchase from the host of the conferencing system 106 or the third party developers 4310, while others may be free. If the conferencing application is for purchase, the add app object 4714 may be linked to an online transaction functionality for enabling the participant to purchase the application. In other embodiments, purchases may be automatically processed according to a stored account profile 4602 (FIG. 46) and made available to the participant.

Figure 48:
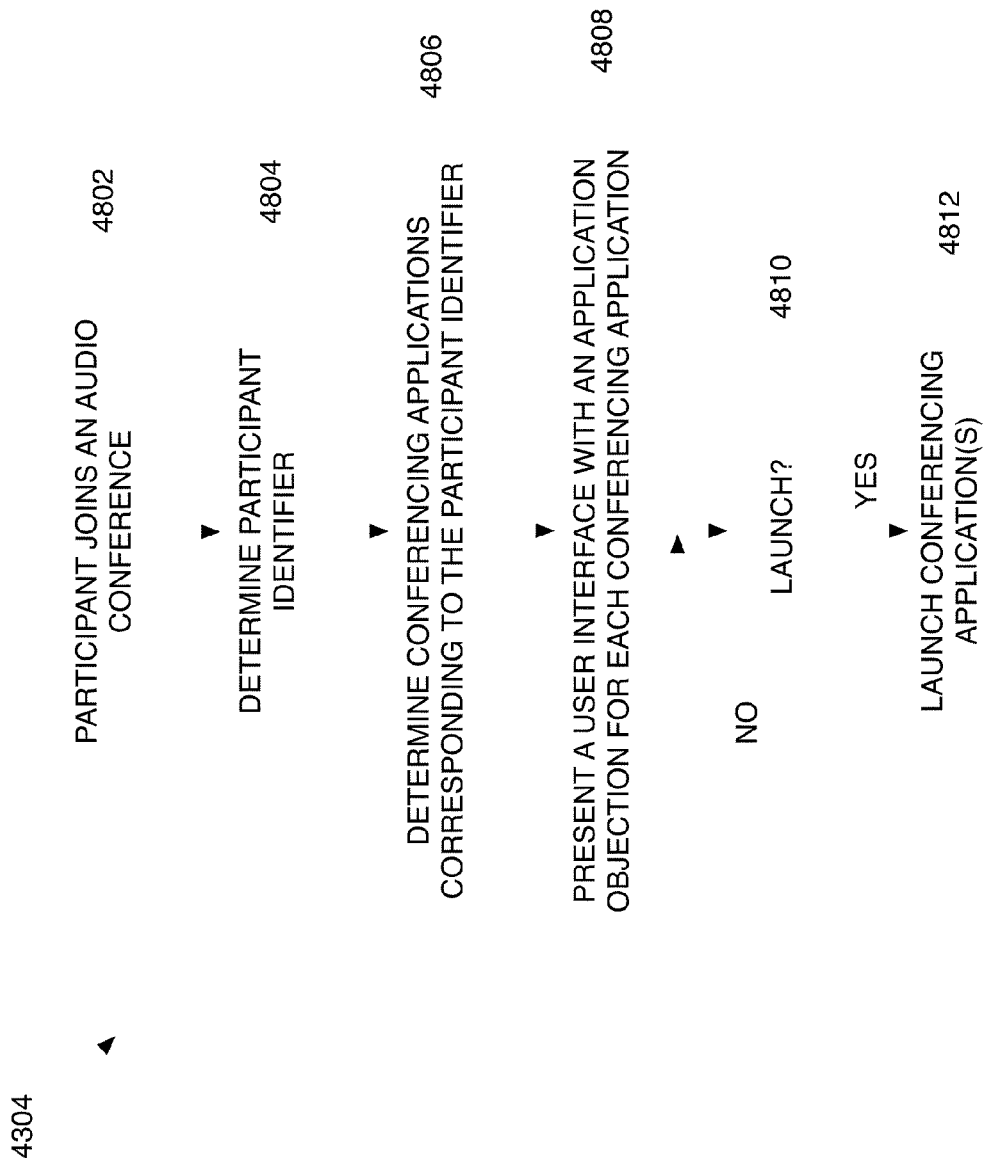
FIG. 48 is a flowchart illustrating the architecture, operation, and/or functionality of an embodiment of the participant application control modules in the conferencing system of FIG. 43.

FIG. 48 illustrates an embodiment of a method for operating a conferencing application store in a conferencing system 106. At block 4802, the participant 104 joins the audio conference 114. At block 4804, the participant application control module 4304, determines a participant identifier 3802 associated with the participant 104. The participant identifier 3802 may be obtained in various ways. In one embodiment, the participant 104 may provide profile information during a login process (FIG. 6), which is used to reference a participant identifier 3802 in the participant database 4308. It should be appreciated, however, that the participant identifier 3802 may be determined based on any available information, including, for example, the participant's originating telephone number, an IP address, a social networking profile, or a request from the computing device 102 (e.g., URL).

At block 4806, the participant application control module 4304 determines the conferencing applications associated with the participant identifier 3802. The participant application control module 4304 may access this information from a database (e.g., conference app database 4306, participant database 4308) and/or from a social networking system 3102. As mentioned above, in the enterprise context, the conferencing applications associated with an employee may be specified according to permissions, roles, etc. provided by the enterprise. In this manner, at block 4806, the conferencing applications are determined based on the enterprise-related information.

At block 4808, the conference user interface 4400 is presented to the computing device 102 associated with the participant, and the associated conferencing applications are made available for use. The conference user interface 4400 may display the available conferencing applications in, for example, the my apps component 4404 (FIG. 44) with a corresponding application control 4406. The application control 4406 may be selected to launch the conferencing application, configure application settings, share the application, or access other features.

At blocks 4810 and 4812, the participant application control module 4304 may automatically launch one or more of the available conferencing applications. Alternatively, the participant 104 may manually launch a conferencing application by selecting the corresponding application control 4406.

Figure 49:
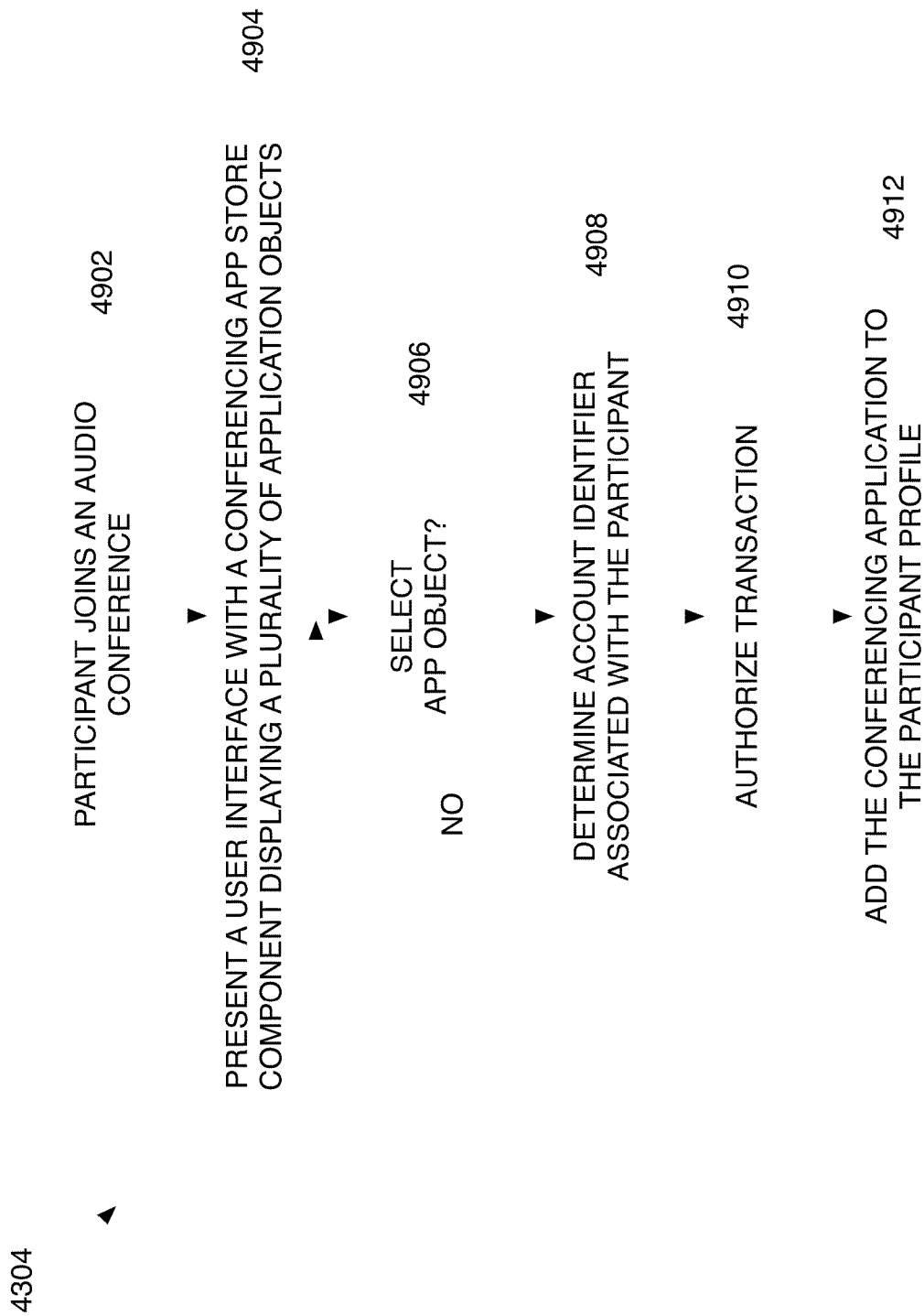
FIG. 49 flowchart illustrating the architecture, operation, and/or functionality of another embodiment of the participant application control modules in the conferencing system of FIG. 43.

FIG. 49 illustrates an embodiment of a method for providing conferencing applications to participants 104 in an audio conference 114. At block 4902, a participant joins an audio conference 114. At block 4904, a conference user interface 4400 is presented to a computing device 102 associated with the participant 104. The conference user interface 4400 comprises a conferencing application store component 4402 for browsing conferencing applications that are available via the conferencing system 106. The conferencing application store component 4402 may display a plurality of applications objects, each object associated with one of the available conferencing applications.

The participant 104 may select one or more of the available conferencing applications in the conferencing application store. At decision block 4906, the participant application control module 4304 may determine that one of the application objects has been selected by the participant 104. The selected conferencing application may be launched or made available for launching by the participant. In some embodiments, to access the conferencing application, the participant 104 may be required to purchase it. At block 4908, the participant application control module 4304 may determine the account identifier associated with the participant 104 and authorize the purchase (block 4910). At block 4912, the conferencing application may be added to the participants profile.

Figure 5:
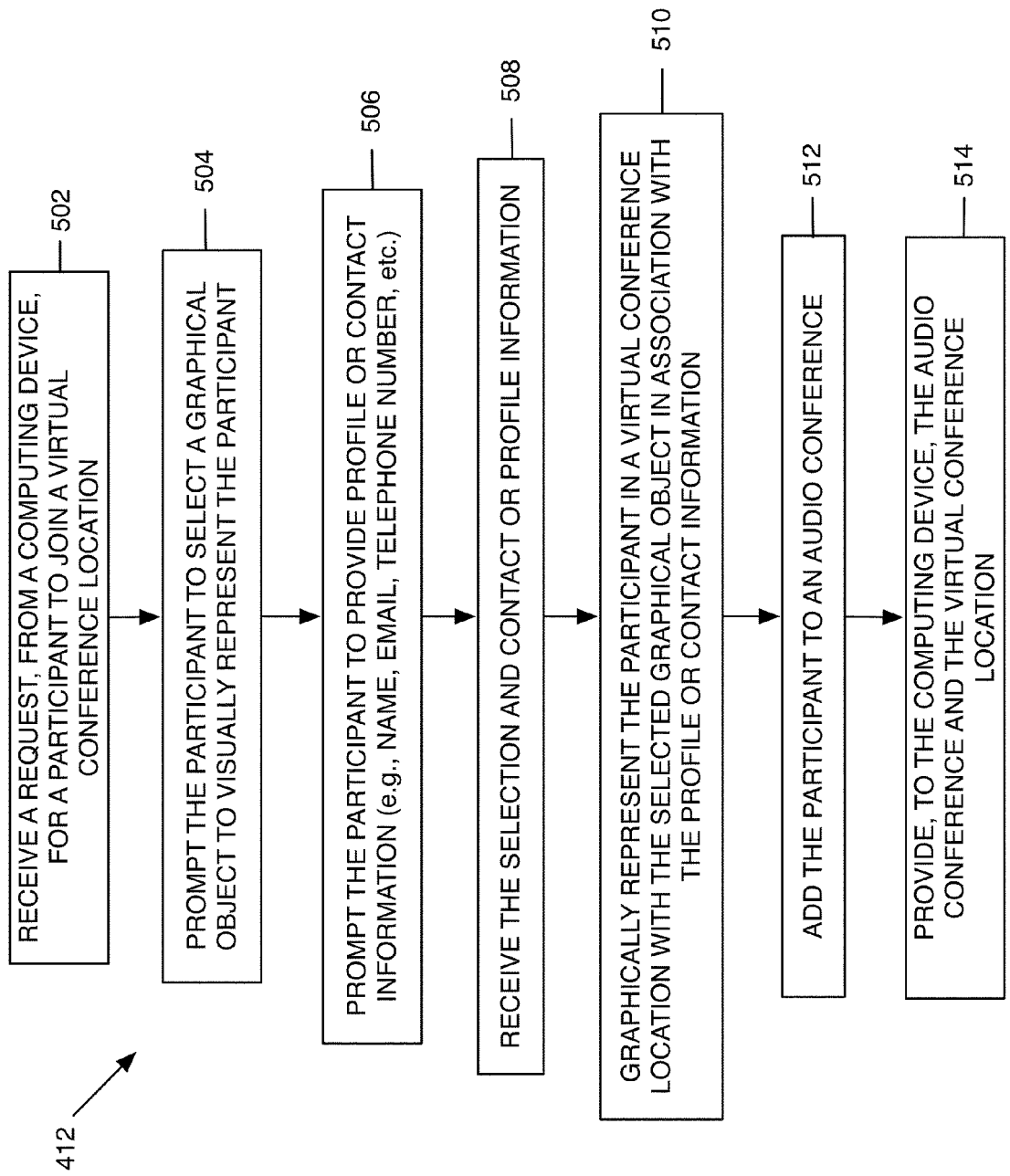
FIG. 5 is a flowchart illustrating the architecture, operation, and/or functionality of an embodiment of the participant configuration module(s) of FIG. 4.
Figure 6:
FIG. 6 is a login screen for a conference interface presented via the graphical user interface of FIGS. 1 & 4.
Figure 7:
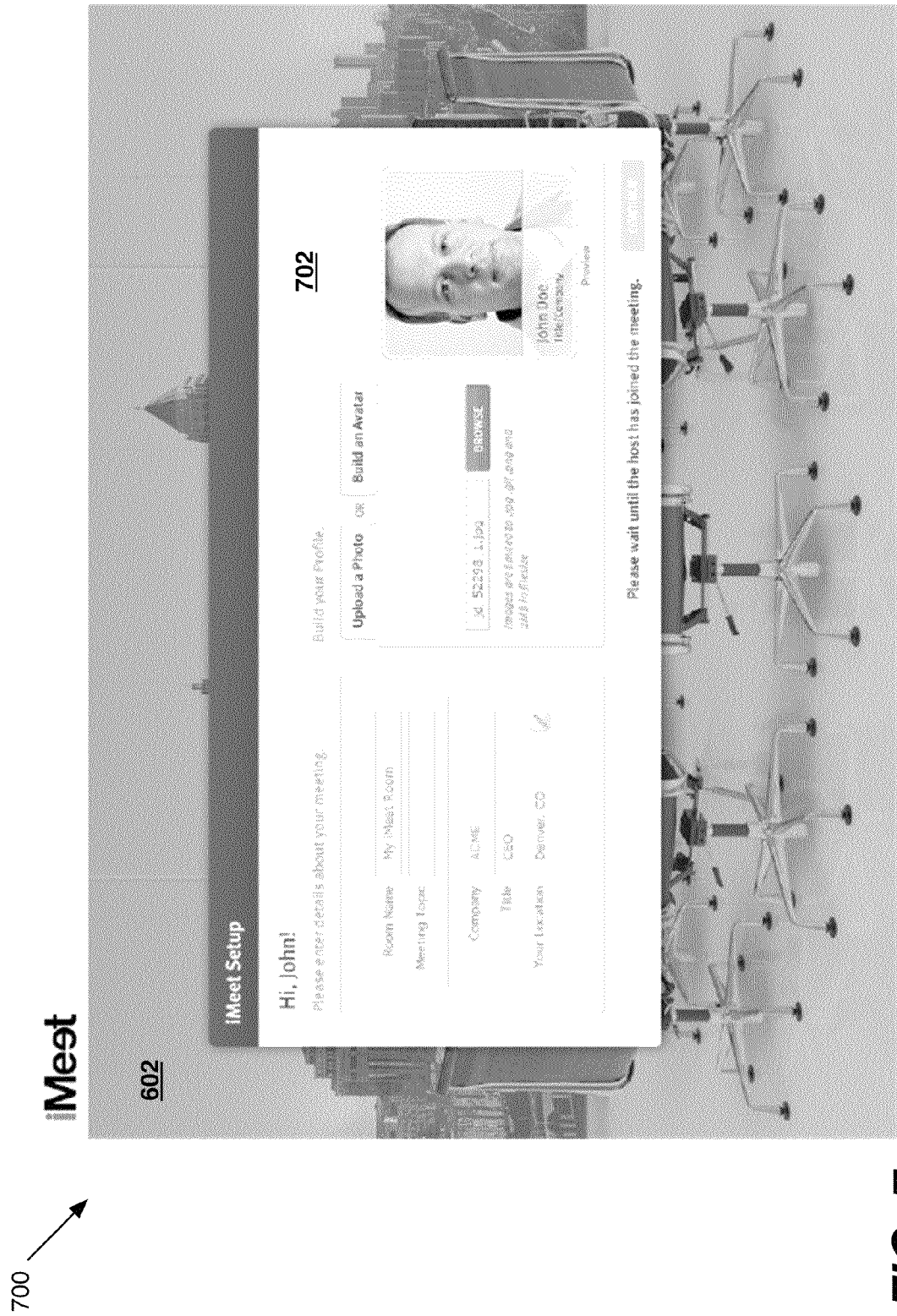
FIG. 7 is participant setup screen for a conference interface presented via the graphical user interface of FIGS. 1 & 4.
Figure 8:
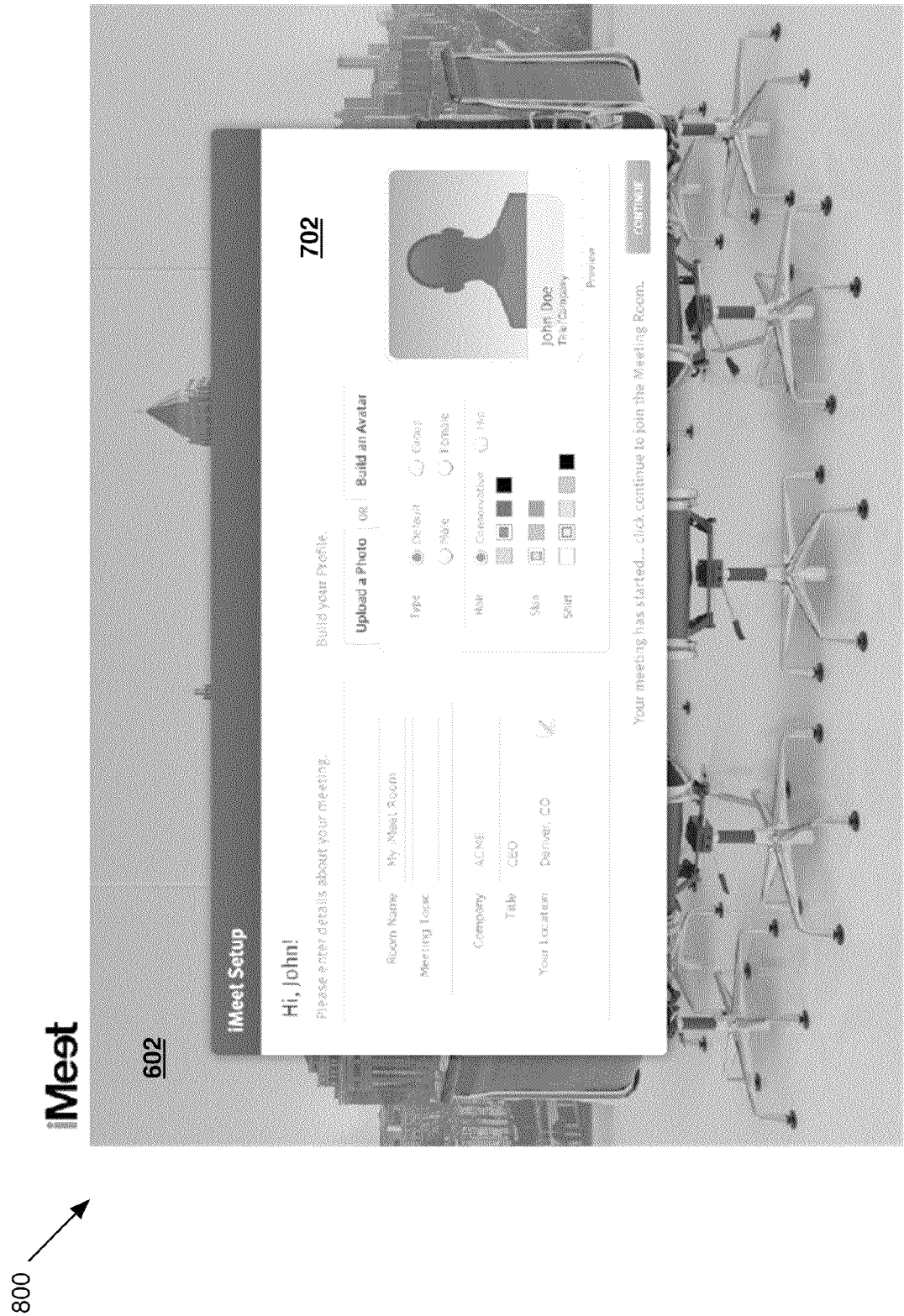
FIG. 8 is host setup screen for a conference interface presented via the graphical user interface of FIGS. 1 & 4.

Referring again to FIG. 4 and the software modules stored in memory 404, the participant configuration module(s) 412 generally comprise the logic or functionality for enabling participants to join the conference and/or configure their user-related information 130 via the conference interface. FIG. 5 is a flowchart illustrating the architecture, operation, and/or functionality of an embodiment of the virtual participant configuration module(s) 412. At block 502, the server 108 receives a request from a client device 102. The request may originate from, or be initiated from, for example, a link embedded in an electronic message sent to a participant 104 by the host. By selecting the embedded link, the client device 102 may access the server 108 and initiate a login and/or setup procedure (FIGS. 6-8). At block 504, the server 108 may prompt the participant 104 to select a graphical object to visually represent the participant 104 in the conference interface. At block 506, the server 108 may prompt the participant to provide profile or contact information (e.g., user-related information 130). At block 508, the server 108 may receive the user selections and/or information. FIG. 6 illustrates an exemplary login screen 600 for enabling the participants 104a-104c to join the conference. The login screen 600 comprises a "first name" text field, a "last name" text field, an "email address" text field, and a "phone number" text field. The login screen 600 also enables the user to request that the server 108 and/or the conferencing system 106 initiate an outgoing call to the user to join the audio conference 114.

Figure 9:
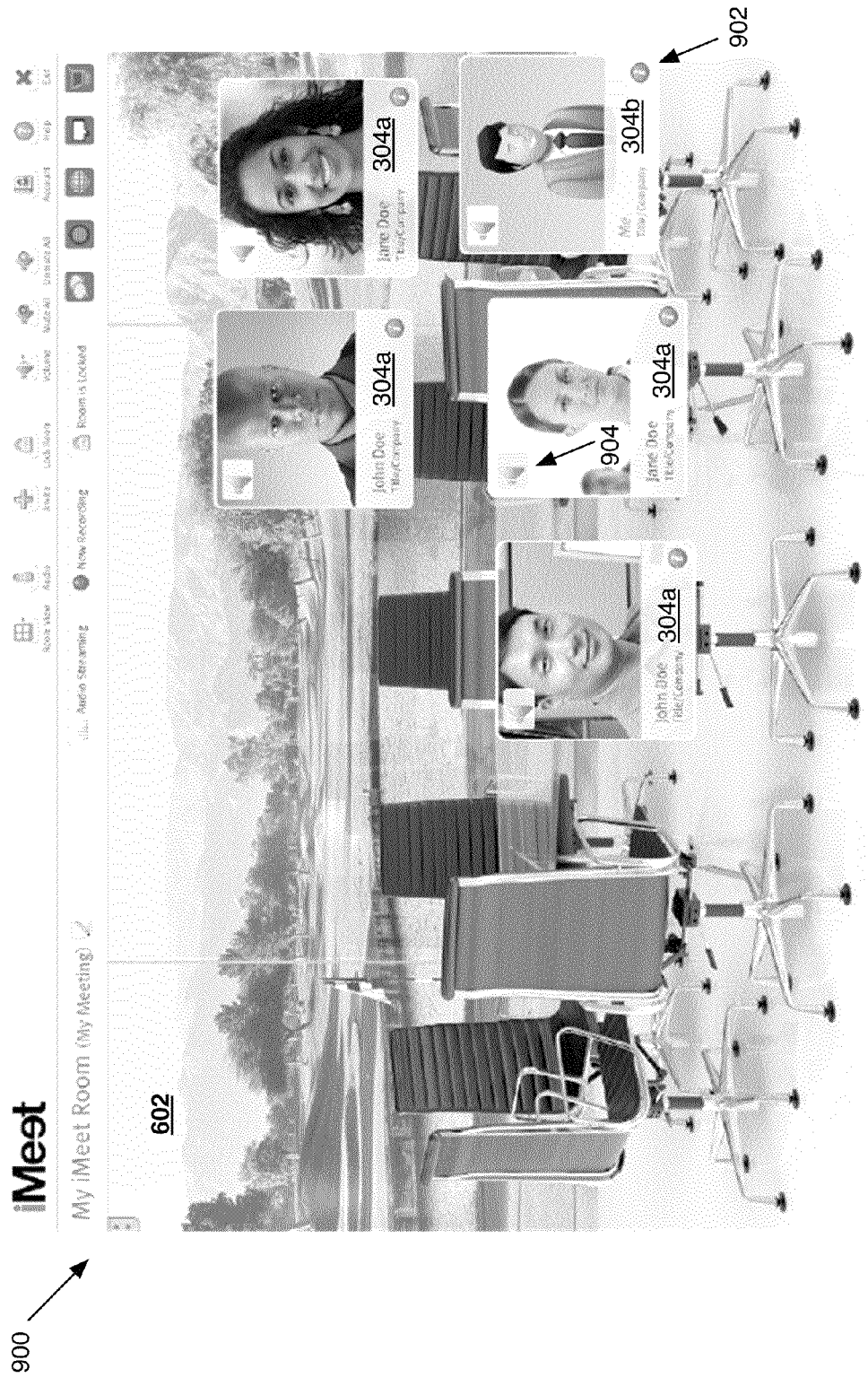
FIG. 9 is a screen shot of an embodiment of a conference interface presented via the graphical user interface of FIGS. 1 & 4 with a first location view.
Figure 10:
FIG. 10 is a screen shot of another embodiment of a conference interface with a tile view.
Figure 11:
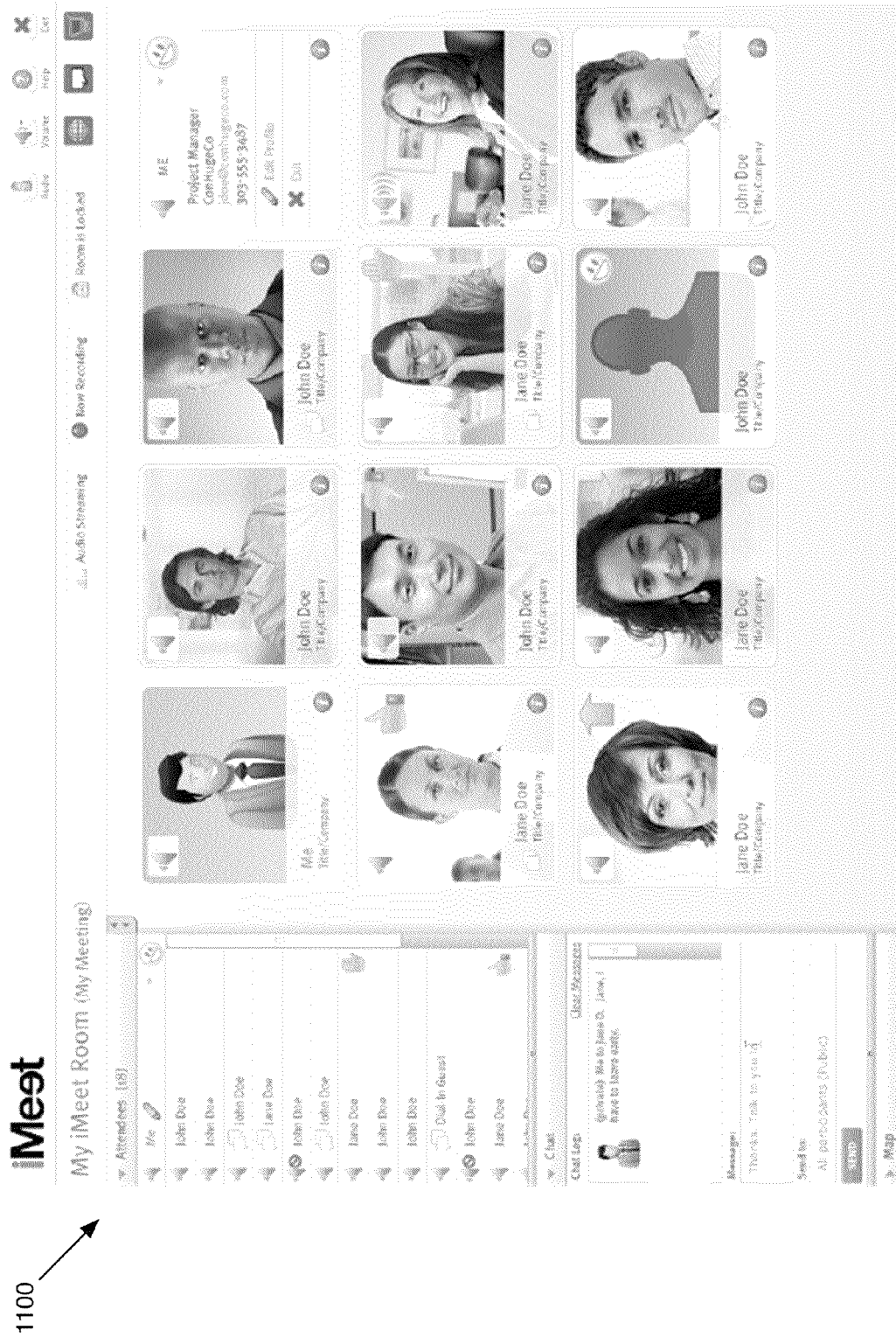
FIG. 11 illustrates the screen shot of FIG. 10 with the attendees list expanded.
Figure 12:
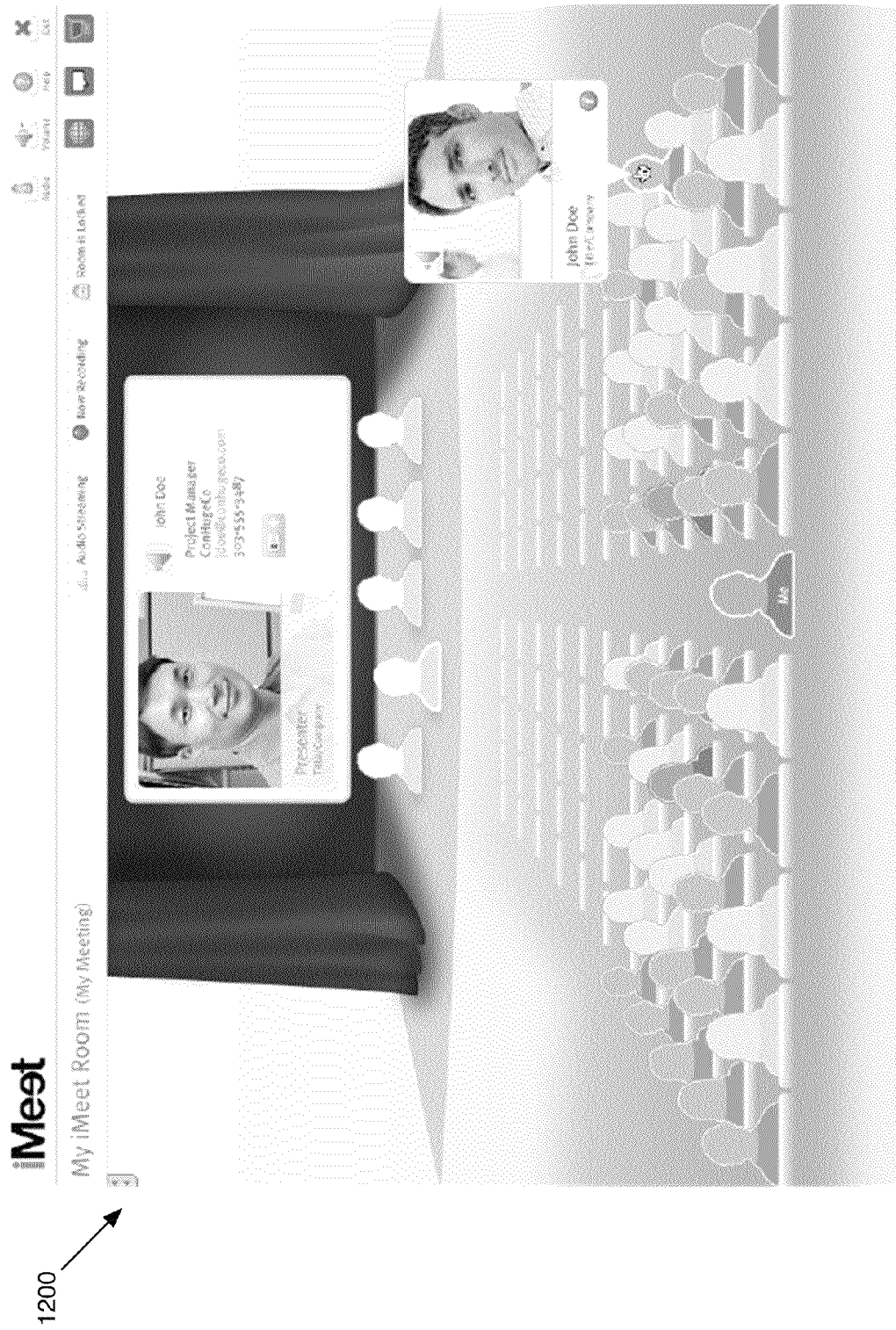
FIG. 12 is a screen shot of a further embodiment of a conference interface with a theatre view.
Figure 13:
FIG. 13 is a screen shot of another embodiment of a conference interface.
Figure 14:
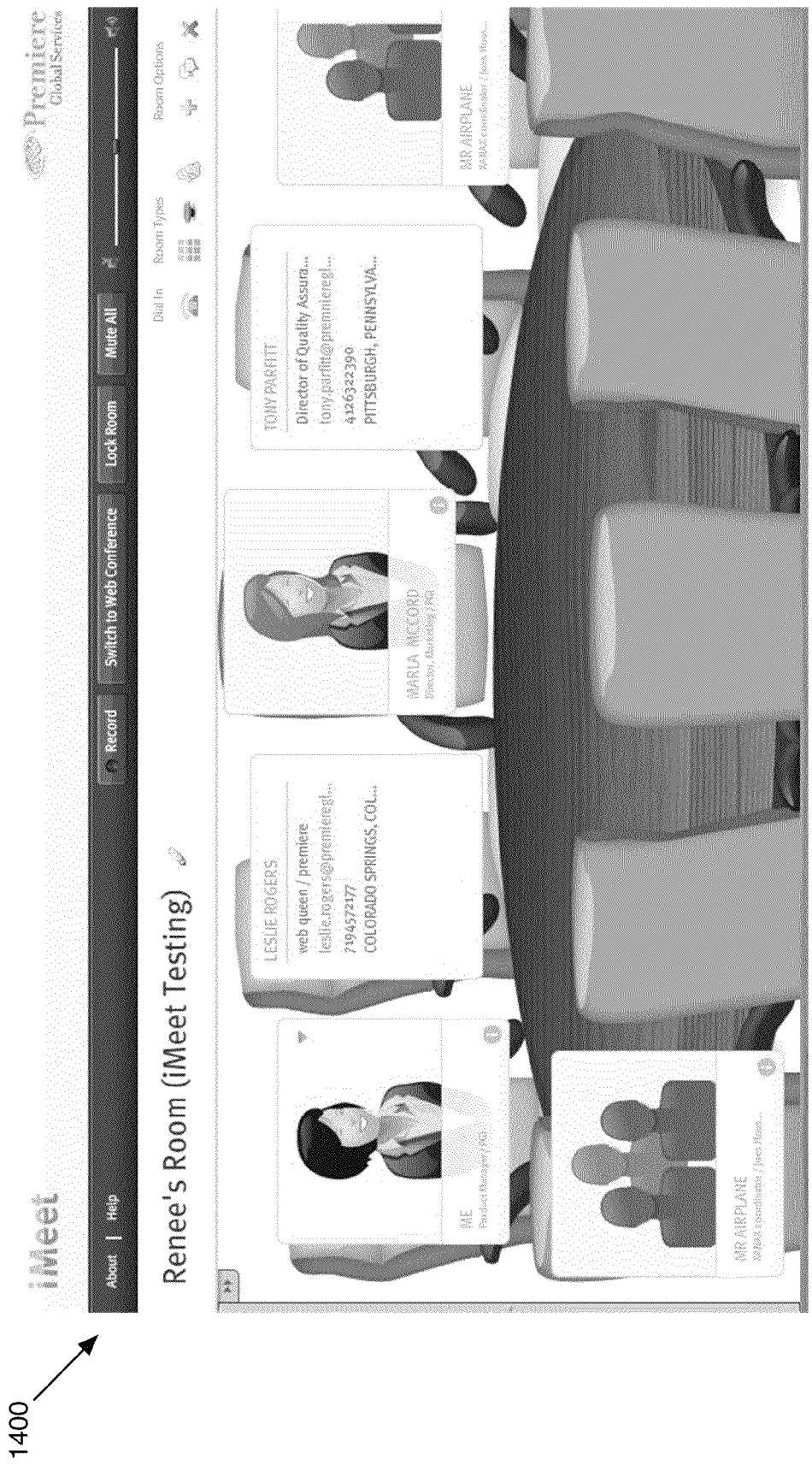
FIG. 14 illustrates the screen shot of FIG. 13 with two participants displaying business card.

Various embodiments of virtual location view(s) 124 are illustrated in FIG. 7-14. FIG. 7 illustrates a participant setup screen 700 for enabling the participants 104 to configure a user profile. FIG. 8 illustrates a host setup screen 800 for enabling the host 104d to configure a conference and customize a profile. FIG. 9 illustrates an exemplary conference location view of the conference. FIGS. 10 & 11 illustrate an exemplary tile view of the virtual conference. In the embodiments of FIGS. 10 & 11, the tiles 304 are arranged in a grid format. The conference interface further comprises various selectable side panels. An attendees panel may display the participants 104 in a list format along with any desirable user information. A chat panel may enable the participants 104 to chat during the audio conference 114. A map panel may display the locations of the participants 104 in a map view. FIG. 12 illustrates an exemplary theatre view for the conference interface, which may be desirable for conferences with a relatively large number of participants 104. In this embodiment, participants 104 defined as presenters may be displayed on a stage, and the other participants 104 may be displayed in the seats of the theatre. In the theatre view, the participants 104 may be presented in a default state without any contact information to reduce visual clutter, although the contact information may be accessed (FIG. 12) by a suitable user interface command (e.g., a mouse-over, mouse click, hot key, etc.). FIGS. 13 & 14 illustrate an alternative embodiment of a conference interface in which the virtual location comprises a conference room environment with the participants 104 arranged around the conference table.

Figure 15:
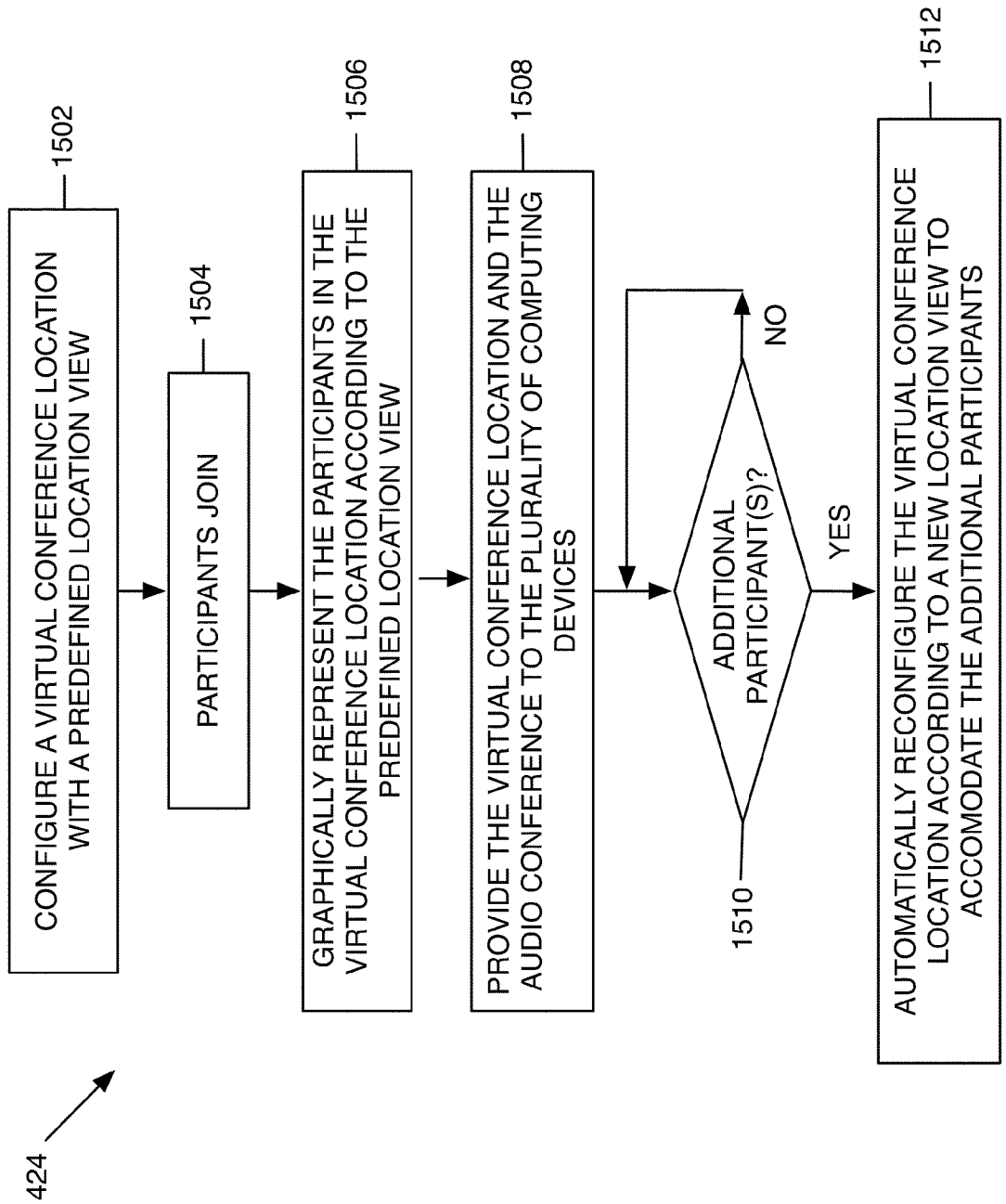
FIG. 15 is a flowchart illustrating the architecture, operation, and/or functionality of an embodiment of the automated location view configuration module(s) of FIG. 4.

FIG. 15 illustrates an embodiment of the automated location view configuration module(s) 424. In general, the automated location view configuration module(s) 424 comprise the logic of functionality for automatically configuring the location views 124 based on, for example, the number of participants 104 that have joined the conference, characteristics of the conference, etc. At block 1502, the virtual conference location 118 is configured with a predefined first location view 124. This may be a default location view 124 or one selected by the host and/or the participants 104. At blocks 1504 and 1506, one or more of the participants join the conference and are added to the first location view. At block 1508, the conference interface and the audio conference 114 are simultaneously presented to the client devices 102. At decision block 1510, the configuration module(s) 424 determine that additional participants 104 are joining the conference. The configuration module(s) 424 may be configured to determine that the existing location view 124 is not suitable for the additional participants 104. This determination may be made based on the number of participants, for example, or other information related to the existing participants and/or the new participants. At block 1512, the configuration module(s) 424 select a new location view 124 and automatically reconfigure the conference interface to accommodate the additional participants 104.

Figure 16:
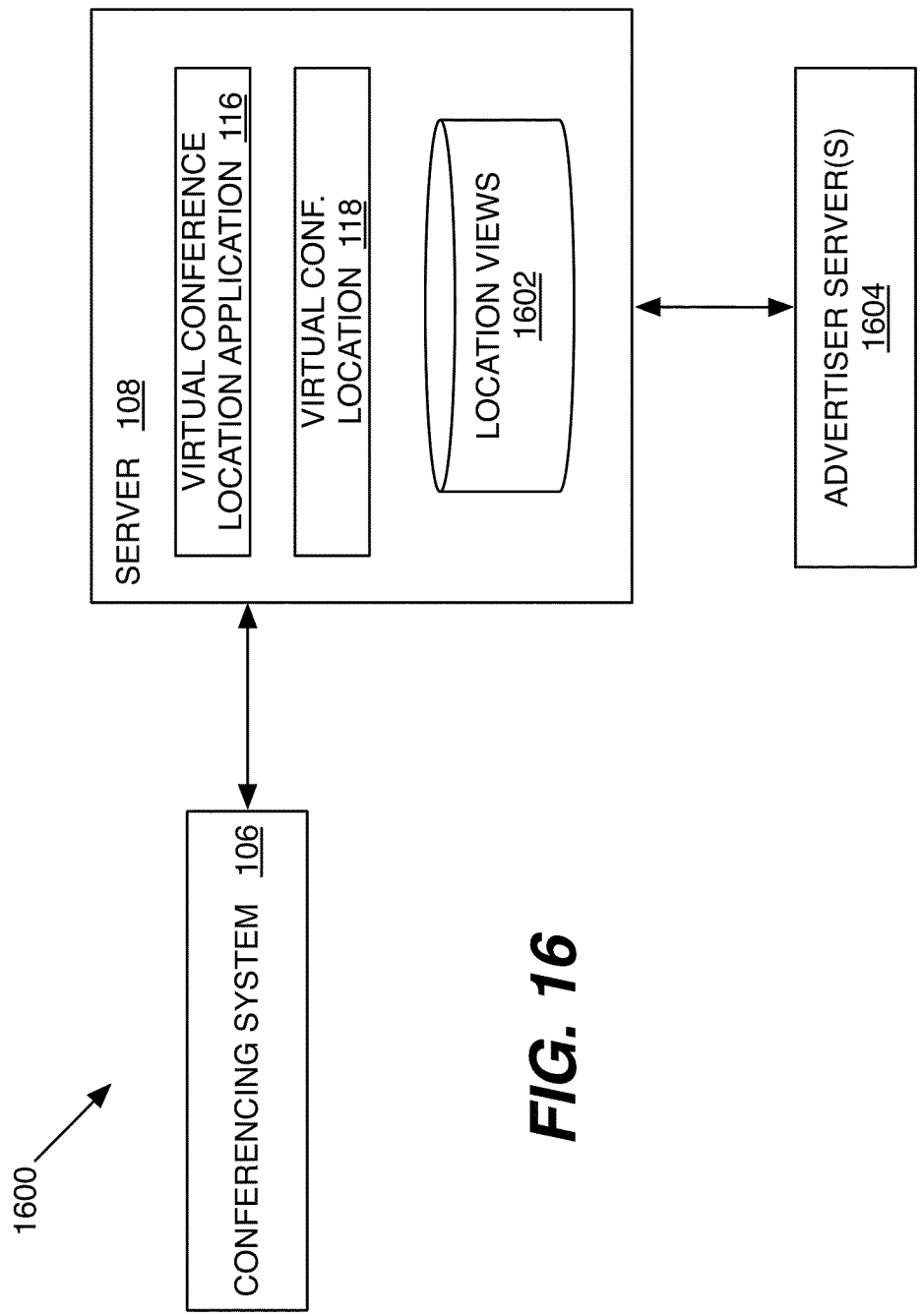
FIG. 16 is a block diagram illustrating another embodiment of the server of FIGS. 1 & 4.

It should be appreciated that the location views 124 may be stored in a database 1602 (FIG. 16), which is accessible to one or more of the module(s) stored in memory 404. The location views database 1602 may be leveraged to provide various advertising campaigns to advertiser server(s) 1604. For example, advertisers may desire to provide product placement advertisements or other advertisements in the virtual conference location 118. The server 108 may manage these advertisements via the database 1604. One of ordinary skill in the art will appreciate that the database 1604 may further support licensed assets that are also provided in the virtual conference location 118 during the audio conference 114. For example, the virtual conference location 118 may be customized to resemble a distinctive setting, such as, corporate boardroom, a host's office, or otherwise present licensed assets in the location view 1602.

The conferencing system 106 may license the assets from third parties and offer them for purchase by participants 104 for use in a virtual conference location 118. A licensed asset may comprise a licensed location for the virtual conference location 118, or graphics, audio, video, items, etc. that may be licensed from third parties and presented in a location view 1602. As an example, a licensed asset may include displaying a particular celebrity as a participant 104, displaying artwork (e.g., wall paintings, sculptures, etc.) in the location view 1602. Although not necessary to be considered licensed assets, it should be appreciated that the licensed assets may comprise any embodiment of intellectual property rights in any medium that are capable of being presented in the virtual conference location 118.

Figure 21:
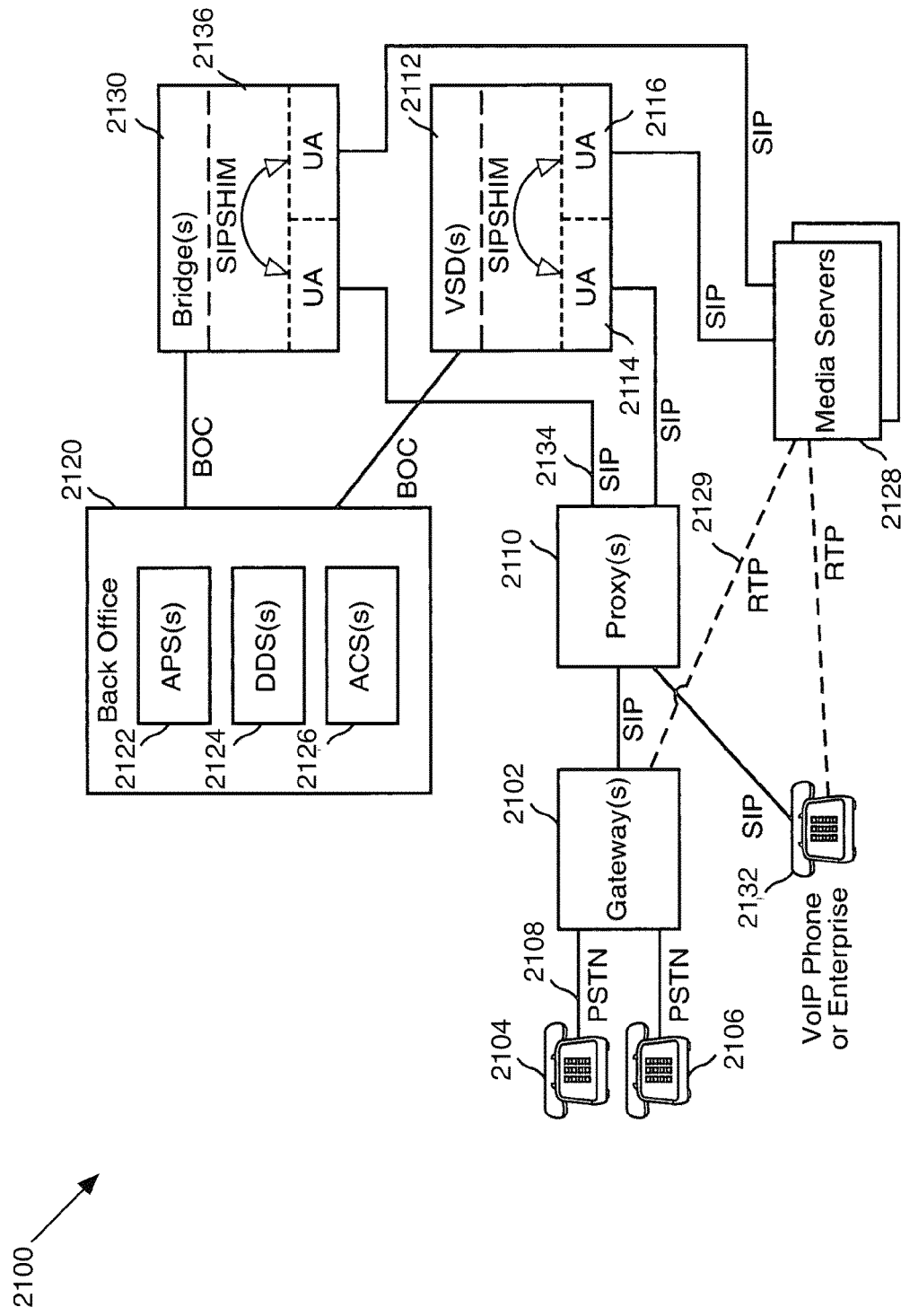
FIG. 21 is a block diagram of an embodiment of a VoIP conferencing system in which the conference interface of FIGS. 1 & 4 may be implemented.

The conferencing system 106 may be configured to support any desirable conferencing system, such as, for example, a teleconferencing system, a VoIP-based (Voice Over Internet Protocol) system, a web-based or online conferencing system, or any other suitable conferencing platform or system. FIGS. 21-25 illustrate several exemplary, non-limiting embodiments of VoIP conferencing systems or platforms for supporting the audio portion of the conference, which may be integrated with the conference interface. The VoIP conferencing systems may be configured to readily handle different protocols, load balance resources and manage fail-over situations FIG. 21 is a block diagram of an embodiment of a VoIP conferencing system 2100. One or more of the applications and/or servers in the following description may be single, clustered or load balanced to scale the system capacity and/or improve system reliability and/or system response times. The system comprises a gateway (GW) 2102, which is coupled to a telephone 2104, 2106 through the PSTN (Public Switched Telephone network) 2108. The telephones 2104, 2106 use a public switched telephone network format. The gateway 2102 converts the PSTN format of the call into a control portion, usually SIP (Session Initiation Protocol) or control portion, and a media portion, usually RTP (Real Time Protocol). The gateway 2102 connects to a proxy 2110 through a network 110, such as, for example, the Internet, a local area network (LAN), a wide area network (WAN), etc. or any other suitable network. The proxy 2110 passes the SIP information to a Voice Services Director (VSD) 2112. The VSD 2112 has a back-to-back user agent (UA) 2114, 2116. One user agent 2114 acts as the termination point for the original call, while the other user agent 2116 communicates with and controls media server(s) 2118. The VSD 2112 also communicates with back office servers 2120 using some back-office communication protocol (BOC), either through the B2BUA (back-to-back user agent) or through another mechanism and/or protocol. The back office 2120 has a number of control services including an Advanced Protocol Server (APS) 2122, which routes back-office messages, a Dialog Database Server (DDS) 2124, which holds conference information and validates user passcodes, and an Active Conference Server (ACS) 2126, which tracks information about active conferences. Note that the ACS 2126 assigns conferences to various bridges and also load balances between the bridges. Once a media server 2118 is designated for a particular conference, RTP media 2129 is routed from the gateway 2102 to the media server 2118. The media server 2118 does the voice (audio, video, or real-time data) mixing. Note that each media server 2118 may have a number of blades, each further having a number of ports. As a result, a given media server 2118 may perform audio mixing for a number of conferences. The media servers 2118 are connected to a bridge application comprising one or more conferencing bridges (i.e., bridges 2130). A bridge 2130 performs the control functions for an active conference, including functions like muting, recording and conference creation and destruction. If a user is using a computer 2132 or a VoIP hard phone as their telephone they can connect directly to the proxy 2110 that then routes the SIP and the RTP portions of the call to the appropriate places. The telephone 2132 employs a VoIP connectivity rather than PSTN.

The bridge 2130 is SIP-protocol enabled, as illustrated by reference numeral(s) 2134. A control layer (SIPSHIM 2136) may comprise an implementation of a B2BUA, allowing the bridge application 2130 to interact with the caller and the media servers 2118 through generic higher-level commands rather than dealing directly with SIP protocol and SIP signaling events.

When a PSTN user calls into a conference, the call is routed through a gateway 2102, through the proxy 2110 and to the VSD 2112. The VSD 2112 plays a greeting and asks the user for a passcode. Different passcodes may be used to differentiate the conference leader for a given conference, as well as to select a particular conference. These passcodes are validated by the DDS 2124 at the request of the VSD 2112. Based on the DNIS, ANI, passcode, or any combination of these (customer defining code), a specific greeting may be selected by the VSD 2112, rather than playing a generic greeting. Next, the VSD 2112 asks the ACS 2126 which bridge 2130 the conference is assigned to. The VSD 2112 then transfers the caller to the appropriate conferencing bridge, 2130 where the caller's media is joined to a conference.

The back-to-back user agents 2114, 2116 allow the system to handle failures in conferencing resources. The call from the telephone 2104 is terminated at the first user agent 2114. If a media server 2118 stops functioning or gives indication of a pending failure (failure mode), the second user agent 2116 is instructed to reroute the call to another media server 2118. The back-to-back user agents 2114, 2116 also allow the system to handle different protocols. The first user agent 2114 generally receives SIP protocol information, but the second user agent 2116 can use a different protocol if that is convenient. This allows the system 2100 to interoperate between resources that use differing protocols.

It should be appreciated that the systems connected to the SIP/BOC channels may be considered part of the conference control system while those systems connected to the RTP or media data streams can be considered to be part of the data portion of the conference system.

Figure 22:
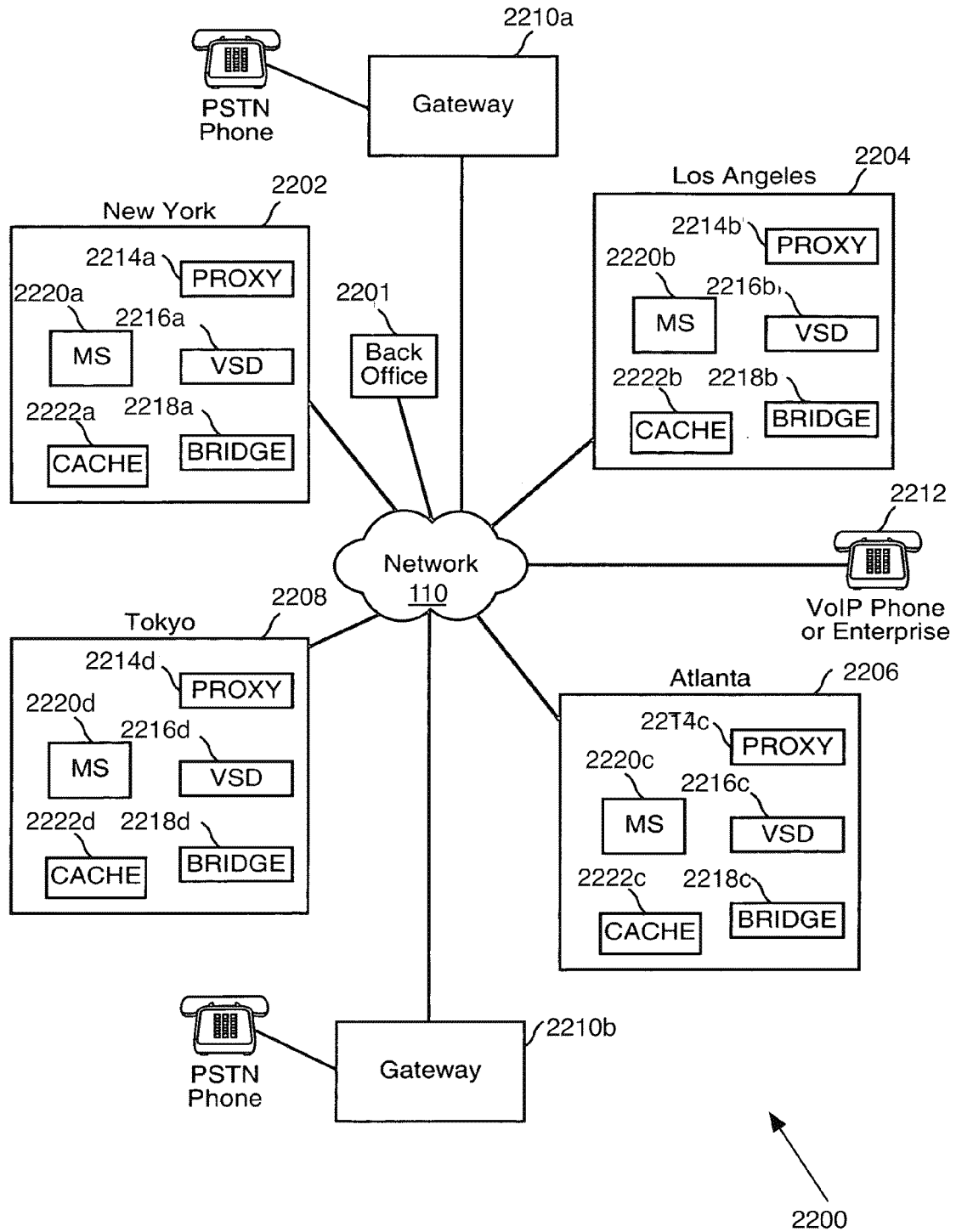
FIG. 22 is a block diagram of another embodiment of a distributed VoIP conferencing system in which the conference interface of FIGS. 1 & 4 may be implemented.

FIG. 22 is a block diagram of an embodiment of a distributed VoIP conferencing system 2200 for implementing the conferencing platform. The conferencing system 2200 is similar to that shown in FIG. 21 except that this system is distributed and has multiple instances of a system like that of FIG. 21. A number of conference centers 2202, 2204, 2206, 2208 are located in different locations in a geographical area (e.g., around a country or the world). Each conference center 2202, 2204, 2206, 2208 is coupled to a network 110. One or more gateways 2210a, b can also be coupled to the network 110, and VoIP phones or VoIP-based enterprises 2212 can tie in to the system. Each conference center would typically have one or more of a proxy 2214a-d, a VSD 2216a-d, a bridge 2218a-d and a media server 2220a-d. A software based distributed cache 2222a-d or other information-sharing mechanism (such as a Back Office 2201) is made available to all VSDs 2216 and provides shared information about the ongoing conferences and the resources that are available. The caches 2222a-d shares this information through the network 110. A call may arrive at the proxy 2214b in LA 2204 and be routed to the VSD 2216a in New York 2202. The VSD 2216a may select the media server 2220d in Tokyo 2208 and a bridge 2218c in Atlanta 2206. This allows the proxy 2214, VSD 2216 and bridge 2118c to load balance all available resources across the network 110. In addition, in a fail-over situation the VSD 2216a in New York 2202 can detect that the bridge 2218d in Tokyo is not responding. Under these circumstances, the VSD 2216 can redirect the conference to bridge 2218c in Atlanta.

Figure 23:
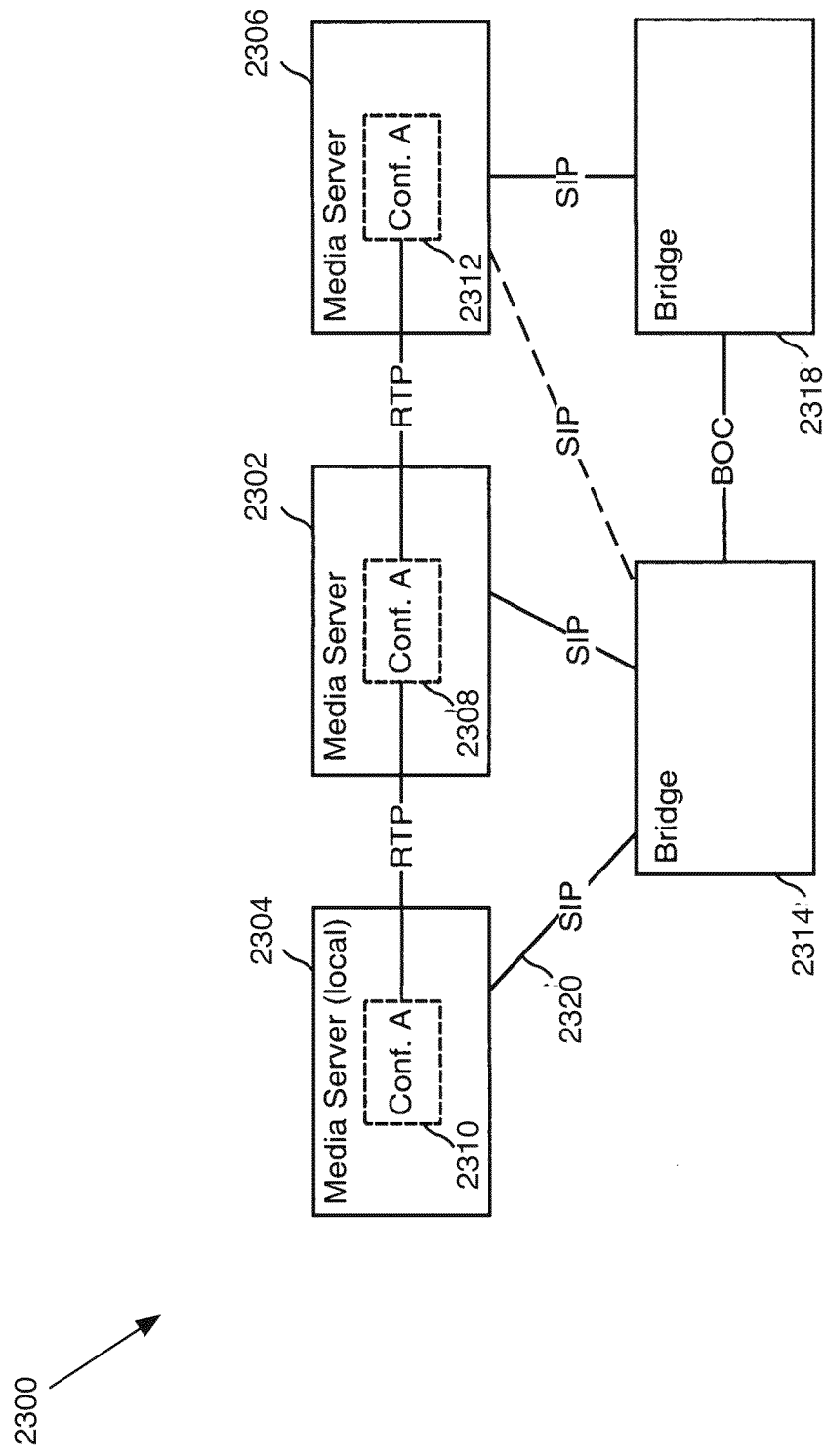
FIG. 23 is a block diagram of an embodiment of a distributed conference using the distributed VoIP conferencing system of FIG. 22.

FIG. 23 is a block diagram of another embodiment of a suitable conference platform in which the virtual conference location application 116 may be implemented. This implementation uses a distributed conference using a distributed VOIP conferencing system 2300. FIG. 23 shows how distributed resources may be shared. The system 2300 comprises a plurality of media servers 2302, 2304, and 2306, each of which may provide a large number of conferencing port resources. For example, assume that a conference 2308 starts on media server 2302. Five minutes into that conference, only ten ports are left unused on media server 2302 but twenty new people want to join that conference. These people can be allocated to other media servers. For instance, ten ports 2310 can be used in media server 2304 and ten ports 2312 can be used in media server 2306. Two additional conference ports may be required from the original conference and media server 2302 to link the RTP or media to the other two media servers, which each use one media (RTP) linking port in addition to their ten callers. A single bridge 2318 may control all three media servers 2302, 2304, and 2306 and the three conferences 2308, 2310, and 2312 through SIP 2320 or another protocol, even if one or more media servers are located in a remote location relative to the location of the bridge. Conference bridge applications may also be linked at a high level, where each bridge 2314, 2318 controls its own media server resources, and are linked through some form of back-office communications (BOC), which may include SIP. Conference media (RTP) linking may be initiated from one bridge that acts as a parent, with multiple subordinate or child conferences being instantiated on the other media servers and possibly also on other bridges.

This approach minimizes audio latency by having a common focal point for all child conferences to converge. However, this approach may use more "linking" ports on the parent conference. Hence, the initial conference may be deprecated to be a child conference, while the second conference is assigned to be the parent (or step-parent), and thus the media for all conferences is linked to the second conference as the focal point. When instantiating the second conference, sufficient ports may be reserved to allow linking further child conferences in the future.

This approach of linking conferences may also apply where large numbers of callers are located in different geographical regions, or possibly on different types of networks such as a combination of standard VoIP network or a proprietary network, but these need to be linked together. Rather than having all callers connect to a single location, each region or network could connect to a regional bridge, then the bridges and the media are linked together. This minimizes audio latency for callers in the same region, and may also reduce media transport and/or conversion costs. Each region or network could also use parent and child conferences as needed, and only the two parent (or step-parent) conferences in different regions or networks would have their media linked together.

Figure 24:
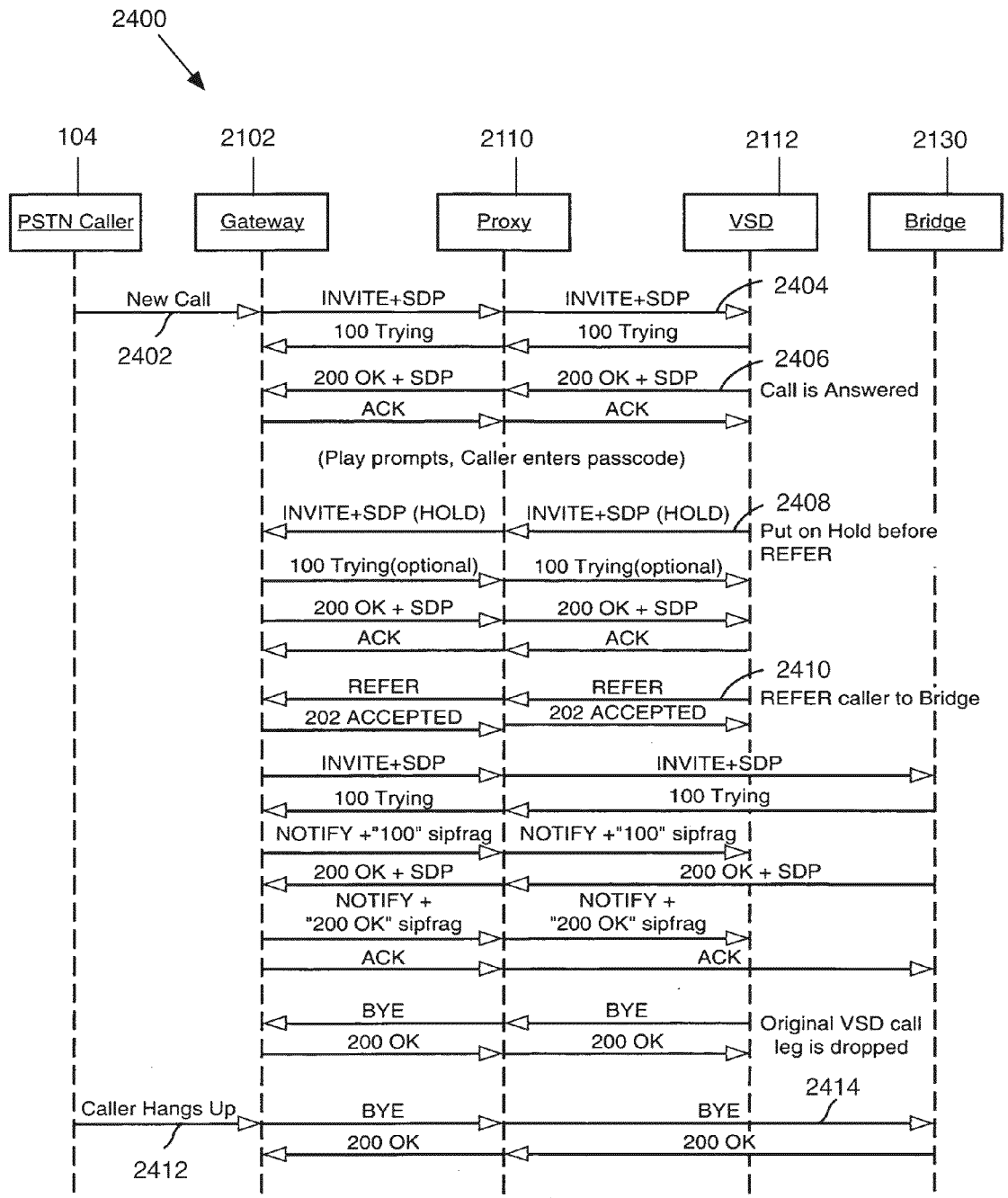
FIG. 24 is a call flow diagram for an embodiment of a PSTN participant in the VoIP conferencing systems of FIGS. 21-23.

FIG. 24 illustrates an embodiment of a method 2400 for establishing a call with a participant 104 via the PSTN. A gateway 2102 receives an incoming call 2402 from the PSTN. The gateway 2102 converts the PSTN call into a control (SIP) portion and media (RTP) portion. FIG. 24 shows the SIP portion of the call that is coupled to the gateway 2102. The SIP portion is not shown. The RTP is also not shown in FIG. 24, as this diagram details the control messaging (SIP) as opposed to the media. A proxy 2110 forwards the control portion of the incoming call 2402 to a VSD 2112. The VSD 2112 answers the call 2406, then plays one or more prompts to the caller requesting them to enter a passcode. After the caller enters the necessary information by, for example, DTMF, by speaker-independent voice recognition, or by other means, the media for the original call is put on hold 2408. Next, the VSD 2112 checks with the back-office system to see if the passcode is valid, and if so, the caller is transferred 2410 to a bridge 2130 as specified by the back-office system. When the caller hangs up 2412, the gateway 2102 informs the bridge 2130 of this event 2412 and the call is thereby terminated at both ends.

During the call, the state of the conference and of individual users can be controlled through DTMF by the caller, or from any other mechanism that allows a user to access the bridge 2130 directly or indirectly, such as a web-based interface that ties to the bridge 2130 through the back office. The bridge 2130 will subsequently control the media server(s) in use.

For both the VSD 2112 and the conferencing bridge 2130, when the caller presses a digit on his phone the digit press may be passed on as in-band tones within the RTP audio media stream, or may optionally be converted by the gateway 2102 to a telephony event signaling protocol that is carried inside the RTP. In either case, the digit press is detected by the media server and reported to the VSD 2112 or bridge application. The above describes the basic call flow of typical conference user.

Figure 25:
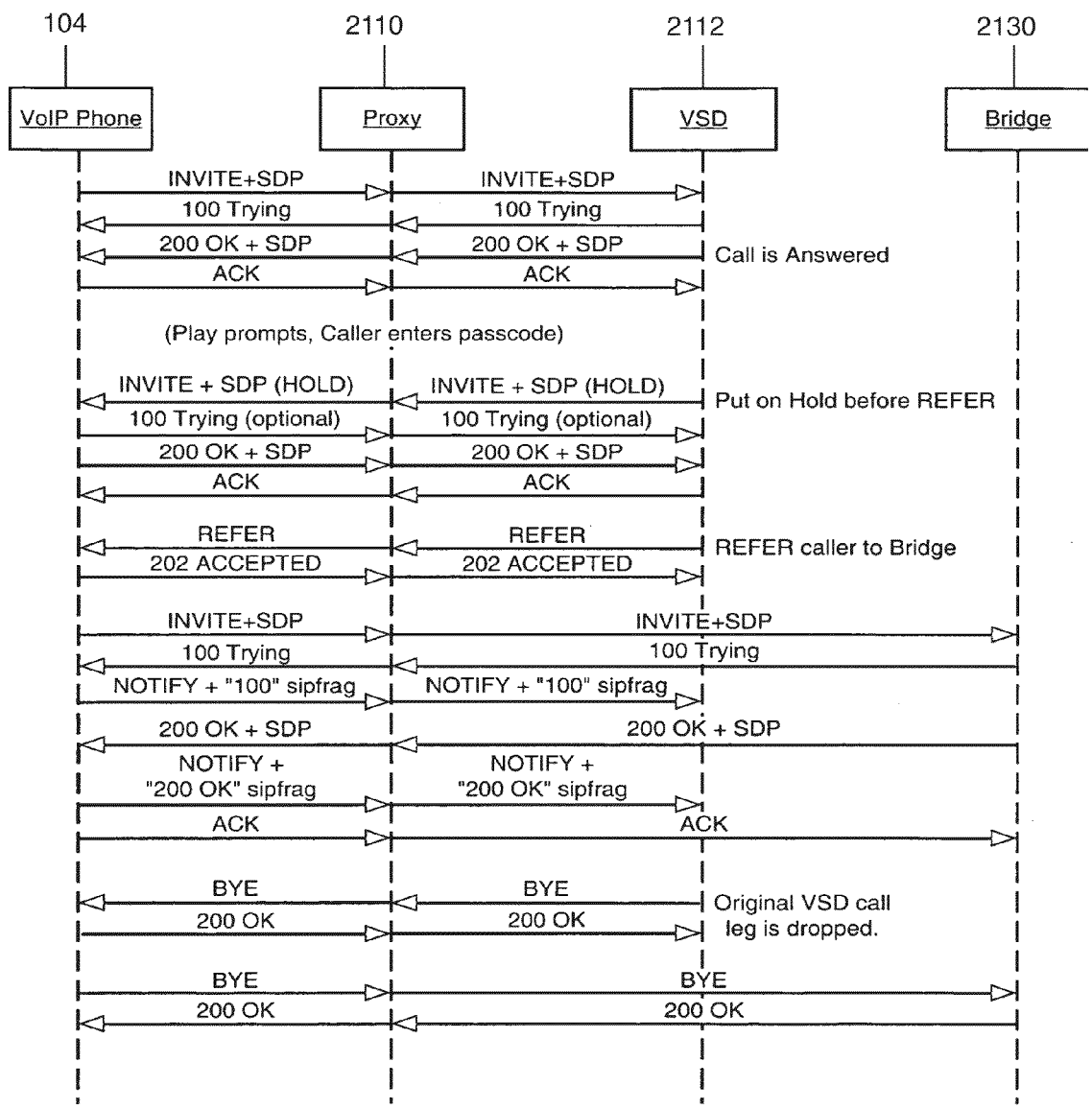
FIG. 25 is a call flow diagram for an embodiment of a VoIP participant in the VoIP conferencing systems of FIGS. 21-23.

FIG. 25 shows the identical call flow from FIG. 24, but with a native VoIP call origination rather than PSTN. The main difference is that a gateway 2102 is not used. Variations of these flows are also needed to handle error conditions that may occur, such as a bridge failing to answer when a caller is transferred to it. These have been omitted for clarity.

The SIP commands employed in the methods of FIGS. 24 & 25 are described below, for exemplary purposes.

SIP: Session Initiation Protocol, as defined primarily by IETF Standard RFC3261. SIP is an application-layer control protocol that can establish, modify, and terminate multimedia sessions such as Internet telephony calls.

INVITE: a SIP Request method used to set up (initiate) or modify a SIP-based communication session (referred to as a SIP "dialog").

SDP: Session Description Protocol. An IETF protocol that defines a text-based message format for describing a multimedia session. Data such as version number, contact information, broadcast times and audio and video encoding types are included in the message.

ACK: Acknowledgement. A SIP Request used within the SIP INVITE transaction to finalize the establishment or renegotiation of a SIP session or "dialog".

100, 200, 202: SIP Response codes that are sent back to the originator of a SIP request. A response code indicates a specific result for a given request.

NOTIFY: a SIP Request method that is used to convey information to one SIP session about the state of another SIP session or "dialog".

REFER: a SIP Request method that is used to transfer one end of a SIP session to a different SIP destination.

Sipfrag: SIP fragment. A fragment of a SIP message (such as a Response code) from another SIP session, that is sent as part of the body of a SIP NOTIFY message.

BYE: a SIP Request method that is used to terminate an existing SIP session or "dialog".

A conferencing system, such as those described above or other conferencing systems, may interface with a social networking system to provide various enhanced communication features. FIG. 31 illustrates a computer system 3100 comprising a conferencing system 106 and a social networking system 3102 that may communicate with client devices 102 via a communication network 110. In the embodiment of FIG. 31, the conferencing system 106 is configured in the manner described above, and comprises one or more servers 108, social networking integration module(s) 414, a conference interface, and one or more datastore(s) 3110. As described below in more detail, the social networking integration module(s) 414 enable the conferencing system 106 to communicate with the social networking system 3102 via, for example, an application programming interface (API) 3108. The conferencing system 106 and/or the social networking system 3102 may access data, applications, or any other stored content or functionality associated with the respective systems.

It should be appreciated that the social networking integration module(s) 414 may be configured to interface with any desirable social networking system 3102. However, to illustrate the general principles of the integrated systems, various exemplary embodiments of a social networking system 3102 will be described.

The social networking system 3102 generally comprises one or more server(s) 3104 for providing a social networking website 3106 to client devices 102 via, for example, a client or web browser 3110. The social networking system 3102 may expose an application program interface (API) 3108 to other computer systems, such as, the conferencing system 106. The API 3108 enables third party applications to access data, applications, or any other stored content or functionality provided by the social networking system 3102 to members 3201.

The social networking system 3102 offers its members 3201 the ability to communicate and interact with other members 3201 of the social network. Members 3201 may join the social networking system 3102 and then add connections to a number of other members 3201 to whom they desire to be connected. Connections may be explicitly added by a member 3201. For example, the member 3201 may select a particular other member 3201 to be a friend, or the social networking system 3201 may automatically recommend or create connections based on common characteristics of the members (e.g., members who are alumni of the same educational institution, organization, etc.). As used herein, the term "friend" refers to any other member to whom a member has formed a connection, association, or relationship via the social networking system 3102. Connections in social networks are usually in both directions, but need not be, so the terms "member," "friend," or "follower" may depend on the frame of reference. For example, if Bob and Joe are both members and connected to each other in the website, Bob and Joe, both members, are also each other's friends. The connection between members 3201 may be a direct connection. However, some embodiments of a social networking system 3201 may allow the connection to be indirect via one or more levels of connections. It should be appreciated that the term friend does not require that the members 3201 are friends in real life. It simply implies a connection in the social networking system 3102.

The social networking system 3102 may be implemented in various types of computer systems. The implementation of the social networking system 3102 may provide mechanisms for members 3201 to communicate with each other, form connections with each other, store information, and share objects of interest, among other things. The implementations described below include a social networking website 3106 that interacts with members 3201 at client devices 102 via a communication network 110, such as a web-based interface (e.g., via the browser 3110). However, other implementations are possible, such as one or more servers 3104 that communicate with clients using various client and server applications (e.g., non-web-based applications). Furthermore, the social networking system 3102 may not include any centralized server, but rather may be implemented as, for example, a peer-to-peer system with peer-to-peer applications running on the client devices 102 that allow members 3201 to communicate and perform other functions. One example is a peer-to-peer network of smart phones communicating via Short Message Service (SMS) over a cellular network. It should be appreciated that the embodiments of a social networking website 3106 described below may be adapted to various other implementations of social networking systems.

FIG. 32 illustrates a social networking system 3102 implemented as a social networking website 3106, in one embodiment. The social networking website 3106 provides various mechanisms to its members 3201 to communicate with each other or to obtain information that they find interesting, such as activities that their friends are involved with, applications that their friends are installing, and comments made by friends on activities of other friends, just to name a few examples. The mechanisms of communication between members are referred to as social networking communication channels 3202. In one embodiment, a communication channel 3202 is a computer-mediated communication mechanism for facilitating communication between or among members 3201 of the social networking website 3106 and/or the social networking website 3201 itself.

FIG. 32 illustrates an embodiment of various exemplary communication channels 3202, although it should be appreciated that various modifications, alternatives, etc. may be implemented in the social networking website 3106. An invitation channel 3204 communicates one or more invitations between users. An invitation is a message sent by a member 3201 inviting another member 3201 to do something, such as, a member 3201 inviting a friend to install an application. A notification channel 3210 communicates a message informing a member 3201 that some activity involving the member 3201 has occurred on the social networking website 3106. An email channel 3206 allows members 3201 to communicate by email. A wall post channel 3212 allows members 3201 to share information between friends. A wall is an application allowing members 3201 to provide information to be shared between friends. A message written to a member's wall is called a wall post. A member can post on his own wall, as well as a wall of any friends. A friend of a member 3201 may see what is written on his wall. A newsfeed channel 3208 informs a member 3201 of activities of the member's friends. The newsfeed is constantly updated as the member's friends perform various activities, such as adding applications, commenting on photos, or making new friends. In an embodiment, the newsfeed may be integrated with an online publication system, such as, for example, a blog or other authoring tools. A mini-feed channel 3214 provides a mini-feed listing actions taken by the member 3201. For example, the member 3201 may have added new friends to his social network or installed certain applications. One or more of a member's activities may be listed in the mini-feed of that member.

In addition to interactions with other members 3201, the social networking website 3106 provides members 3201 with the ability to take actions on various types of items supported by the social networking system 3102. These items may include groups or social networks (a social network refers not to physical communication networks but rather to social networks of people) to which members 3201 may belong, events or calendar entries in which a member 3201 might be interested, computer-based applications that a member 3201 may use via the social networking website 3106, and transactions that allow members 3201 to buy, sell, auction, rent, or exchange items via the social networking website 3106. These are just a few examples of the items upon which a member 3201 may act on the social networking website 3106, and many others are possible.

As illustrated in the embodiment of FIG. 32, the social networking website 3106 maintains a number of objects for the different kinds of items with which a member 3201 may interact on the social networking website 3106. In one embodiment, these objects include member profiles 3220, group objects 3222, event objects 3216, application objects 3218 (respectively, hereinafter, referred to as profiles 3220, groups 3222, events 3216, and applications 3218). In one embodiment, an object is stored by the social networking website 3106 for each instance of its associated item. For example, a member profile 3220 is stored for each member 3201 who joins the social networking website 3106, a group 3220 is stored for each group defined in the social networking website 3106, and so on. The types of objects and the data stored for each is described in more detail below.

The member 3201 of the social networking website 3106 may take specific actions on the social networking website 3106, where each action is associated with one or more objects. The types of actions that a member 3201 may perform in connection with an object are defined for each object and may depend on the type of item represented by the object. A particular action may be associated with multiple objects. Described below are a number of examples of particular types of objects that may be defined for the social networking website 3106, as well as a number of actions that may be taken for each object. The objects and actions are provided for illustration purposes only, and one or ordinary skill in the art will readily appreciate that an unlimited number of variations and features may be provided on the social networking website 3106.

Figure 33:
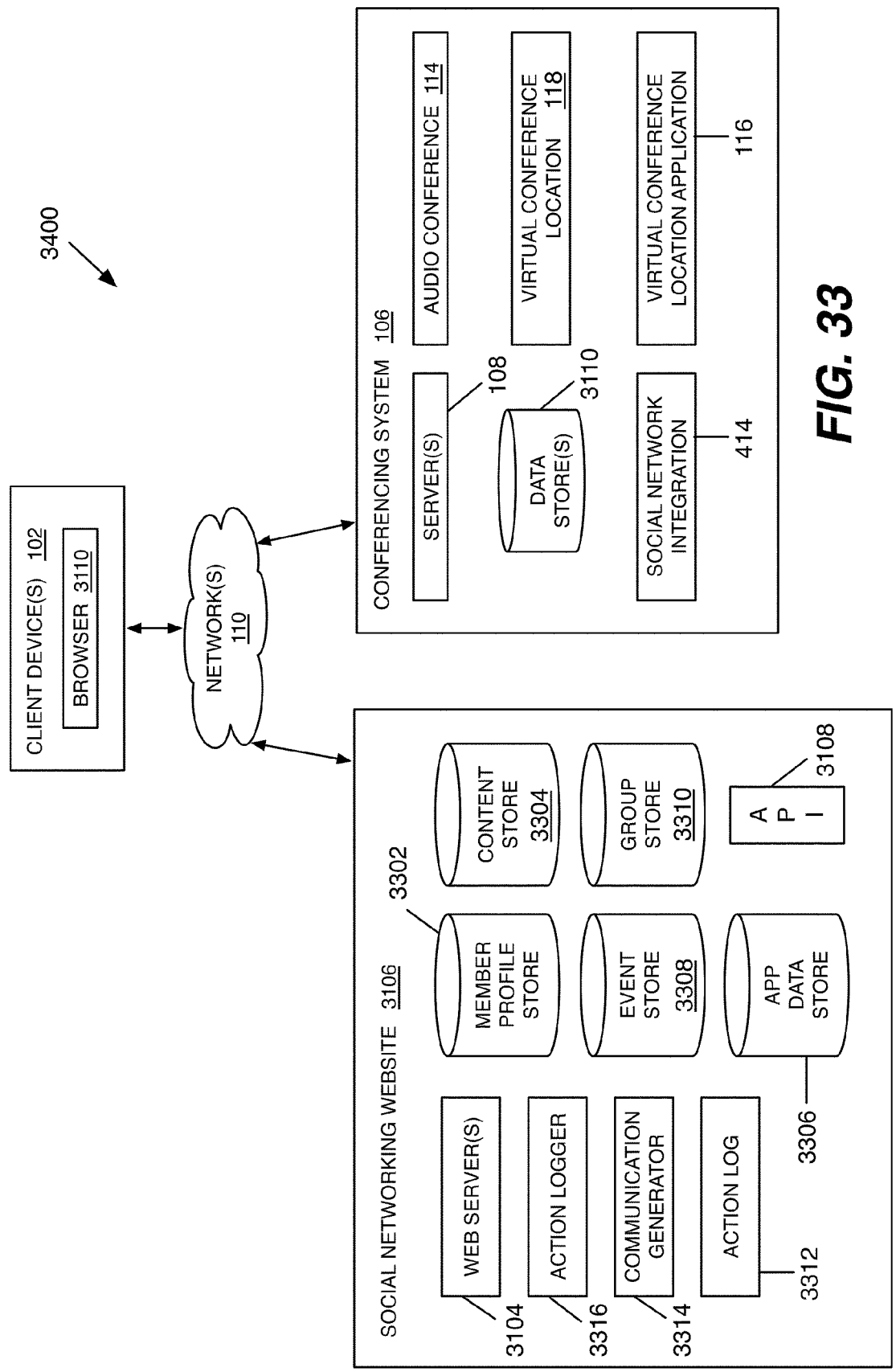
FIG. 33 is block diagram illustrating an exemplary social networking website in the social networking system of FIG. 31.

The social networking website 3106 maintains a member profile 3220 for each member of the website 3106. Any action that a particular member 3201 takes with respect to another member 3201 is associated with each member's profile 3220, through information maintained in a database or other data repository, such as the action log 3310 (FIG. 33). The tracked actions may include, for example, adding a connection to the other member 3201, sending a message to the other member, reading a message from the other member 3201, viewing content associated with the other member 3201, attending an event posted by another member 3201, among others. In addition, a number of actions described below in connection with other objects may be directed at particular members 3201, in which case these actions may be associated with those members 3201, as well.

A group 3222 may be defined for a group or network of members 3201. For example, a member 3201 may define a group to be a fan club for a particular band. The social networking website 3106 would maintain a group 3222 for that fan club, which might include information about the band, media content (e.g., songs or music videos) by the band, and discussion boards on which members 3201 of the group may comment about the band. In this regard, member actions that are possible with respect to a group 3222 may include joining the group, viewing the content, listening to songs, watching videos, and posting a message on the discussion board.

An event 3216 may be defined for a particular event, such as a birthday party. A member 3201 may create the event 3216 by defining information about the event, such as the time and place and a list of invitees. Other members 3201 may accept the invitation, comment about the event, post their own content (e.g., pictures from the event), and perform any other actions enabled by the social networking website 3106 for the event 3216. The creator of the event 3216, as well as the invitees for the event, may perform various actions that are associated with that event 3216.

The social networking website 3106 also enables members 3201 to add applications 3218 to their profiles. These applications provide enhanced content and interactivity within the social networking website 3106, which maintains an application object 3218 for each application hosted in the social networking system. The applications may be provided by the social networking system 3102, the conferencing system 106, and/or by third party developers. The social networking system 3102 and the conferencing system 106 may share applications between the respective computer systems. The use of any functionality offered by the application may constitute an action by the member 3201 in connection with the application 3218. The actions may be passive and need not require active participation by a member 3201. The scope and type of applications provided is limited only by the imagination and creativity of the application developers. The applications are generally written as server-side code that is run on servers of the social networking website 3106, although in other embodiments an application may also use client-side code as appropriate, or any combination thereof. When a member 3201 logs into the social networking website site 3106, the system determines which applications the user has installed (e.g., registered for, purchased, etc.), and then loads and runs such applications in combination with the underlying functionality of the social networking website 3106.

When a member 3201 takes an action on the social networking website 3106, the action is recorded in an action log 3312. In one embodiment, the social networking website 3106 maintains the action log 3312 as a database of entries. When an action is taken, the social networking website 3106 may add an entry for that action to the log 3312. The action loc 3312 may maintain any of the following or other types of information: a timestamp of when the action occurred; an identifier for the member 3201 who performed the action; an identifier for the member 3201 to whom the action was directed; an identifier for the type of action performed; an identifier for an object acted on by the action (e.g., an application); and content associated with the action. It should be appreciated that many types of actions that are possible in the social networking website 3106 need not require all of this information.

The social networking website 3106 generally comprises a computing system that allows members 3201 to communicate or otherwise interact with each other and access content and/or functionality as described herein. The social networking website 3106 stores member profiles 3220 in, for example, a member profile store 3302. A member profile 3220 may describe the member, including biographic, demographic, and other types of descriptive information, such as work experience, educational history, hobbies or preferences, location, and the like. The social networking website 3106 further stores data describing one or more relationships between different members 3201. The relationship information may indicate members 3201 who have similar or common work experience, group memberships, hobbies, or educational history. The social networking website 3106 may include member-defined relationships between different members 3201, allowing members 3201 to specify their relationships with other members 3201. For example, member-defined relationships may allow members 3201 to generate relationships with other members 3201 that parallel real-life relationships, such as friends, co-workers, partners, and so forth. Members 3201 may select from predefined types of relationships, or define their own relationship types as needed.

To further illustrate the manner in which the conferencing system 106 may share data and/or applications with a social networking system, FIG. 33 shows a block diagram of the social networking website 3106. In this embodiment, the social networking website 3106 includes a web server 3104, an action logger 3316, an action log 3312, a member profile store 3302, an application data store 3306, a group store 3310, and an event store. In other embodiments, the social networking website 3106 may include additional, fewer, or different modules for various applications. Conventional components such as network interfaces, security mechanisms, load balancers, failover servers, management and network operations consoles, and the like are not shown so as to not obscure the details of the system.

The web server(s) 3104 link the social networking website 3106 via the network 110 to the client devices 102. The web server 3104 serves web pages, as well as other web-related content, such as, for example, Java, Flash, XML, and so forth.

The web server 3104 may include a mail server or other messaging functionality for receiving and routing messages between the social networking website 3106, the client devices 102, and the conferencing system 106. The messages can be instant messages, queued messages (e.g., email), text and SMS messages, or any other suitable messaging technique, using any suitable protocol(s).

The action logger 3316 is capable of receiving communications from the web server 3104 about member actions on and/or off the social networking website 3106. The action logger 3316 populates the action log 3312 with information about member actions to track them.

As discussed above, the social networking website 3106 maintains data about a number of different types of objects with which a member may interact on the social networking website 3106. In this regard, each of the member profile store 3302, application data store 3306, the group store 3310, and the event store 3308 stores instances of the corresponding type of object(s) maintained by the social networking website 3106. Each object type has information fields that are suitable for storing information appropriate to the type of object. For example, the event store 3308 may contain data structures that include the time and location for an event, whereas the member profile store 3302 may contain data structures with fields suitable for describing a member's profile 3220. When a new object of a particular type is created, the social networking website 3106 may initialize a new data structure of the corresponding type, assign a unique object identifier to it, and begin to add data to the object as needed.

Figure 34:
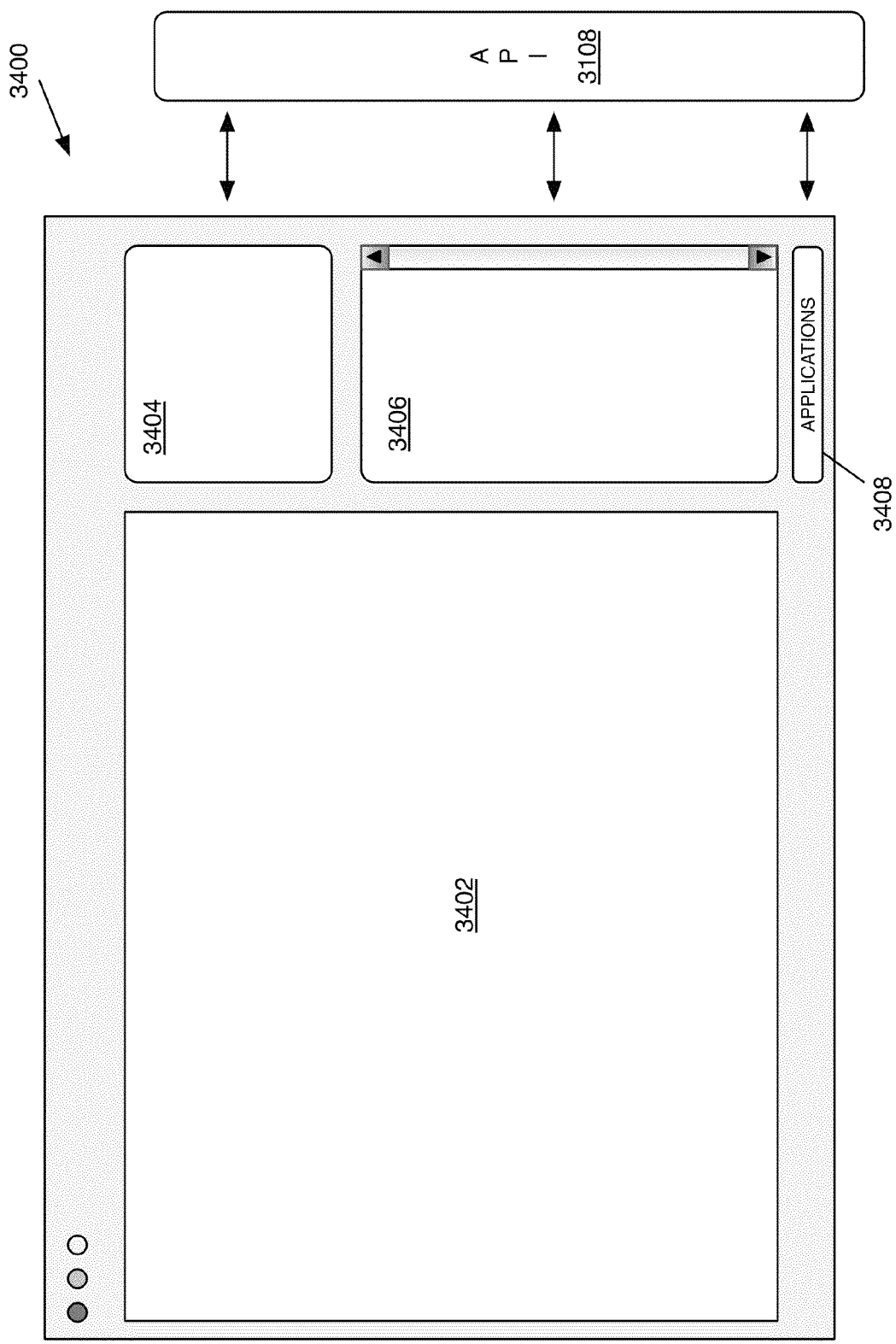
FIG. 34 is a user interface screen shot of an embodiment of a conference interface for enabling a participant to share social networking content during an audio conference.

Having described exemplary embodiments of a social networking system 3102 with which the conferencing system 106 may share data and/or functionality, the operation of additional embodiments of the social networking integration module(s) 414 will be described with reference to FIGS. 34-36. FIG. 34 illustrates another embodiment of a graphical user interface 3400 for presenting the audio conference 114 and the conference interface to participants 104. The graphical user interface 3400 may comprise a first portion 3402, a second portion 3404, and a third portion 3406. The conference interface may be presented in the first portion. The second portion 3404 and the third portion 3406 may comprise user interface mechanisms for accessing communication features related to the social networking system 3102 via, for example, the API 3108. It should be appreciated that the second portion 3404 and the third portion 3406 may be provided in separate screens from the first portion 3402. The graphical user interface 3400 may employ any desirable layout and other user interface mechanisms for accessing the associated content and/or functionality.

In an embodiment, the first portion 3404 may comprise an input mechanism for capturing content, during the audio conference 114, which may be posted to one or more of the social networking communication channels 3202 (FIG. 32). The input mechanism may enable the participants 104 to input text, upload photos and/or video, send invitations, join groups, etc. The content may comprise any form of content, and may be specified by the participant 104 or otherwise captured by hardware and/or software on the client device 102.

Figure 35:
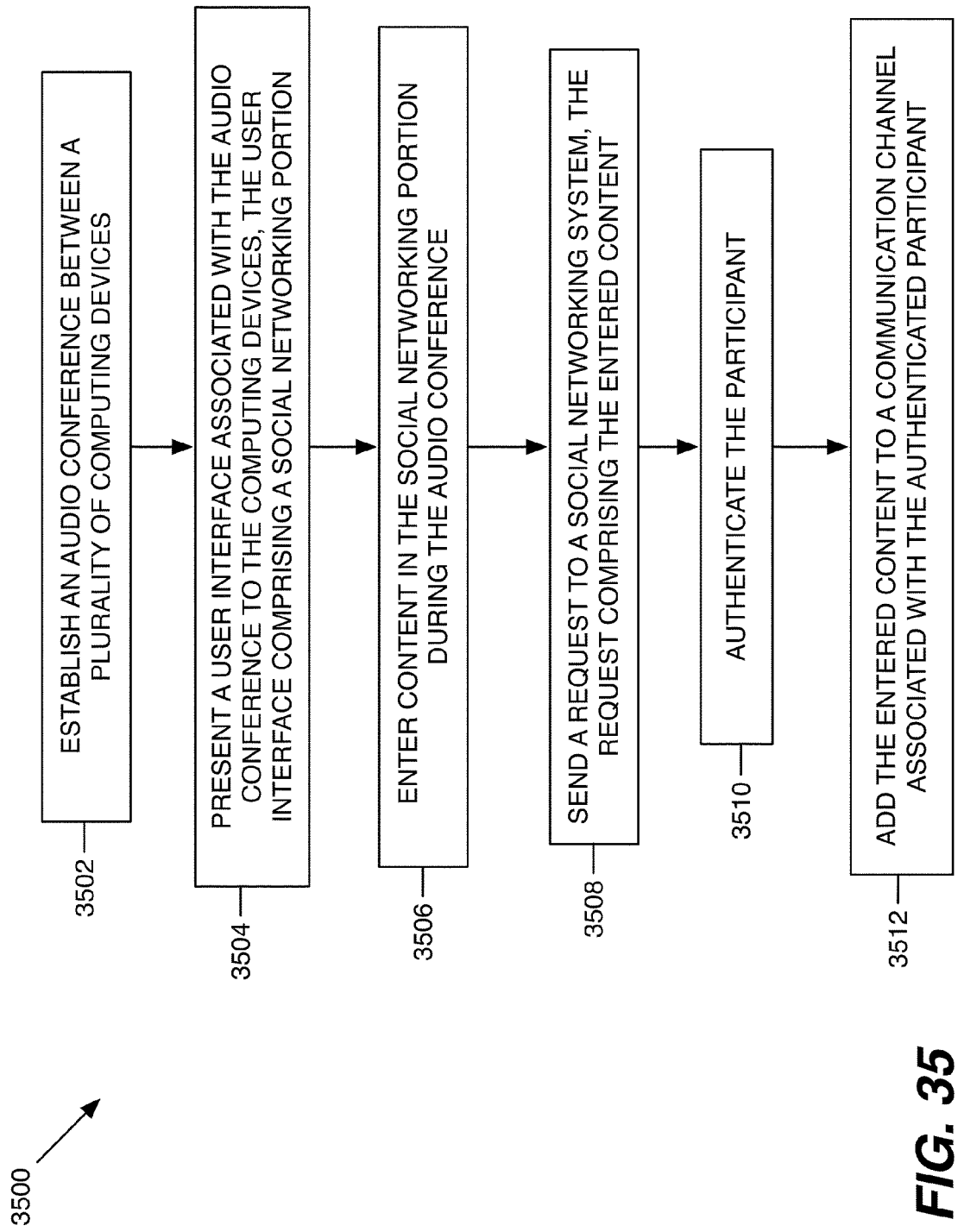
FIG. 35 is a flowchart illustrating an embodiment of a method for providing social networking content in a conference interface.

As illustrated in FIG. 35, in operation, the conferencing system 106 establishes the audio conference 114 with the participants 104 (block 3502). At block 3504, the conferencing system 106 presents the graphical user interface 3400 to a client device 102 operated by a participant 104. At any time during the audio conference 114, at block 3506, the participant 104 enters or specifies content to be provided to the social networking system 3102. At block 3508, a request is sent to the social networking system 3102. The request may originate from the client device 102 (e.g., the browser 3110) or the conferencing system 106. The social networking system 3102 may send a response to the originator enabling the content to be added to the participant's profile 3220 (block 3512). It should be appreciated that the content may be provided with the request or subsequently via additional message(s). Furthermore, the request may include the participant's credentials (e.g., username, password, etc.) to automatically authenticate the participant 104. In other embodiments, the participant 104 may be prompted by either the conferencing system 106 or the social networking system 3102 to enter the authentication credentials (block 3510).

Figure 36:
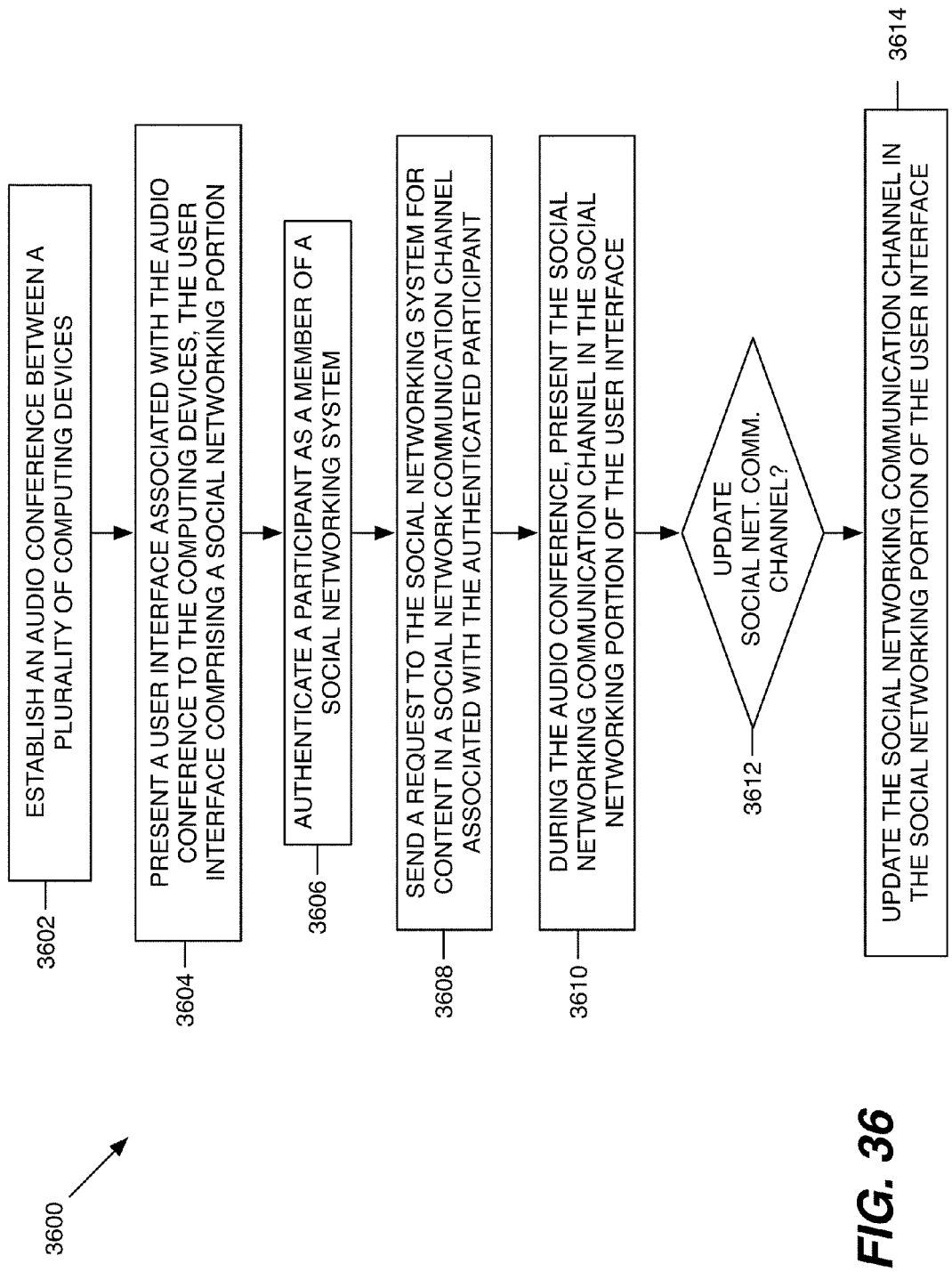
FIG. 36 is a flowchart illustrating an embodiment of a method for incorporating social networking data in a conference interface.

FIG. 36 illustrates another embodiment of a method for sharing content between the conferencing system 106 and the social networking system 3102. After establishing the audio conference 114 and presenting the graphical user interface 3400 (blocks 3602 and 3604), the conferencing system 106 or the social networking system 3102 may prompt the participant to enter authentication credentials. The participant 104 may be authenticated, at block 3606, for access to the social networking features. The authentication may be performed when the participant 104 logs into the conferencing system 106, or the participant 104 may be prompted for the authentication credentials when the social networking features are being accessed. Furthermore, in an embodiment, the conferencing system 106 may enable participants 104 to access the conferencing system 106 by using their social networking profile 3220. In this manner, if authentication is required, there may not be a need to separately authenticate with the social networking system 3102.

If the participant 104 is properly authenticated for access to the social networking system 3102, at block 3608, data from the social networking system 3102 (e.g., communication channels 3202) may be integrated with the graphical user interface 3400. The data may be presented in the second portion 3406, and may comprise any data described above, or any other data, content, and/or functionality associated with the social networking system 3102. As mentioned above, the data may be accessed using the API 3108, in which case suitable requests and responses may be sent (block 3608) from, and received by, either the client device 102 or the conferencing system 106. The participant 104 may also access social networking applications 3218 via a user interface control 3408. The participant 104 may select or otherwise engage the control 3408, which may trigger a menu for enabling the participant 104 to access applications 3218 associated with the participant's social networking profile 3220.

Referring to FIGS. 50-61, the conferencing system 106 may support an alert/notification functionality for enabling the participants 104 to receive information about an audio conference 114 and an associated conference without necessarily joining the audio conference 114 or viewing the conference interface. The alert/notification functionality generally comprises logic for monitoring an audio conference 114 and the content/functionality presented in the conference interface and providing alerts, notifications, or other messages (collectively referred to as "alerts") to the participant 104. An alert may comprise audio, video, text, graphics, or other information embodied in any medium and presentable via hardware and/or software components supported by the computing device, including, a browser 3110, an operating system 5004, a GUI 132, a microphone, and a display, such as, for example, a touchscreen 5004.

Figure 50:
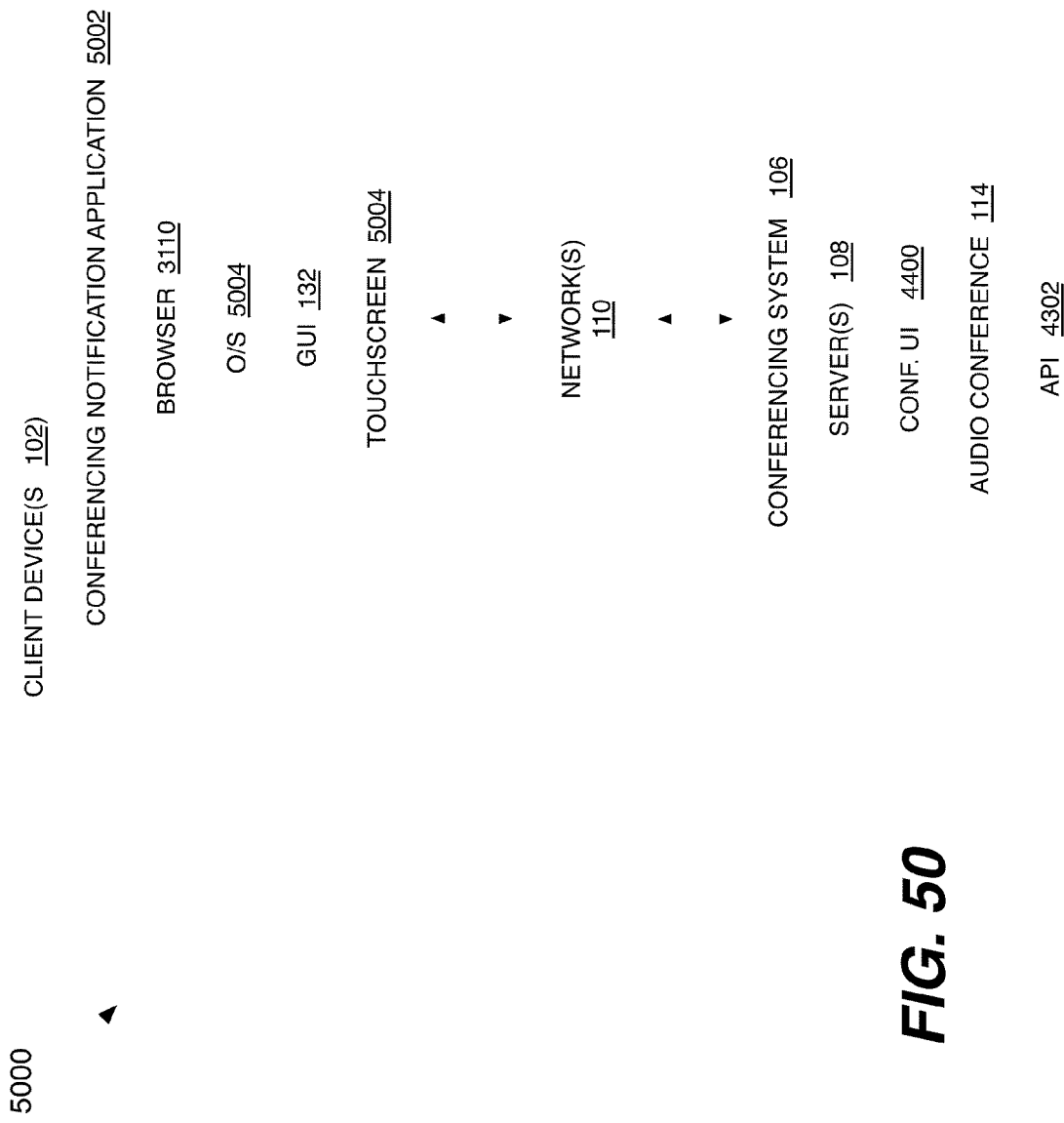
FIG. 50 is a block diagram illustrating an embodiment of a computer system for implementing a conferencing notification application on a client device.

In the embodiment illustrated in FIG. 50, the alert/notification functionality comprises a conferencing notification application 5002 residing in memory 404 on a client device 102 (FIG. 4) and executed by processor(s) 402. It should be appreciated that the logic associated with the conferencing notification application 5002 may be located at, and/or controlled by, the conferencing system 106 or other computer devices, systems, etc.

In general operation, the conferencing notification application 5002 may provide alerts based on various events monitored by the conferencing system 106. For instance, the conferencing notification application 5002 may notify a host when an audio conference 114 or conference has started and alert the host to who has joined the audio conference 114 or accessed the conference by showing, for example, the participant name, the number of current participants, etc. The alerts may be implemented using a push methodology by which the alerts are "pushed" from the conferencing system 106, a pull methodology by which the alerts are "pulled" from the conferencing system 106 by the computing device 102 using, for example, the conferencing API 4302, or other alert protocols, services, methodologies, etc. As participants 104 join the audio conference 114 or the associated conference, the conferencing system 106 maintains a counter of the number and identity of participants 104 and provides related or other information to the host. The conferencing notification application 5002 may also enable the host to conveniently access the conference interface from within the application (e.g., via a menu, key shortcut, or other user interface control), as well as modify conferencing, notification or account settings prior to or during a virtual conference.

The conferencing notification application 5002 may incorporate a user interface control for enabling users to launch the application or conveniently access certain functions or features of the application (e.g., configure remote or local settings, join a virtual conference, etc.). The user interface control may be presented in various ways depending on, for example, the configuration of the operating system 5004, the GUI 132, the display type and/or size, and other hardware and/or software characteristics.

Figure 51:
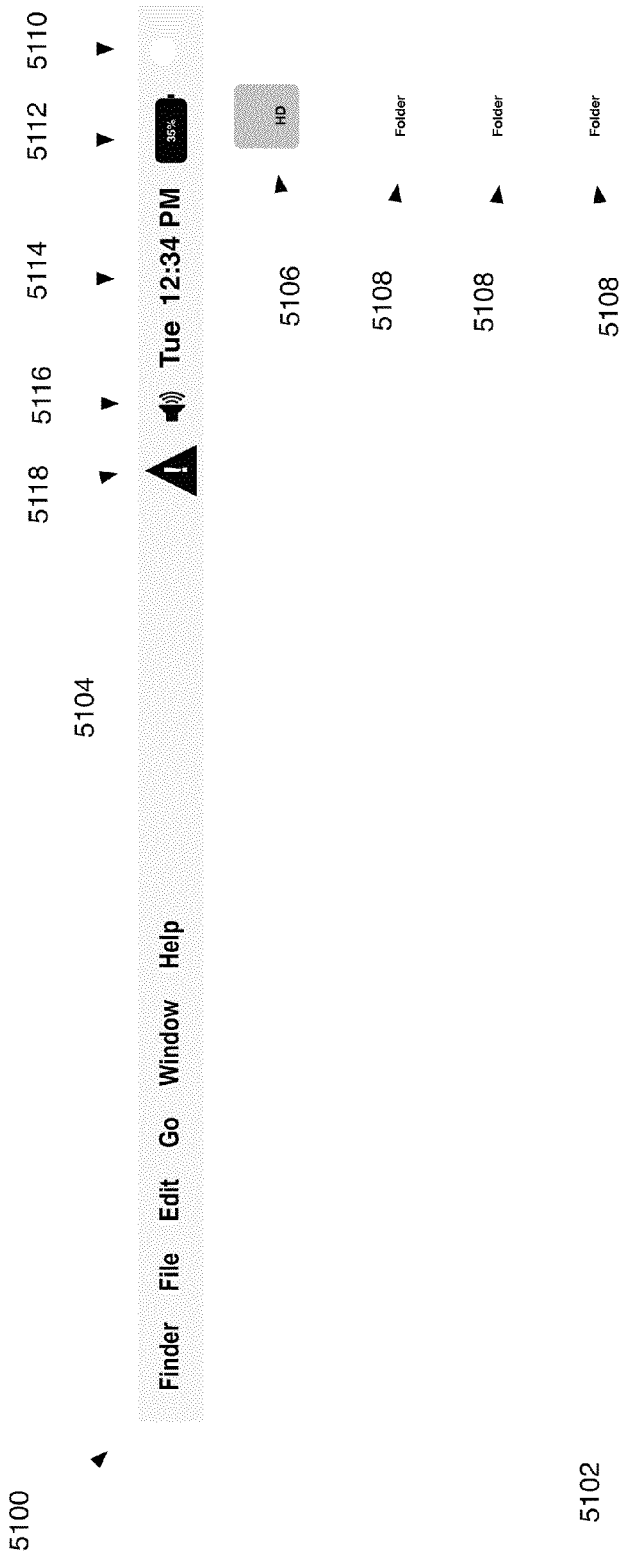
FIG. 51 is a screen shot illustrating an embodiment of a desktop user interface for accessing exemplary services provided by the conferencing notification application of FIG. 50.

FIG. 51 illustrates an embodiment of a user interface control 5118 implemented in a desktop environment 5100 for accessing the conferencing notification application 5002. The desktop environment 5100 comprises a desktop 5102 that may display one or more icons, folders, wallpaper, widgets, or other desktop objects associated with the system. The desktop objects enable the user to easily access, configure, or modify aspects of the operating system 5004 and/or other software or features of the computing device 102. In the embodiment of FIG. 51, the desktop 5102 may display a system application tray 5104, one or more folder icons 5108 for organizing files, and a hard drive icon 5106 for accessing a hierarchical folder structure for accessing files stored on the computing device 102.

The user interface control 5118 may be displayed anywhere within the desktop 5102. In FIG. 51, the user interface control 5118 is displayed on a system application tray 5104. The system application tray 5104 may display various icons (e.g., a search icon 5110, a battery level icon 5112, a system time icon 5114, a volume icon 5116, or any other system icon, application icon, or user-defined icon).

Figure 52:
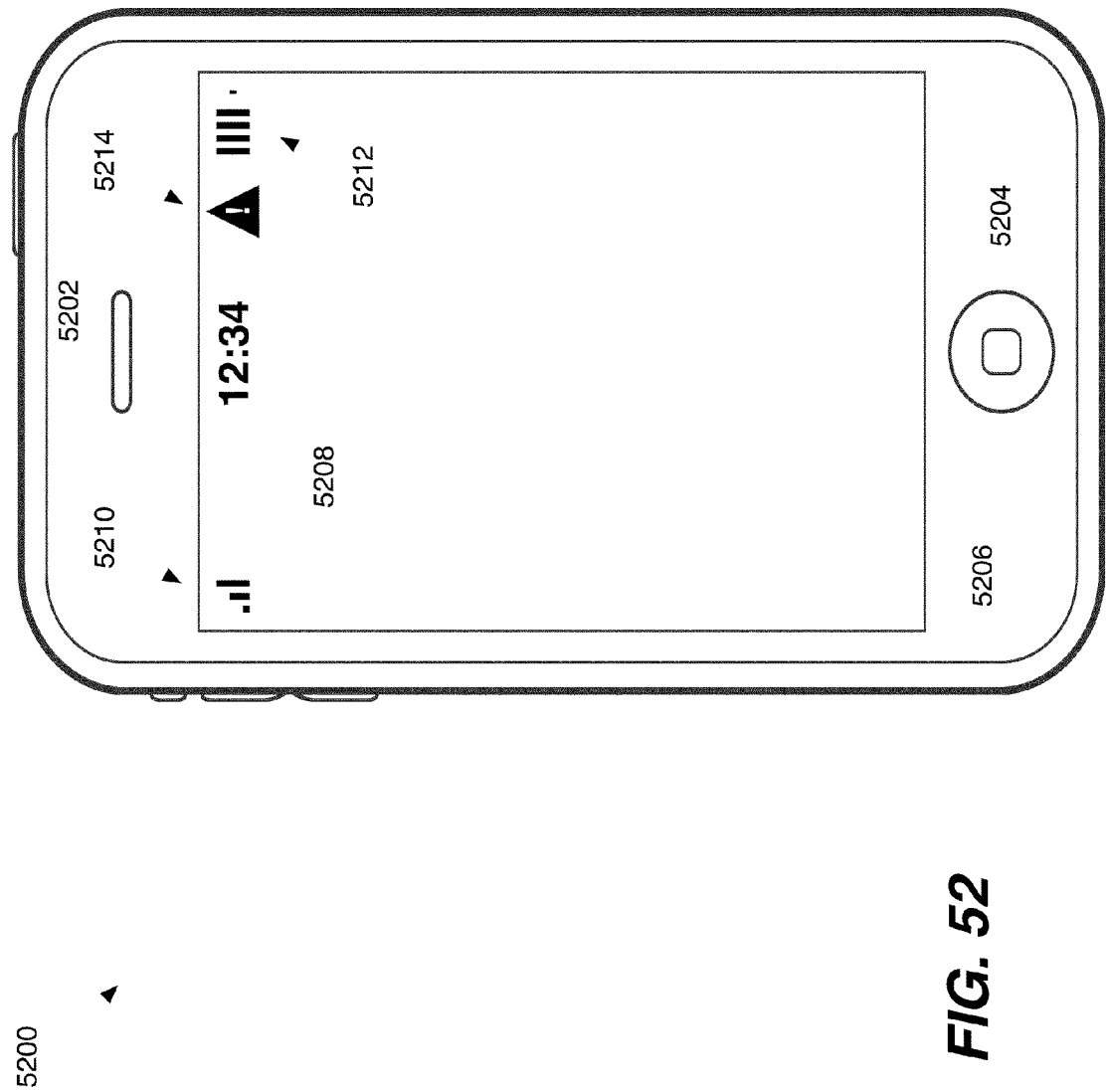
FIG. 52 is a user interface screen shot illustrating another embodiment of a mobile user interface for accessing services provided by the conferencing notification application of FIG. 50.
Figure 53:
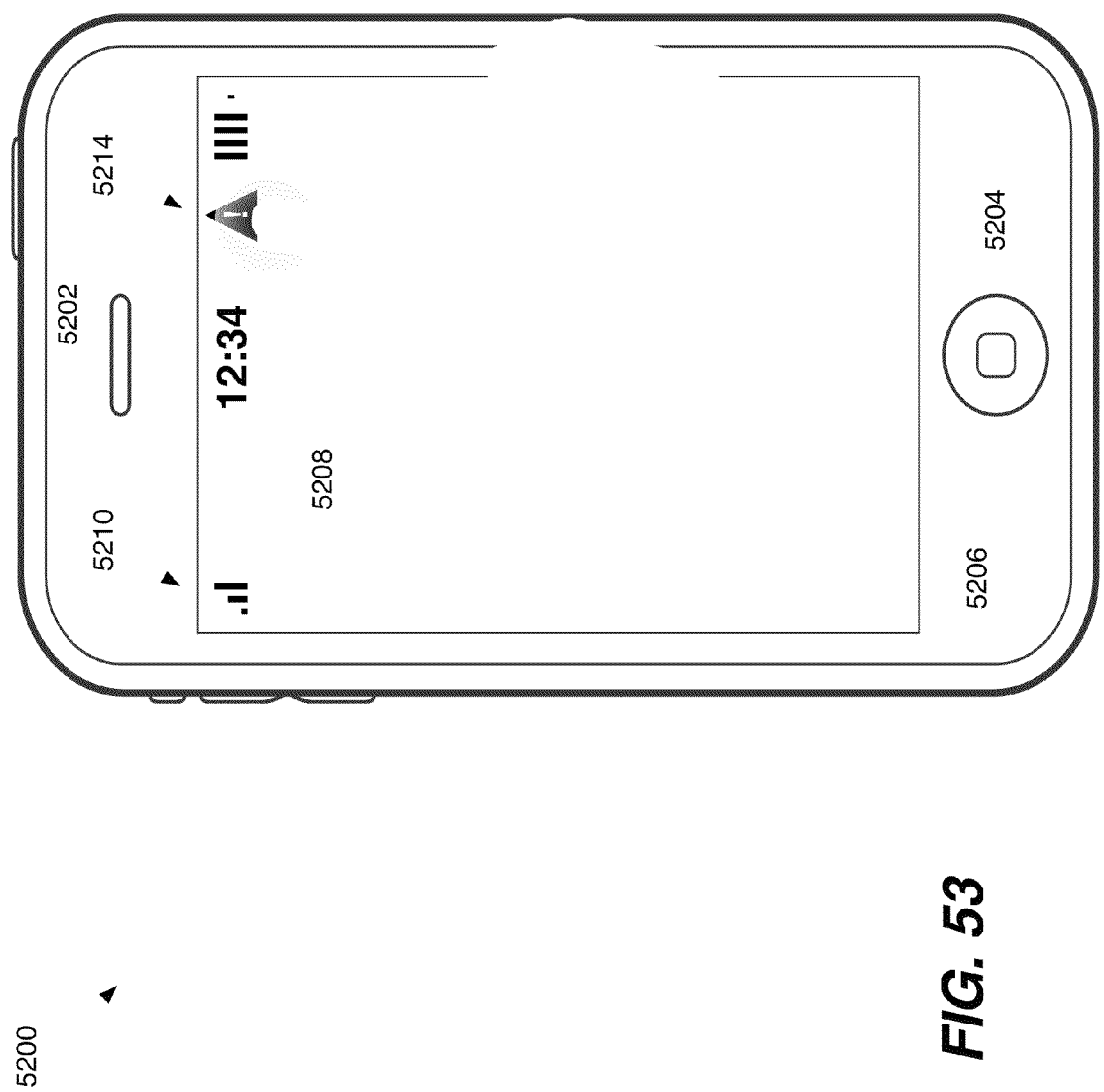
FIG. 53 is a screen shot illustrating an embodiment of a method for launching a conferencing notification menu via the mobile user interface of FIG. 52.

FIG. 52 illustrates another embodiment of a user interface control 5214 for providing user access to certain aspects of the conferencing notification application 5002. In this embodiment, the computing device 102 comprises a mobile telephone 5200 having a touchscreen display 5004. The touchscreen display 5004 comprises a display device that can detect the presence and location of a touch within the display area by, for example, a finger or hand or passive objects, such as, a stylus, pen, or other object. The touchscreen display 5004 may be based on any current or future touchscreen technology, and may employ various forms of input gestures for performing associated functions.

The touchscreen display 5004 may comprise a resistive touchscreen panel having two thin, metallic, electrically conductive layers separated by a narrow gap. When an object, such as a finger, presses down on a point on the panel's outer surface the two metallic layers become connected at that point. The touchscreen panel then behaves as a pair of voltage dividers with connected outputs. This causes a change in the electrical current which is registered as a touch event and sent to a controller (e.g., processor 402) for processing.

The touchscreen display 5004 may be implemented using surface acoustic wave (SAW) technology that uses ultrasonic waves that pass over the touchscreen panel. When the panel is touched, a portion of the wave is absorbed. This change in the ultrasonic waves registers the position of the touch event and sends this information to the processor 402.

In another embodiment, the touchscreen display 5004 supports capacitive sensing via a capacitive touchscreen panel. A capacitive touchscreen panel comprises an insulator, such as glass, coated with a transparent conductor, such as indium tin oxide. As the human body is also a conductor, touching the surface of the screen results in a distortion of the local electrostatic field, measurable as a change in capacitance. Different technologies may be used to determine the location of the touch. The location may be passed to the processor 402, which may calculate how the user's touch or gestures relate to the particular functions of the conferencing notification application 5002.

The touchscreen display 5004 may also support surface capacitance implementations, in which only one side of the insulator is coated with a conductive layer. In such implementations, a small voltage is applied to the layer, resulting in a uniform electrostatic field. When a conductor, such as a human finger, touches the uncoated surface, a capacitor is dynamically formed. The sensor controller may determine the location of the touch indirectly from the change in the capacitance as measured from the four corners of the display area 5206.

In a further embodiment, the touchscreen display 5004 implements a projected capacitive touch (PCT) display having an etched conductive layer. An XY array may be formed by, for example, etching a single layer to form a grid pattern of electrodes or by etching two separate perpendicular layers of conductive material with parallel lines or tracks to form the grid. Applying voltage to the array creates a grid of capacitors. Bringing a finger or conductive stylus close to the surface of the sensor changes the local electrostatic field. The capacitance change at every individual point on the grid may be measured to accurately determine the touch location. The use of a grid permits a higher resolution than resistive technology and also allows multi-touch operation. The PCT display may allow operation without direct contact, such that the conducting layers can be coated with further protective insulating layers, and operate even under screen protectors.

The touchscreen display 5004 may be configured to optically sense touch using, for example, an array of infrared (IR) light-emitting diodes (LEDs) on two adjacent bezel edges of a display, with photosensors placed on the two opposite bezel edges to analyze the system and determine a touch event. The LED and photosensor pairs may create a grid of light beams across the display. An object (such as a finger or pen) that touches the screen interrupts the light beams, causing a measured decrease in light at the corresponding photosensors. The measured photosensor outputs can be used to locate a touch-point coordinate.

Another embodiment of the touchscreen technology involves dispersive signal technology, which uses sensors to detect the mechanical energy in the glass that occurs due to a touch. Algorithms stored in memory 404 and executed by processor 402 interpret this information and provide the actual location of the touch.

Acoustic pulse recognition may also be used to detect the touch. In this embodiment, two piezoelectric transducers are located at some positions of the screen to turn the mechanical energy of a touch (i.e., vibration) into an electronic signal. The screen hardware then uses an algorithm to determine the location of the touch based on the transducer signals.

Referring again to FIG. 52, the mobile telephone 5200 includes a microphone 5202 and various hardware keys, including, for example, a scroll button 5204 for navigating the GUI 132. The mobile telephone 5200 includes a notification bar 5208 for displaying system information, such as, signal strength icon 5210, battery level icon 5212, or any other system of application information. The notification bar 5208 may be expandable based on touch input to display additional notification icons.

Figure 54:
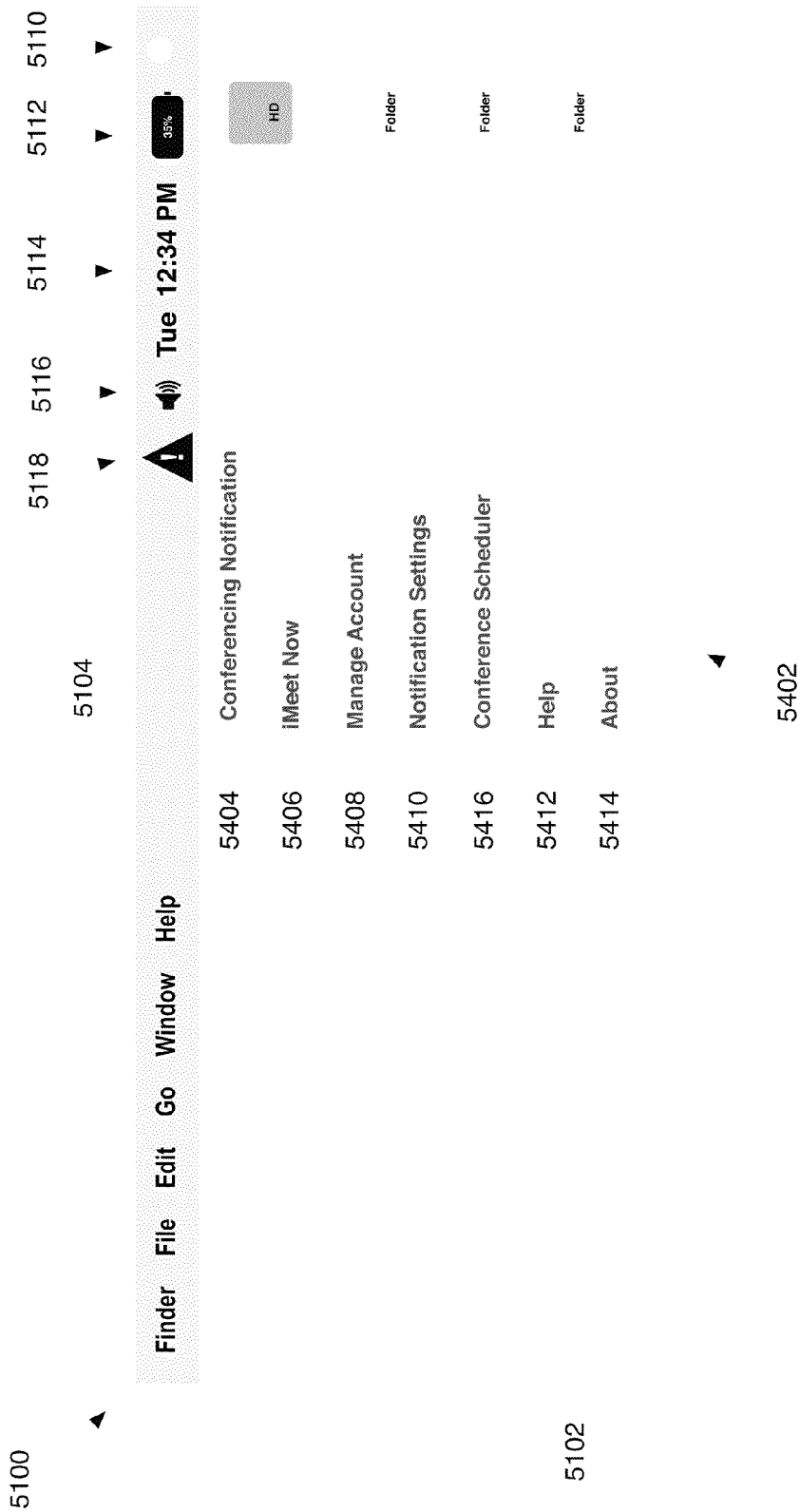
FIG. 54 is a user interface screen shot illustrating an embodiment of a conferencing notification menu in the desktop user interface of FIG. 51.

Regardless of the type and configuration of the computing device 102, the conferencing notification application 5002 may be accessed by selecting the user interface control. For example, a user may select the user interface control 5214 (FIG. 53) to display a conferencing notification menu 5402 (FIG. 54). The conferencing notification menu 5402 may comprise a display header 5404 and one or more additional user interface controls for selecting certain configuration or other options. In the embodiment of FIG. 54, conferencing notification menu 5402 displays an iMeet Now button 5406, a Manage Account button 5408, a Notification Settings button 5410, a Conference Scheduler button 5416, a Help button 5412, and an About button 5414.

The iMeet Now button 5406 may enable the user to connect to the conferencing system 106. When the user selects the button 5406, the conferencing notification application 5002 may launch the browser 3110 and enable the user to join an audio conference 114 and access the conference user interface 4400. The Manage Account button 5408 may enable the user to configure the account profile 4602 (FIG. 46). In an embodiment, the user may configure the parameters via the conferencing notification application 5002, and the parameters subsequently provided to the conferencing system 106 via the conferencing API 4302. In alternative embodiments, the Manage Account button 5408 may direct the user to a web page provided by the conferencing system 106, which receives the configuration parameters. The Notification Settings button 5410 may operate in a similar manner to enable the user to configure parameters associated with the conferencing notification. For example, the conferencing notification parameters may specify any of the following, or other, parameters: alert push enabled/disabled; alert pull enabled/disabled; alert frequency; and alert types.

In operation, the conferencing notification application 5002 may communicate with the conferencing system 106 using conferencing API(s) 4302. The conferencing API(s) 4302 may enable the conferencing notification application 5002 to submit requests 5516 to, and receive responses 5514 from, the conferencing system 106. These communications may include, for example, status checks of the user's conferences to determine if there are any active participants 104. In the event that someone has entered the user's conference or joined one of their bridges via a phone, this activity may be transmitted to the conferencing notification application 5002 as a status update or alert. The update may include other information about the newly joined participants, such as, the participant parameters described above and illustrated in FIGS. 38 and 46, information stored in participant database 4308 (FIG. 43), or other relevant information about the user, including, information associated with the social networking system 3102 (FIG. 31).

Figure 56:
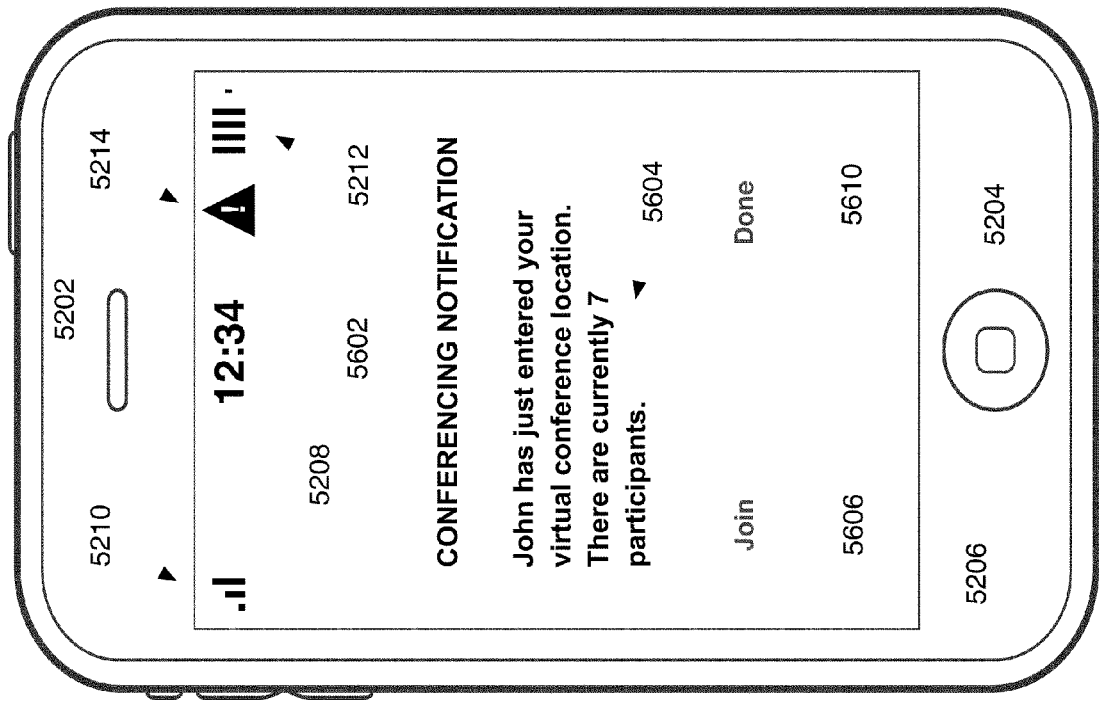
FIG. 56 is a user interface screen shot illustrating an embodiment of a conferencing notification functionality displayed in the mobile user interface of FIG. 52.
Figure 57:
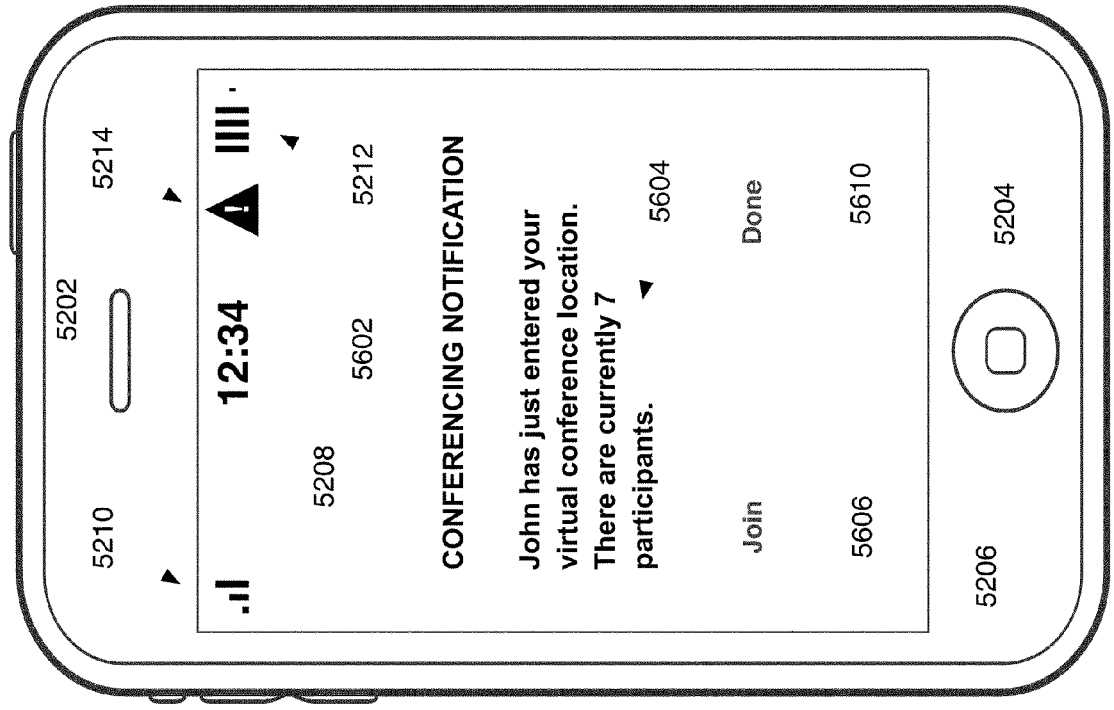
FIG. 57 illustrates the user interface screen shot of FIG. 57 for enabling a user to join a conference via the conferencing notification functionality.
Figure 58:
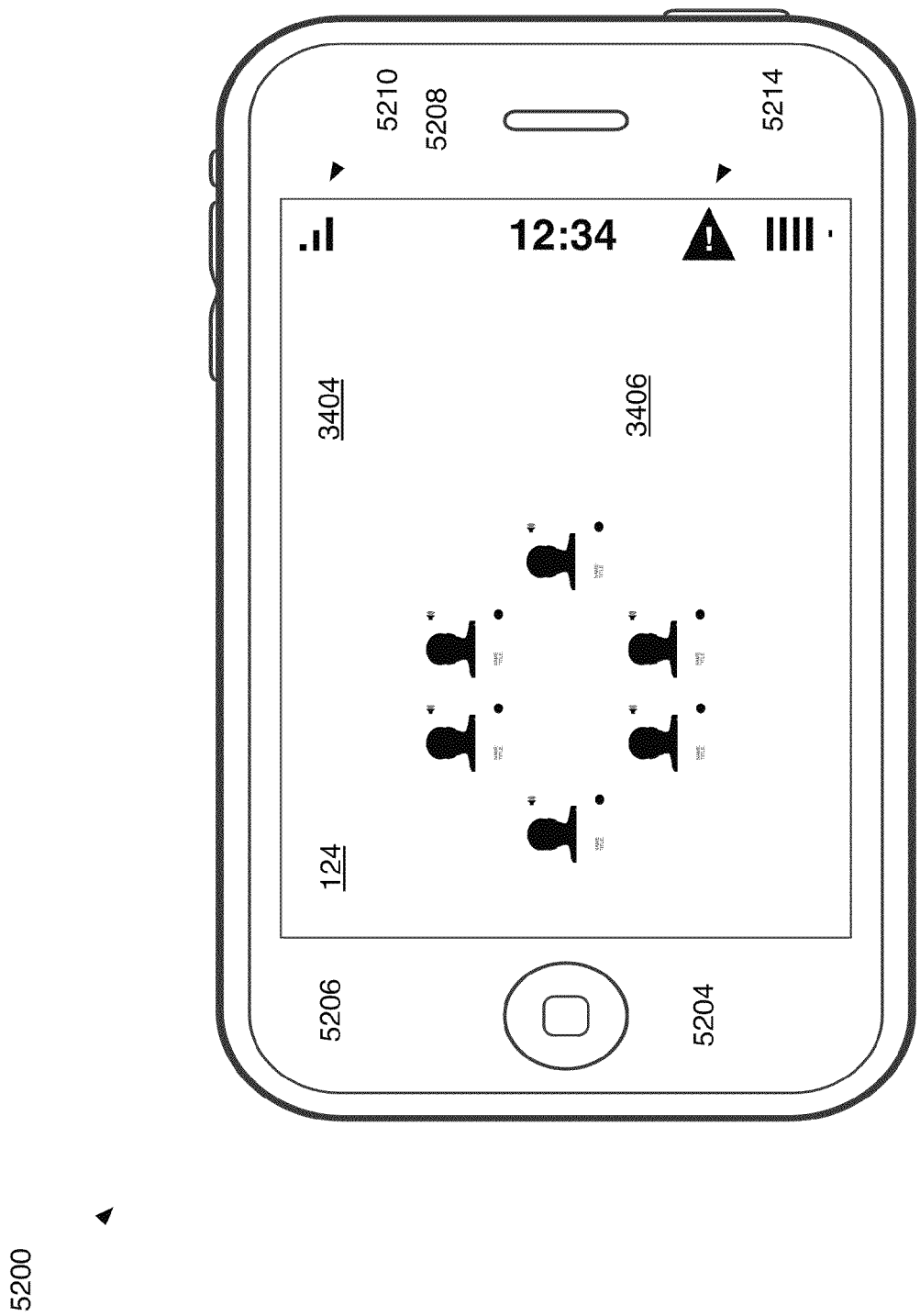
FIG. 58 is a user interface screen shot illustrating an embodiment of a conference interface for an exemplary mobile computing device.

The alerts provided to the conferencing notification application 5002 may be presented on the display. FIG. 56 illustrates an exemplary message or alert 5602 notifying the user of the identity of a newly joined participant and the current number of participants. The alert 5602 may appear for a predetermined amount of time, which may be configurable via the Notification Settings button 5410, or the user may cancel the alert message 5602 by selecting the Done button 5610. It should be appreciated that the content and/or format of the alert 5602 may vary depending on, for example, the events being monitored by the conferencing system 106. The alert 5602 may include a convenient mechanism for enabling the user to join the audio conference 114 and/or the associated conference from the displayed alert 5602. In an embodiment, the conferencing notification application 5002 may prompt the user to join the audio conference 114 and/or the associated conference. As illustrated in FIG. 56, the displayed alert 5602 may include a Join button 5606. When selected (FIG. 57), the conferencing notification application 5002 may initiate a process to enable the user to join the audio conference 114 and present a conferencing user interface 4400 on the computing device 102. The conferencing user interface 4400 may be configured in the manner described herein.

If the user chooses to cancel a particular message or the message expires without the user joining the conference, the conferencing system 106 may continue to send alerts as events occur. If the user chooses to join the conference, the conferencing system 106 may disable alerts.

To implement the conferencing notification application 5002, the conferencing system 106 may support various web services for exchanging structured information with the conferencing notification application 5002. The web services may be implemented using any suitable protocol. In an embodiment, the web services may be implemented via the Simple Object Access Protocol (SOAP) using Extensible Markup Language (XML) as the messaging format. The conferencing system 106 may respond to web service calls from the conferencing notification application 5002 by either returning the requested information immediately or by initiating the request and then providing the results (later) via a polling action.

Figure 55:
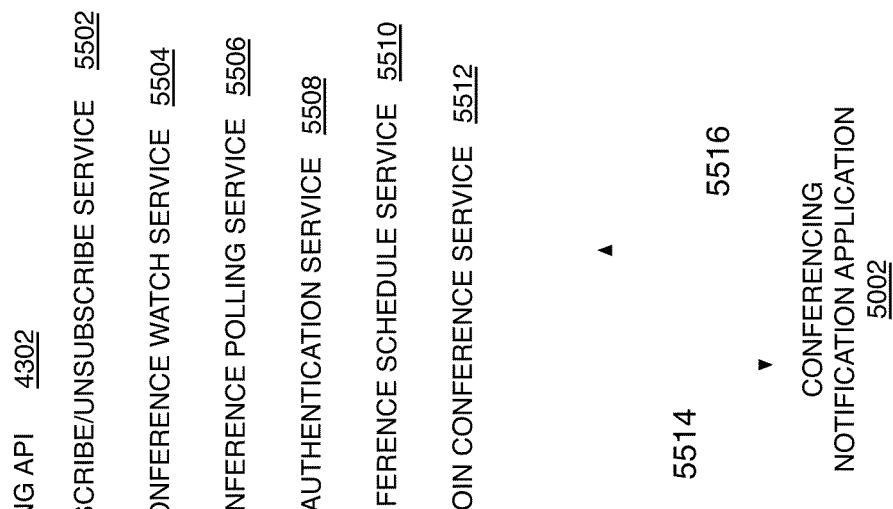
FIG. 55 is a block diagram illustrating an exemplary implementation of the conferencing API in FIG. 50.

FIG. 55 illustrates various exemplary web services for implementing one or more aspects of the conferencing notification application 5002. The web services may comprise any of the following, or other, web services: a subscribe/unsubscribe service 5502; a conference watch service 5504; a conferencing polling service 5506; an authentication service 5508; a conference schedule service 5510; and a join conference service 5512. Each of these web services are generally described below with reference to exemplary request and response XML messages.

The subscribe/unsubscribe service 5502 may be implemented with a Subscribe( ) call that establishes authorization to use the resources provided by the conferencing system 106. The Subscribe( ) call may be the first call made by the conferencing notification application 5002 to the conferencing system 106. In an embodiment, the Subscribe( ) call may require an authorization response before the conferencing notification application 5002 may access other services. In this regard, the subscribe/unsubscribe service 5502 may be configured without a security token in the SOAP header. The other web services may be implemented with the security token (e.g., a session ID obtained with the Subscribe( ) call).

An exemplary XML request for the Subscribe( ) call may be configured as follows:

```
<?xml version="1.0" encoding="utf-8"?>
<soap:Envelope xmlns:xsi="http://www.w3.org/2001/XMLSchema-
instance"
xmlns:xsd="http://www.w3.org/2001/XMLSchema"
xmlns:soap="http://schemas.xmlsoap.org/soap/envelope/">
<soap:Body>
<Subscribe xmlns="http://pia.premiereglobal.com/">
<ClientID>string</ClientID> <ClientPW>string</ClientPW>
<WebID>string</WebID>
<WebPW>string</WebPW>
</Subscribe>
</soap:Body>
</soap:Envelope>
```

An exemplary XML response for the Subscribe( ) call may be configured as follows:

```
<?xml version="1.0" encoding="utf-8"?>
<soap:Envelope xmlns:xsi="http://www.w3.org/2001/XMLSchema-
instance"
xmlns:xsd="http://www.w3.org/2001/XMLSchema" xmlns:soap="http://
schemas.xmlsoap.org/soap/envelope/">
<soap:Body>
<SubscribeResponse xmlns="http://pia.premiereglobal.com/">
<SubscribeResult>
<ResultCode>ResultCode</ResultCode>
<SessionID>string</SessionID>
</SubscribeResult>
</SubscribeResponse>
</soap:Body>
</soap:Envelope>
```

An Unsubscribe( ) call may be made to unsubscribe the user from the web services when the conferencing notification application 5002 is closed. The call may terminate the session with the conferencing system 106. Further interactions with the conferencing system 106 may require a subsequent Subscribe( ) call to be made by the conferencing notification application.

An exemplary XML request for the Unsubscribe( ) call may be configured as follows:

```
<?xml version="1.0" encoding="utf-8"?>
<soap:Envelope xmlns:xsi="http://www.w3.org/2001/XMLSchema-
instance"
xmlns:xsd="http://www.w3.org/2001/XMLSchema" xmlns:soap="http://
schemas.xmlsoap.org/soap/envelope/">
<soap:Header>
<SoapSecurityHeader xmlns="http://pia.premiereglobal.com/">
<SessionID>string</SessionID>
</SoapSecurityHeader>
</soap:Header>
<soap:Body>
<Unsubscribe xmlns="http://pia.premiereglobal.com/" />
</soap:Body>
</soap:Envelope>
```

An exemplary XML response for the Unsubscribe( ) call may be configured as follows:

```
<?xml version="1.0" encoding="utf-8"?>
<soap:Envelope xmlns:xsi=http://www.w3.org/2001/XMLSchema-
instance
xmlns:xsd="http://www.w3.org/2001/XMLSchema" xmlns:soap="http://
schemas.xmlsoap.org/soap/envelope/">
<soap:Body>
<UnsubscribeResponse xmlns="http://pia.premiereglobal.com/">
<UnsubscribeResult>
<ResultCode>ResultCode</ResultCode>
</UnsubscribeResult>
</UnsubscribeResponse>
</soap:Body>
</soap:Envelope>
```

The conference watch service 5504 may invoke a SetConferenceWatch( ) call that establishes a conference watch, which enables the conferencing system 106 to begin sending alerts to the conferencing notification application 5002. After setting a conference watch, the user may receive notifications or alerts for conference(s) associated with the user, including, for example, when a participant 104 joins or leaves a conference, when a participant speaks during an audio conference 114, when a participant posts or receives information associated with a social networking system 3102, etc.

The conference watch service 5504 may be useful for hosts who are too busy to join a conference, do not wish to join the conference, or are otherwise unable to join the conference but want to monitor the activity of the conference. For example, the host may be interested in joining the conference, for example, but only after a particular person has joined or some other event has occurred. The host may view the alert messages as they are provided by the conferencing system 106 and displayed by the computing device 102. When the desired event has occurred, the host may elect to join the conference. As described below, the alerts may be retrieved from the conferencing system 106 via the conference polling service 5506.

An exemplary XML request for the SetConferenceWatch( ) call may be configured as follows:

```
<?xml version="1.0" encoding="utf-8"?>
<soap:Envelope xmlns:xsi="http://www.w3.org/2001/XMLSchema-
instance"
xmlns:xsd="http://www.w3.org/2001/XMLSchema" xmlns:soap="http://
schemas.xmlsoap.org/soap/envelope/">
<soap:Header>
<SoapSecurityHeader xmlns="http://pia.premiereglobal.com/">
<SessionID>string</SessionID>
</SoapSecurityHeader>
</soap:Header>
<soap:Body>
<SetConferenceWatch xmlns="http://pia.premiereglobal.com/">
<ConferenceID>string</ConferenceID>
</SetConferenceWatch>
</soap:Body>
</soap:Envelope>
```

An exemplary XML response for the SetConferenceWatch( ) call may be configured as follows:

```
<?xml version="1.0" encoding="utf-8"?>
<soap:Envelope xmlns:xsi="http://www.w3.org/2001/XMLSchema-
instance"
xmlns:xsd="http://www.w3.org/2001/XMLSchema" xmlns:soap="http://
schemas.xmlsoap.org/soap/envelope/">
<soap:Body>
<SetConferenceWatchResponse xmlns="http://pia.premiereglobal.com/">
<SetConferenceWatchResult>
<ResultCode>ResultCode</ResultCode>
</SetConferenceWatchResult>
</SetConferenceWatchResponse>
</soap:Body>
</soap:Envelope>
```

The conference watch service 5504 may also invoke a ClearConferenceWatch( ) call that may be used to clear a previously established conference watch. Removing a conference watch may cause the alerts for the specified conference to be disabled. After clearing the conference watch, the user will no longer receive alerts.

An exemplary XML request for the ClearConferenceWatch( ) call may be configured as follows:

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema" xmlns:soap="http://schemas.xmlsoap.org/soap/envelope/">
<soap:Header>
<SoapSecurityHeader xmlns="http://pia.premiereglobal.com/">
<SessionID>string</SessionID>
</SoapSecurityHeader>
</soap:Header>
<soap:Body>
<ClearConferenceWatch xmlns="http://pia.premiereglobal.com/">
<ConferenceID>string</ConferenceID>
</ClearConferenceWatch>
</soap:Body>
</soap:Envelope>
```

An exemplary XML response for the ClearConferenceWatch( ) call may be configured as follows:

```
<?xml version="1.0" encoding="utf-8"?>
<soap:Envelope xmlns:xsi=http://www.w3.org/2001/XMLSchema-instance
xmlns:xsd="http://www.w3.org/2001/XMLSchema" xmlns:soap="http://schemas.xmlsoap.org/soap/envelope/">
<soap:Body>
<ClearConferenceWatchResponse xmlns="http://pia.premiereglobal.com/">
<ClearConferenceWatchResult>
<ResultCode>ResultCode</ResultCode> </ClearConferenceWatchResult>
</ClearConferenceWatchResponse>
</soap:Body>
</soap:Envelope>
```

The conferencing polling service 5506 may invoke a PollForMessages( ) call, which is used to request events from a watched conference. In response to the request, the conferencing notification application 5502 will receive events associated with the watched conference.

An exemplary XML request for the PollForMessages( ) call may be configured as follows:

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema" xmlns:soap="http://schemas.xmlsoap.org/soap/envelope/">
<soap:Header>
<SoapSecurityHeader xmlns="http://pia.premiereglobal.com/">
<SessionID>string</SessionID>
</SoapSecurityHeader>
</soap:Header>
<soap:Body>
<PollForMessages xmlns="http://pia.premiereglobal.com/" />
</soap:Body>
</soap:Envelope>
```

An exemplary XML response for the PollForMessages( ) call may be configured as follows:

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema" xmlns:soap="http://schemas.xmlsoap.org/soap/envelope/">
<soap:Body>
<PollForMessagesResponse xmlns="http://pia.premiereglobal.com/">
<PollingRequestResult>
<ResultCode>ResultCode</ResultCode>
</PollingRequestResult>
</PollForMessagesResponse>
</soap:Body>
</soap:Envelope>
```

The authentication service 5508, the conference schedule service 5510, and the join conference service 5512 may enable the conferencing notification application 5002 to interface with a registration system. The authentication service 5508 may invoke a SecurityValidateLogOn( ) call to validate a user's logon credentials. The call may return a security token, which may be used to create a login header. The login header may be sent with one or more of the other service calls. An exemplary XML request for the SecurityValidateLogOn( ) call may be configured as follows:

```
<?xml version="1.0" encoding="utf-8"?>
<soap:Envelope xmlns:xsi="http://www.w3.org/2001/XMLSchema-instance" xmlns:xsd="http://www.w3.org/2001/XMLSchema"
xmlns:soap="http://schemas.xmlsoap.org/soap/envelope/">
    <soap:Body>
        <SecurityValidateLogOn xmlns="Conferencing">
            <request>
                <LogOnId>string</LogOnId>
                <Password>string</Password>
                <WebId>string</WebId>
                <WebPassword>string</WebPassword>
            </request>
        </SecurityValidateLogOn>
    </soap:Body>
</soap:Envelope>
```

An exemplary XML response for the SecurityValidateLogOn( ) call may be configured as follows:

```
<?xml version="1.0" encoding="utf-8"?>
<soap:Envelope xmlns:xsi="http://www.w3.org/2001/XMLSchema-instance" xmlns:xsd="http://www.w3.org/2001/XMLSchema"
xmlns:soap="http://schemas.xmlsoap.org/soap/envelope/">
    <soap:Body>
        <SecurityValidateLogOnResponse xmlns="Conferencing">
            <SecurityValidateLogOnResult>
```

```
                <Token>guid</Token>
                <TokenExpirationUtc>dateTime</TokenExpirationUtc>
                <FirstName>string</FirstName>
                <LastName>string</LastName>
                <Email>string</Email>
                <ClientId>int</ClientId>
                <IntlClientId>string</IntlClientId>
                <ProviderId>int</ProviderId>
                <ProviderName>string</ProviderName>
                <CompanyId>int</CompanyId>
                <IntlCompanyId>string</IntlCompanyId>
                <CompanyName>string</CompanyName>
                <CorporateCustomerId>int</CorporateCustomerId>
                <CorporateCustomerName>string</CorporateCustomerName>
                <HubId>int</HubId>
                <HubName>string</HubName>
                <HubGroupId>int</HubGroupId>
                <HubGroupName>string</HubGroupName>
                <HubUrls>
                    <string>string</string>
                    <string>string</string>
                </HubUrls>
                <RedFlagDate>dateTime</RedFlagDate>
                <FinanceChangeDate>dateTime</FinanceChangeDate>
            </SecurityValidateLogOnResult>
        </SecurityValidateLogOnResponse>
    </soap:Body>
</soap:Envelope>
```

Figure 61:
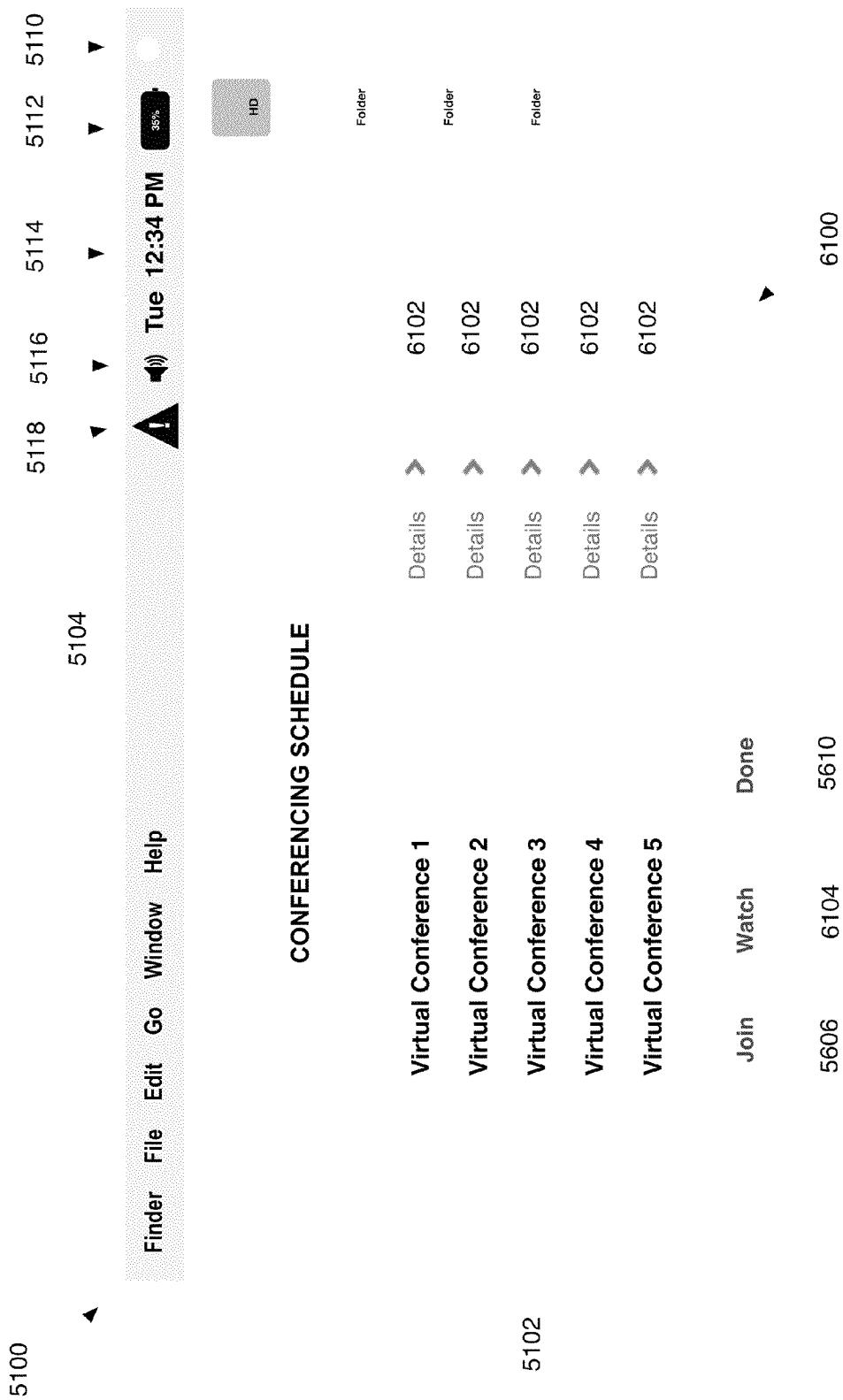
FIG. 61 is a user interface screen shot illustrating an embodiment of a conference scheduler functionality.
Figure 62:
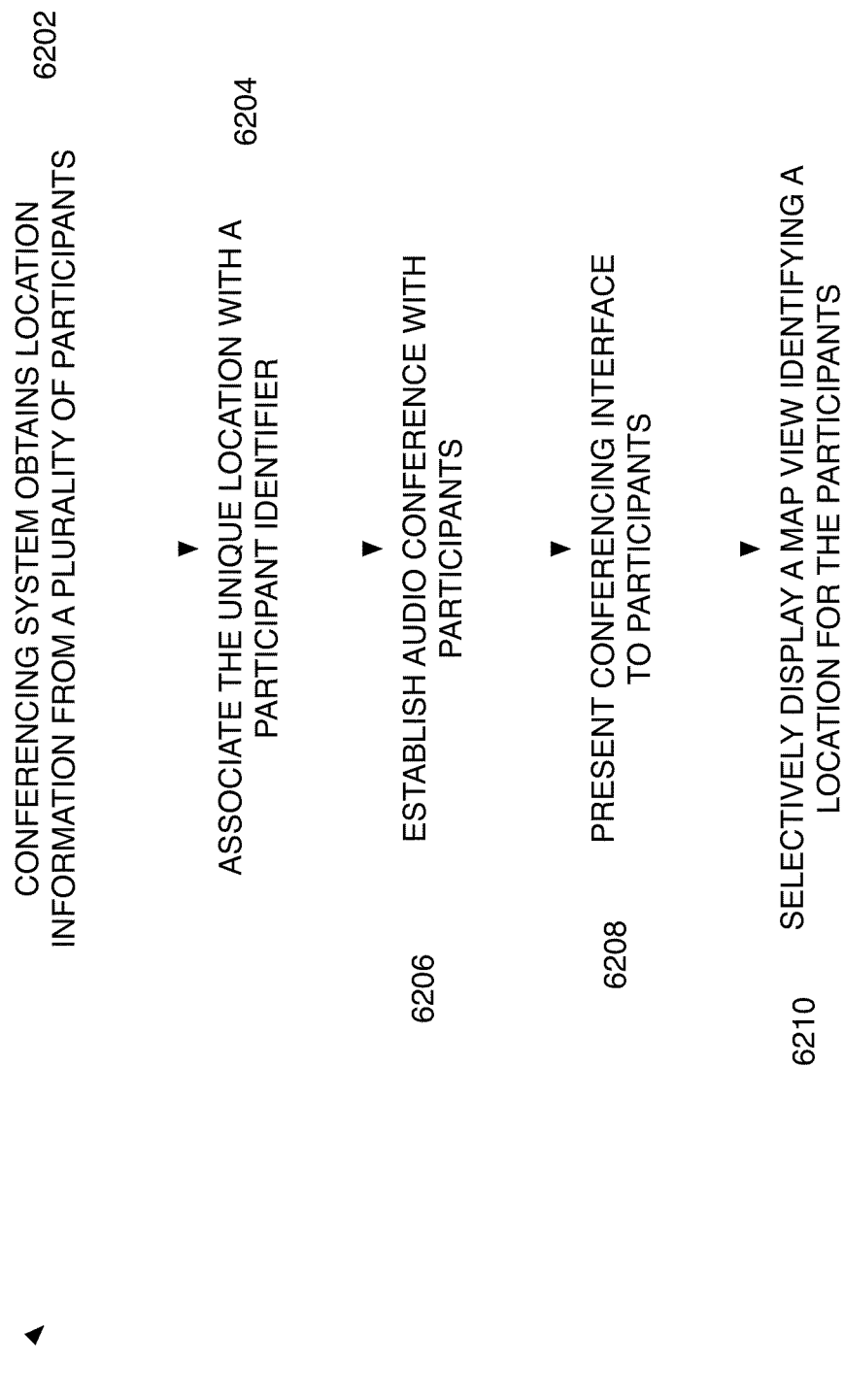
FIG. 62 is a flowchart illustrating the architecture, operation, and/or functionality of an embodiment of the location-based services module(s) of FIG. 19.

The conference schedule service 5510 may invoke a FindReservation( ) call that returns a list of conferences. The FindReservation( ) call may be initiated when a user selects the Conference Schedule button 5416, as illustrated in FIG. 54. The result contains detailed information of all conferences associated with the user. The conferencing notification application 5002 may present the results to the user. FIG. 61 illustrates an exemplary display 6100 for presenting the results. The display 6100 comprises a list of conference entries 6102. Additional details (e.g., dial-in numbers, passcodes, date, time, agenda, participants, etc.) about each conference may be accessed by selecting the particular entry 6102. As illustrated in FIG. 61, when a user wants to watch a conference to receive alerts about that conference, the user may select an entry 6102 and select a watch button 6104.

An exemplary XML request for the FindReservation( ) call may be configured as follows:

```
<?xml version="1.0" encoding="utf-8"?>
<soap:Envelope xmlns:xsi="http://www.w3.org/2001/XMLSchema-instance" xmlns:xsd="http://www.w3.org/2001/XMLSchema" xmlns:soap="http://schemas.xmlsoap.org/soap/envelope/">
    <soap:Header>
        <HeaderToken xmlns="Conferencing">
            <Token>string</Token>
        </HeaderToken>
    </soap:Header>
    <soap:Body>
        <FindReservation xmlns="Conferencing">
            <aFindReservationRequest TimeZone="string" DisplayLanguage="string">
                <SearchCriteria CompanyID="string" ClientID="string" ConfID="string" PPassCode="string" ClientPassCode="string" ConfName="string" ModeratorName="string" StartDate="string" EndDate="string" AddDeleted="string" MaxRecords="string" StartRecord="string" InterfaceID="string" SortByModified="string">
                    <ConfTypes>
                        <ConfType>string</ConfType>
                        <ConfType>string</ConfType>
                    </ConfTypes>
                </SearchCriteria>
            </aFindReservationRequest>
            <aIgnoreUserId>boolean</aIgnoreUserId>
        </FindReservation>
    </soap:Body>
</soap:Envelope>
```

An exemplary XML response for the FindReservation( ) call may be configured as follows:

```
<?xml version="1.0" encoding="utf-8"?>
<soap:Envelope xmlns:xsi="http://www.w3.org/2001/XMLSchema-instance" xmlns:xsd="http://www.w3.org/2001/XMLSchema" xmlns:soap="http://schemas.xmlsoap.org/soap/envelope/">
    <soap:Body>
        <FindReservationResponse xmlns="Conferencing">
            <FindReservationResult Count="string">
                <Result ErrorCode="string" ErrorText="string" />
                <Reservation Deleted="string" DeleteDate="string" Created="string" Modified="string" Attended="string" Participants="string">
                    <ReservationDetails ConfID="string" ConfName="string" PPassCode="string" MPassCode="string" LPassCode="string" ClientPassCode="string" ClientMPassCode="string" SecurityCode="string" PassCodeType="string">
                        <PhoneNumbers xsi:nil="true" />
                    </ReservationDetails>
                    <Client ClientID="string" ConfName="string" Password="string" Email="string" Company="string" PONumber="string" ModeratorName="string" InterfaceID="string" SystemID="string" MinutesAvailable="string" SecurityCode="string" RSVPCustom="string" Language="string" DisplayLanguage="string" ClientNumMinLen="string" ClientNumMaxLen="string" MatterNumMinLen="string" MatterNumMaxLen="string" PONumMinLen="string" PONumMaxLen="string" />
                    <BridgeOptions>
                        <BridgeOption>string</BridgeOption>
                        <BridgeOption>string</BridgeOption>
                        <Option xsi:nil="true" />
                        <Option xsi:nil="true" />
                    </BridgeOptions>
```

```
<Options>
        <Option xsi:nil="true" />
        <Option xsi:nil="true" />
    </Options>
<Schedule TimeZone="string" TimeZoneName="string">
        <AdHoc xsi:nil="true" />
        <AdHoc xsi:nil="true" />
        <Daily xsi:nil="true" />
        <Daily xsi:nil="true" />
        <Weekly xsi:nil="true" />
        <Weekly xsi:nil="true" />
        <WeekDays xsi:nil="true" />
        <WeekDays xsi:nil="true" />
        <MonthlyDesc xsi:nil="true" />
        <MonthlyDesc xsi:nil="true" />
        <MonthlyDate xsi:nil="true" />
        <MonthlyDate xsi:nil="true" />
        <Skip xsi:nil="true" />
        <Skip xsi:nil="true" />
        <NextConference xsi:nil="true" />
        <NextConference xsi:nil="true" />
        <ConferenceTime xsi:nil="true" />
        <ConferenceTime xsi:nil="true" />
    </Schedule>
<PhoneURL Value="string" />
        <VisionCast ParticipantURL="string"
    ModeratorURL="string" ReplayURL="string" />
        </Reservation>
<Reservation Deleted="string" DeleteDate="string"
        Created="string" Modified="string"
        Attended="string" Participants="string">
    <ReservationDetails ConfID="string" ConfName="string"
PPassCode="string" MPassCode="string"
LPassCode="string" ClientPassCode="string"
ClientMPassCode="string" SecurityCode="string"
PassCodeType="string">
        <PhoneNumbers xsi:nil="true" />
    </ReservationDetails>
<Client ClientID="string" ConfName="string"
Password="string" Email="string" Company="string"
PONumber="string" ModeratorName="string"
InterfaceID="string" SystemID="string"
MinutesAvailable="string" SecurityCode="string"
RSVPCustom="string" Language="string"
DisplayLanguage="string" ClientNumMinLen="string"
ClientNumMaxLen="string" MatterNumMinLen="string"
MatterNumMaxLen="string" PONumMinLen="string"
PONumMaxLen="string" />
    <BridgeOptions>
        <BridgeOption>string</BridgeOption>
        <BridgeOption>string</BridgeOption>
        <Option xsi:nil="true" />
        <Option xsi:nil="true" />
    </BridgeOptions>
<Options>
        <Option xsi:nil="true" />
        <Option xsi:nil="true" />
    </Options>
<Schedule TimeZone="string" TimeZoneName="string">
        <AdHoc xsi:nil="true" />
        <AdHoc xsi:nil="true" />
        <Daily xsi:nil="true" />
        <Daily xsi:nil="true" />
        <Weekly xsi:nil="true" />
        <Weekly xsi:nil="true" />
        <WeekDays xsi:nil="true" />
        <WeekDays xsi:nil="true" />
        <MonthlyDesc xsi:nil="true" />
        <MonthlyDesc xsi:nil="true" />
        <MonthlyDate xsi:nil="true" />
        <MonthlyDate xsi:nil="true" />
        <Skip xsi:nil="true" />
        <Skip xsi:nil="true" />
        <NextConference xsi:nil="true" />
        <NextConference xsi:nil="true" />
        <ConferenceTime xsi:nil="true" />
        <ConferenceTime xsi:nil="true" />
    </Schedule>
<PhoneURL Value="string" />
        <VisionCast ParticipantURL="string"
    ModeratorURL="string" ReplayURL="string" />
        </Reservation>
    </FindReservationResult>
</FindReservationResponse>
</soap:Body>
</soap:Envelope>
```

The join conference service 5512 may be invoked when, for example, the user selects the join button 5606 (FIG. 56) or selects a conference from the conferencing schedule (FIG. 61). A WebHostLogin( ) call may return a location for the virtual conference location. In an embodiment, the call may return a redirectUrl of a given client and host, which logs the client into a host. The conferencing notification application 5002 may send the WebHostLogin( ) request, which contains the user's credentials, and then opens a web browser placing the user directly into the conference without the need to login again.

An exemplary XML response for the WebHostLogin( ) call may be configured as follows:

```
<?xml version="1.0" encoding="utf-8"?>
<soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
    <soap:Header>
        <HeaderToken xmlns="Conferencing">
            <Token>string</Token>
        </HeaderToken>
    </soap:Header>
    <soap:Body>
        <WebHostLogin xmlns="Conferencing">
            <request>
                <ClientId>string</ClientId>
                <WebHost>None or VisionCast or VisionCastDemo or
ReadyCast or ReadyCastDemo or ReadyCastProtect or
AcrobatConnectPro or PgiAdobeConnect or ReadyCastMeeting
or ReadyCastEvent or ConferencingHub</WebHost>
                <ConfId>int</ConfId>
                <DialInNumbers>
                    <PhoneNumber>
                        <Location>string</Location>
                        <Number>string</Number>
                    </PhoneNumber>
                    <PhoneNumber>
                        <Location>string</Location>
                        <Number>string</Number>
                    </PhoneNumber>
                </DialInNumbers>
                <Target>string</Target>
            </request>
        </WebHostLogin>
    </soap:Body>
</soap:Envelope>
```

An exemplary XML response for the WebHostLogin( ) call may be configured as follows:

```
<?xml version="1.0" encoding="utf-8"?>
<soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
    <soap:Body>
        <WebHostLoginResponse xmlns="Conferencing">
            <WebHostLoginResult>
                <RedirectUrl>string</RedirectUrl>
            </WebHostLoginResult>
        </WebHostLoginResponse>
    </soap:Body>
</soap:Envelope>
```

Figure 59:
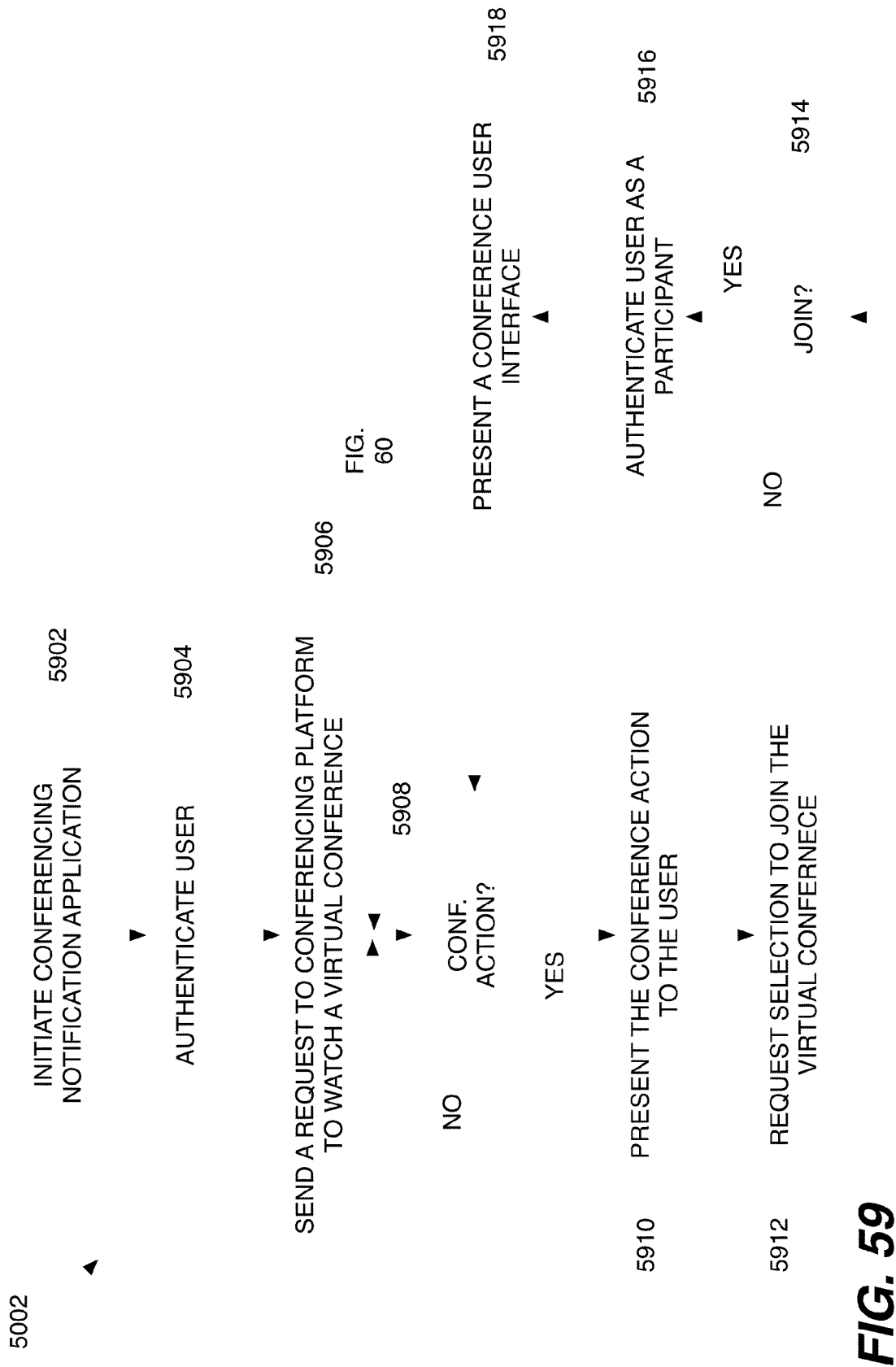
FIG. 59 is a flowchart illustrating the architecture, operation, and/or functionality of an embodiment of the conferencing notification application of FIG. 50.

FIG. 59 illustrates an embodiment of a method for enabling a user to watch a conference via the notification application without having to join the audio conference 114 or access the conference interface. At block 5902, the conferencing notification application 5002 is initiated. A user may manually launch the conferencing notification application 5002 or the operating system 5004 may be configured to automatically launch the application at startup or upon a predetermined event. At block 5904, the conferencing notification application 5002 may authenticate the user with the conferencing system 106. At block 5906, the conferencing notification application 5002 sends a request to the conferencing system 106 to watch a virtual conference. The request may comprise information identifying the conference. At decision block 5908, the conference and/or the audio conference 114 are monitored for specific actions or events. As events occur during the audio conference 114, the conferencing notification application 5002 may receive and present related messages or alerts to the user (block 5910). At block 5912, the conferencing notification application 5002 may prompt the user for a selection to join the conference via the conference interface. In an embodiment, the request to join may be presented in association with the message or alert. If the user makes a selection to join the virtual conference (decision block 5914), the conferencing notification application 5002 may further authenticate the user as a participant in the conference, at block 5916. This authentication may substitute for the authentication at block 5904 or provide further or separate authentication. At block 5918, the conferencing notification application 5002 enables the user to access the conference via, for example, the conference user interface 4400.

Figure 60:
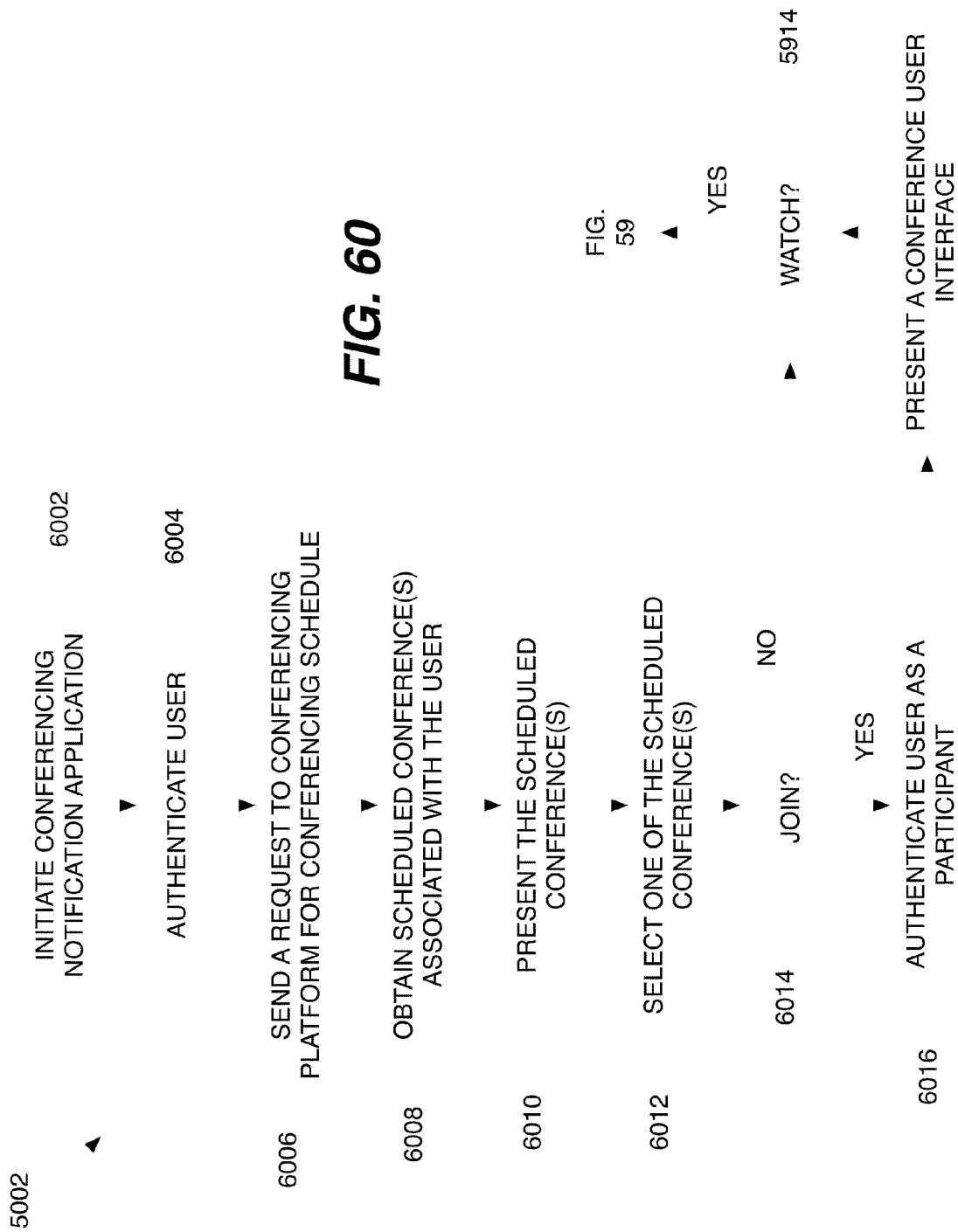
FIG. 60 is a flowchart illustrating the architecture, operation, and/or functionality of another embodiment of the conferencing notification application of FIG. 50.

FIG. 60 illustrates another embodiment of a method for implementing certain aspects of the conferencing notification application 5002. The conferencing notification application 5002 is initiated, at block 6002. At block 6004, the conferencing notification application 5002 may authenticate the user with the conferencing system 106. At block 6006, the conferencing notification application 5002 sends a request to the conferencing system 106 for available conferences associated with the user. At decision block 6008, the conferencing notification application 5002 may receive a schedule of conferences associated with the user, which may be presented to the user (block 6010). At block 6012, the conferencing notification application 5002 may prompt the user for a selection of one of the conferences (block 6012). If the user requests to join the selected conference (decision block 6014), the user may be authenticated (block 6016) and then permitted to join the audio conference 114 and/or the virtual conference. As illustrated at decision block 5914, the user may also request to watch the conference without necessarily joining the conference.

Figure 65:
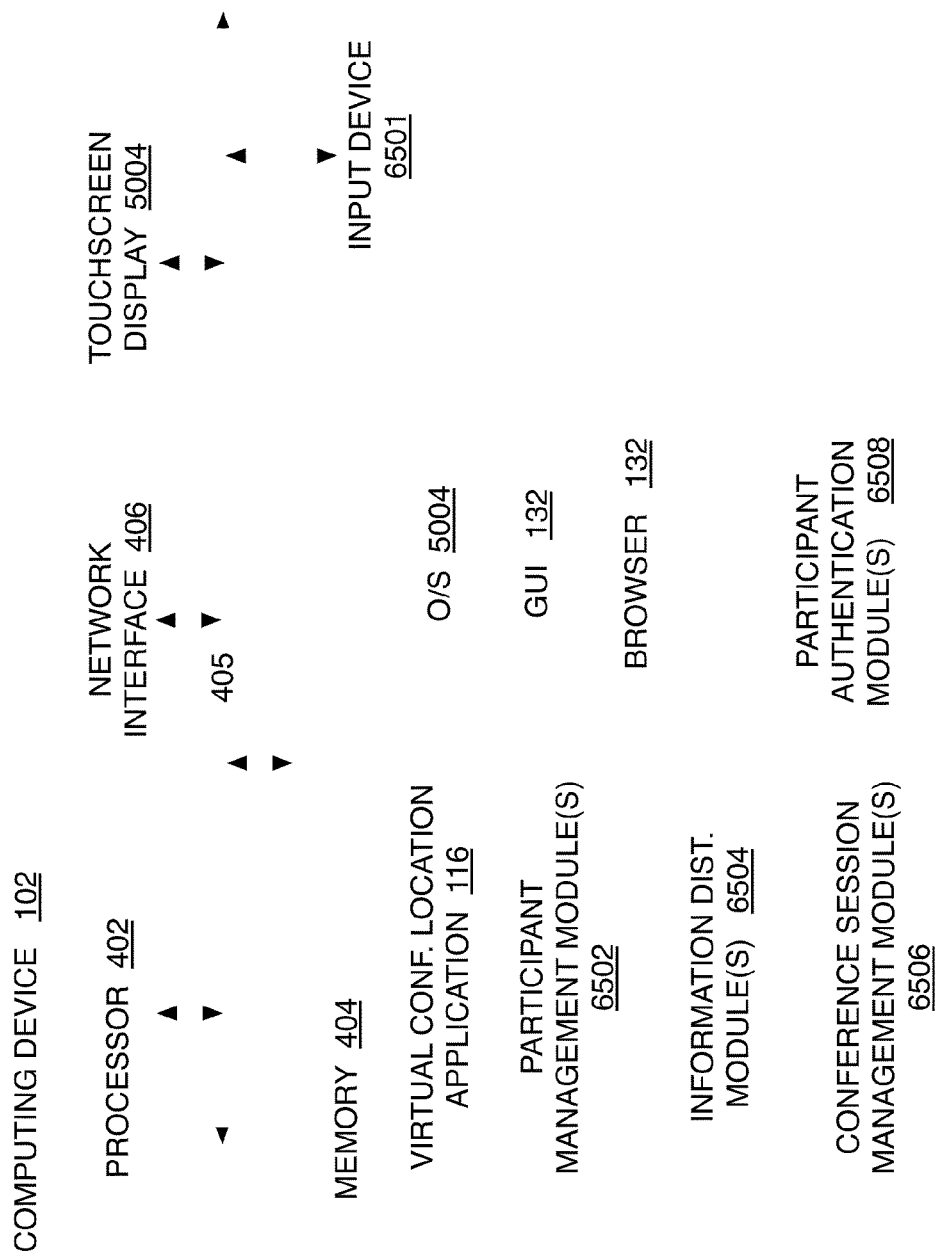
FIG. 65 is a block diagram illustrating an embodiment of a computing device for implementing a drag-and-drop participant management functionality in a conference interface.

Referring to FIGS. 65-75, various embodiments of systems, methods, and computer programs will be described for managing users participating in an audio conference 114 via a conference interface. In this regard, FIG. 65 illustrates an embodiment of a computing device 102 comprising one or more modules stored in memory 404 and executable by processor 402 (participant management module(s) 6502). As described below in more detail, in general, the participant management module 6502 comprises the logic and/or functionality for enabling a user of the computing device 102 to add and/or remove participants in the conference via, for example, a drag-and-drop functionality associated with the conference interface. The participant management module 6502 may control the operation of the drag-and-drop functionality in association with related functionality provided by the graphical user interface 132 and/or the conference interface provided by the conferencing system 106. The user of the computing device 102 (e.g., participant, host, etc.) may interface with the drag-and-drop functionality via any desirable input mechanism. In one embodiment, the drag-and-drop functionality supports a touchscreen display 5004 (as described above or otherwise) that enables the user to perform the drag-and-drop functionality by touching the touchscreen display 5004 with their fingers or other input device, such as, a stylus. In other embodiments, the drag-and-drop functionality may be performed with a mouse or other input device 6501 that controls movement of a displayed cursor associated with the graphical user interface 132 and provides inputs for selecting displayed objects and providing user input commands. In further embodiments, the drag-and-drop functionality may be performed using voice commands, keyboard shortcuts, or any other desirable input means for providing the commands to specify objects in the conference interface to be moved and/or the manner in which they should be moved.

Figure 66:
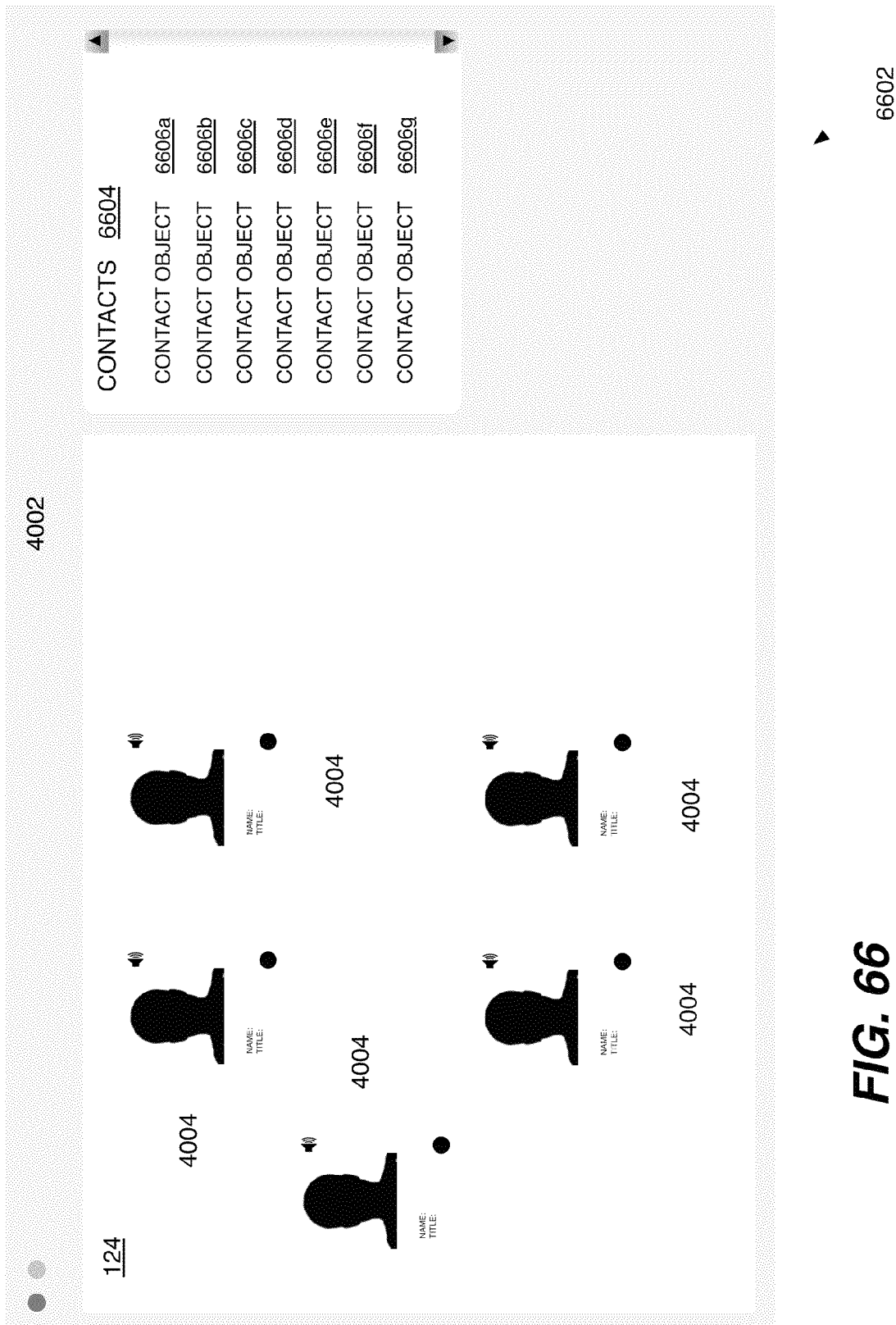
FIG. 66 is a user interface screen shot illustrating an embodiment of a conference interface for implementing an aspect of the drag-and-drop participant management functionality.

FIG. 66 illustrates an embodiment of a conference user interface 6602 for managing participants in the online conference. The conference user interface 6602 generally comprises a screen portion 4002 and a contacts list 6604. The screen portion 4002 provides aspects of the user experience associated with the online conference, including, displaying an object 4004 for each participant 104 in the audio conference 114. The objects 4004 (as well as the more general conference interface) may be arranged and configured in any of the ways described above herein.

The contacts list 6604 displays a list (or other desirable visual arrangement) of contact objects 6606. A contact object 6606 may display information identifying a particular contact or group of contacts. The identifying information may comprise any suitable information for enabling a user of the contacts list 6604 to uniquely identify contacts. For example, in an embodiment, the contact object 6606 may display one or more of a contact identifier or description, name, nickname, image, avatar, icon, email address, telephone number, social networking profile, identifier or name, etc. Regardless of information displayed by the contact object 6606, it should be appreciated that each contact object 6606 is logically associated with corresponding contact information. The contact information may comprise any data identifying a contact that may be used by the client device 102 and/or the conferencing system 106 to initiate and/or establish a connection between the contact and the conferencing system 106. The contacts list 6606 and any associated data, including the contact information, may be stored in memory 404 on the client device 102 or stored remotely by the conferencing system 106, the social networking system 3102, or otherwise accessible by the client device 102.

Figure 67:
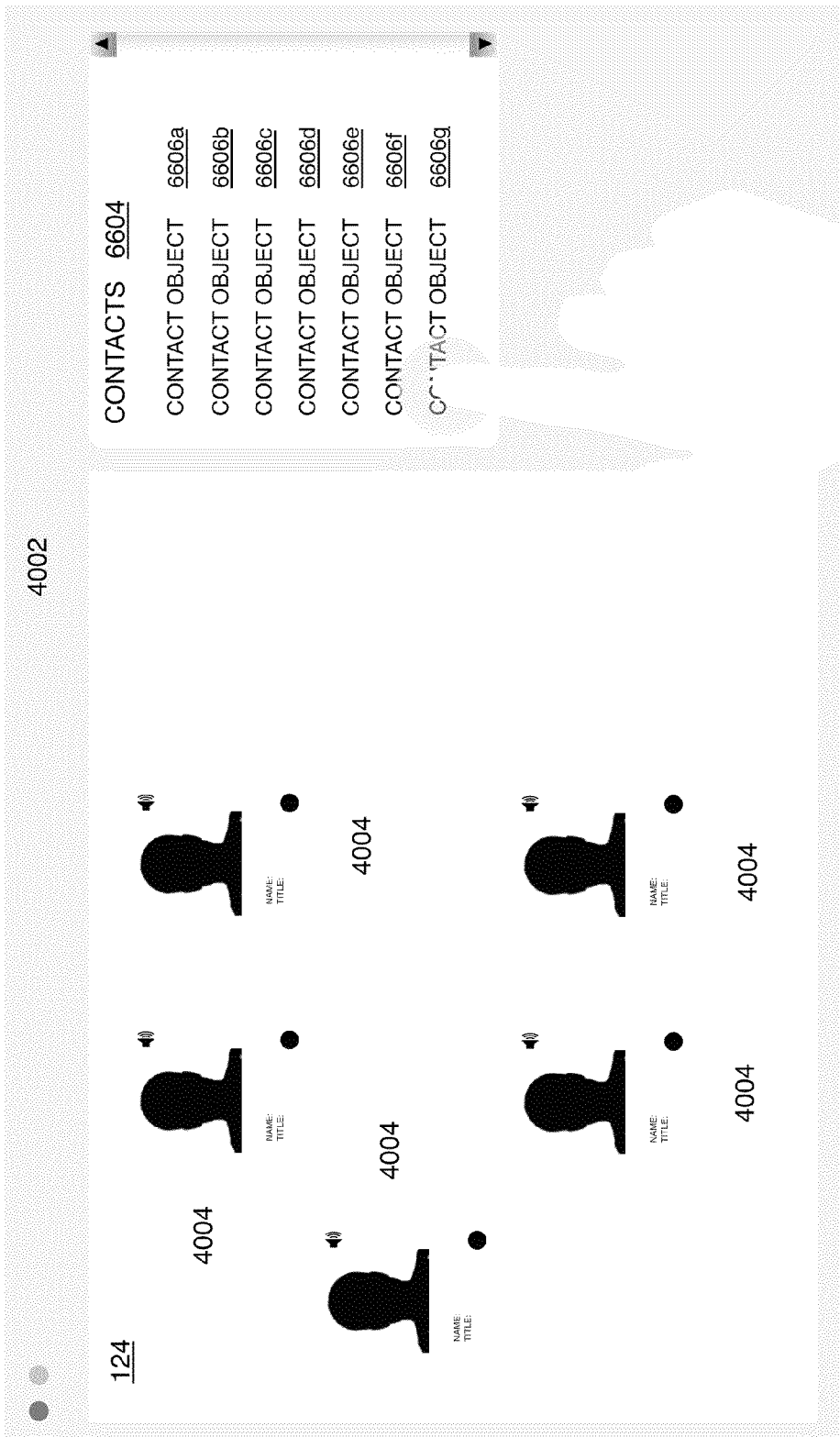
FIG. 67 illustrates the user interface screen shot of FIG. 66 in which a user selects a contact object associated with a contact to be added to the conference.
Figure 68:
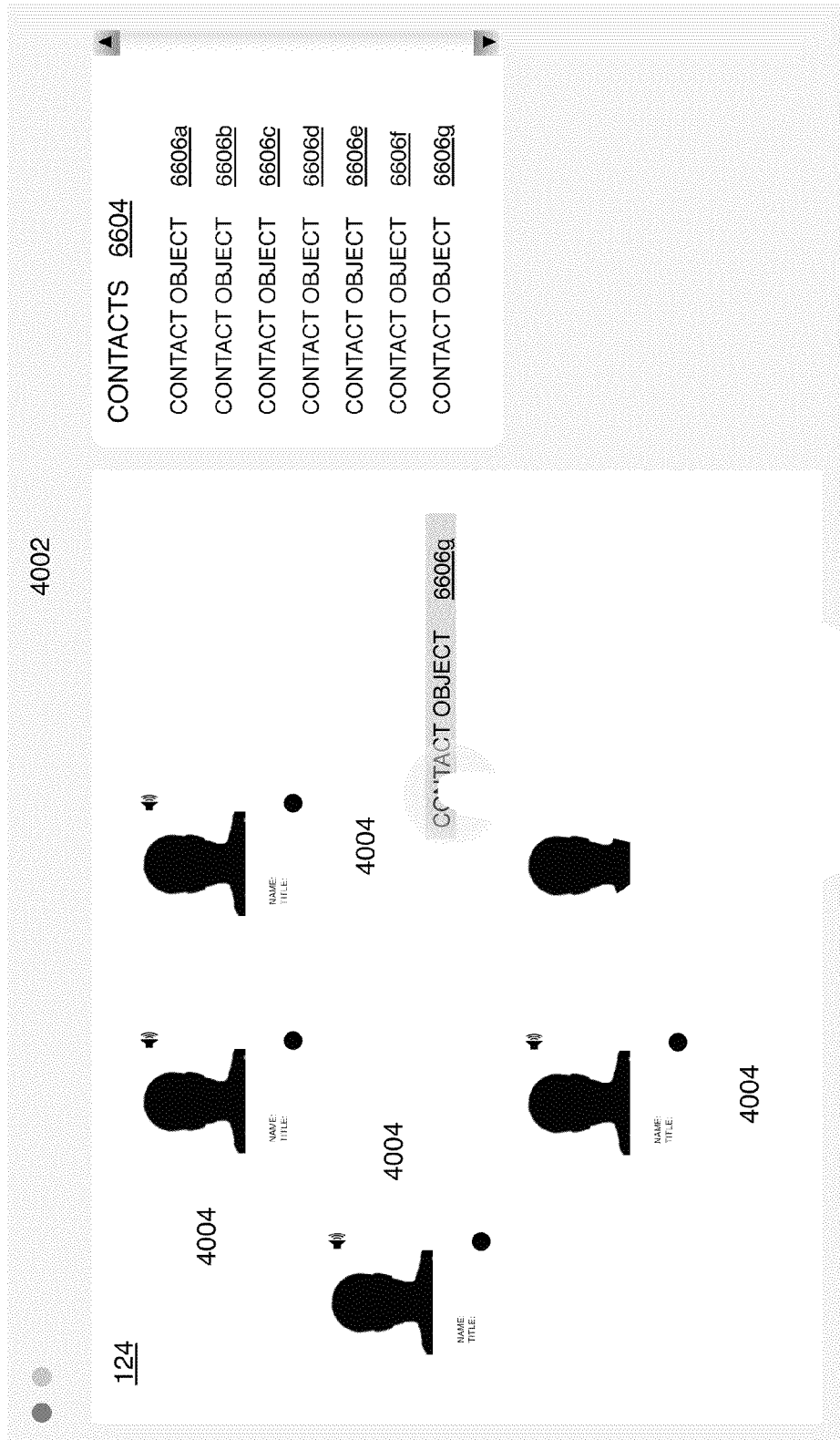
FIG. 68 illustrates the user interface screen shot of FIG. 66 in which the contact object is moved to the conference interface.
Figure 69:
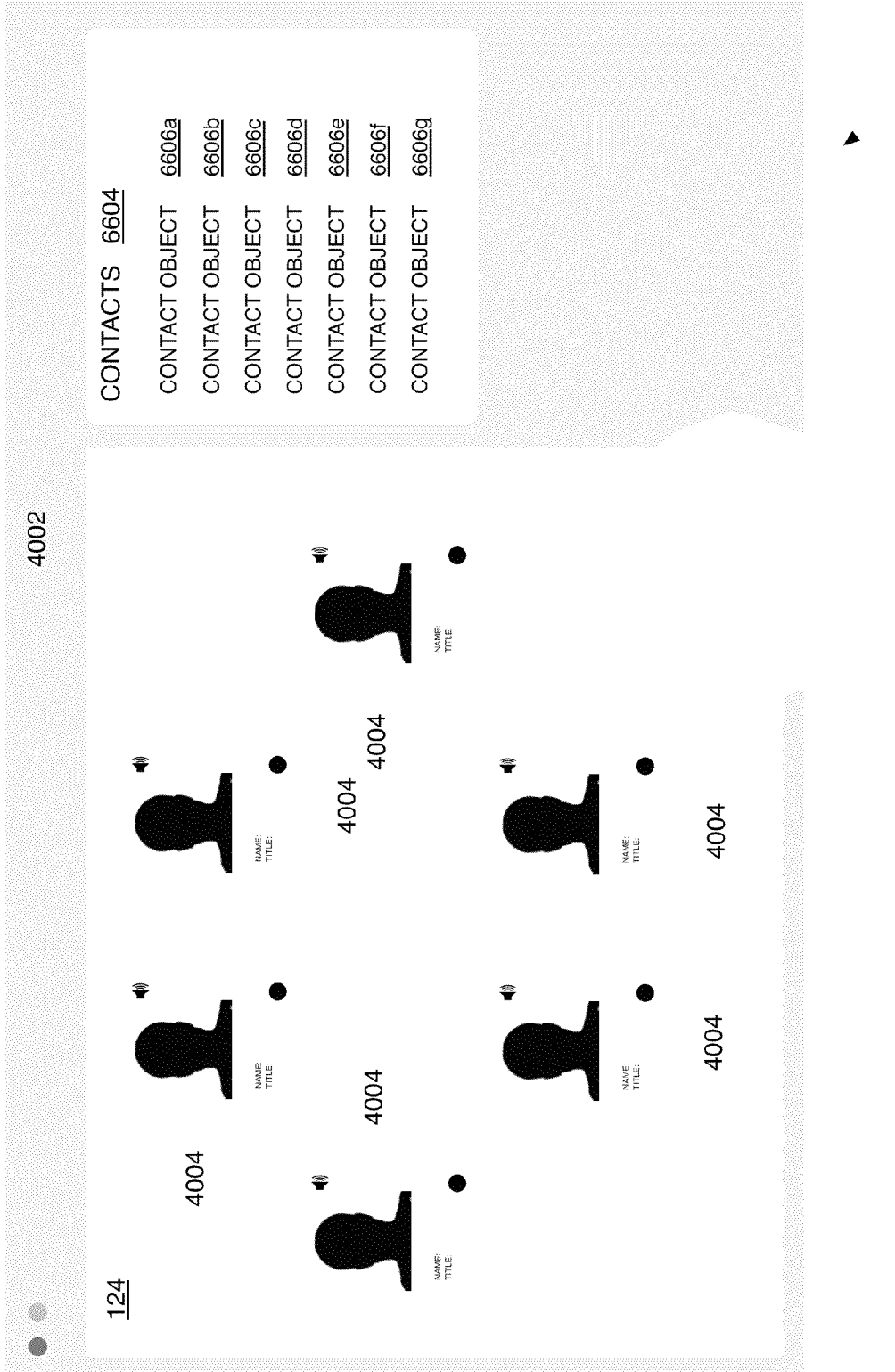
FIG. 69 illustrates the user interface screen shot of FIG. 66 in which the contact object is released in the conference interface to add the contact to the conference.

Referring to FIGS. 67-69, it should be appreciated that each contact object 6606 is configured to support a drag-and-drop functionality via the graphical user interface 132. In general, the drag-and-drop functionality enables a user of the computing device 102 to select a contact object 6606 in the contacts list 6604 (FIG. 67) and perform an input gesture (FIG. 68) to instruct the contact object 6606 to be added to the conference interface (e.g., screen portion 4002) as a participant object 4004 (FIG. 69). The contact object 6606 may be selected in various ways depending on, for example, the configuration of the graphical user interface 132 and the input mechanism. In the embodiment illustrated in FIG. 67, the drag-and-drop functionality is provided via a touchscreen display 5004. The drag-and-drop functionality may be configured to determine the location on the touchscreen display 5004 of a human touch or stylus touch. The contact object

6606 may be selected by touching the displayed region of the object. FIG. 67 illustrates the contact object 6606g being selected by the user touching the appropriate display region. In other embodiments, the user selection of the contact object 6606 may be performed by moving the location of a displayed cursor over the displayed region and initiating a selection command (e.g., by clicking a mouse, touchpad, or other input mechanism).

After the contact object 6606 is selected, the user may perform any desirable gesture to move the selected contact object 6606 to the conference user interface (e.g., screen portion 4002). As illustrated in FIG. 68, in one embodiment, the selected contact object 6606g may be moved with a drag operation. The drag operation may be configured to further monitor the location of the input mechanism (e.g., human or stylus touch, cursor, etc) while the contact object 6606 is selected. In the embodiment of FIG. 68, the contact object 6606g is moved at least partially within the screen portion 4002. The user may deselect the contact object 6606g within the screen portion 4002, which triggers an add-participant command to invite the contact to join the audio conference 114 or automatically establish a connection with the contact using the corresponding contact information. As illustrated in FIG. 69, after the contact is added to the conference (or perhaps before or during the establishment process), the conference interface may be configured to add a new participant object 4004 that identifies the particular contact.

It should be appreciated that the selected contact object 6606 need not be moved within the screen portion 4002 to initiate the add participant command. The conference interface may include a separate screen portion (e.g., a drop target) for dropping or otherwise capturing the contact objects 6606. The separate screen portion may be included within the screen portion 4002 or any other location within the conference interface. It should be further appreciated that the graphical user interface 132 may support other input gestures or mouse-driven commands for implementing the drag-and-drop or similar functionality. For example, in one embodiment, a selected contact object 6606 may be "flicked" toward the screen portion 4002 (or other capture region or drop target) using monitored location and/or acceleration parameters. In other embodiments, the selected contact object 6606 may be added to the online conference via a hotkey or other keyboard input or a selectable menu. For example, when a contact object 6606 is selected, a menu may be automatically or selectively displayed with an add participant prompt. The menu may include options for enabling the user to specify the manner in which the contact is to be added to the conference (e.g., sending an email invitation, initiating an outgoing call, or otherwise establishing the connection via the contact information). In response to the selection from the user, the add participant command may be configured with appropriate parameters to invite the participant or establish the connection with the conferencing system 106.

Figure 70:
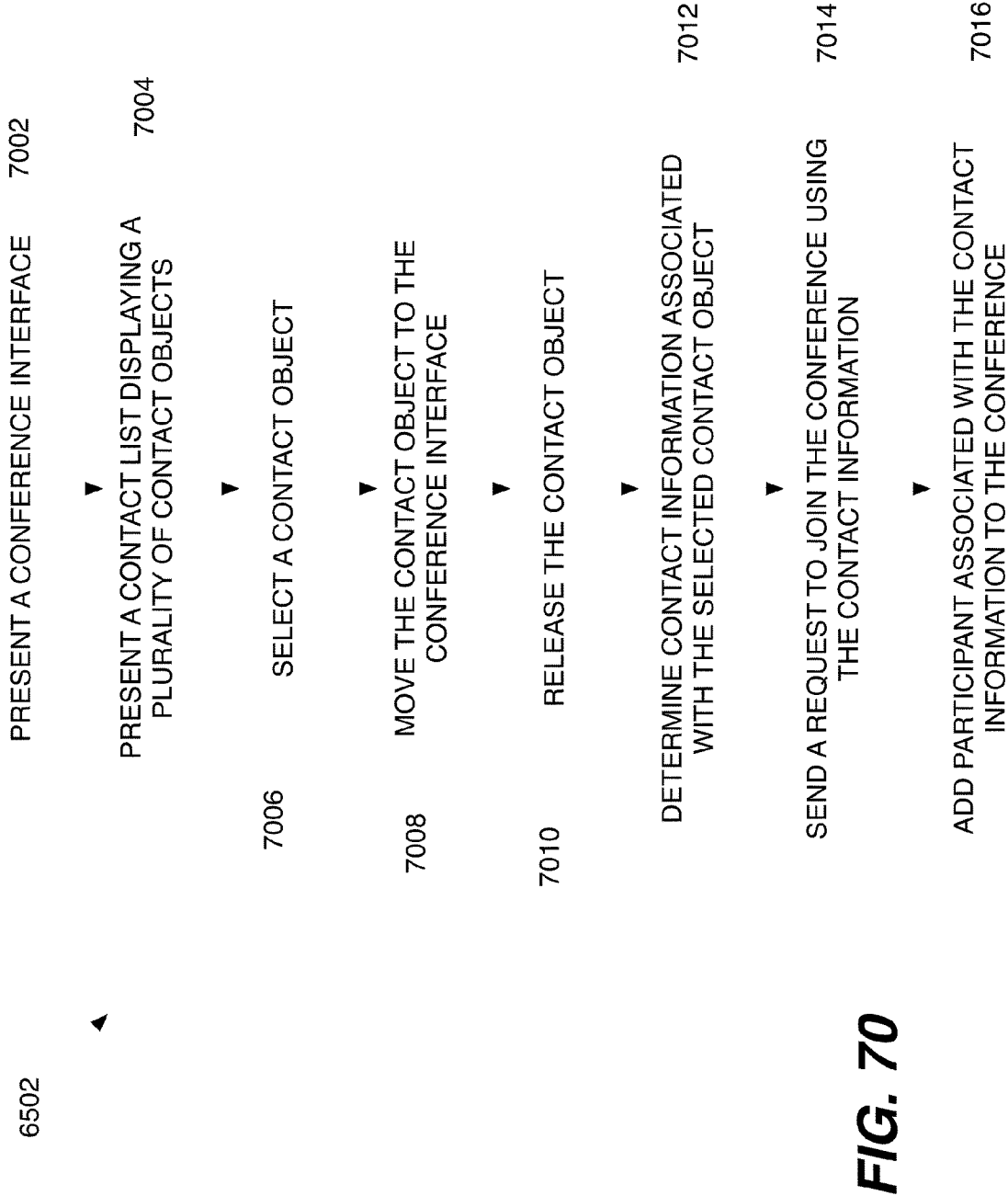
FIG. 70 is a flowchart illustrating the architecture, operation, and/or functionality of an embodiment of the drag-and-drop participant management module in the computing device of FIG. 65.

FIG. 70 illustrates the architecture, operation, and/or functionality of an embodiment of the participant management module(s) 6502 for implementing the above-described participant management features. At blocks 7002 and 7004, the client device 102 displays the conference interface and the contacts list 6604. At block 7006, the participant management module 6502 determines that one of the contact objects 6606 has been selected via the graphical user interface 132. Depending on the particular input device and graphical user interface commands supported by the client device 102, the selected contact object 6606 may be moved to the conference interface or other capture region (block 7008), as described above. At block 7010, the participant management module 6502 may be configured to monitor the location of the selected contact object 6606. At block 7010, the participant management module 6502 receives the add participant command, which may be triggered by, for example, the release of the selected contact object 6606 in a predetermined region of the conference interface or, in other embodiments, via any desirable input command (e.g., gesture, hotkey, key shortcuts, etc.). At block 7012, the participant management module 6502 may determine the contact information associated with the selected contact object 6606. As described above, the contact information may be accessed from a local application or a remote service, such as the conferencing system 106 or social networking system 3102. At block 7012, the add participant command initiates the process of adding the contact to the online conference.

The participant management module 6502 may configure and send a request directly to the contact using the contact information or forward a request to the conferencing system 106 for processing. The request may initiate an email message, a social networking message, or other message containing, for example, a URL directing the contact to a web page hosted by the conferencing system 106. In the manner described above, the user may then enter the audio conference 114 (e.g., via an outgoing call, incoming call to an audio conference 114, etc.), as well as configure a user profile associated with the participant object 4004. In other embodiments, the request may automatically initiate the outgoing call to the contact information to add the contact to the audio conference 114. It should be appreciated that, from the perspective of the participant management module 6502, the contact may be added in any suitable manner to either the audio conference 114 or the online conference. At block 7016, regardless of the manner in which the contact participates in the online conference, the participant management module 6502 may add the participant object 4004 to the conference interface to indicate that the contact has joined the conference.

Figure 71:
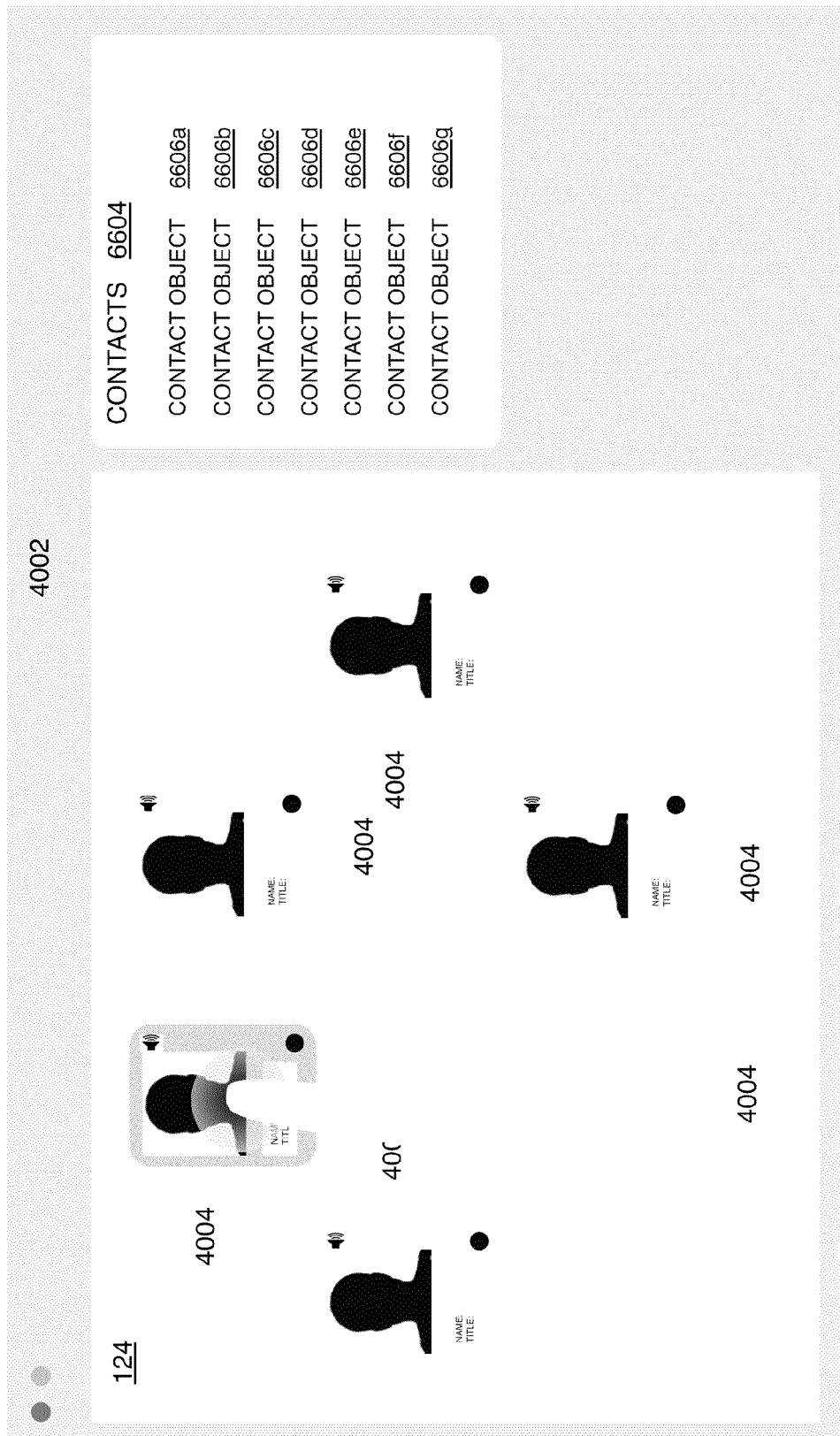
FIG. 71 is a user interface screen shot illustrating an embodiment of another aspect of the drag-and-drop participant management functionality in which a user selects a participant object to be removed from the conference.
Figure 72:
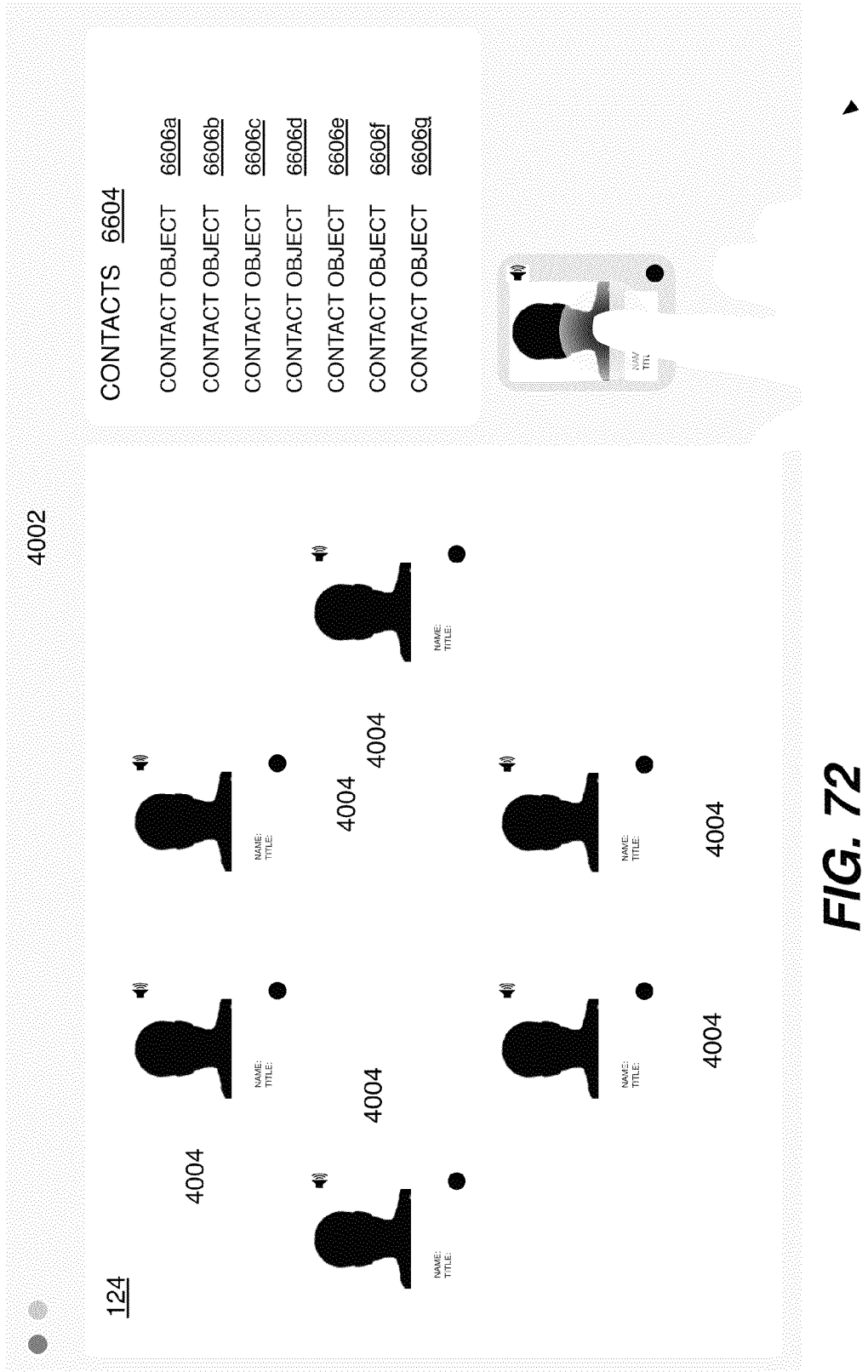
FIG. 72 illustrates the user interface screen shot of FIG. 71 in which the participant object is moved from the conference interface.
Figure 73:
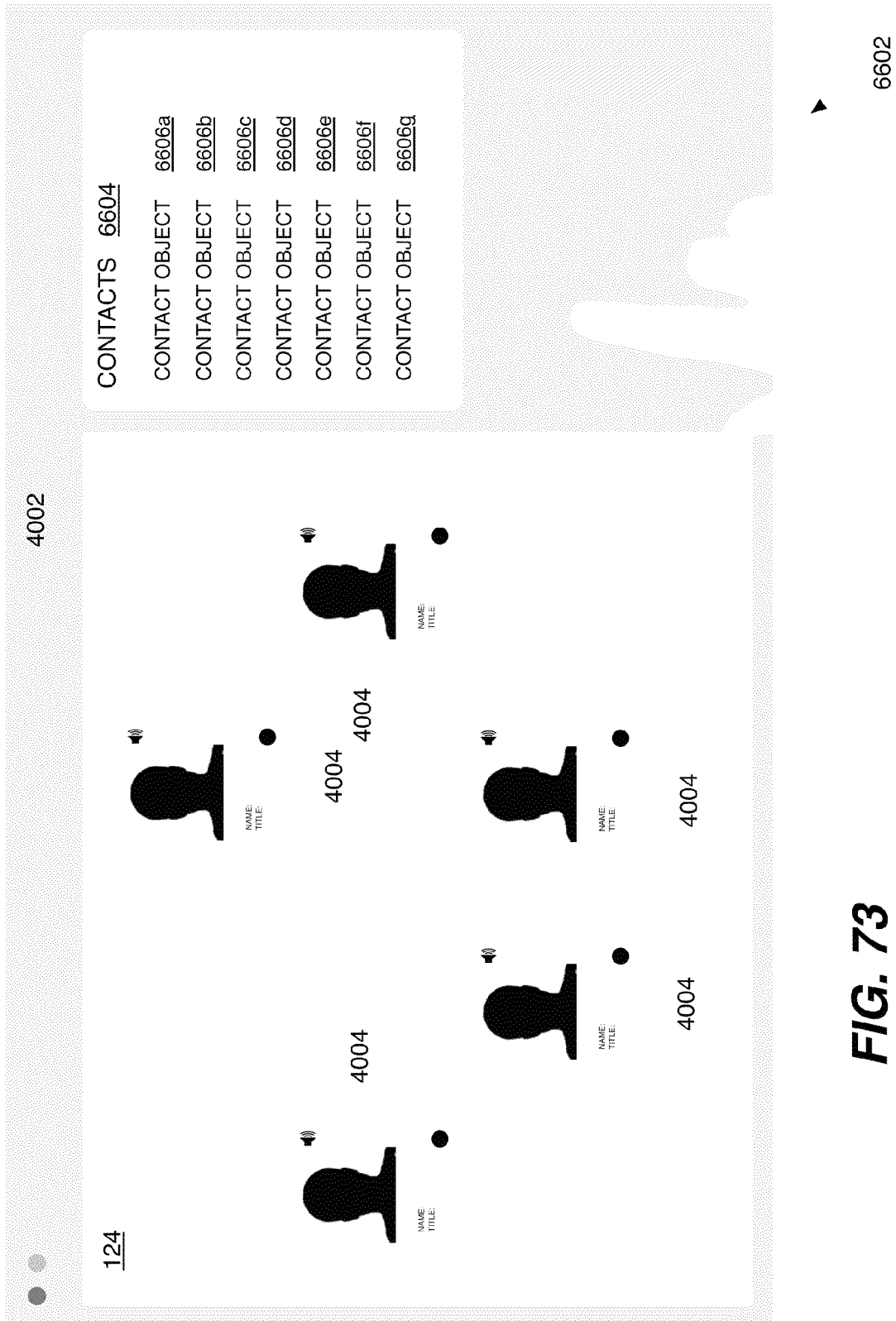
FIG. 73 illustrates the user interface screen shot of FIG. 71 in which the user releases the participant object to remove the participant from the conference.
Figure 74:
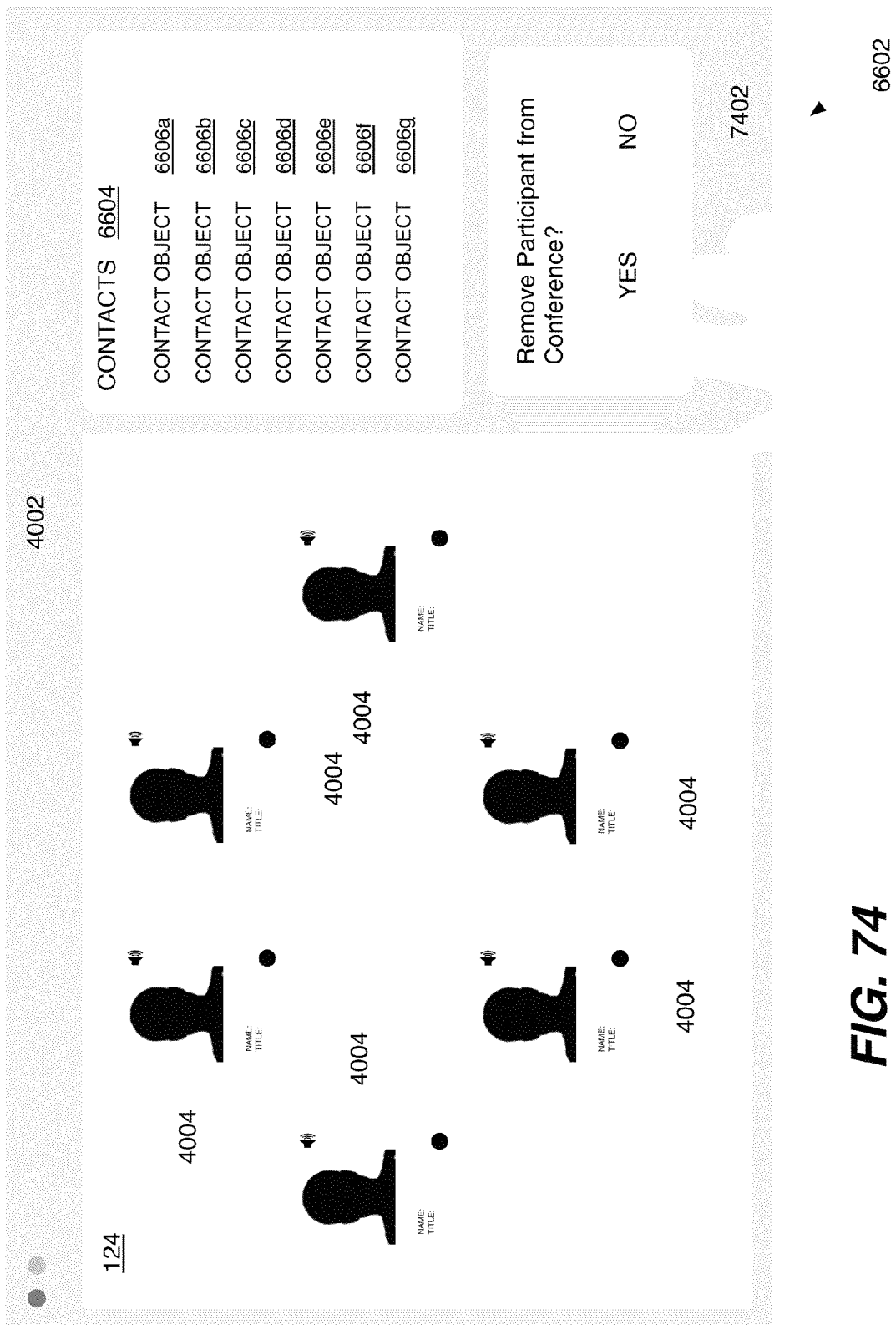
FIG. 74 illustrates the user interface screen shot of FIG. 71 in which a confirmation display is presented to confirm the removal of the participant.

Referring to FIGS. 71-75, in other embodiments, the participant management module 6502 may be further configured to enable the user of the computing device 102 to remove an existing participant in the audio conference 114 via the graphical user interface 132. The participant removal feature may be implemented using the drag-and-drop functionality and other user interface mechanisms described above in connection with FIGS. 65-70. As illustrated in FIG. 71, the participant objects 4004 displayed in the conference interface may be similarly configured as selectable objects. During an existing conference, the user of computing device 102 (FIG. 65) may select a participant object 4004 (FIG. 71) and perform an input gesture or other command, as described above, to move the selected participant object 4004 from an original location in the conference interface (FIG. 72). The selected participant object 4004 may be moved away from the conference interface (e.g., screen portion 4002) and deselected (FIG. 73), which triggers a remove participant command. The remove participant command may be initiated in other ways via the graphical user interface 132, as described above in connection with the add participant command. The remove participant command may initiate the removal of the participant object 4004 from the conference interface (FIG. 73) and disconnect the participant from the audio conference 114. As illustrated in FIG. 74, the user may be prompted by a display menu 7402 to confirm the removal of the participant.

Figure 75:
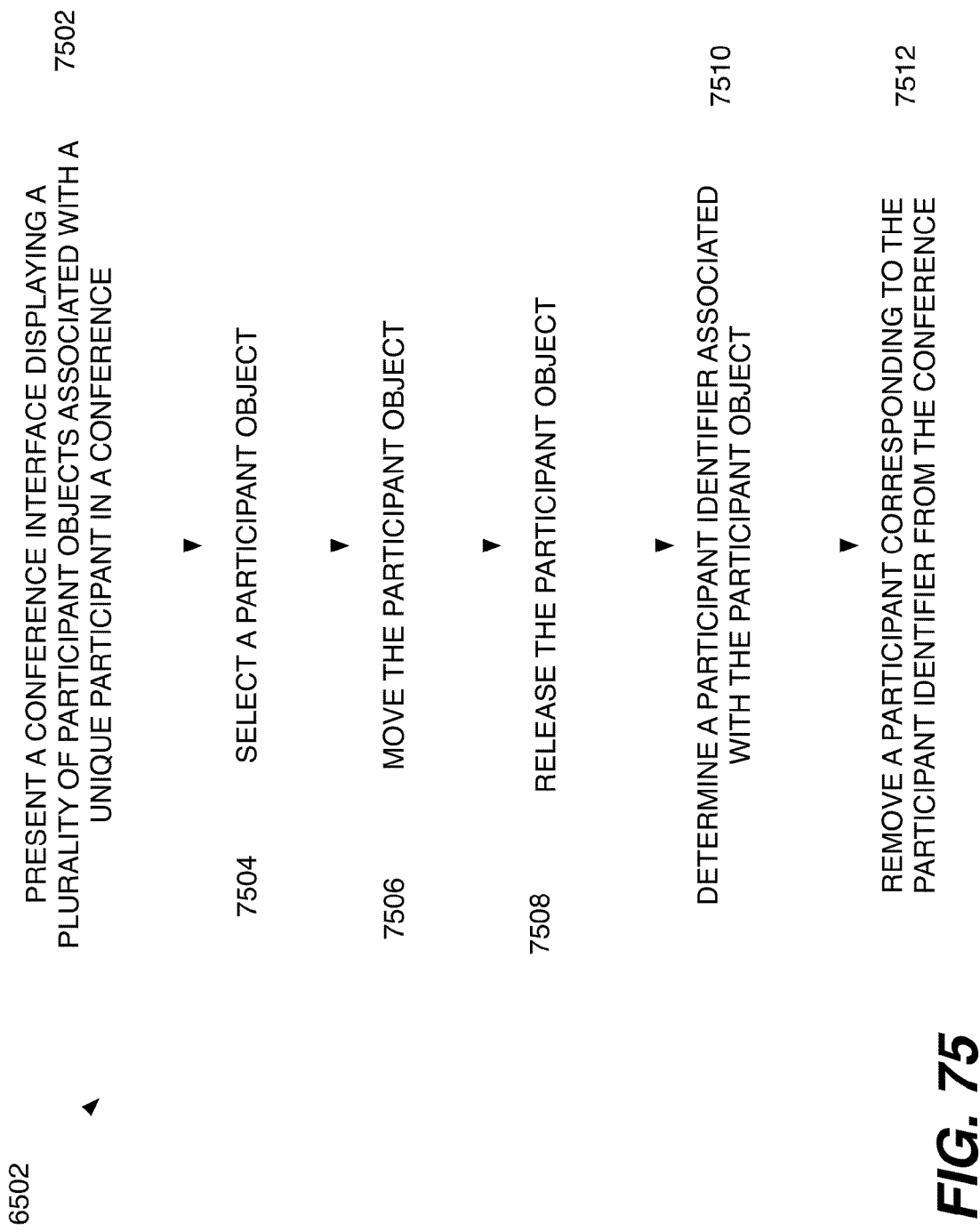
FIG. 75 is a flowchart illustrating the architecture, operation, and/or functionality of another embodiment of the drag-and-drop participant management module in the computing device of FIG. 65.

FIG. 75 illustrates the architecture, operation, and/or functionality of another embodiment of the participant management module(s) 6502 for implementing the participant removal feature. At block 7002, the client device 102 presents the conference interface with participant objects 4004 indicating who is currently participating in the conference. At block 7004, the participant management module 6502 determines that one of the participant objects 4004 has been selected via the graphical user interface 132. Depending on the particular input device and graphical user interface commands supported by the client device 102, the selected participant object 4004 may be moved away from an initial location (block 7506). At block 7508, the participant management module 6502 may be configured to monitor the location of the selected participant object 4004. At block 7508, the participant management module 6502 receives the remove participant command, which may be triggered by, for example, the release of the selected participant object 4004 a predetermined distance from the original location, at some predetermined location or capture region, or in other embodiments via any desirable input command (e.g., gesture, hotkey, key shortcuts, etc.). At block 7510, the participant management module 6502 may determine the identity of the selected participant object 4004. The participant object 4004 may be identified according to a system identifier (e.g., participant identifier 3802—FIG. 38) assigned by the conferencing system 106 for monitoring the participant within the conference. At block 7512, the participant management module 6502 initiates the removal of the participant object 4004 from the conference interface and disconnects the connection associated with the system identifier.

Referring to FIGS. 76-95, various embodiments of systems, methods, and computer programs (e.g., information distribution module(s) 6504—FIG. 65) will be described for distributing information between participants in an online conference via a graphical user interface 132. As described below in more detail, in general, the information distribution module(s) 6504 comprise the logic and/or functionality for enabling a user of the computing device 102 to distribute information between participants in the online conference by selecting and moving, via the conference interface, a source information object to a drop target associated with one or more participants. The selection and movement of the information objects may be implemented via a drag-and-drop functionality and any suitable input mechanisms, such as those described above or others.

The information distribution module(s) 6504 may be configured to control the selection and distribution of various types of information objects to participants in the online conference. An information object refers to any user interface component, to which a drag and drop operation may be performed, and which has an associated source information object. The information object may comprise a data file or programming code or a universal resource locator (URL) associated with a data file or programming code. It should be appreciated that the information source may be in the form of text, audio, video, graphics, etc. or any combination thereof. Furthermore, the information source may be stored on the computing device 102, the conferencing system 106, or any other system accessible by either the computing device 102 or the conferencing system 106.

Various information objects and methods of operation are described below with respect to another embodiment of a conference interface. FIGS. 76-80 illustrate an embodiment in which the information source comprises profile information associated with a participant object 4004 displayed by the conferencing system 106, and the profile information is added as a new contact to a participant's contact list. FIGS. 81-88 illustrate an embodiment in which the information source comprises one of the participant's information resources, and the information source is distributed to one or more participants in the online conference. FIGS. 89-95 illustrate an embodiment in which the information source comprises an information object introduced to the online conference via a collaboration application.

Figure 76:
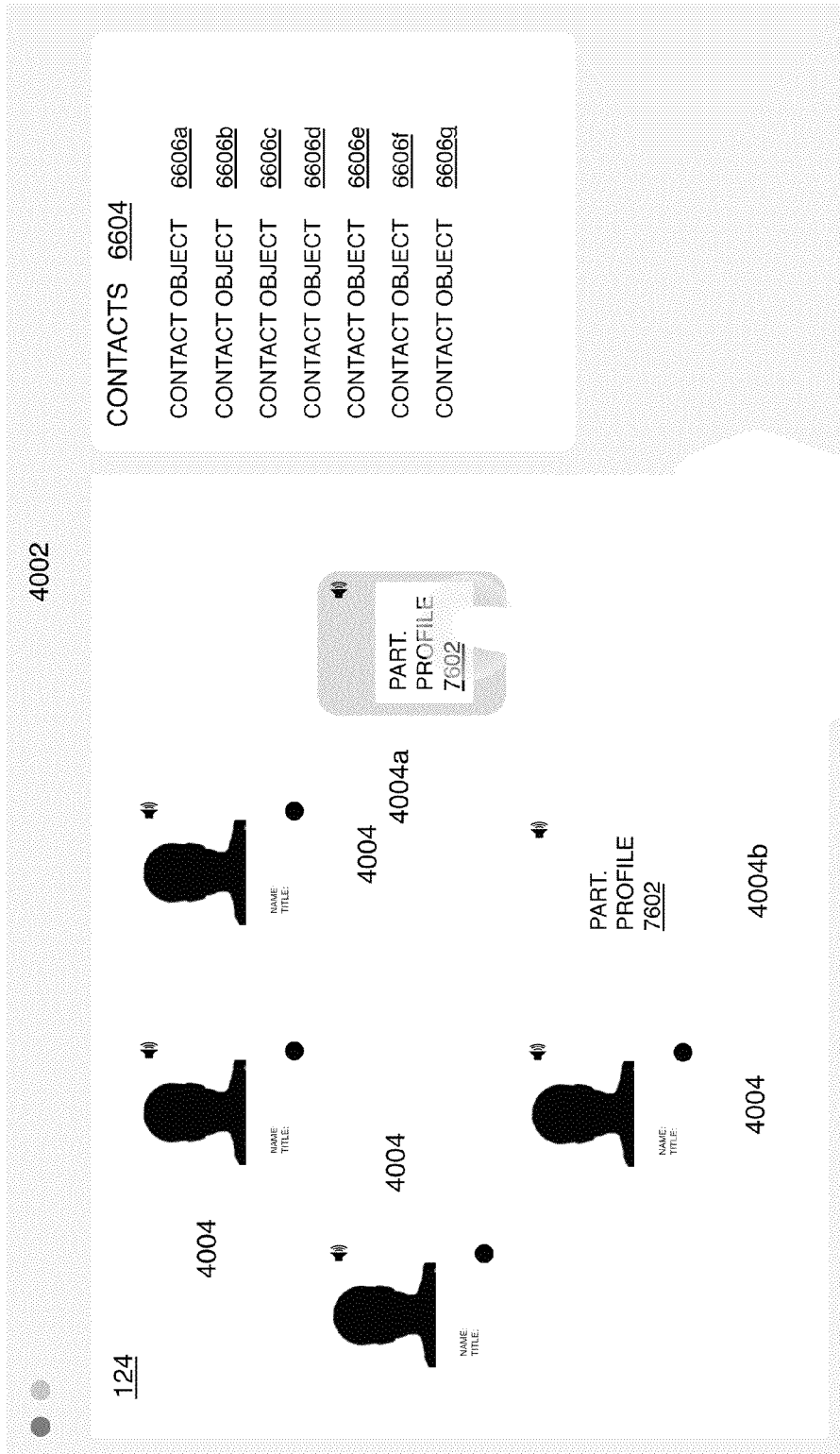
FIG. 76 is a user interface screen shot illustrating an embodiment of a conference interface for implementing aspects of the information distribution module(s) in the computing device of FIG. 65.

As illustrated in FIG. 76, the conference interface may be configured with a my contacts list 6604 comprising a plurality of contact objects 6606 and a screen portion 4002 in which each participant in the online conference is identified with a participant object 4002. The contacts list 6606 may be provided and/or managed by the conferencing system 106, an application operated by the computing device 102, a social networking computer system 3102, or other contact management application. As described above, the participant object 4002 may be associated with stored profile information identifying the participant. The profile information may comprise any desirable parameters, including those described above and illustrated in FIG. 38.

The profile information may be stored by the conferencing system 106 and obtained in any of the ways described above. In one embodiment, the profile information may be provided by a participant when accessing the conferencing system 106. In other embodiments, the profile information may be specified by participants during an audio conference 114 via the conference interface, obtained from local or remote call identification databases, or imported from other online services, such as search engines, social networking profiles, etc.

In operation, the drag-and-drop functionality enables a user of the computing device 102 to select a participant object 4002 (FIG. 76) and perform an input gesture or other input command (FIG. 77) to move the participant object 4002 to the contacts list 6604. The participant object 4002 may be selected in various ways depending on, for example, the configuration of the graphical user interface 132 and the input mechanism. In the embodiment illustrated in FIG. 76, the drag-and-drop functionality is provided via a touchscreen display 5004.

Figure 77:
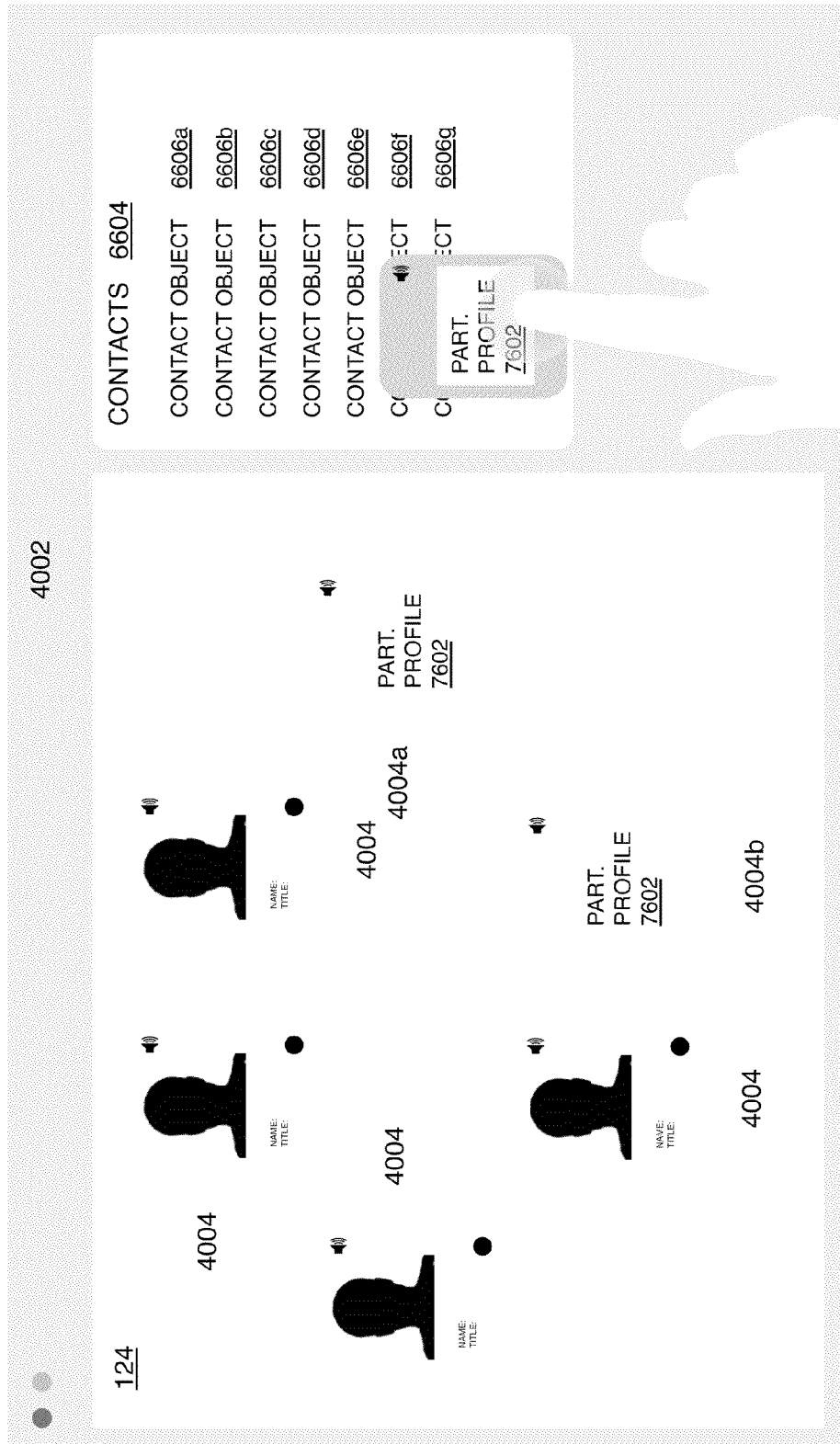
FIG. 77 illustrates the user interface screen shot of FIG. 66 in which the selected participant object has been moved to a contacts list to create a new contact.
Figure 78:
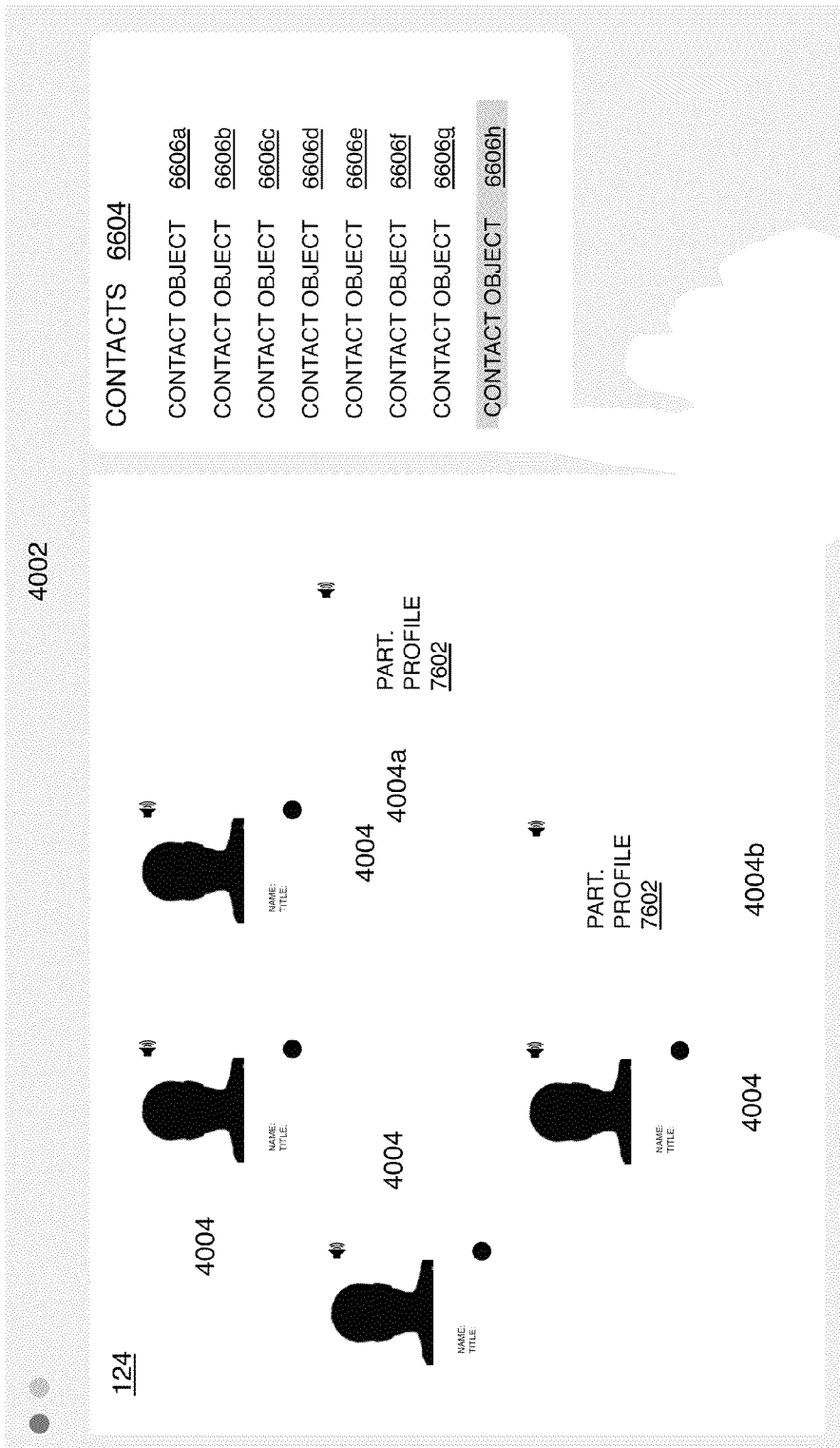
FIG. 78 illustrates the user interface screen shot of FIG. 66 in which the new contact is added to the contacts list.

After the participant object 4002 is selected, the user may perform any desirable gesture to move the selected participant object 4002 to the my contacts list 6604. As illustrated in FIG. 77, in one embodiment, the selected participant object 4002 may be moved with a drag operation. The drag operation may be configured to further monitor the location of the input mechanism (e.g., human or stylus touch, cursor, etc) while the participant object 4002 is selected. In the embodiment of FIG. 77, the participant object 4002 is moved at least partially within the display region of the contacts list 6604. The user may deselect the participant object 4002 within display region, which triggers an add-contact command that instructs the contact management application to create a new contact containing one or more of the profile parameters. As illustrated in FIG. 78, after the new contact is added to the contacts list 6604, a new contact object 6606*h* may be displayed in the contacts list 6604.

Figure 79:
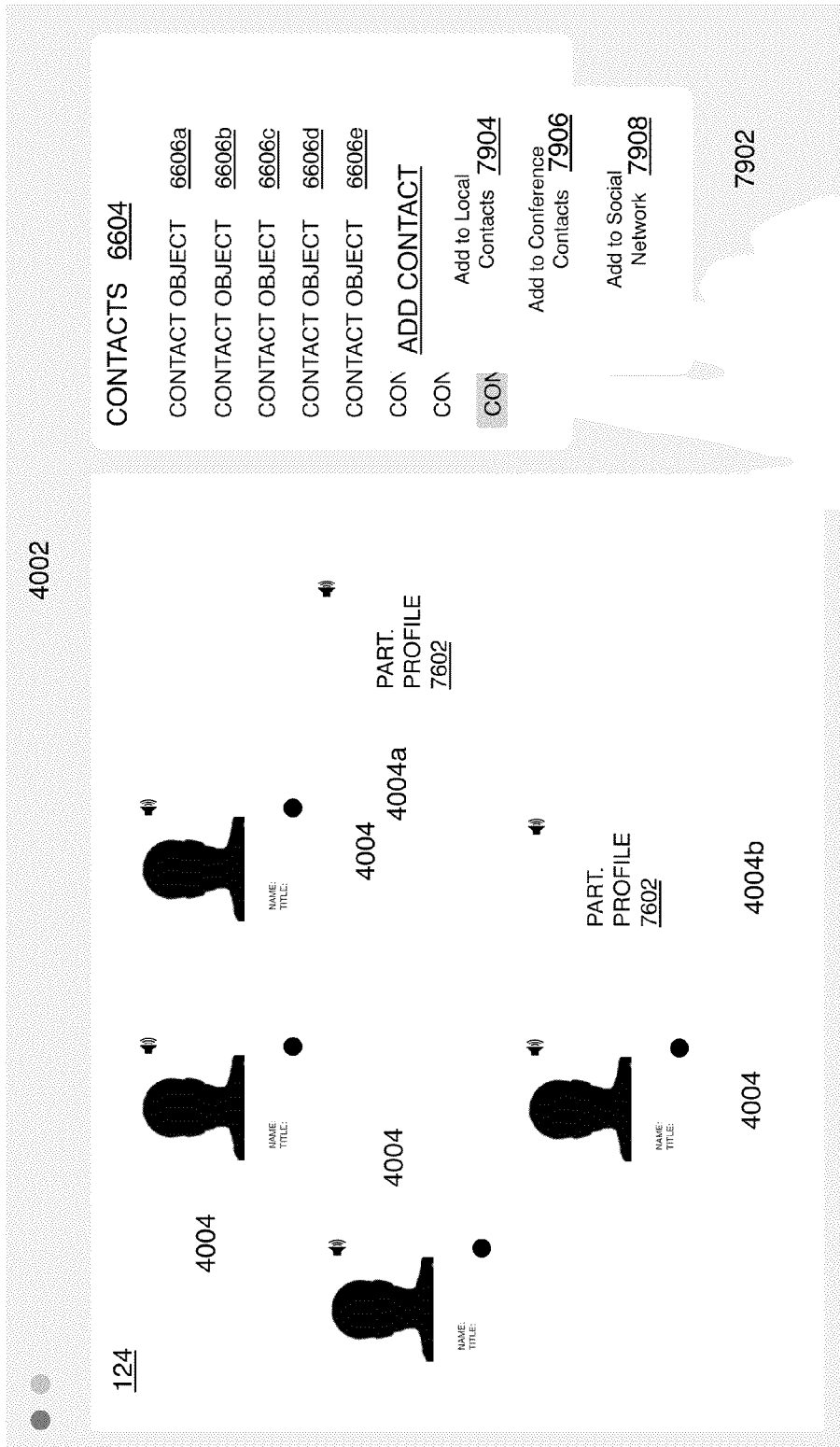
FIG. 79 illustrates the user interface screen shot of FIG. 66 with an "add contact" menu for specifying a target database for storing the new contact.

It should be appreciated that the selected participant object 4002 need not be moved within the contacts list 6604 to initiate the add contact command. The conference interface may include a separate screen portion for dropping or otherwise capturing the participant object 4002 as a new contact. The separate screen portion may be included within the screen portion 4002 or any other location within the conference interface. It should be further appreciated that the graphical user interface 132 may support other input gestures or mouse-driven commands for implementing the drag-and-drop or similar functionality. For example, in one embodiment, a participant object 4002 may be "flicked" toward the capture region or drop target using monitored location and/or acceleration parameters. In other embodiments, the participant object 4002 may be added as a new contact via a hotkey or other keyboard input or a selectable menu. For example, when a participant object 4002 is selected, a menu 7902 may be automatically or selectively displayed with an add contact prompt (FIG. 79). The menu 7902 may include options for enabling the user to specify the location of the contacts list. For example, the contact may be added to, for example, a local contacts list, a social network list, or to a list maintained by the conferencing system 106. In response to the selection from the user, the add contact command may be configured with appropriate parameters to communicate with the participant contact management application specified by the user, including, for example, automatically or selectively inviting the contact to join the user's social networking list.

Figure 80:
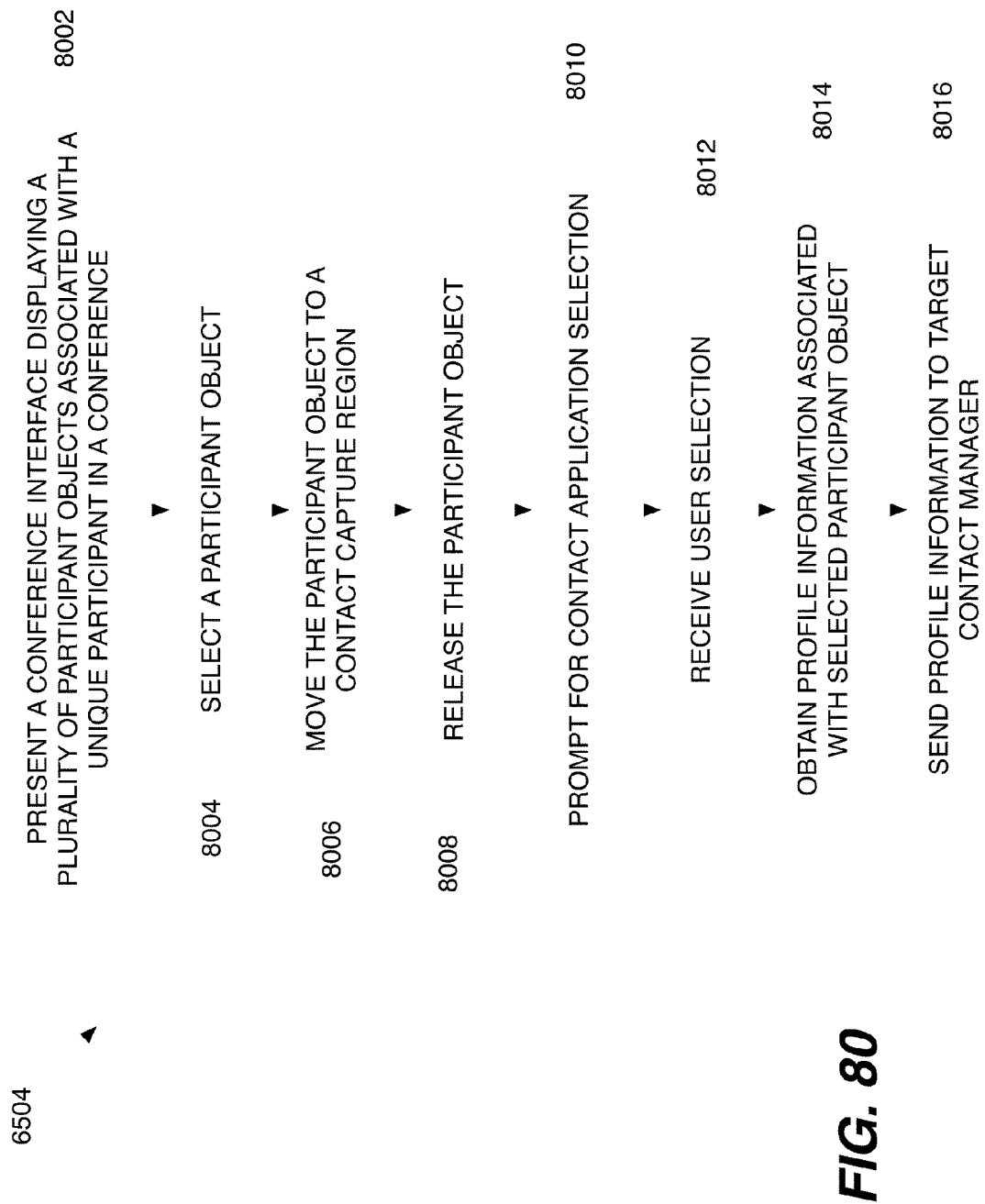
FIG. 80 is a flowchart illustrating the architecture, operation, and/or functionality of an embodiment of the information distribution module(s) in the computing device of FIG. 65.

FIG. 80 illustrates the architecture, operation, and/or functionality of an embodiment of the information distribution module(s) 6504 for implementing the above-described add-contact features. At block 8002, the client device 102 presents the conference interface displaying a plurality of participant objects 4002 that identify the participants in the conference. The client device 102 may also present the contacts list 6604. At block 8004, the information distribution module 6504 determines that one of the participant objects 4002 has been selected via the graphical user interface 132. Depending on the particular input device and graphical user interface commands supported by the client device 102, the selected participant object 4002 may be moved to the contacts list 6604 or other capture region (block 8006). At block 8008, the information distribution module 6504 may be configured to monitor the location of the selected participant object 4002 and determine that the object has been released at the drop target. In response to the release of the object, the menu 7902 (FIG. 79) may be presented to prompt the user for a contact application (block 8010). At block 8012, the information distribution module 6504 receives the user selection and initiates the add-contact command. At block 8014, the information distribution module 6504 may determine the profile information associated with the selected participant object 4002. The profile parameters may be obtained from a local application or a remote service, such as the conferencing system 106 or social networking system 3102. At block 8016, the add-contact command initiates the process of adding the contact to the online conference and sends the profile information to the selected contact application.

Figure 81:
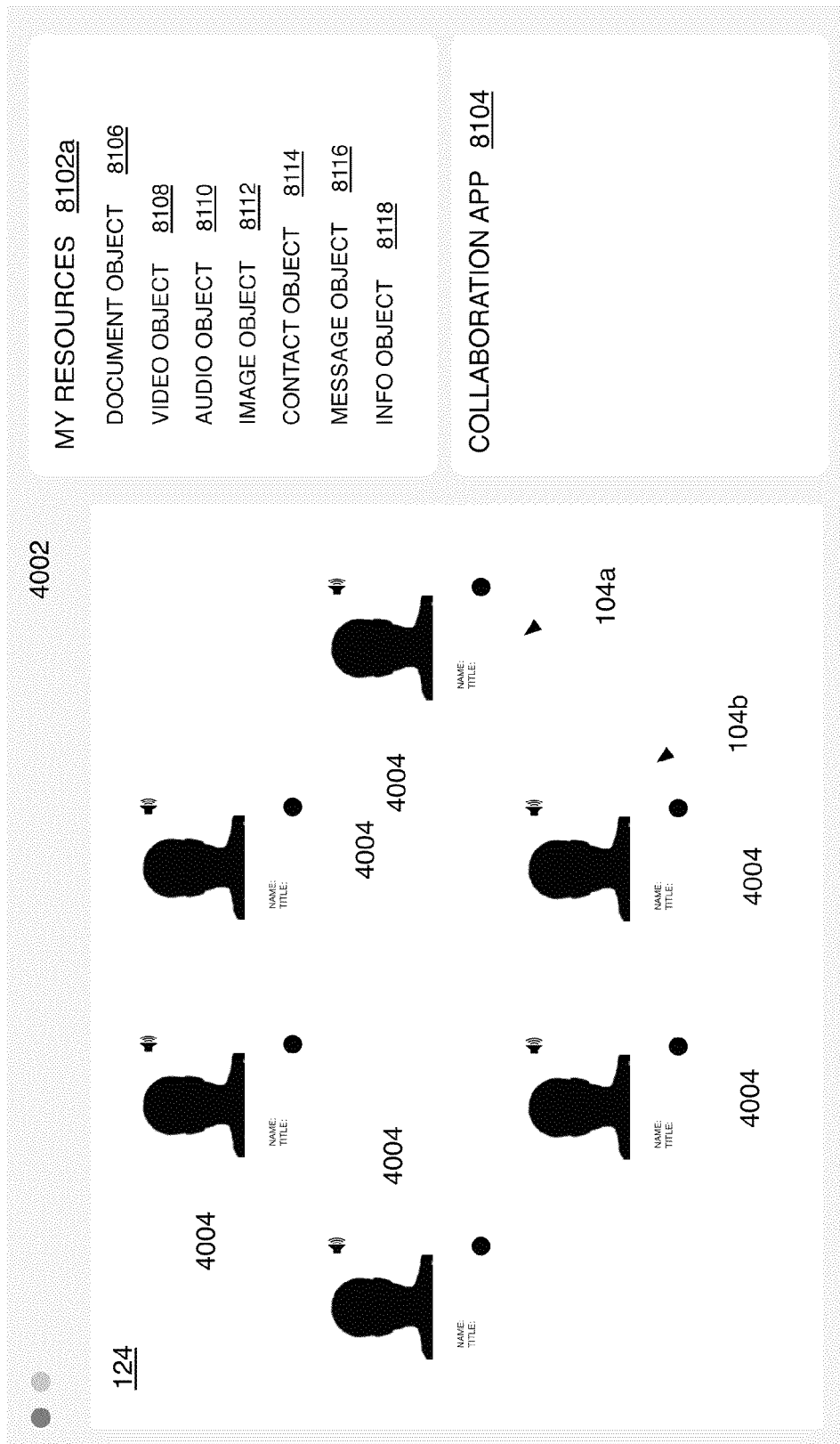
FIG. 81 is a user interface screen shot illustrating another embodiment of a user interface, from the perspective of a first participant, for implementing additional aspects of the information distribution module(s) in the computing device of FIG. 65.

In another embodiment as illustrated in FIG. 81, a conference interface 8100a may be configured with a my resources list 8102 that displays user interface objects associated with one or more information sources. The information objects may comprise, for example, a document object 8106 corresponding to a document, a video object 8108 corresponding to a video, an audio object 8110 corresponding to an audio clip, an image object 8112 corresponding to an image, a contact object 8114 corresponding to a contact (e.g., contact objects 6606), a message object 8116 corresponding to an email, text message, blog post, social networking update, etc. or any other information object 8118. In one embodiment, the my resources list 8102 comprises a file browser window for browsing files stored in memory 404. In this regard, the information objects 8118 may comprise an icon identifying one or more files or folders. The my resources list 8102 may interface with a web service such as, for example, a video, audio, or image hosting site. The information objects 8118 may include selectable objects identifying the underlying embedded code or the location of the hosted file. In further embodiments, the my resources list 8102 may interface with and display messages, videos, documents, files, etc. shared via a social networking system 3102.

The conference interface 8100a may include the screen portion 4002 that displays a participant object 4002 identifying each participant in the online conference. The conference interface 8100a (FIGS. 81-85) corresponds to a version of the conference interface 8100 presented to a first participant 104a. The conference interface 8100b (FIGS. 86 & 87) corresponds to a version of the conference interface 8100 presented to a second participant 104b. The screen portion 4002 is similar for versions 8100a and 8100b, although the my resources list 8102 may be individually configured by each respective participant 104 to display their own unique information objects 8118.

Figure 82:
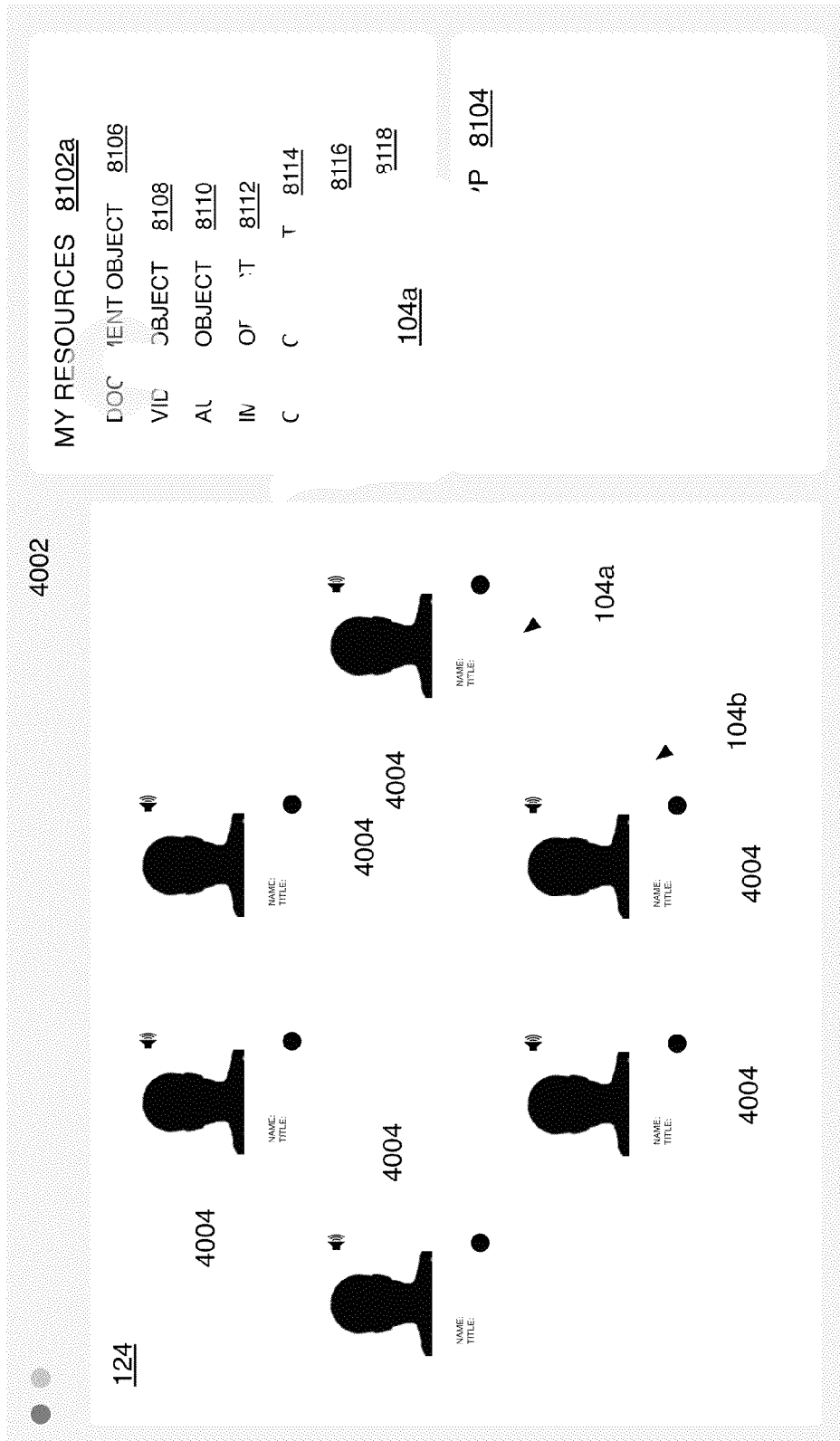
FIG. 82 illustrates the user interface screen shot of FIG. 81 in which a document object has been selected.
Figure 83:
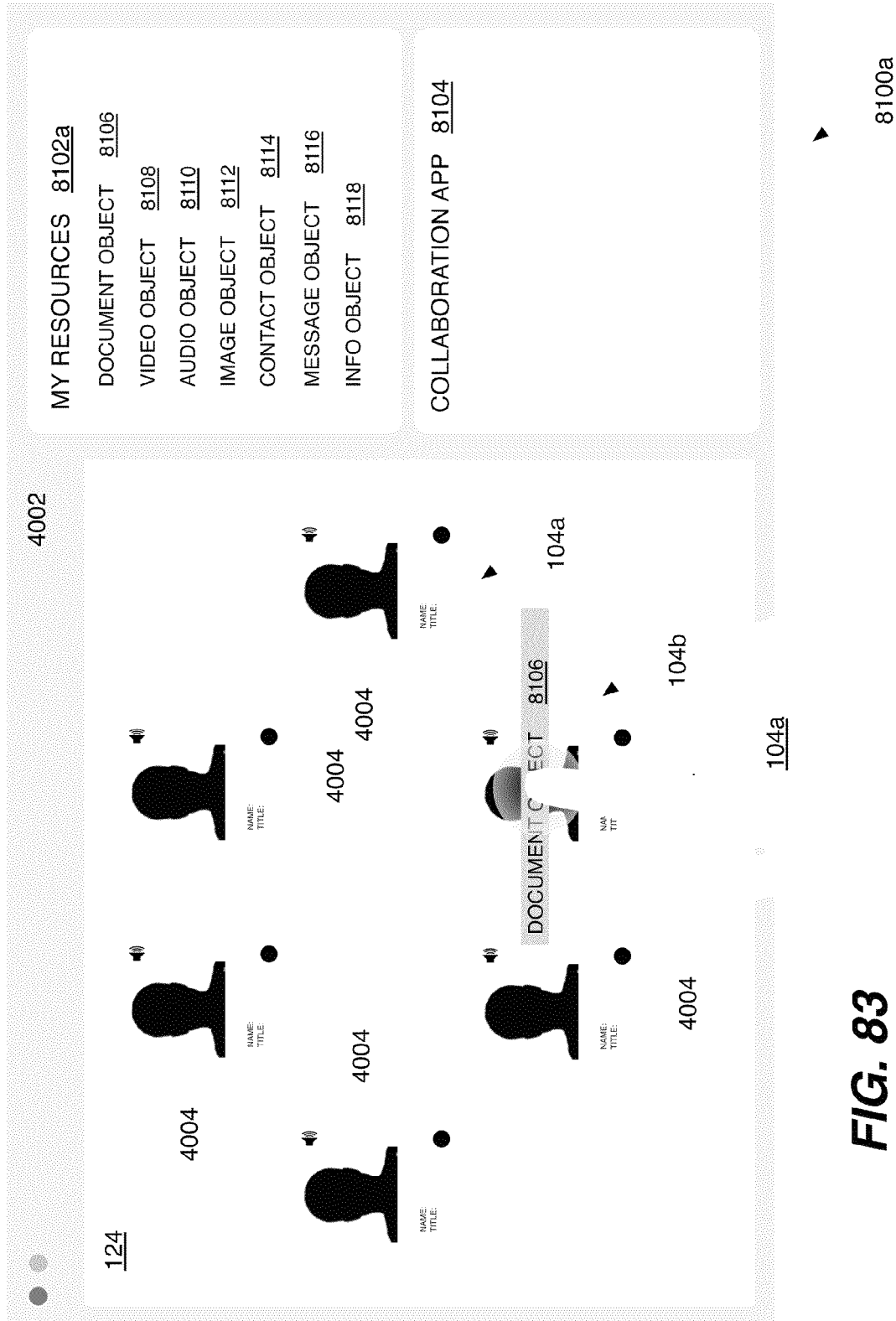
FIG. 83 illustrates the user interface screen shot of FIG. 81 in which a document is distributed to a participant by dropping the selected document object to a participant object in the conference interface.
Figure 84:
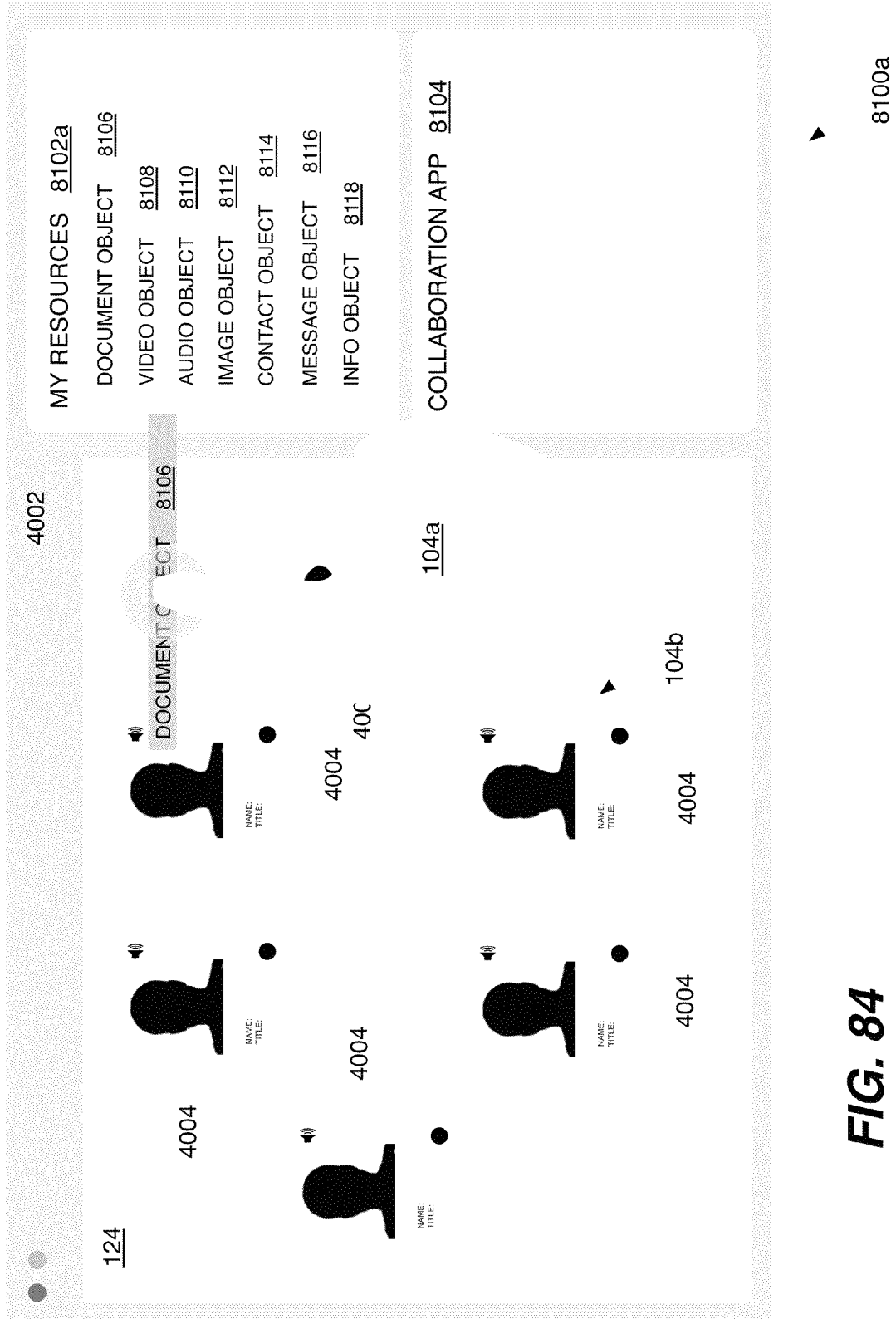
FIG. 84 illustrates the user interface screen shot of FIG. 81 in which the document is distributed to all participants in the conference by dropping the selected document object within the conference interface.

In this embodiment, the drag-and-drop functionality enables a user (e.g., the first participant 104a) to select one of the information objects 8118 and distribute the associated information source to one more of the other participants in the conference. In FIG. 82, the first participant 104a has selected a document object 8106. In the manner described above, the first participant 104a may perform an input gesture or other input command to move the selected document 8106 to the conference interface. The document object 8106 may be moved to a participant object 4004 (FIG. 83) to distribute the document to the corresponding participant (i.e., the second participant 104b). In other embodiments (FIG. 84), the document object 8106 may be moved to a predetermined location or drop target within the screen portion 4002 to distribute the document to all of the participants in the online conference.

The document object 8106 may be selected in various ways depending on, for example, the configuration of the graphical user interface 132 and the input mechanism. In the embodiment illustrated in FIG. 82, the drag-and-drop functionality is provided via a touchscreen display 5004. After the document object 8106 is selected, the user may perform any desirable gesture to move the selected document object 8106 to the drop target. The first participant 104a may deselect the document object 8106 to trigger a distribute object command that initiates delivery of the information source to the selected participants. A menu 8502 (FIG. 85) may be displayed to enable the first participant 104a to select one or more delivery parameters. An email button 8504 may be selected to deliver the document to an email address stored in the participant profile associated with the participant object(s) 4002. A conference profile button 8506 may be selected to store the information source by the conferencing system 106. The conferencing system 106 may store the information source at a designated participant profile or otherwise enable the participants 104 to access the information source (e.g., download, select a link). The online profile button 8508 may be selected to send the information source (or a link to the information source) to the participant's social networking profile.

Figure 86:
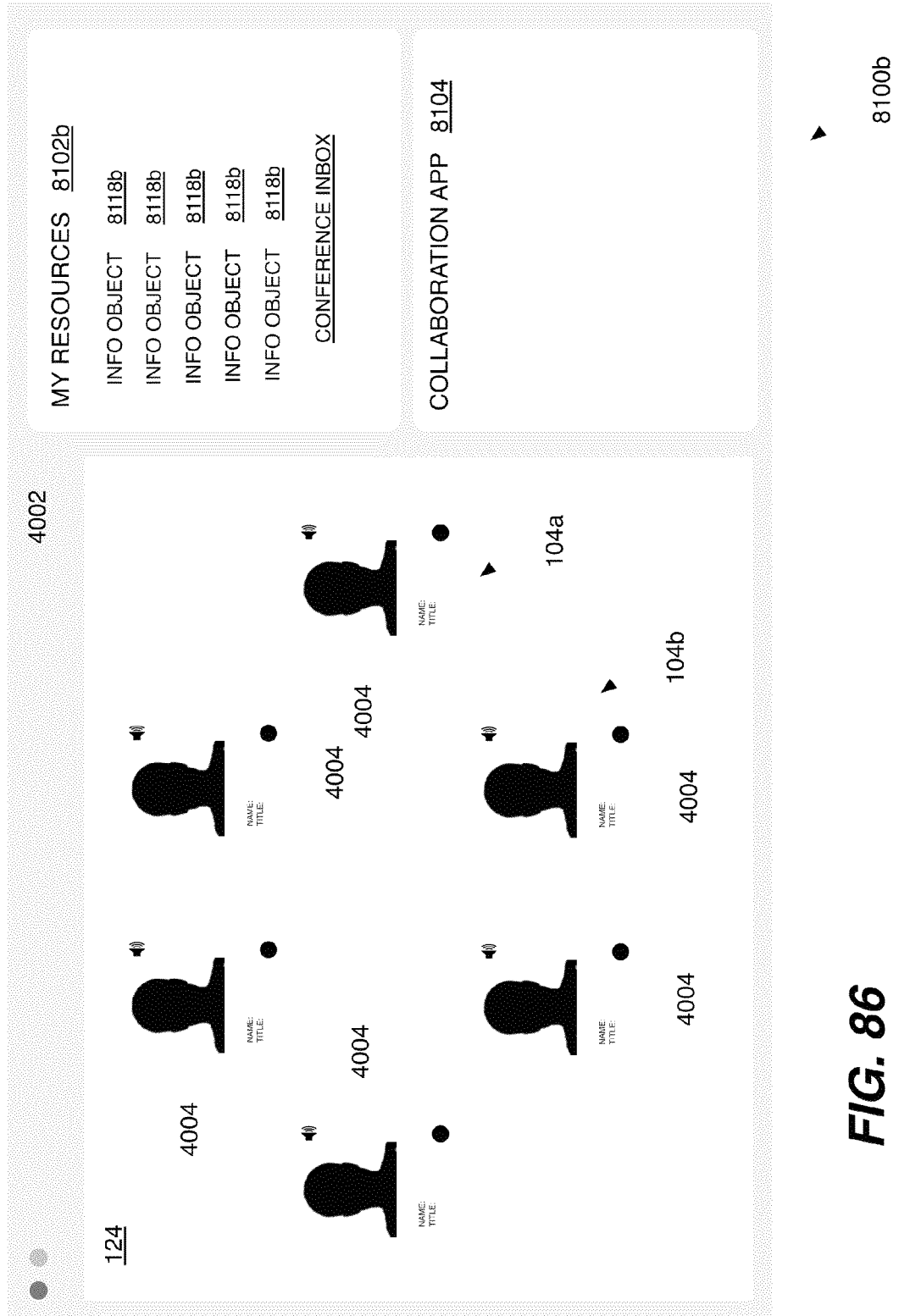
FIG. 86 illustrates the user interface screen shot of FIG. 81, from the perspective of a second participant, who is to receive a document from the first participant.
Figure 87:
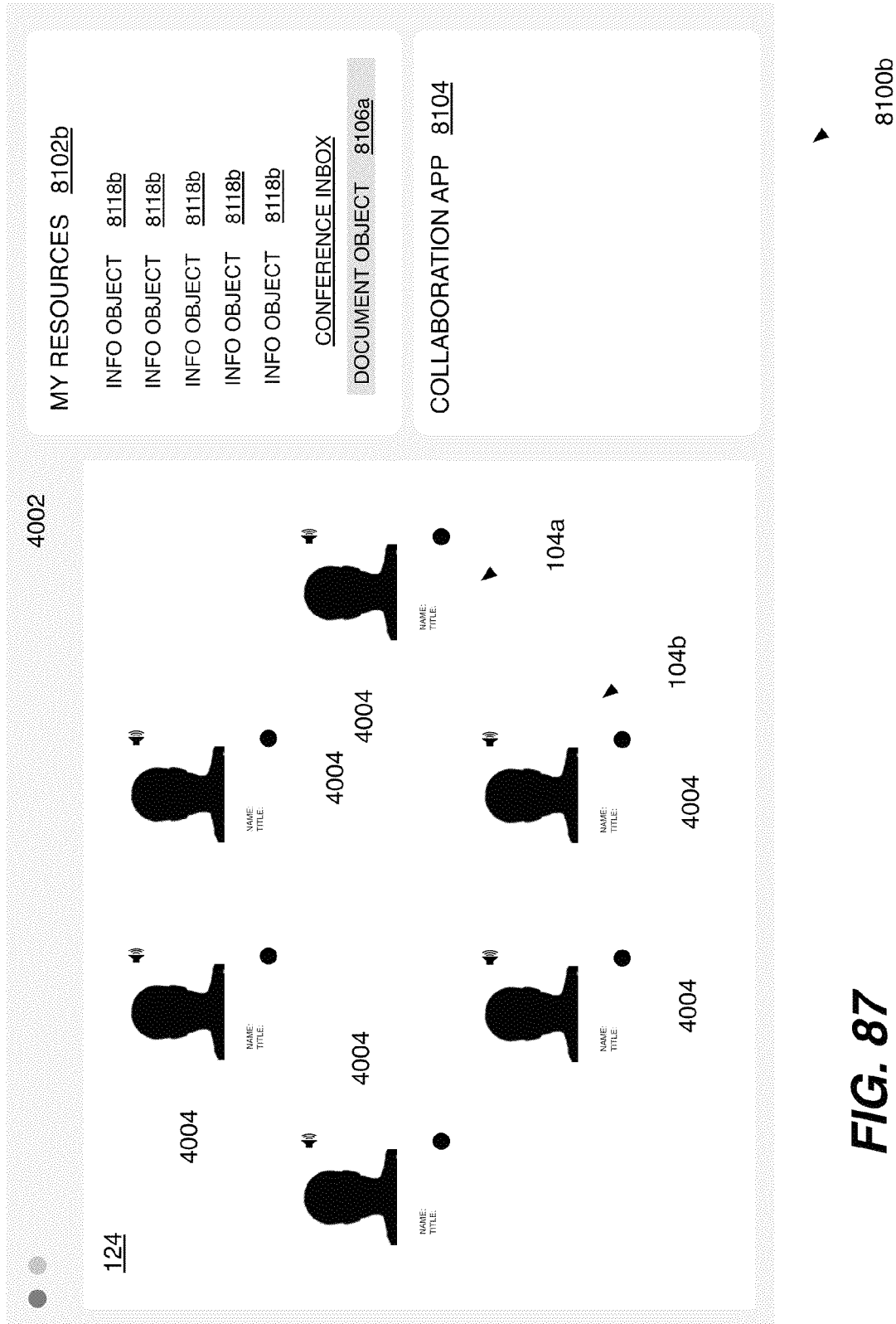
FIG. 87 illustrates the user interface of FIG. 86 after the document has been distributed to the second participant from the first participant.

FIG. 86 illustrates the conference interface of the second participant 104b before the document object 8116 has been distributed by the first participant 104a. The second version 8100b of the conference interface 8100 may include a "Conference Inbox" which is managed by the conferencing system 106 and enables participants to conveniently share information resources within the conference. Assuming that the first participant 104a selects to distribute the selected document object 8106b to the second participant 104b via the conferencing system 106, FIG. 87 shows that the selected document object 8106b has been displayed in the second participant's "Conference Inbox." The second participant 104b may access the document by selecting the document object 8106a.

Figure 88:
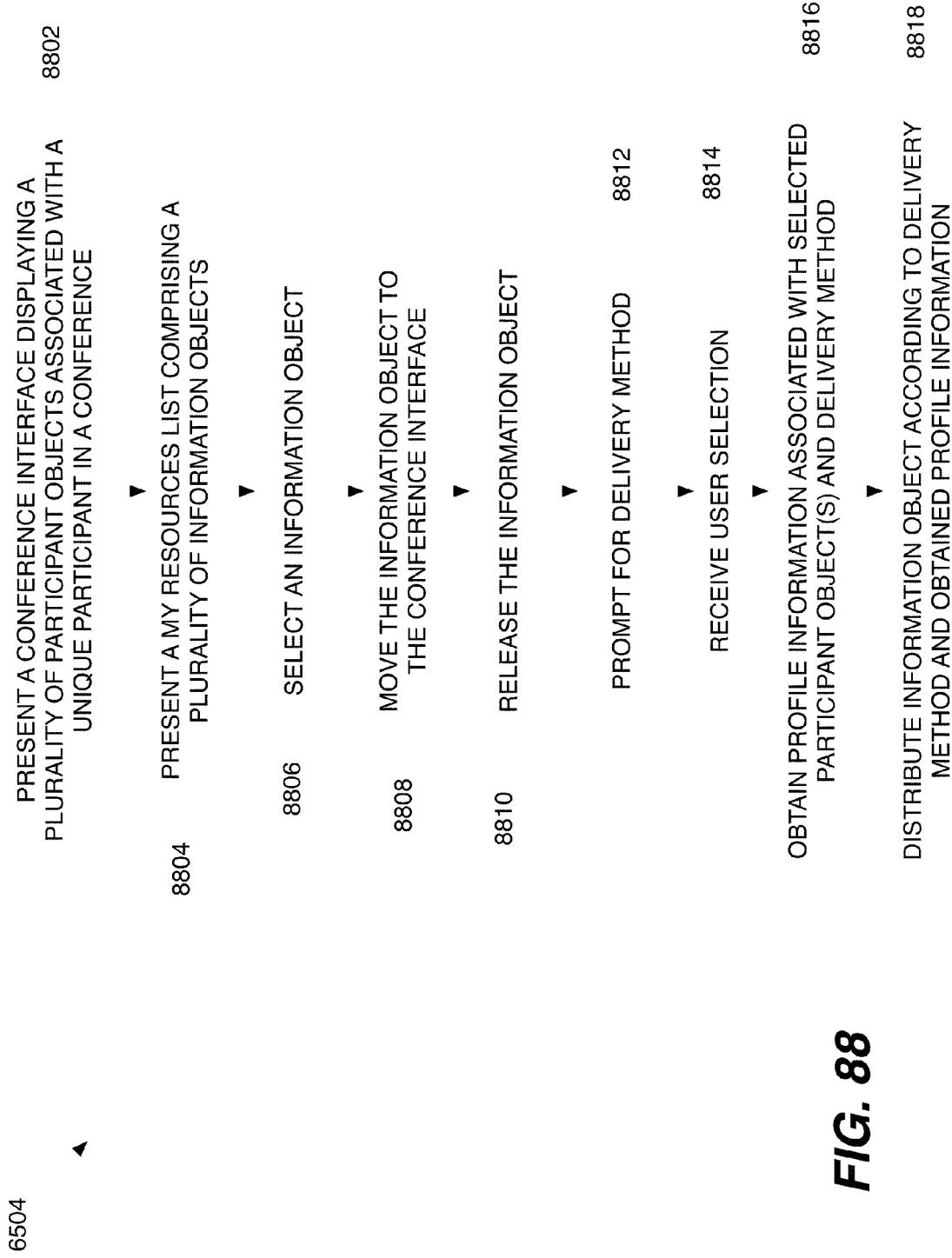
FIG. 88 illustrates the architecture, operation, and/or functionality of another embodiment of the information distribution module(s) in the computing device of FIG. 65.
Figure 89:
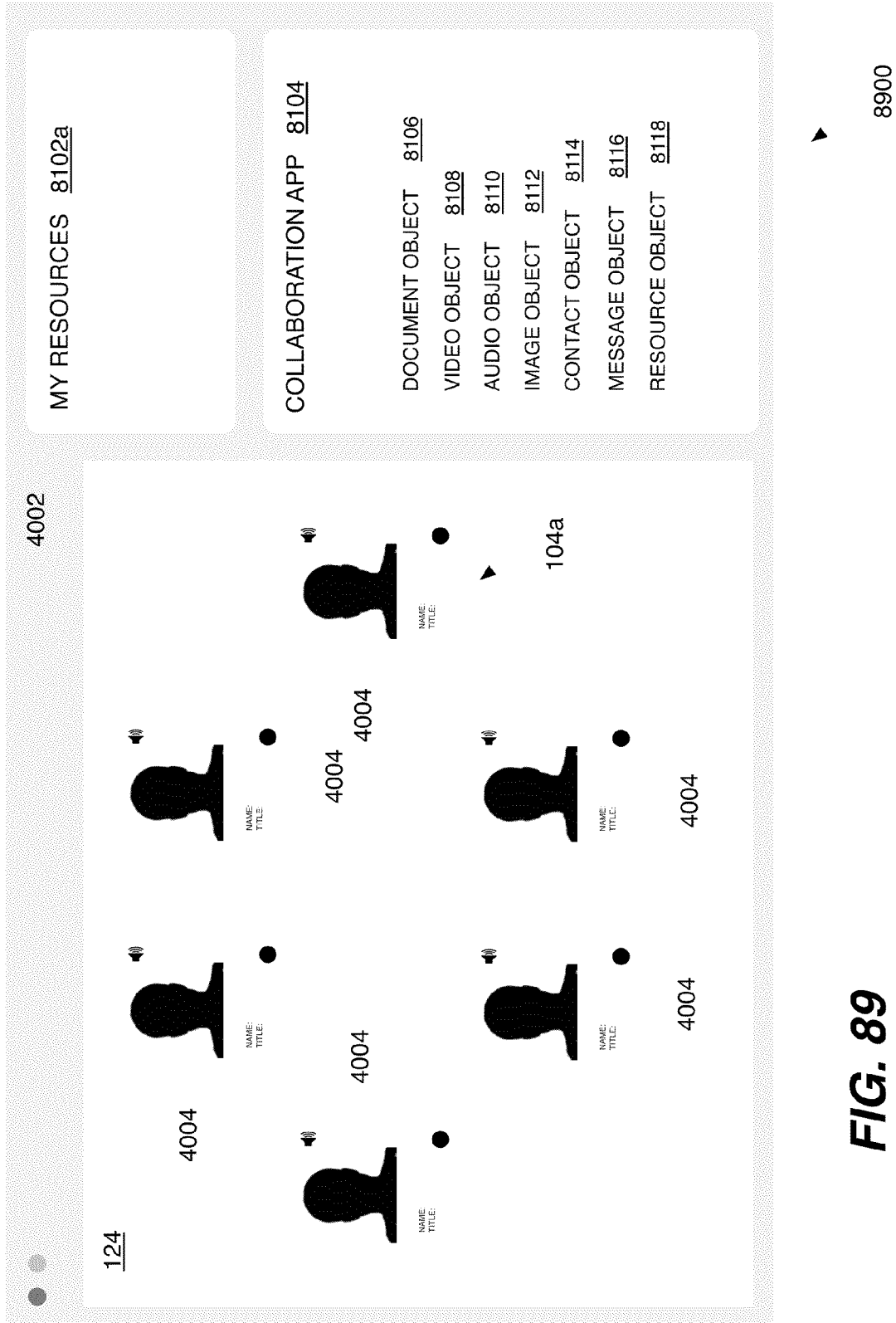
FIG. 89 is a user interface screen shot illustrating another embodiment of a conference interface for implementing further aspects of the information distribution module(s) in the client device of FIG. 65.

FIG. 88 illustrates the architecture, operation, and/or functionality of an embodiment of the information distribution module(s) 6504 for implementing the above-described information distribution features. At block 8802, the client device 102 presents the conference interface, which displays a plurality of participant objects 4002 that identify the participants in the conference. At block 8804, the client device 102 presents a user interface component (e.g., my resources list 8102) that displays a plurality of information objects 8118. At block 8806, the information distribution module 6504 determines that one of the information objects 8118 has been selected via the graphical user interface 132. At block 8008, the information distribution module 6504 may be configured to monitor the location of the selected participant object 4002 and determine that the object has been moved to a drop target in the conference interface. In response to the release of the object, a menu 8502 (FIG. 85) may be presented to prompt the user to specify a method for delivering the information source to the participant(s) (block 8812). At block 8814, the information distribution module 6504 receives the user selection and initiates the distribute-object command. At block 8816, the information distribution module 6504 may determine the profile information associated with the selected participant object 4002 and delivery method. For example, the first participant 104a may select to deliver the document to the second participant 104b via email. The information distribution module 6504 may access the stored profile associated with the second participant 104, identify the email address, and then initiate the delivery of the document to the email address (block 8818).

FIGS. 89-95 illustrate another embodiment of an information distribution method via a conference interface 8900. In this embodiment, the conference interface includes a collaboration application 8104. In general, the collaboration application 8104 comprises a shared space within the conference interface that enables the participants to share information (e.g., text, audio, video, images, etc.). In one embodiment, the collaboration application 8104 may support a simple notes or chat-type application that enables each participant to insert text within a shared user interface. In other embodiments, the collaboration application 8104 may comprise a whiteboard-type functionality that supports a drawing function. It should be appreciated that the collaboration application 8104 may support any desirable functionality for enabling the participants to share information regardless the medium. The shared information comprises, for example, text, images, video, audio, graphics, etc., or any combination thereof. The collaboration application 8104 may include logic for enabling the participant to specify the type of information being shared or, in some embodiments, the collaboration application 8104 may automatically determine the type of information source. In this regard, the collaboration application 8104 may present the shared information as a plurality of information objects 8118. The conference interface 8900 may include the screen portion 4002 that displays a participant object 4002 identifying each participant in the online conference, as well as a my resources list 8102 (or similar functionality).

Figure 90:
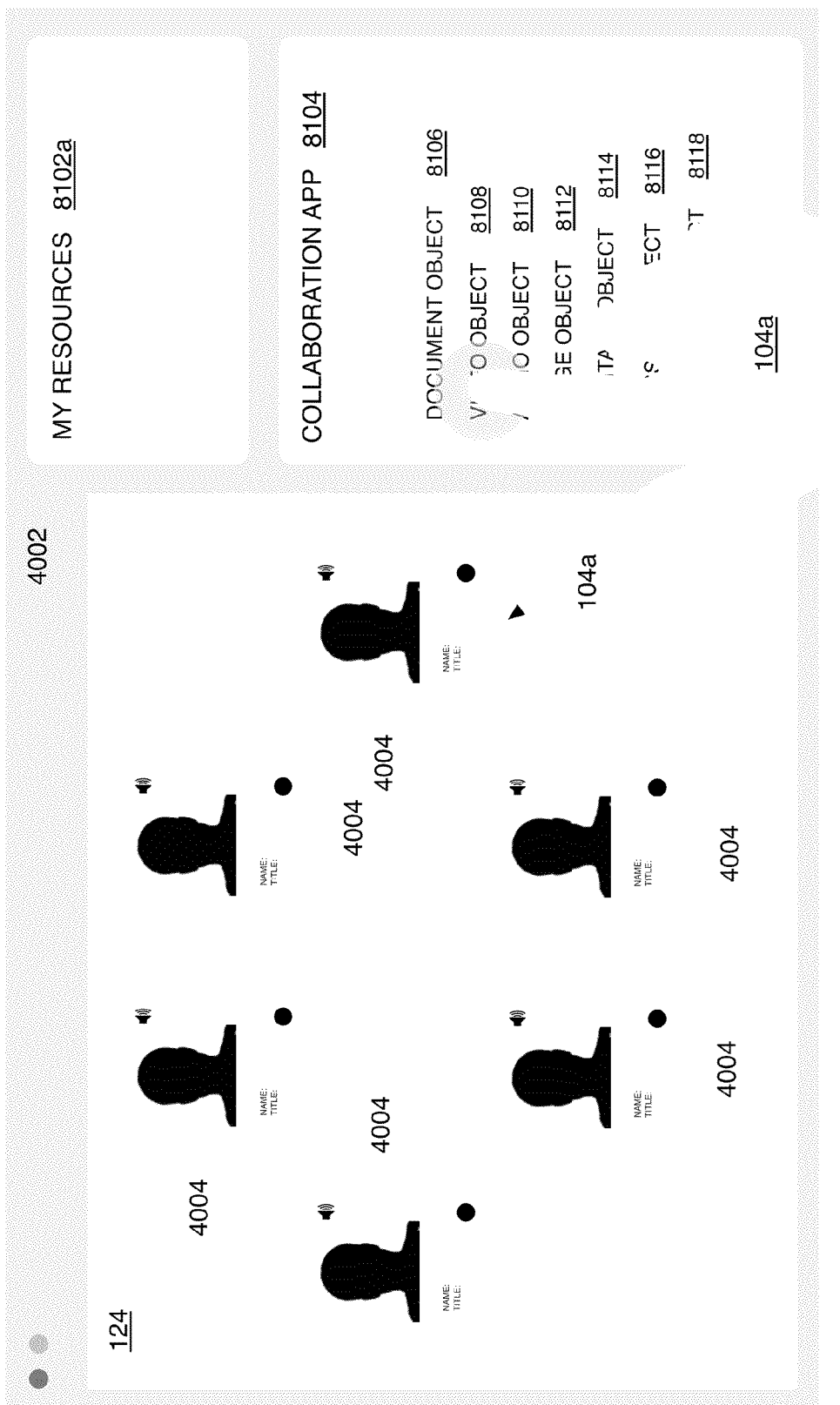
FIG. 90 illustrates the user interface screen shot of FIG. 89 in which a video object from the collaboration application has been selected.
Figure 91:
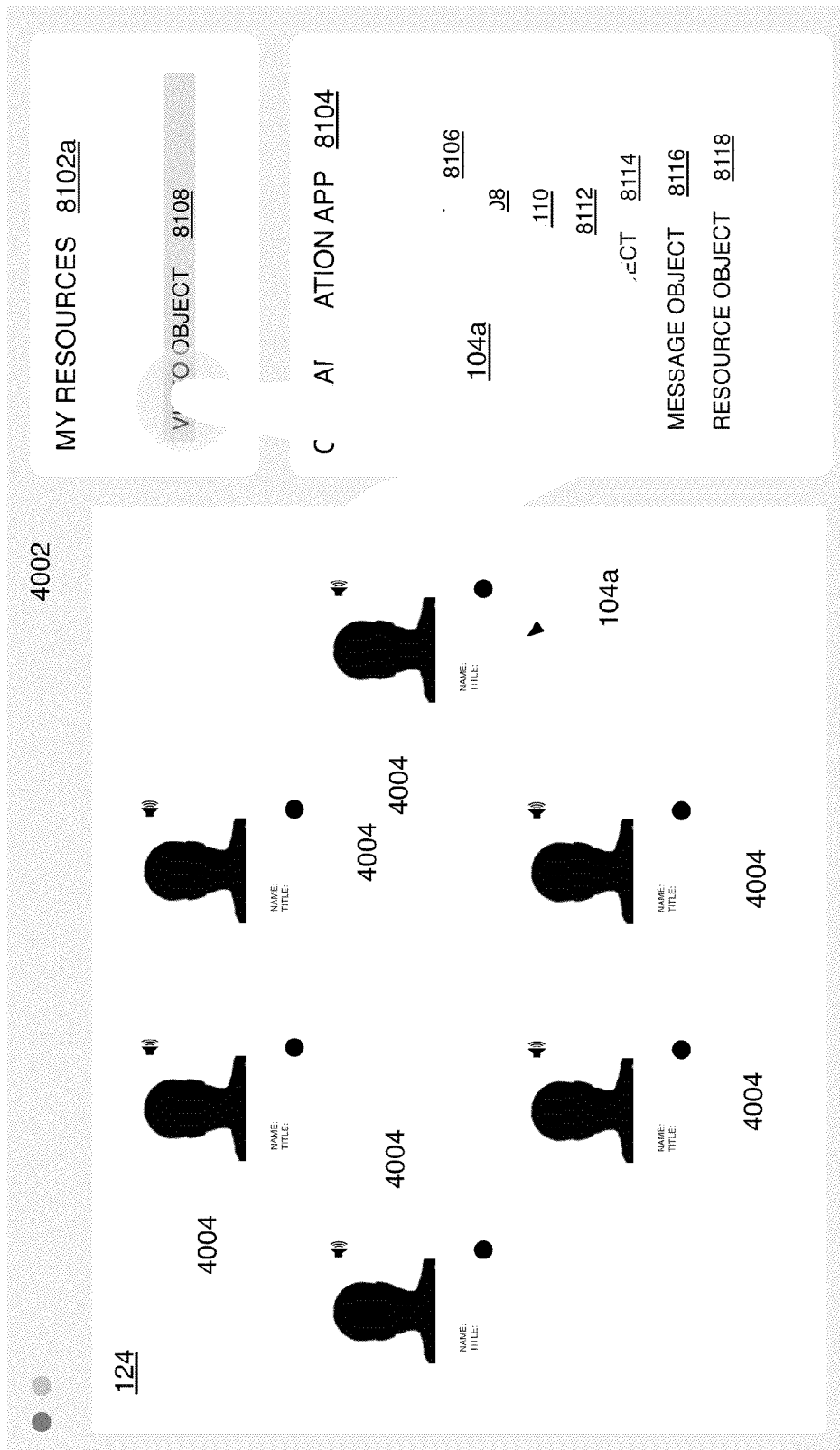
FIG. 91 illustrates the user interface screen shot of FIG. 89 in which the selected video object is distributed to a participant by moving the selected video object from the collaboration application to a "my resources" window.
Figure 92:
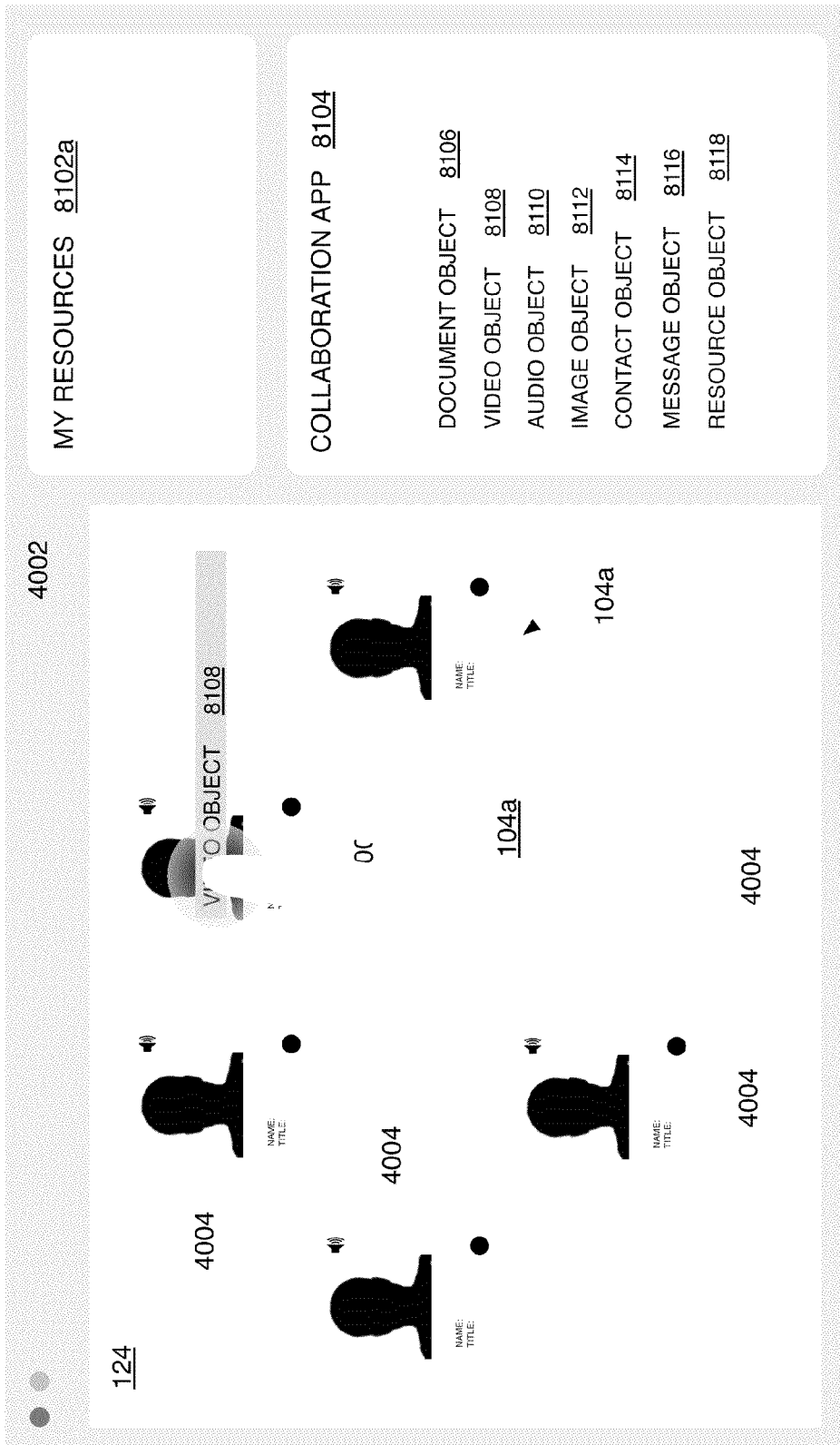
FIG. 92 illustrates the user interface screen shot of FIG. 89 in which the selected video object is distributed to a participant by moving the selected video object from the collaboration application to a participant object.
Figure 93:
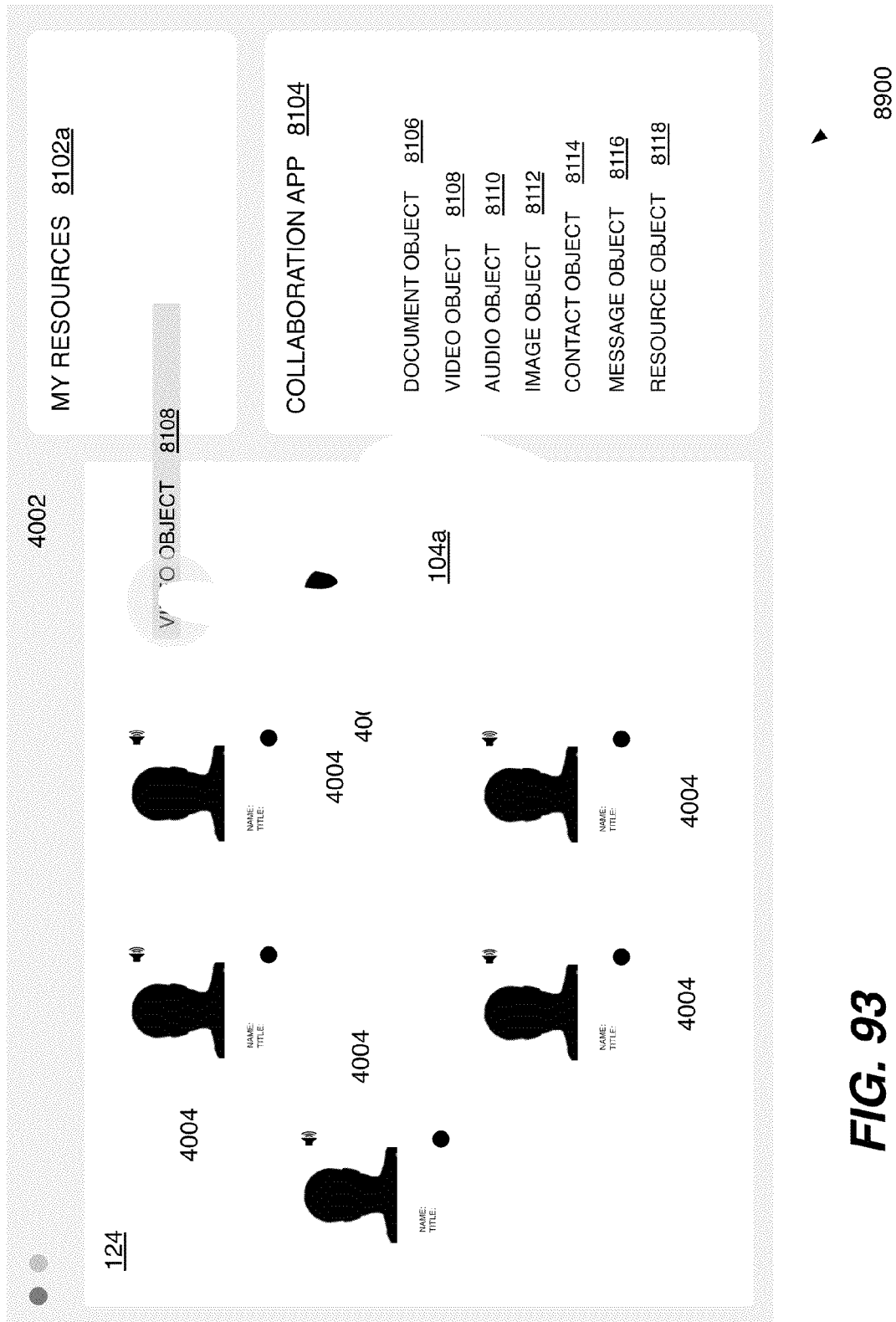
FIG. 93 illustrates the user interface screen shot of FIG. 89 in which the selected video object is distributed to all participants in the conference by moving the selected video object from the collaboration application to the conference interface.
Figure 94A:
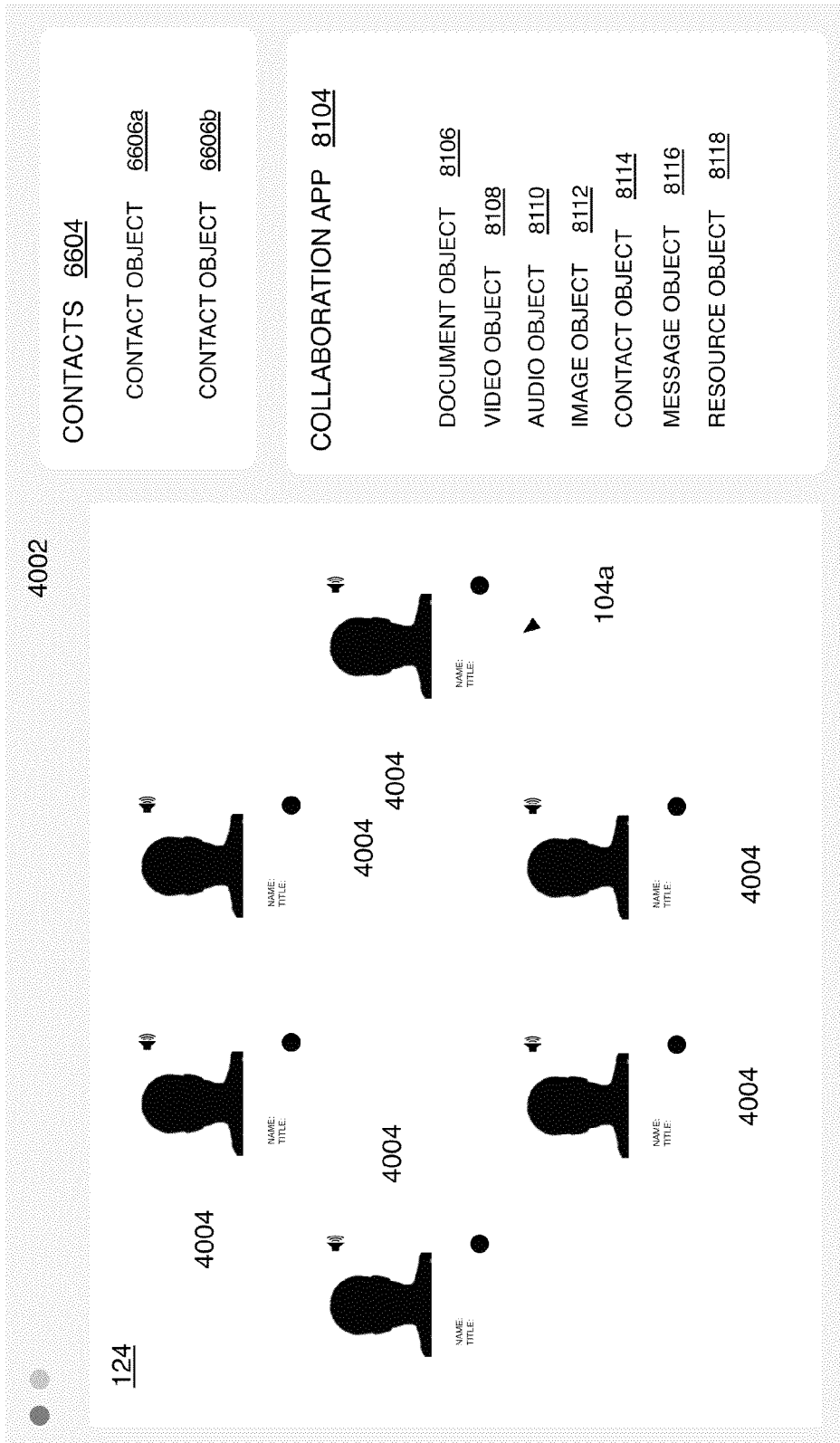
FIG. 94a is a user interface screen shot illustrating another embodiment of a conference interface for implementing further aspects of the information distribution module(s) in the client device of FIG. 65.
Figure 94B:
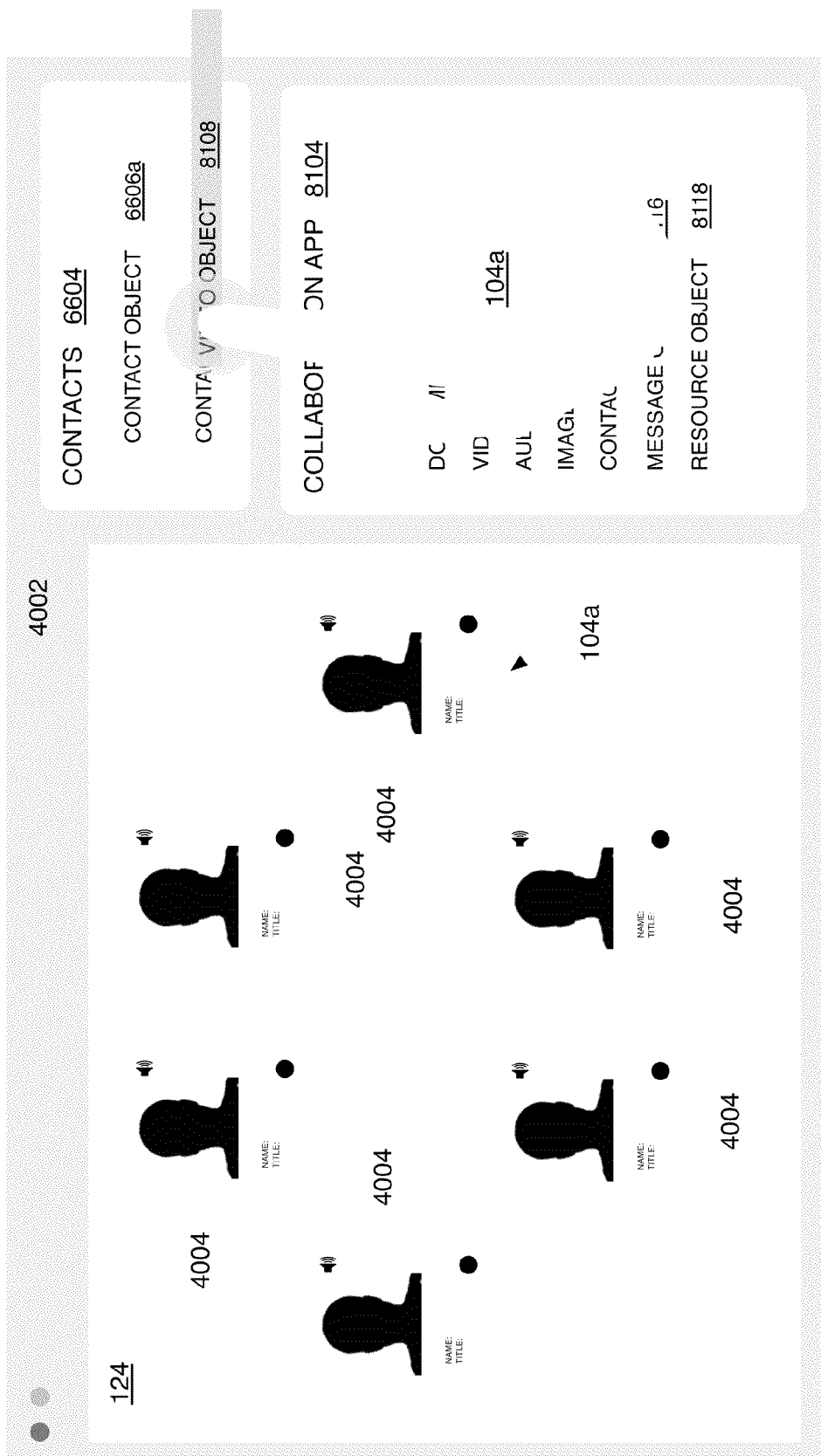
FIG. 94b illustrates the user interface screen shot of FIG. 94a in which the selected video object is distributed to a non-participant by moving the selected video object from the collaboration application to a contact object displayed in a contacts list.

In this embodiment, the drag-and-drop functionality enables a user to select one of the information objects 8118 displayed in collaboration application 8104 and distribute the associated information source to one more of the other participants in the conference. In FIG. 90, the participant 104a has selected a video object 8106 that has been shared by one of the participants in the conference. In the manner described above, the participant 104a may perform an input gesture or other input command to move the selected video 8108 to the conference interface, the my resources list, or other drop target. The video object 8108 may be moved to a participant object 4004 (FIG. 92) to distribute the video to the corresponding participant. In other embodiments (FIG. 93), the video object 8108 may be moved to a predetermined location or drop target within the screen portion 4002 to distribute the video to all of the participants in the online conference. The video object 8108 may also be dragged and dropped to the my resources list 8102. As illustrated in FIGS. 94a & 94b, the user may also distribute information objects 8118 from the collaboration application 8104 to non-participants by dropping the selected objects to, for example, a contact object 6606 displayed in the contacts list 6604.

Figure 85:
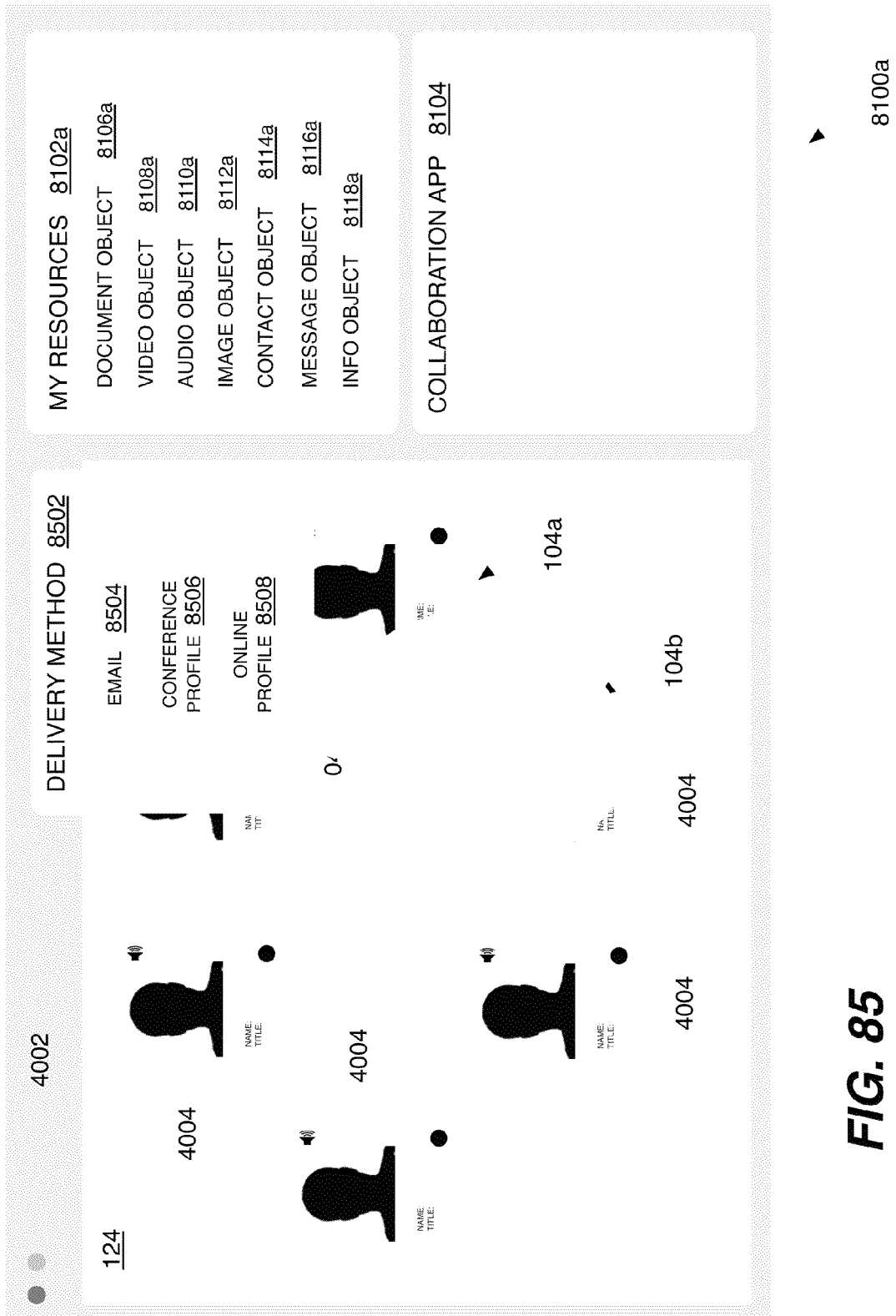
FIG. 85 illustrates the user interface screen shot of FIG. 81 with a "delivery method" menu for specifying the manner in which the document is to be distributed to the participant(s).

The information object 8118 may be selected in various ways depending on, for example, the configuration of the graphical user interface 132, the input mechanism(s), and the particular functionality supported by the collaboration application 8104. In the embodiment illustrated in FIG. 90, the drag-and-drop functionality is provided via a touchscreen display 5004. After the video object 8108 is selected, the user may perform any desirable gesture to move the selected document object 8106 to the drop target. The first participant 104a may deselect the video object 8108 to trigger a distribute-object command that initiates delivery of the information source to the selected participants, contacts, etc. As described above, the user may also specify the method for delivering the selected information object via prompts in a menu (FIG. 85).

Figure 95:
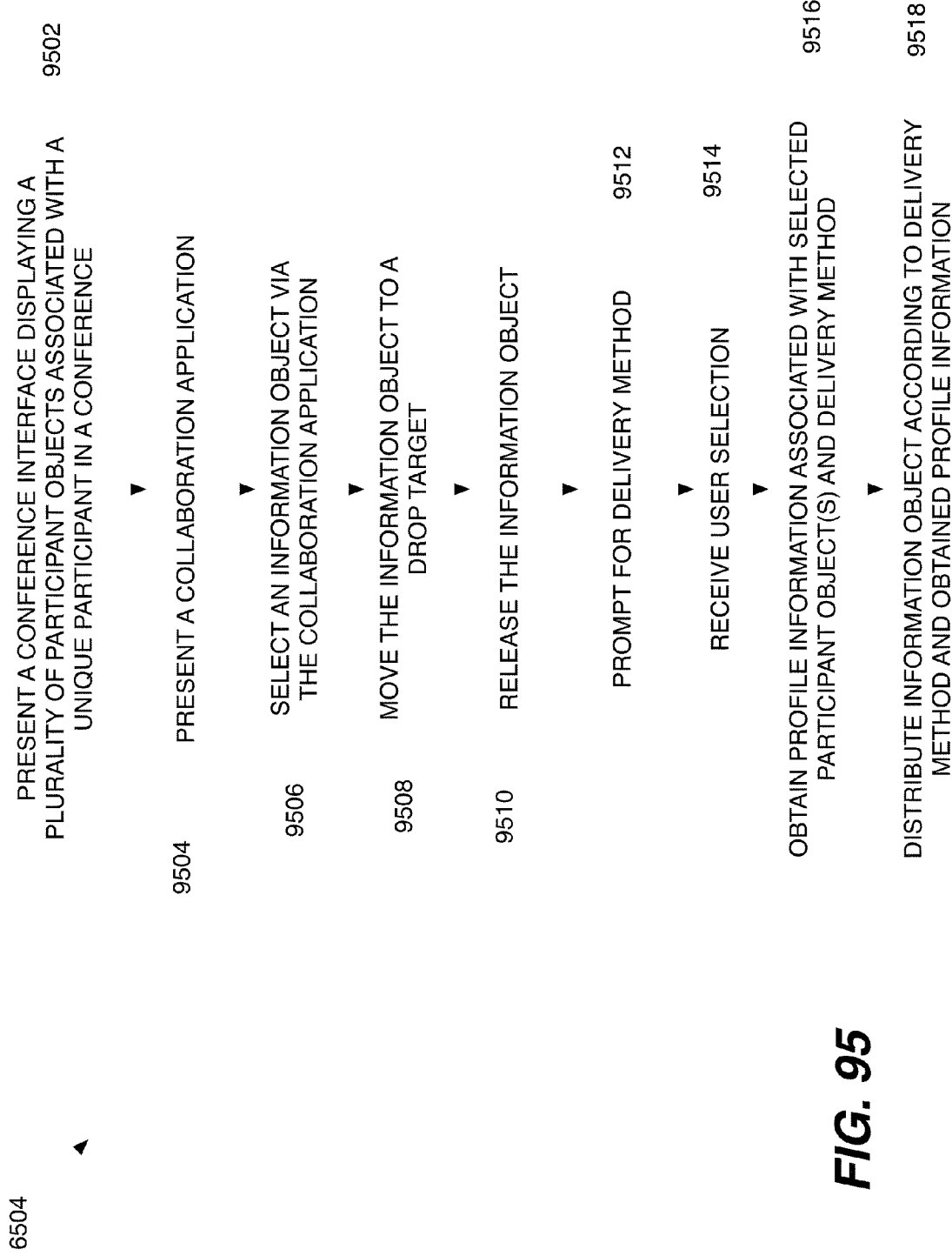
FIG. 95 illustrates the architecture, operation, and/or functionality of a further embodiment of the information distribution module(s) in the computing device of FIG. 65.

FIG. 95 illustrates the architecture, operation, an/or functionality of an embodiment of the information distribution module(s) 6504 for implementing the above-described information distribution features. At block 9502, the client device 102 presents the conference interface, which displays a plurality of participant objects 4002 that identify the participants in the conference. At block 9504, the client device 102 presents a collaboration application 8104 that enables the participants to share information resource. At block 9506, the information distribution module 6504 determines that one of the information objects 8118 displayed in the collaboration application 8104 has been selected via the graphical user interface 132. The user may select one or more (or all) of the information objects 8118. At block 9508, the information distribution module 6504 may be configured to monitor the location of the selected information object 8118 and determine that the object has been moved to a drop target (e.g., the conference interface, one or more participant objects 4004, a contact object, the my resources list 6604, etc.). In response to the release of the object, a menu 8502 (FIG. 85) may be presented to prompt the user to specify a method for delivering the information source to the participant(s) (block 9512). At block 9514, the information distribution module 6504 receives the user selection and initiates the distribute-object command. At block 9516, the information distribution module 6504 may determine the profile information associated with the selected participant object 4002 (or other drop target) and a specified delivery method (if applicable). At block 9518, the information distribution module 6504 distributes the information source according to the specified delivery method and/or profile information.

The conferencing system 106 may also support various additional mechanisms for transferring information to, and distributing information from, the conferencing system 106. For example, in one embodiment, the conferencing system 106 may provide a customized email address that is associated with the participant's account. When the participant 104 creates an account with the conferencing system 106, the customized email address may be automatically established, associated with the participant's account, and made available for use. The participant 104 may use the email account to send and receive emails via a separate client application, a web-based interface, or via the conference interface. Because the customized email address is linked to the participant's account, when an email to this address is received, the conferencing system 106 may automatically determine the corresponding account. Any file attachments, links, or other documents or information may be automatically or manually parsed from the email and made available to the participant 104, via the conference interface, for presentation during a conference or for distribution to other participants in the manner described above. In another embodiment, the participant 104 may associate an existing email address with the account instead of using a separate customized email address.

Referring to FIGS. 96-107, various embodiments of systems, methods, and computer programs will be described for managing conference sessions in an online conference via a graphical user interface 132. Embodiments of a conference session management functionality may be implemented via the module(s) 6506 stored in memory 404 (FIG. 65). As described below in more detail, in general, the conference session management module(s) 6506 comprise the logic and/or functionality for enabling a user of the computing device 102 to create a breakout session of a conference session via the graphical user interface 132. The breakout session may be created by selecting and moving one or more participant objects 4004 to a predetermined drop target. The selection and movement of the participant objects 4004 may be implemented via a drag-and-drop functionality and any suitable input mechanisms, such as those described above or others.

Figure 96:
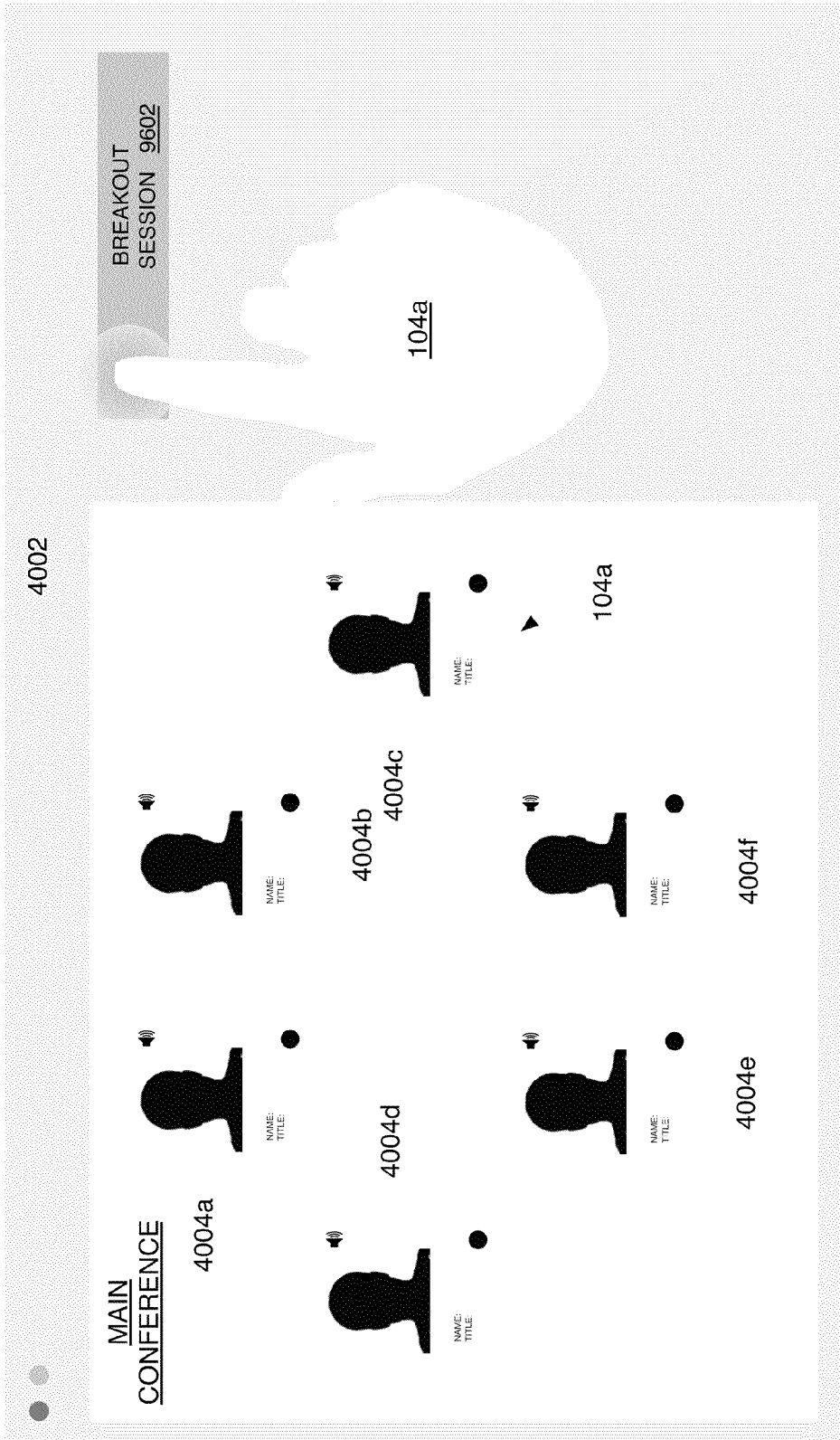
FIG. 96 is a user interface screen shot illustrating an embodiment of a conference interface for implementing aspects of the conference session management module(s) in the client device of FIG. 65.

FIG. 96 illustrates an embodiment of a conference user interface 9600 for creating the breakout session. The conference user interface 9600 generally comprises a screen portion 4002 displaying a participant object 4004 for each participant 104 in a conference session provided by the conferencing system 106. The conference session may comprise an audio conference 114 with an associated online conference. The conference session may be established by the conferencing system 106 in any of the ways described herein. The conference user interface 9600 may further comprise a user interface component (e.g., breakout session component 9602) for enabling a user of the client device 102 to selectively initiate the process of creating a breakout session.

Figure 97:
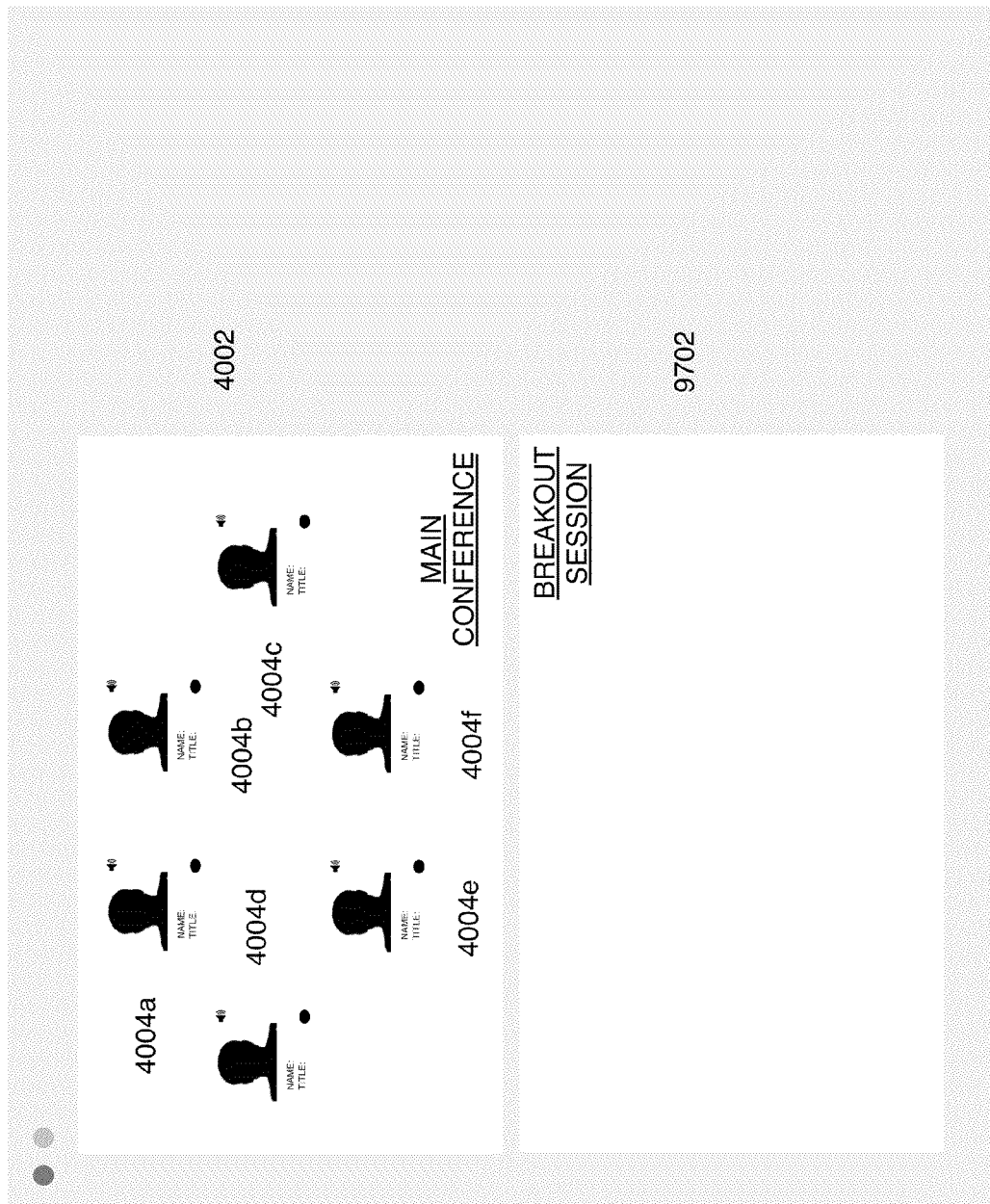
FIG. 97 illustrates the user interface screen shot of FIG. 96 after a user has initiated a breakout session.

During the conference session, a user of the client device 102 may select the breakout session component 9602, which may trigger the display of a breakout session window in a screen portion 9702 (FIG. 97). Referring to FIGS. 98-101, it should be appreciated that each participant object 4002 may be configured to support a drag-and-drop functionality via the graphical user interface 132. The drag-and-drop functionality (or other input gesture(s), as described herein) enables the user to select and move a participant object 4004 from a main conference window in the screen portion 4002 to the breakout session window in the screen portion 9702. The drag and drop operation may initiate an appropriate command for instructing the conferencing system 106 to add the corresponding participant to a breakout session.

Figure 98:
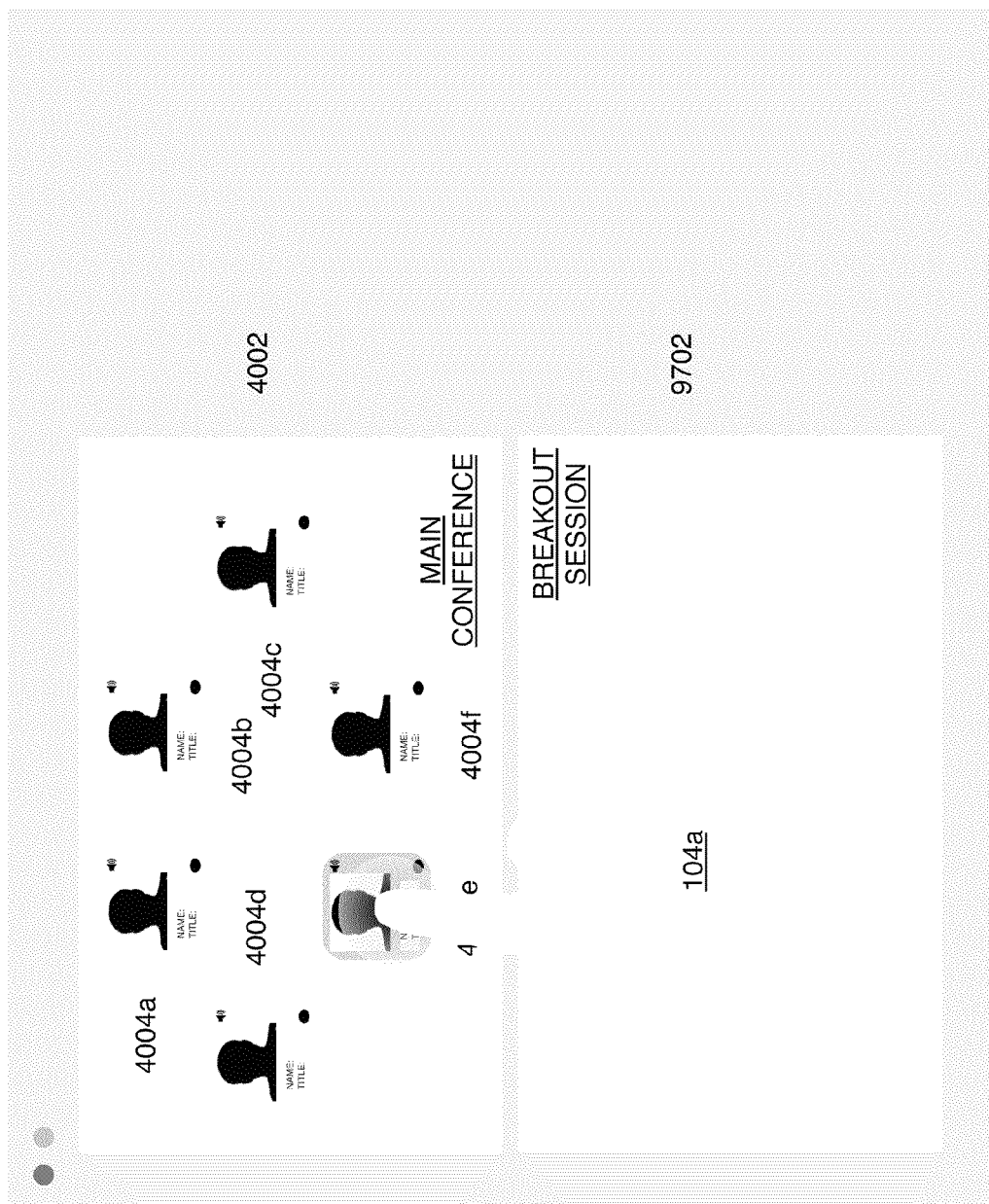
FIG. 98 illustrates the user interface screen shot of FIG. 97 in which the user has selected a participant object in the main conference session.

The participant object 4004 may be selected in various ways depending on, for example, the configuration of the graphical user interface 132 and the input mechanism. In one embodiment, the drag-and-drop functionality is provided via a touchscreen display 5004. The drag-and-drop functionality may be configured to determine the location on the touchscreen display 5004 of a human touch or stylus touch. The participant object 4004 may be selected by touching the displayed region of the object. FIG. 98 illustrates the participant object 4004e being selected by the user touching the appropriate display region. In other embodiments, the user selection of the participant object 4004 may be performed by moving the location of a displayed cursor over the displayed region and initiating a selection command (e.g., by clicking a mouse, touchpad, or other input mechanism).

Figure 99:
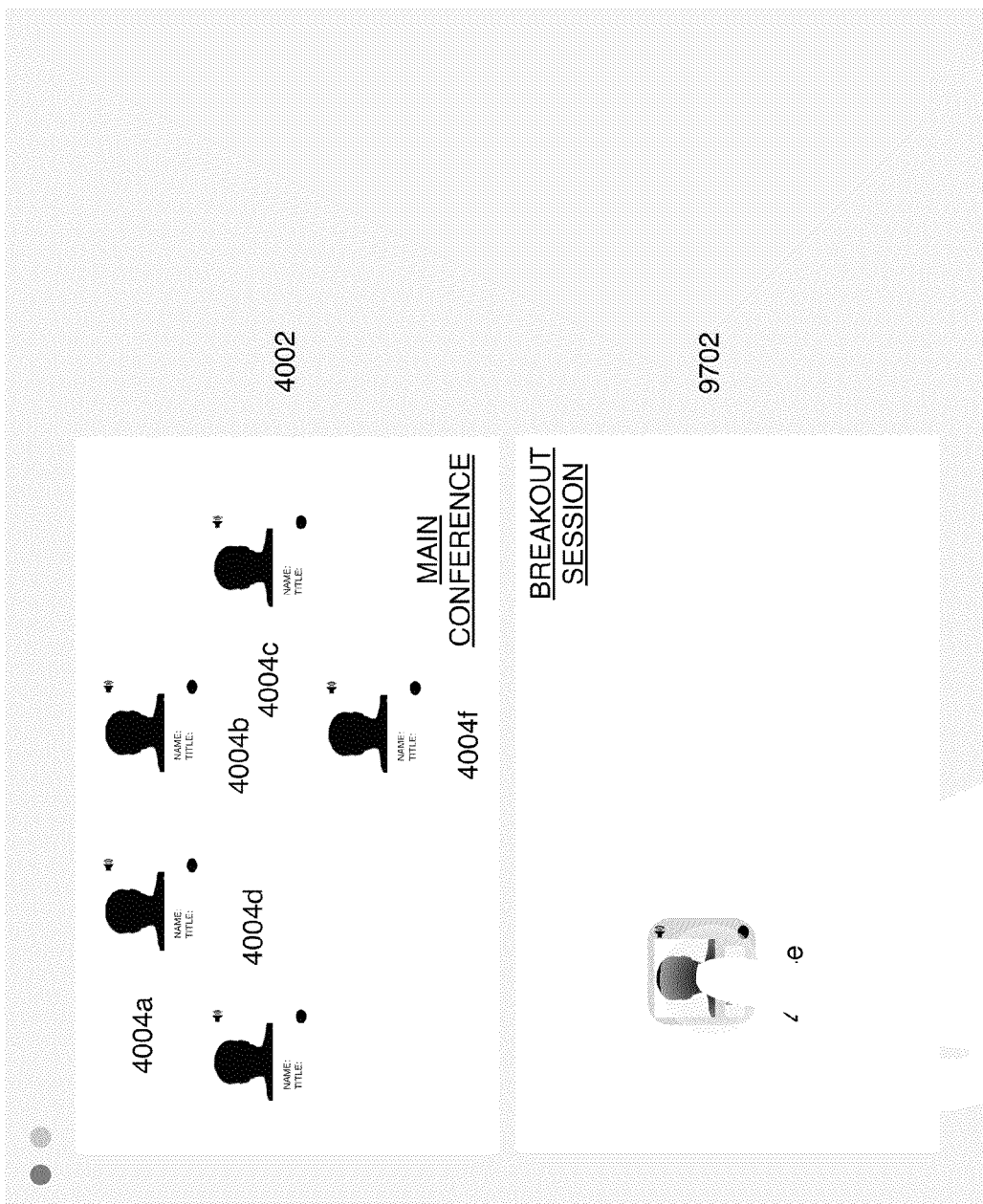
FIG. 99 illustrates the user interface screen shot of FIG. 98 in which the selected participant object has been moved from the main conference session to the breakout session.
Figure 100:
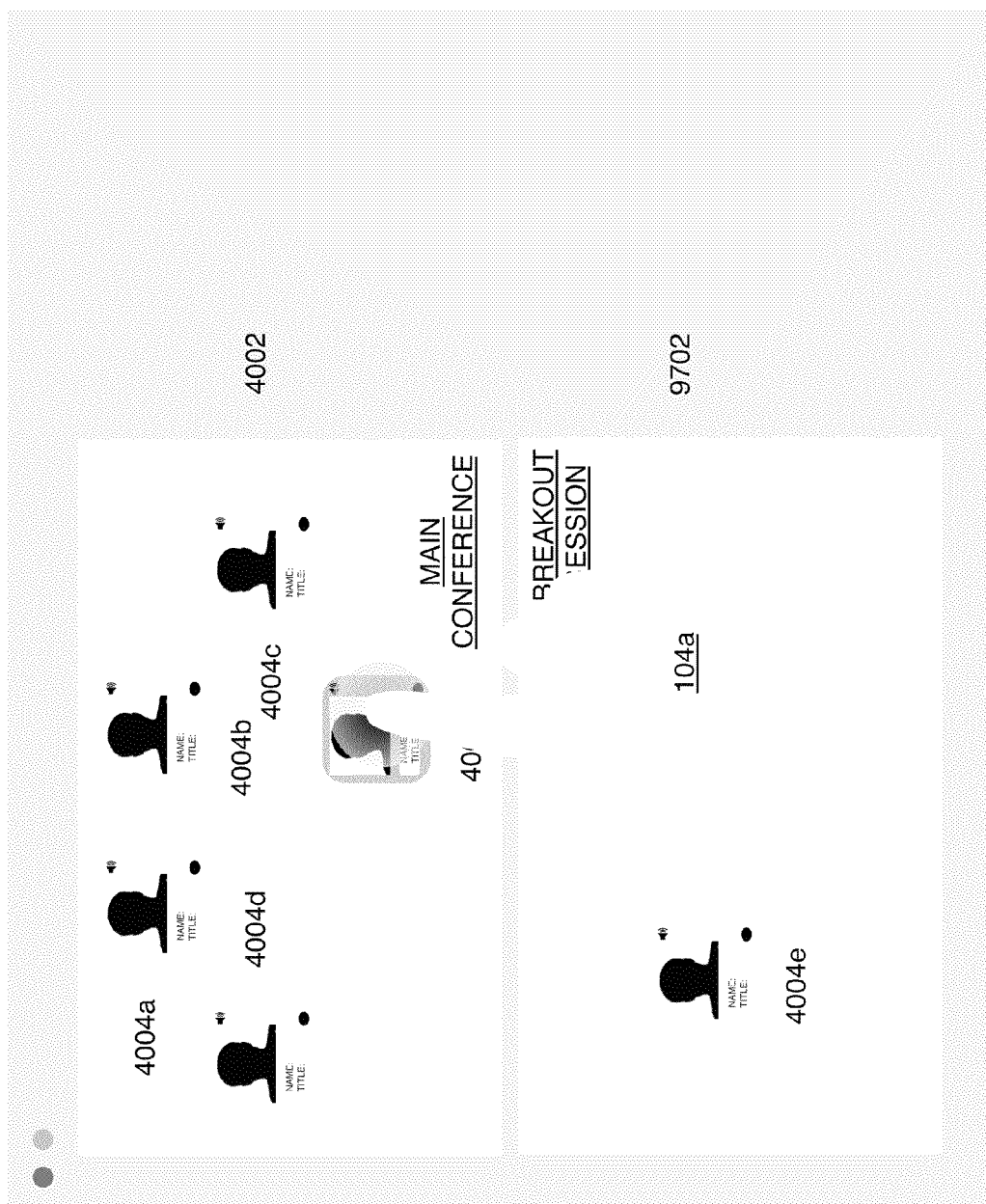
FIG. 100 illustrates the user interface screen shot of FIG. 99 in which the user has selected a second participant object in the main conference session.
Figure 101:
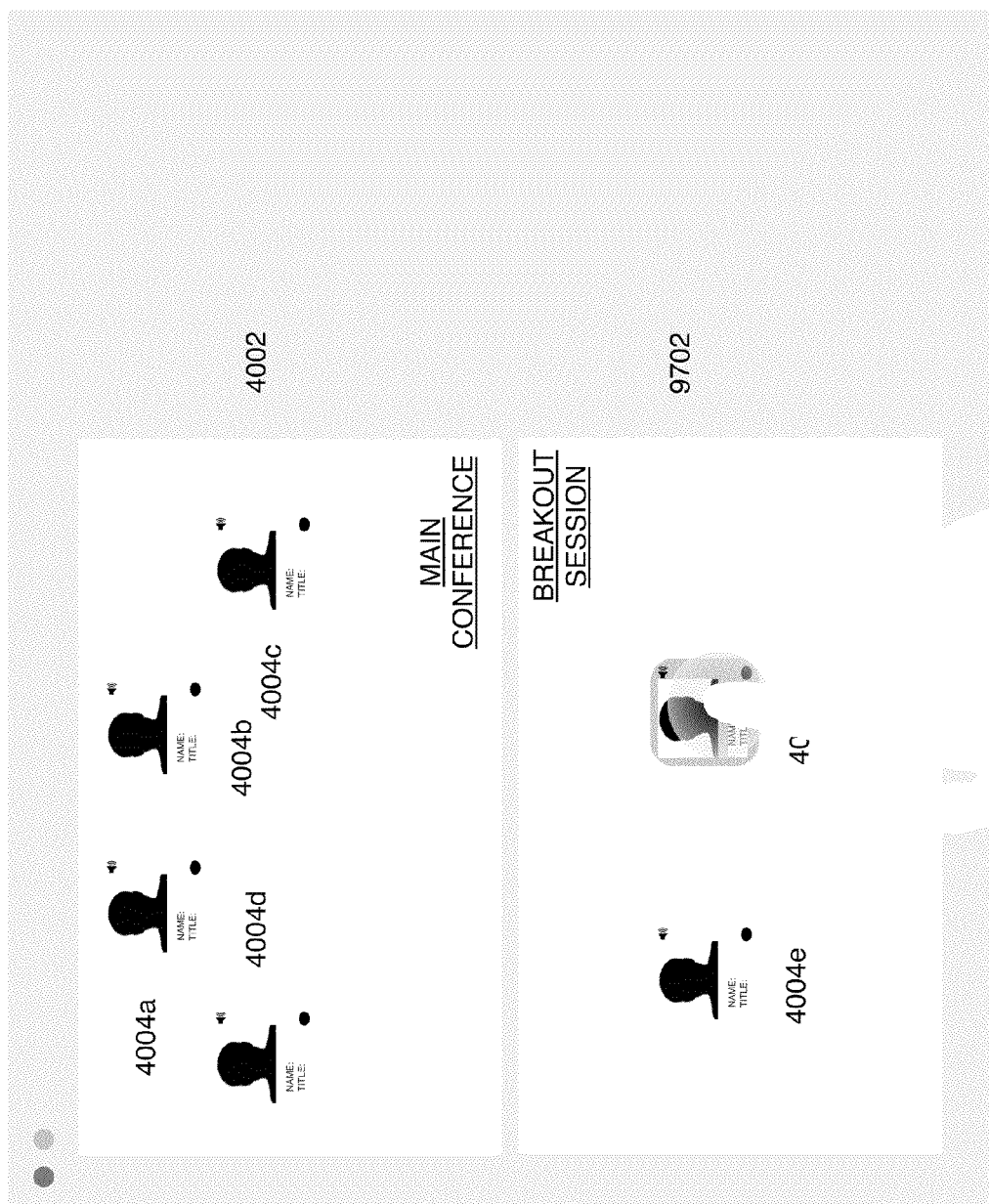
FIG. 101 illustrates the user interface screen shot of FIG. 100 in which the second participant object has been moved from the main conference session to the breakout session.
Figure 102:
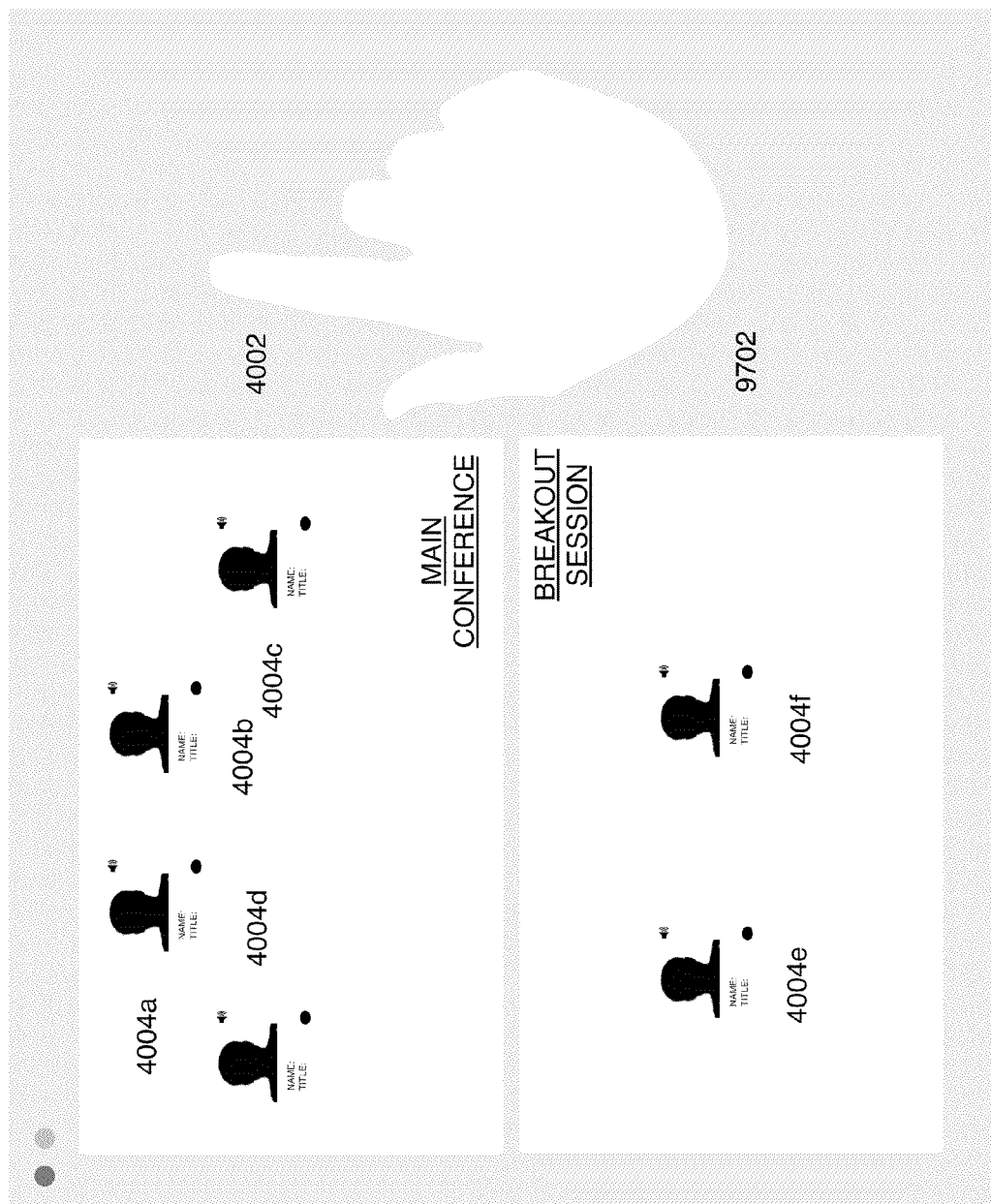
FIG. 102 illustrates the user interface screen shot of FIG. 101 with both sessions active.

After the participant object 4004 is selected, the user may perform any desirable gesture to move the selected participant object 4004 to the screen portion 9702. As illustrated in FIG. 99, in one embodiment, the selected participant object 4004e may be moved with a drag operation. The drag operation may be configured to further monitor the location of the input mechanism (e.g., human or stylus touch, cursor, etc) while the participant object 4004 is selected. In the embodiment of FIG. 99, the participant object 4004e is moved within the breakout session window. The user may deselect the participant object 4004e to trigger the command to add the corresponding participant to the breakout session. FIGS. 100 and 101 illustrate a second participant object 4004f being added to the breakout session.

In an embodiment, the breakout session may be created by processing the audio streams 122 in an audio conference 114. Consider the example illustrated in FIG. 102 in which participant objects 4004e and 4004f are moved to the breakout session window. Prior to moving the participant objects 4004e and 4004f, the conferencing system 106 has established an audio conference 114 involving six participants identified by participant identifiers 120a-f. Each participant has a corresponding audio stream 122a-f, and is identified in the conference interface with a corresponding participant object 4004a-f. When the participant objects 4004e and 4004f are moved to the breakout session window, the conference session management module(s) 6506 may identify the corresponding audio streams 122e and 122f with reference to the participant identifiers 120e and 120f. The conference session management module(s) 6506 may configure and initiate appropriate command(s) to the conferencing system 106. In an embodiment, the command for adding a participant to the breakout session may specify the participant identifier 120e and 120f. The conferencing system 106 may receive the command(s) and identify the corresponding audio streams 122e and 122f.

Figure 105:
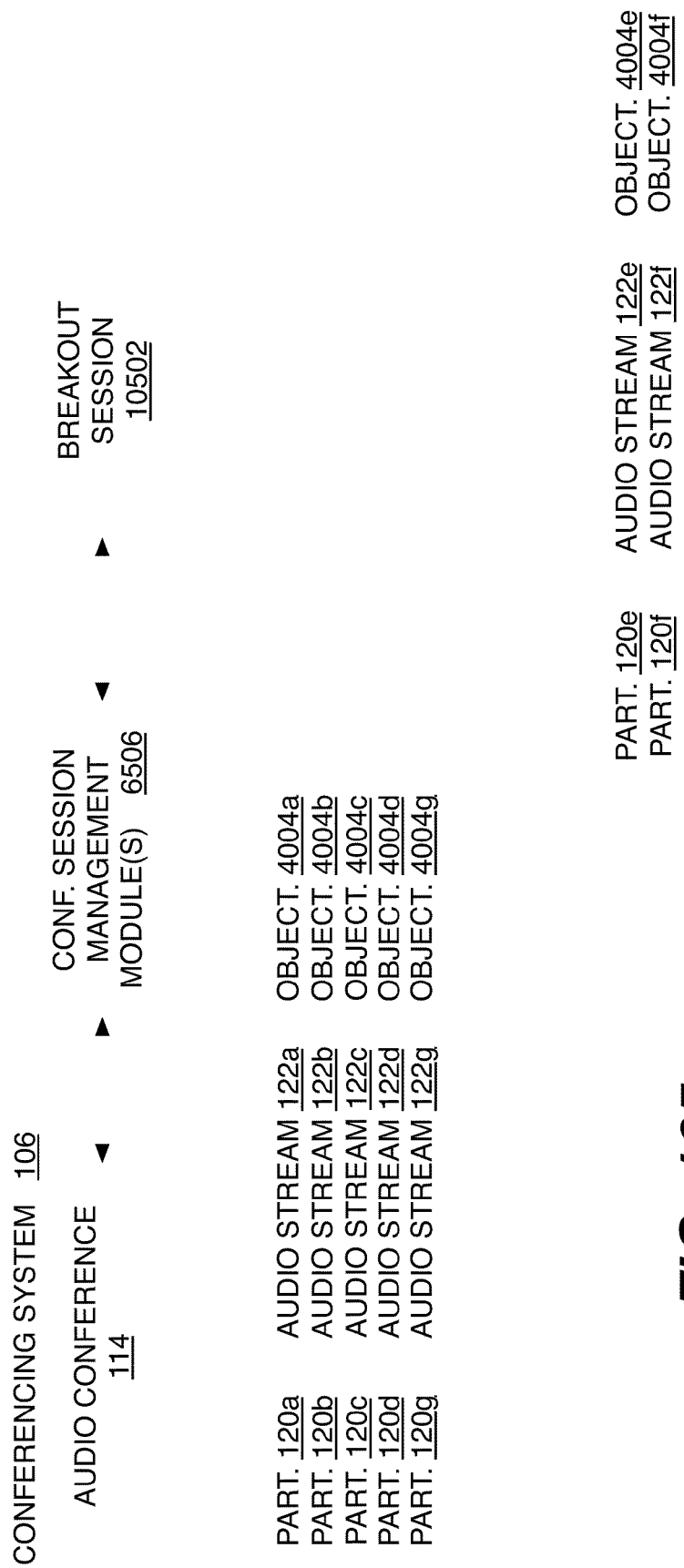
FIG. 105 is a combined block/data diagram illustrating the general operation and management of the breakout session implemented by the conference session management module(s).

As illustrated in FIG. 105, the conferencing system 106 may establish a breakout session 12002 comprising the audio streams 122e and 122f. The conferencing system 106 may remove or otherwise disable or mute the audio streams 122e and 122f in the audio conference 114 associated with the original conference, and create a separate mix of the two streams for the breakout session 12002. In this manner, the participants in the conference session do not hear the audio streams 122e and 122f, and the participants in the breakout session do not hear the audio streams 122a, 122b, 122c, 122d, and 112g. It should be appreciated that the processing of the audio streams 122 may be implemented in various alternative ways depending on the architecture of the conferencing system 106.

Figure 106:
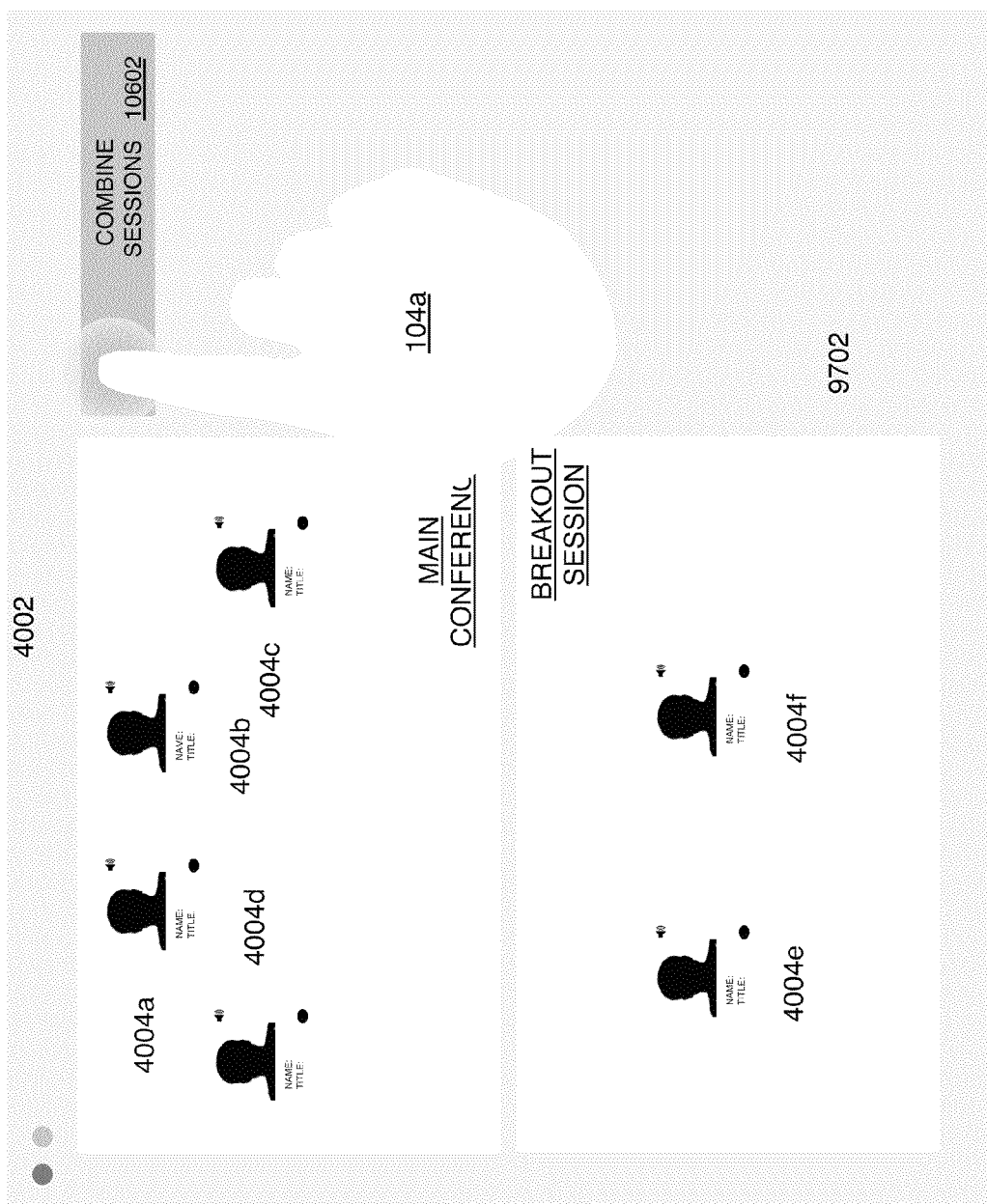
FIG. 106 illustrates an embodiment of a conference interface for joining the breakout session with the main conference session.
Figure 107:
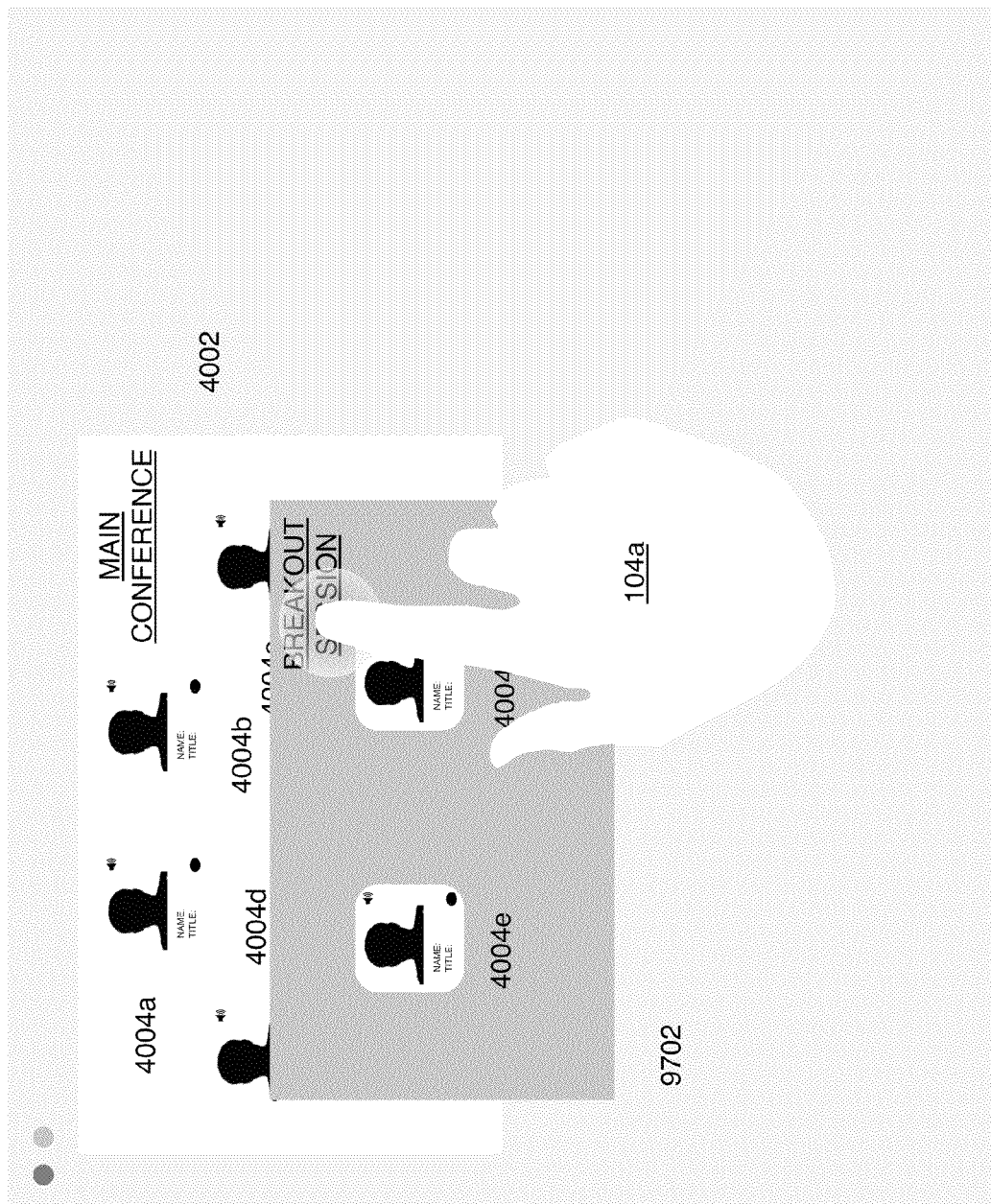
FIG. 107 illustrates another embodiment of a conference interface for joining the breakout session with the main conference session.

As illustrated in FIGS. 106 and 107, the breakout session 10502 may be selectively recombined or rejoined with the audio conference 114 by similarly processing the audio streams 122a-f. In the embodiment of FIG. 106, a user may recombine the breakout session 10502 with the audio conference 114 by selecting a user interface component (e.g., combine sessions component 10602). In another embodiment, the breakout session window may be configured as a draggable object, which the user may select and move to the main conference window (FIG. 107). Individual participants may be added back to the conference session by selecting and moving the participant object 4004 from the breakout session window to the main conference window, as described above.

Figure 103:
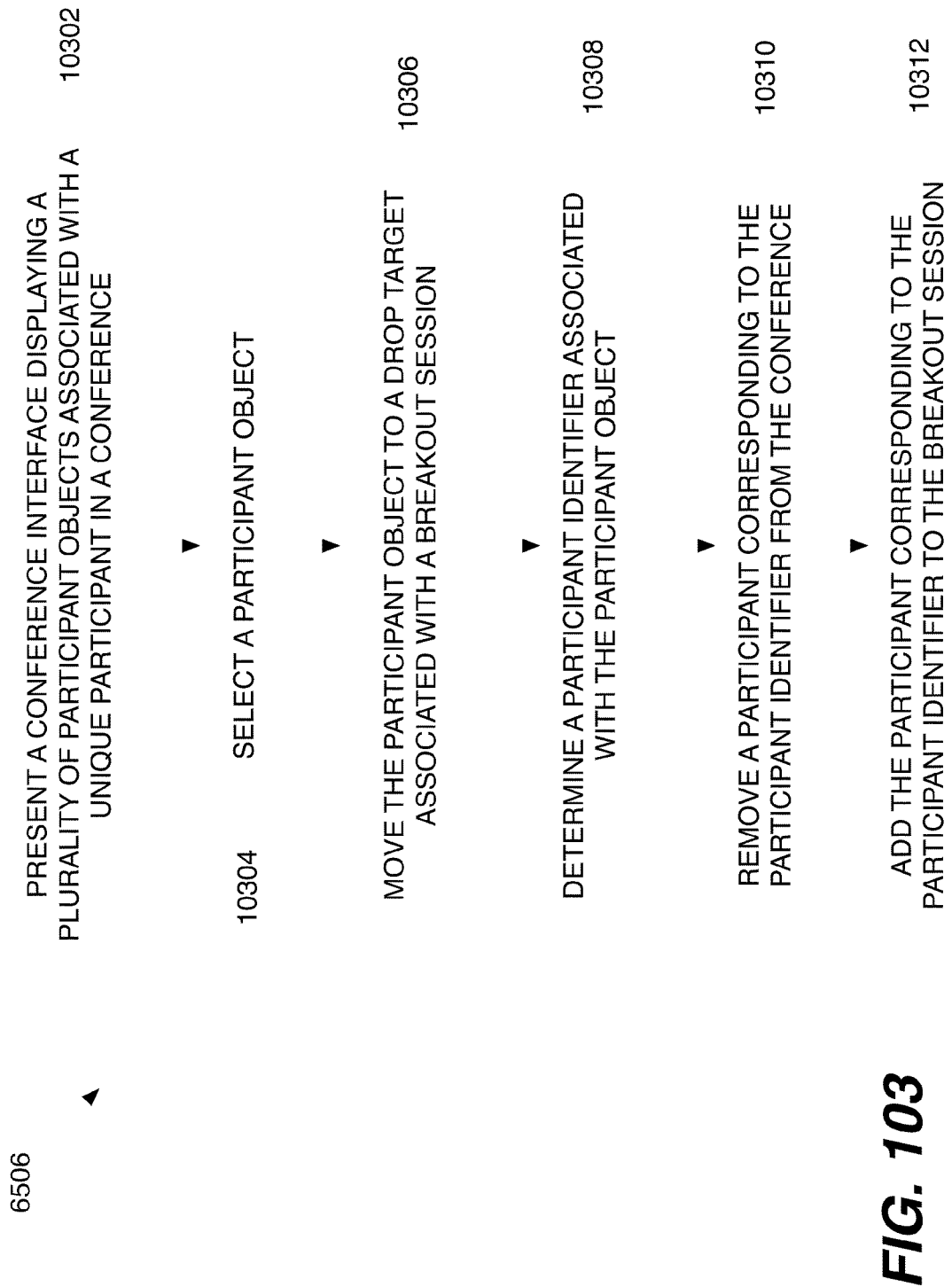
FIG. 103 is a flowchart illustrating the architecture, operation, and/or functionality of an embodiment of the conference session management module(s) of FIG. 65.

FIG. 103 illustrates the architecture, operation, and/or functionality of an embodiment of the conference session management module(s) 6506 for implementing the above-described session management features. At block 10302, the client device 102 presents the conference interface, which displays in a first screen portion a plurality of participant objects 4004 identifying the participants in a conference session established by the conferencing system 106. At block 10304, the conference session management module 6506 determines that one of the participant objects 4004 has been selected via the graphical user interface 132. Depending on the particular input device and graphical user interface commands supported by the client device 102, the selected participant object 4004 may be moved to a drop target associated with a breakout session (block 10306). At block 10308, the conference session management module 6506 may determine a participant identifier 120 associated with the participant object. The conference session management module 6506 may instruct the conferencing system 106 to remove the participant from the conference session (block 10310) and add the participant to the breakout session (10312).

Referring to FIGS. 108-114, various embodiments of systems, methods, and computer programs will be described for authenticating participants in an online conference via a graphical user interface 132. The functionality for implementing the participant authentication may be embodied in, for example, the participant authentication module(s) 6508 (FIG. 65). As described below in more detail, the participant authentication module(s) 6508 comprise the logic and/or functionality for authenticating a participant via a signature capture mechanism displayed in the conference interface. The signature capture mechanism may comprise an area within the conference interface presented via the graphical user interface 132. The signature capture area is configured to electronically recognize and/or capture the location of an input device via the graphical user interface 132 as the input device is moved with respect to the screen portion. In an embodiment, a touchscreen display 5004 may be used to enable a user to write or trace on the screen portion with, for example, a finger or other input device, such as, a stylus. In other embodiments, a mouse or other input device 6501 (FIG. 65) may be used to control the movement of a displayed cursor within the screen portion.

Figure 108:
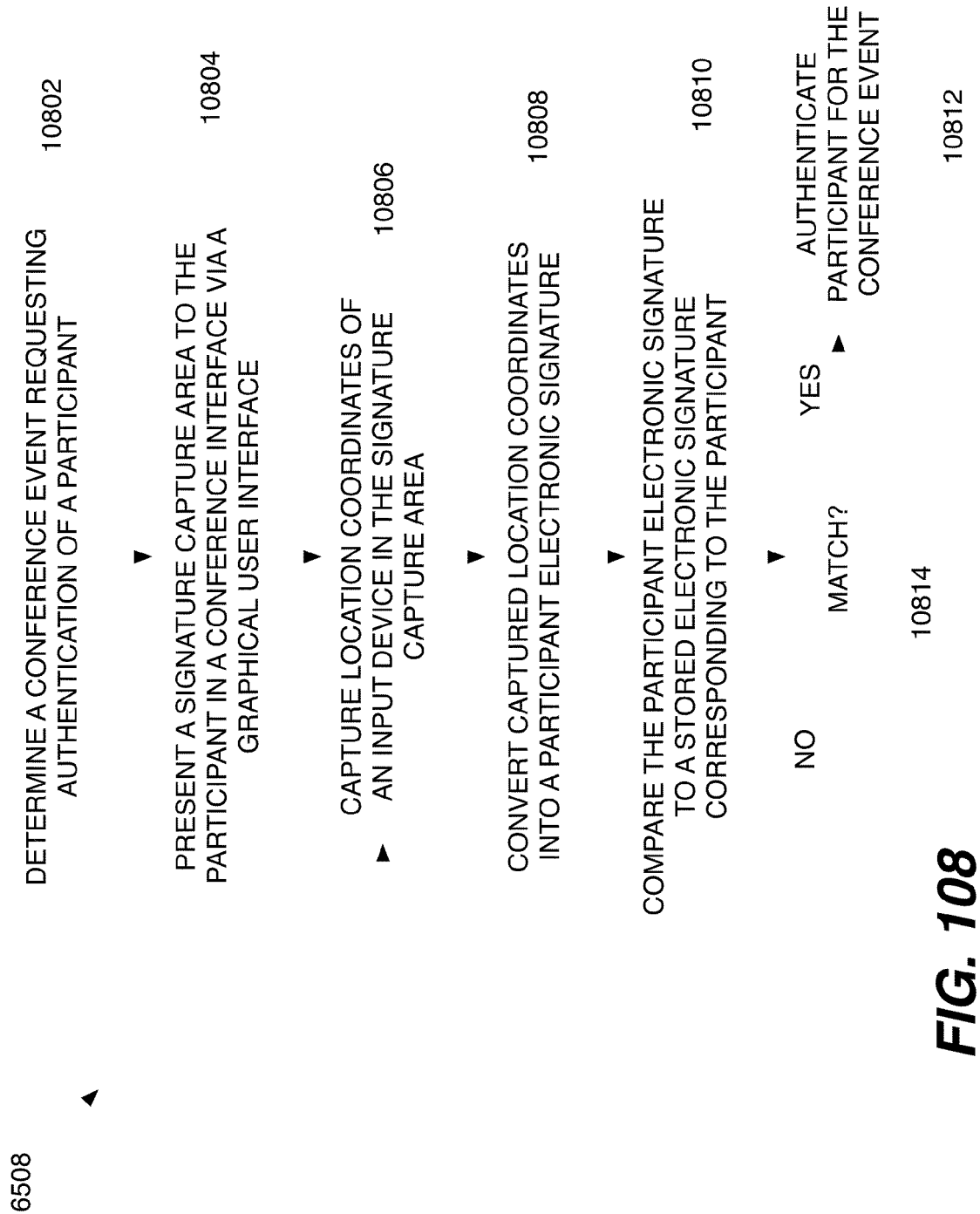
FIG. 108 is a flowchart illustrating the architecture, operation, and/or functionality of an embodiment of the participant authentication module(s) in the computing device of FIG. 65.
Figure 109:
FIG. 109 is a user interface screen shot illustrating an embodiment of a conference interface for authenticating a participant via a signature capture area before entering an online conference.
Figure 110:
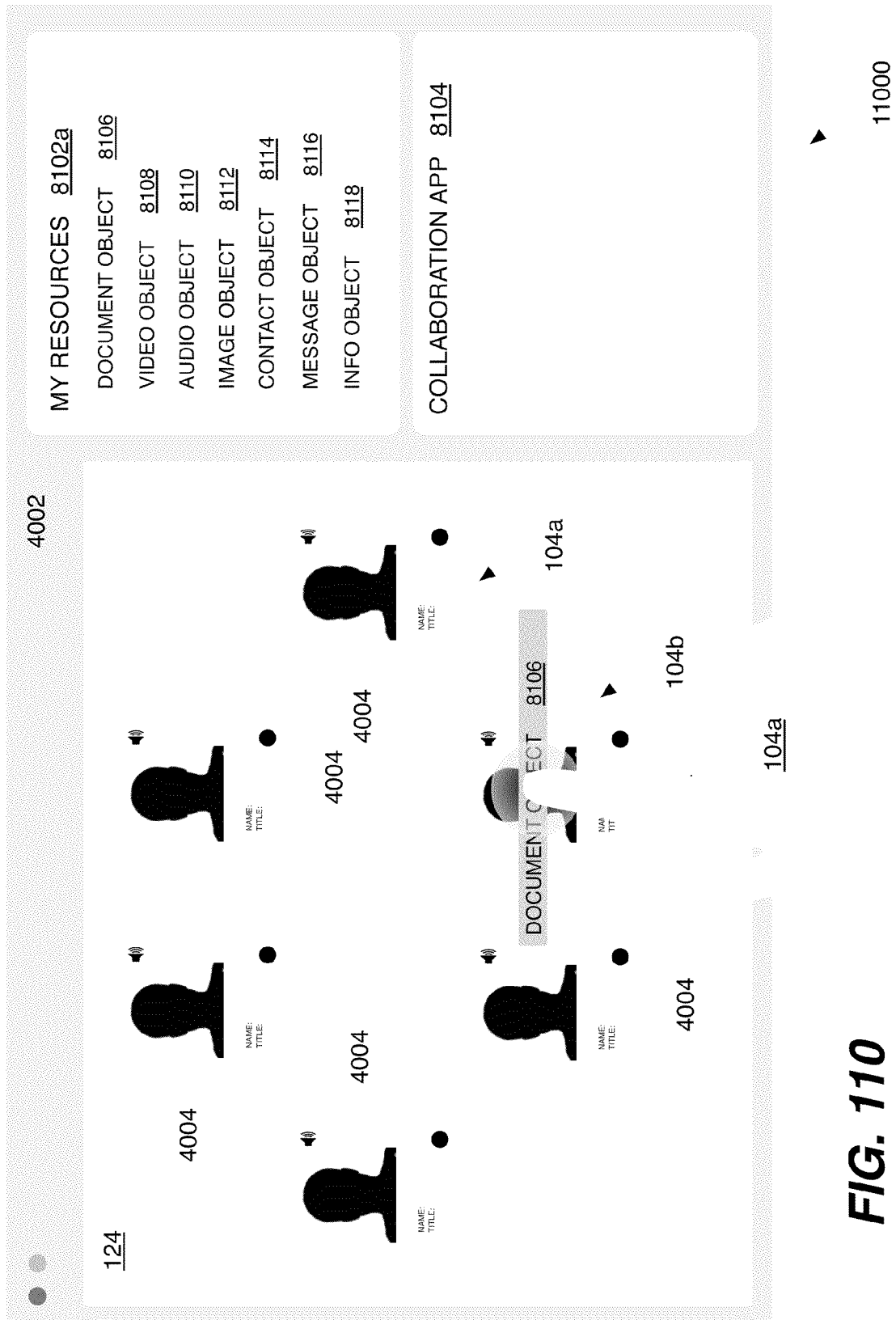
FIG. 110 is a user interface screen shot illustrating another embodiment of a user interface for authenticating a participant via a signature capture area before distributing a secure document.

FIG. 108 illustrates the architecture, operation, and/or functionality of one embodiment of the participant authentication module(s) 6508 for authenticating a participant in a conference. The conference may be established by the conferencing system 106 in any of the ways described herein. The conference may comprise an audio conference 114 and/or a videoconference with an associated conference interface presented to a client device 102 by the conferencing system 106 via a communication network. The conferencing system 106 may call or invoke the participant authentication process whenever it is desirable to authenticate a participant for any event related to the provision and/or management of the conference (i.e., a conference event). At block 10802, the participant authentication module 6508 determines or is otherwise notified of a conference event associated with the conference for which a participant is to be authenticated. The conference event may be associated with a login event (FIG. 109) or, in other embodiments, may be used to authenticate a participant prior to distributing a document or other information source. FIG. 110 illustrates an embodiment in which a participant 104*a* selects a document object 8106 to be distributed to a participant 104*b*. It may be desirable to authenticate the participant 104*b* prior to distributing the document, particularly if the document is confidential or it is otherwise desirable to confirm the identify of the recipient. In this manner, after the selected document object 8106 is dropped to the participant object 104*b*, a secure distribution event may be trigger. The secure distribution event may initiate the display of a screen 11102 (FIG. 111), which includes a signature capture area.

Figure 113:
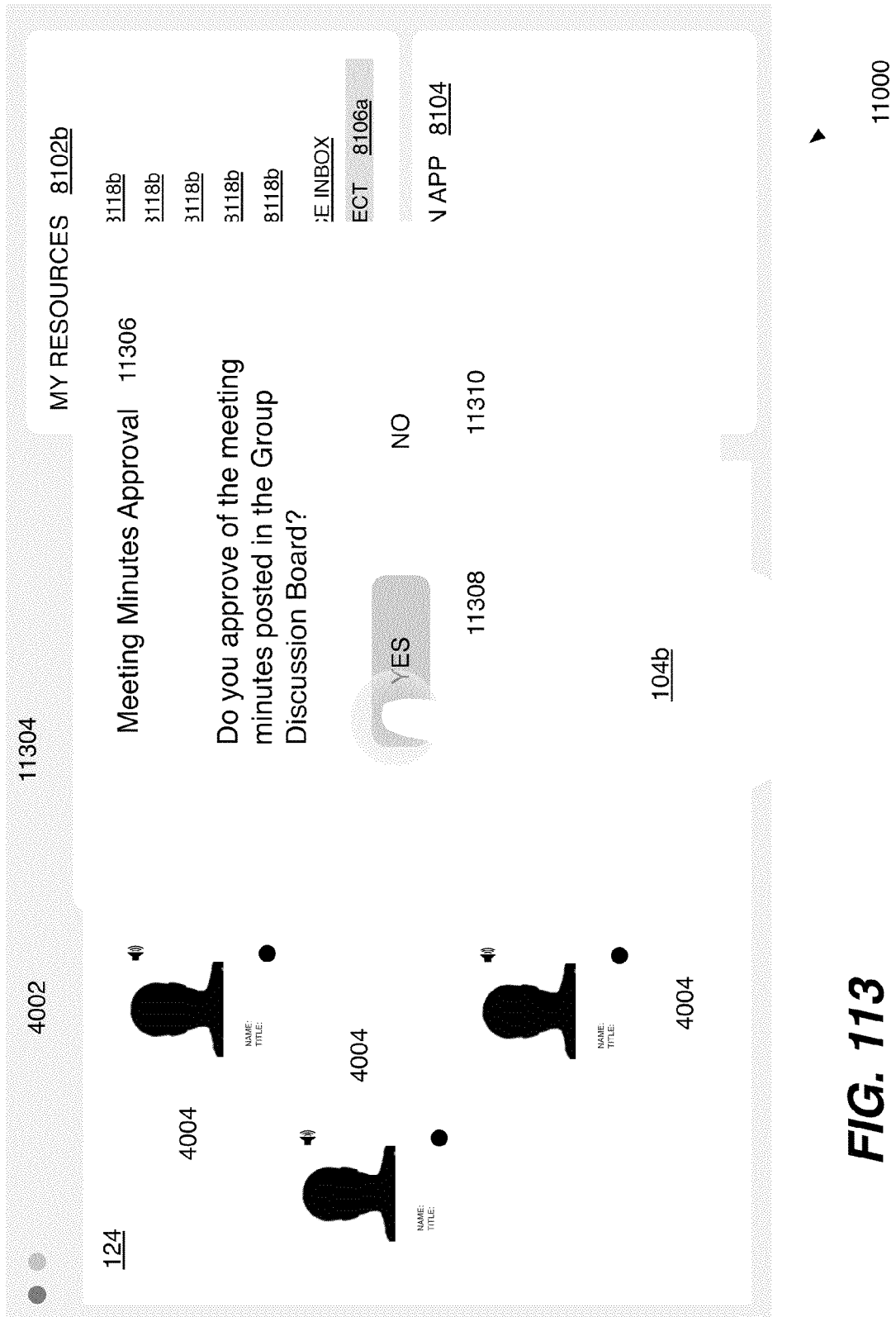
FIG. 113 is a user interface screen shot illustrating a further embodiment of a conference interface for authenticating a participant vote.
Figure 114:
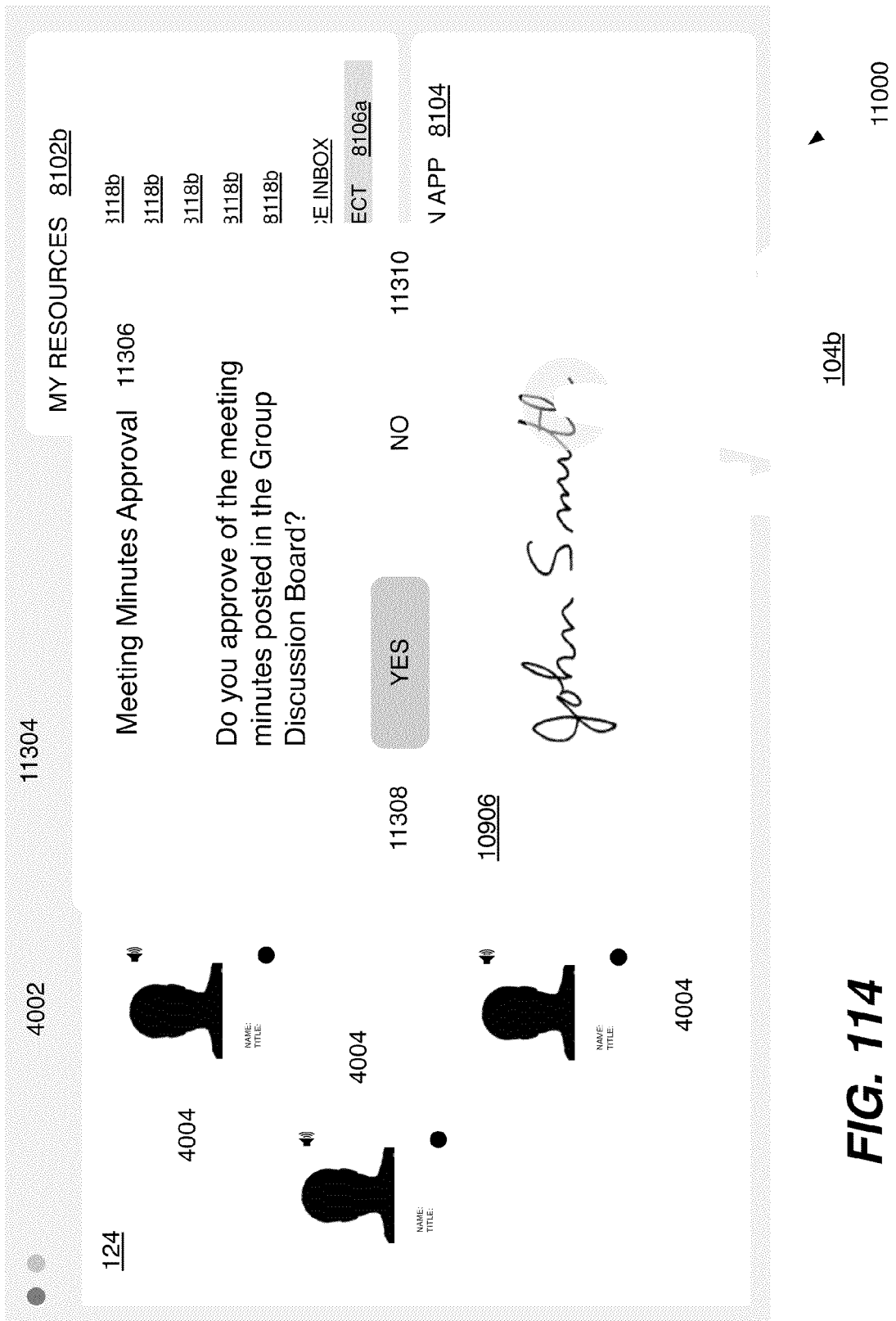
FIG. 114 illustrates the user interface screen shot of FIG. 113 with a signature capture area.

Another conference event may involve confirming a participant vote or affirmation of an issue being discussed in the audio conference 114. FIG. 113 shows a "meeting minutes approval" screen 11304, which prompts the participant to approve meeting minutes (which may be displayed, for example, in the conference interface by the collaboration application 8104). The screen 11304 may include a description 11306 of the issue being voted on, as well as a "yes" button 11308 and a "no" button 11310 or other input mechanisms. After making a selection, a signature capture area 10906 may be displayed for authenticating the participant (FIG. 114).

Regardless the conference event requesting authentication, at block 10804, the participant authentication module 6508 presents to the participant being authenticated a signature capture area in the conference interface. The signature capture area may comprise a window, menu, display, area, region, etc. or any other user interface component displayed in the conference interface via the graphical user interface 132. The user interface component may display the border of the signature capture area to highlight the defined area. As illustrated at block 10806, the signature capture area is configured to electronically capture location coordinates of an input device (e.g., human or stylus touch on a touchscreen display or a cursor) as the input device is moved within the defined area. The signature capture area may capture continuous movement or a series of movements. Signature capture area 10906 (FIGS. 109 & 114) is configured to capture a handwritten signature. It should be appreciated, however, that the signature may comprise any series of one or more movements as determined by the particular user.

Figure 111:
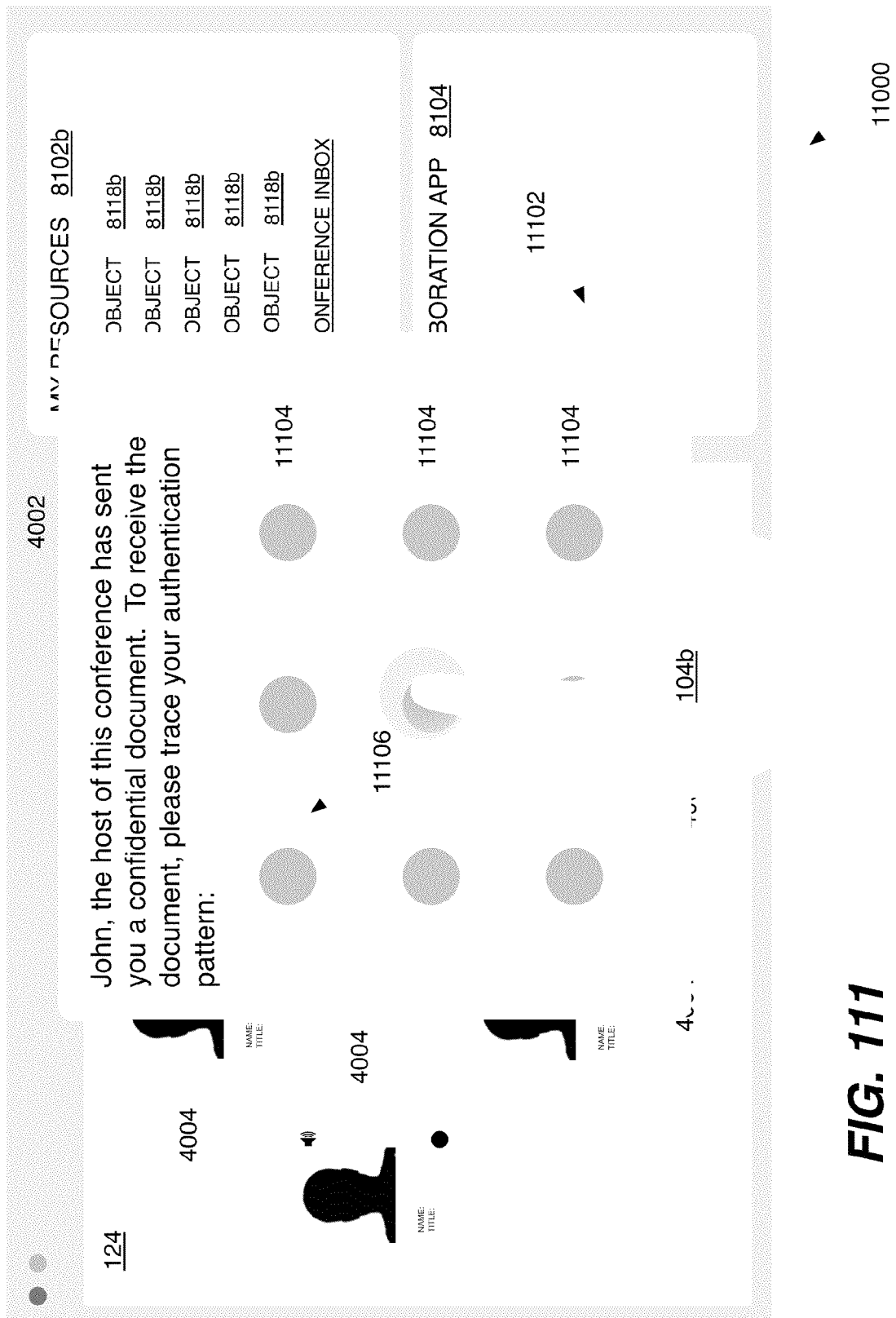
FIG. 111 is a user interface screen shot illustrating another embodiment of a conference interface for authenticating a participant via a trace sequence.
Figure 112:
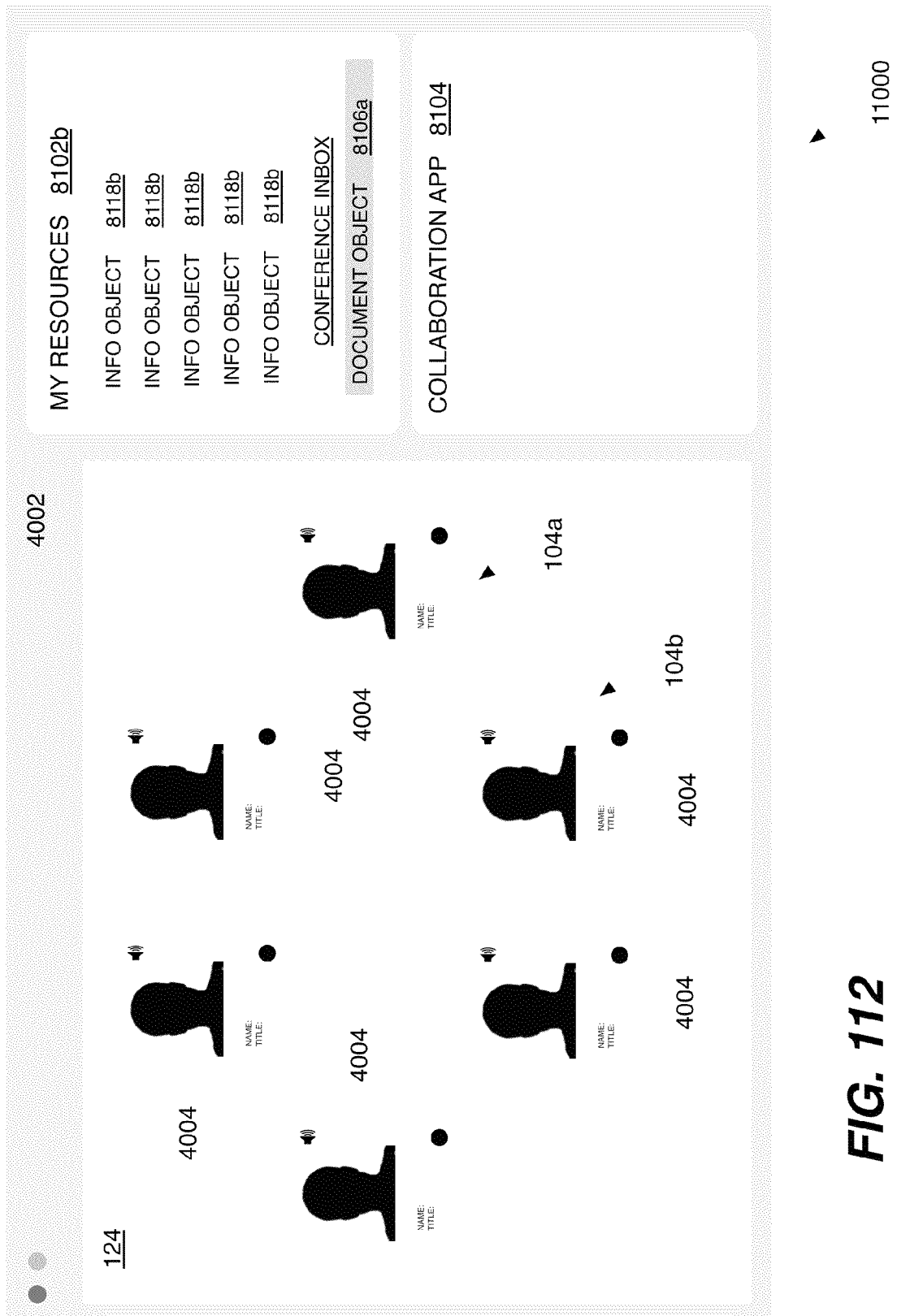
FIG. 112 illustrates the user interface screen shot of FIG. 111 in which the trace sequence matches a stored trace sequence associated with the participant.

In the embodiment illustrated in FIG. 111, the signature capture area may display a reference grid comprising a plurality of nodes 11104. The participant may be asked to trace a predefined pattern through two or more of the nodes 11104. The signature capture area may detect the traced pattern 11106 as a node-to-node sequence. For example, in the example of FIG. 111, the participant has traced a node-to-node sequence from the top left node, to the top right node, to the bottom right node, and terminating at the center node. This trace pattern 11106 may define the node-to-node sequence according to numbered nodes. It should be appreciated that other reference grids, patterns, arrangements, etc. may be implemented.

At block 10808, the location coordinates of the electronic signature (e.g., handwritten signature, trace pattern, gestures, etc.) are converted into a participant electronic signature. The participant electronic signature may be compared to a stored electronic signature (block 10810). The stored electronic signature may be stored locally in memory 404, in the conferencing system 106, or at another remote location. The stored electronic signature may have been previously specified as a reference signature for purposes of authenticating the participant. The stored electronic signature may be logically associated with a participant identifier. In this regard, the participant electronic signature and the participant identifier may be provided to the application performing the comparison. The application may look-up the stored electronic signature corresponding to the participant identifier and determine whether there is match (decision block 10814). The comparison of the two signatures may be implemented via any suitable algorithms, taking into account human error and/or any technical limitations associated with the input mechanism. If there is a match, the participant may be authenticated (block 10812). If there is not a match, the process may be repeated one or more times or the participant may be denied access to the conference event.

FIG. 115 illustrates an embodiment of a conference record/playback system 11500 for enabling participants 104 to selectively record, playback and distribute various components of a conference provided by a conferencing system 106. The conference record/playback system 11500 comprises a conferencing system 106 and a plurality of client devices 102 connected via one or more communication networks 110 (FIG. 1). The conferencing system 106 and the client devices 102 may be configured in the manner described above. In general, the conferencing system 106 establishes an audio conference 114 between the participants 104. One or more server(s) 108 may be configured to present the audio conference 114 and a conference interface to the client device(s) via a client 11502 (e.g., a browser, one or more browser plug-ins, and/or a special-purpose client). The conference interface may be presented to and displayed via a graphical user interface 132 and an associated display (e.g., touchscreen display device 5004 or other display device).

To record and playback the audio conference 114 and the content displayed or otherwise presented in the conference interface, the client device(s) 102 further comprise a record module 11504, a playback module 11506, a control module 11510, and one or more buffer(s) and or storage device(s) 11508. The record module 11504, the playback module 11506, and the control module 11510 may be embodied in memory (e.g., memory 404) and executed by one or more processor(s) 402. In one embodiment, the modules 11504, 11506, and 11510 may be integrated with the client 13002, although it should be appreciated that the modules may comprise separate modules that interface with the client 11502, the graphical user interface 132, the conference interface, or other associated software and/or hardware programs. Furthermore, it should be appreciated that one or more of these modules may reside at the server(s) 106 or other components in the conferencing system 106.

The record module 11504 is configured to capture content and/or functionality displayed or otherwise presented in the conference interface, including audio streams 122 in the audio conference 114 and any other audio, video, graphics, images, documents, text, data, or other multimedia presented via the conference interface 3110. A user of the client device 102 may selectively control the record module 11504 via the control module 11510 and an associated user interface. The recording module 11504 may store the captured content in one or more buffers or storage devices 13008. In an embodiment, the captured content is buffered in real-time during the conference for immediate or subsequent playback by the playback module 11506, as described below in more detail. The record module 11504 may comprise a screen capture functionality for capturing portions of (or the entire display region of) the conference interface. The record module 11504 may separately capture embedded audio and/or video content. At the conclusion of, or during, a conference, the captured content may be processed and stored in a playable format for storage, distribution, etc.

Figure 116:
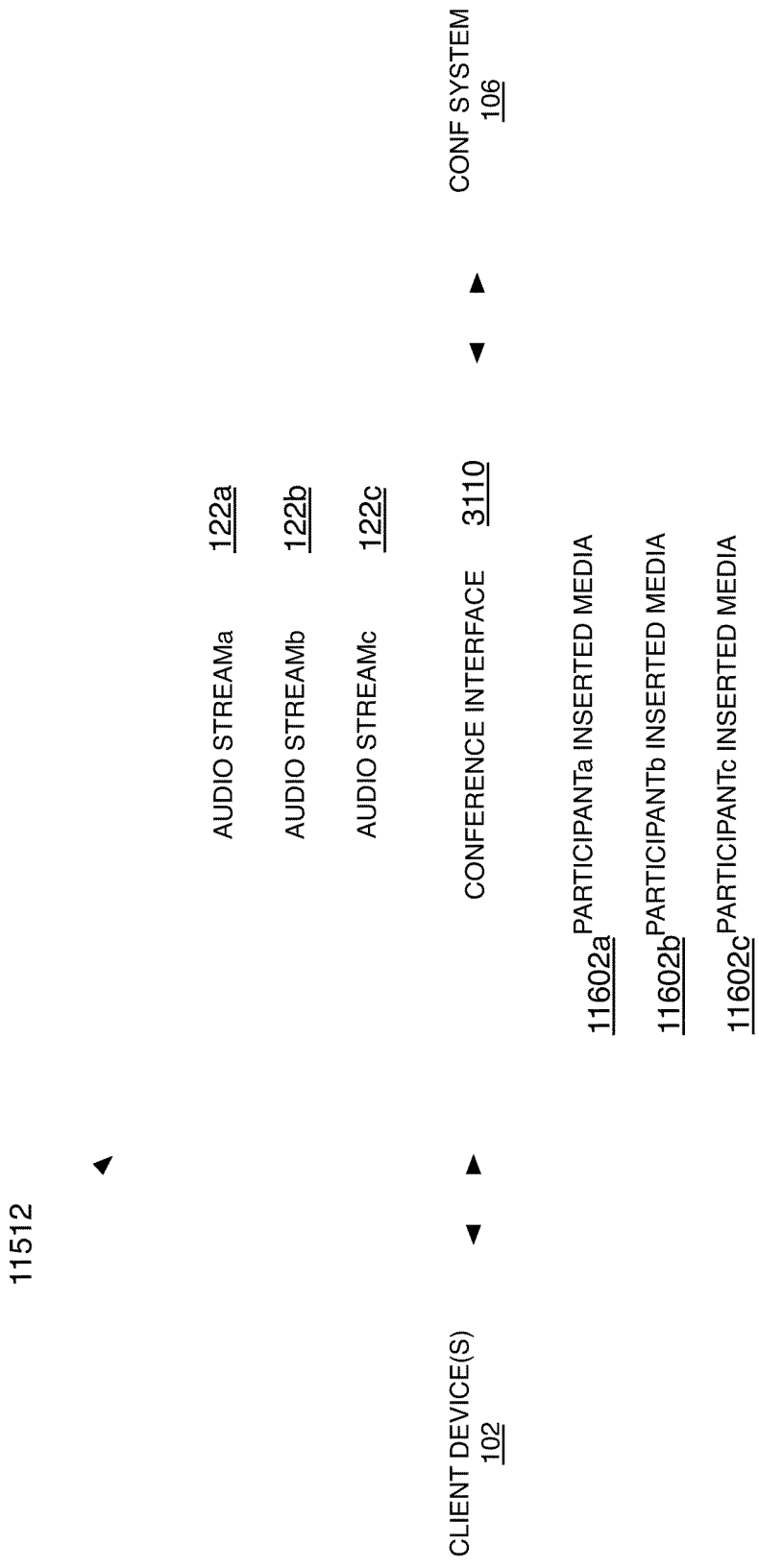
FIG. 116 is a block diagram illustrating an embodiment of the conference channels that may be selectively recorded, played back, and distributed via the conference record/playback system of FIG. 115.

As illustrated in FIG. 115, the captured content may comprise data related to any of a plurality of conference channels 11512 associated with the conference. The conference channels 11512 may comprise, for example, the audio streams 122 in the audio conference 114, the presentation content associated with the conference interface, and any inserted media 11602 from participants 104. The example illustrated in FIG. 116 comprises an audio conference 114 comprising three participants 104a-104c. Each participant has an associated audio stream 122a-122c. The inserted media 13102 may comprise audio, video, documents, notes, images, graphics, data, etc. that a participant may share, post, or otherwise present or display via the conference interface.

In operation, each client device 102 in the conference record/playback system 11500 may selectively capture one or more of the conference channels 11512 for immediate or subsequent playback. The captured content may be stored on the respective client devices 102 or at the conferencing system 106. In this regard, the conferencing system 106 may include the record module 11506 and the buffer(s) or storage device(s) 11508.

Figure 117:

FIG. 117 illustrates an embodiment of a data structure for a recorded conference 11700, which has been recorded and stored via the conference record/playback system 11500. The recorded conference 11700 may be stored in any storage device in any computer-readable format. In an embodiment, the recorded conference 11700 is configured as a playable media file or code. The recorded conference 11700 may be transferred or distributed between participants 104 or to other recipients using any desirable transfer or distribution method. In an embodiment, a participant 104 who recorded a conference may transfer the recorded conference 11700 to a participant profile or archive hosted by the conferencing system 106. The archive may store multiple recorded conferences 11700 for subsequent access and/or distribution by the participant 104 or any other users. The users may download the recorded conference 11700 for playback on a client device 102. In other embodiments, the recorded conference 11700 may be streamed as an integrated video. In further embodiments, the recorded conference 11700 may be referenced with a uniform resource locator (URL) or other embedded code that may be distributed to users. The participant 104 may also directly transfer or distribute the recorded conference 11700 to other users via any of the above-described or other methods, including by electronic mail or via a social networking computer system or third party video distribution system.

As illustrated in FIG. 117, the recorded conference channels 11512 are synchronized according to a master timeline associated with the conference (e.g., conference timeline 11702). As part of the recording process, the record module 11504 may generate timestamps 11704 for the recorded content. In an embodiment, the timestamps 11704 may include a time reference 11706, an event type 11708, and an event identifier 11710. The time reference 11706 defines a temporal location along the master timeline. The event type 13208 and event identifier 13210 may be used to catalogue specific types of events that occur in the conference. In the example illustrated in FIG. 117, a participant 102a may insert a video object 11712 in the conference interface 3110. The video object 11712 may be shared with the other participants 102b and 102c via the conference interface 3110, and an appropriate event type 11712 and event identifier 11710 may be created to identify the beginning and end of the inserted video. Later in the conference, the participant 102b may insert an audio object 11714, and the participant 102c may display a document object 11716. The record module 11504 may generate a timestamp 11704 to identify the beginning and end of the inserted audio and document.

Figure 118:

It should be appreciated that the record module 11504 may be configured to generate timestamps 11704 for any conference event related to the conference interface 3110. In the embodiment illustrated in FIG. 118, timestamps 11704 may be generated for participant-specified comments, notes, or markers 11802. The markers 11802 may be used to identify relevant points in the conference for subsequent review, or otherwise annotate the conference. Furthermore, timestamps 11704 may be generated to identify incoming and/or outgoing posts associated with a data feed, such as, for example, a communication channel 3202 related to a social networking system 3102 (FIGS. 31 & 32). Timestamps 11704 for the markers 11802 and feeds 11804 may be categorized as private or public, which may define whether the channel components 11512 are shared with other participants 104 or only available to the user who defined them.

Having described the general structure and operation of the conference record/playback system 11500, various additional features and functions will be described with reference to an exemplary embodiment of a conference interface 11900 (FIG. 119). The conference interface 11900 displays an interactive participant object 11904 that identifies each participant 104 in the conference. The interactive participant object 11904 may display similar information as described above in connection with participant objects 4004 (e.g., a graphical representation 4102, profile information 4104, an audio indicator 4106, a business card component 4108, etc.). As mentioned above in connection with FIG. 42b, the business card component 4108 may "flip" the participant object 4004 to display additional parameters 4202. The interactive participant objects 11902 may comprise further interactive functionality and visual effects. For example, the participant object 11902 may comprise a cube having multiple display faces. When a participant 104 selects a user interface component, the cube may be expanded to display one or more faces of the object.

Figure 121:
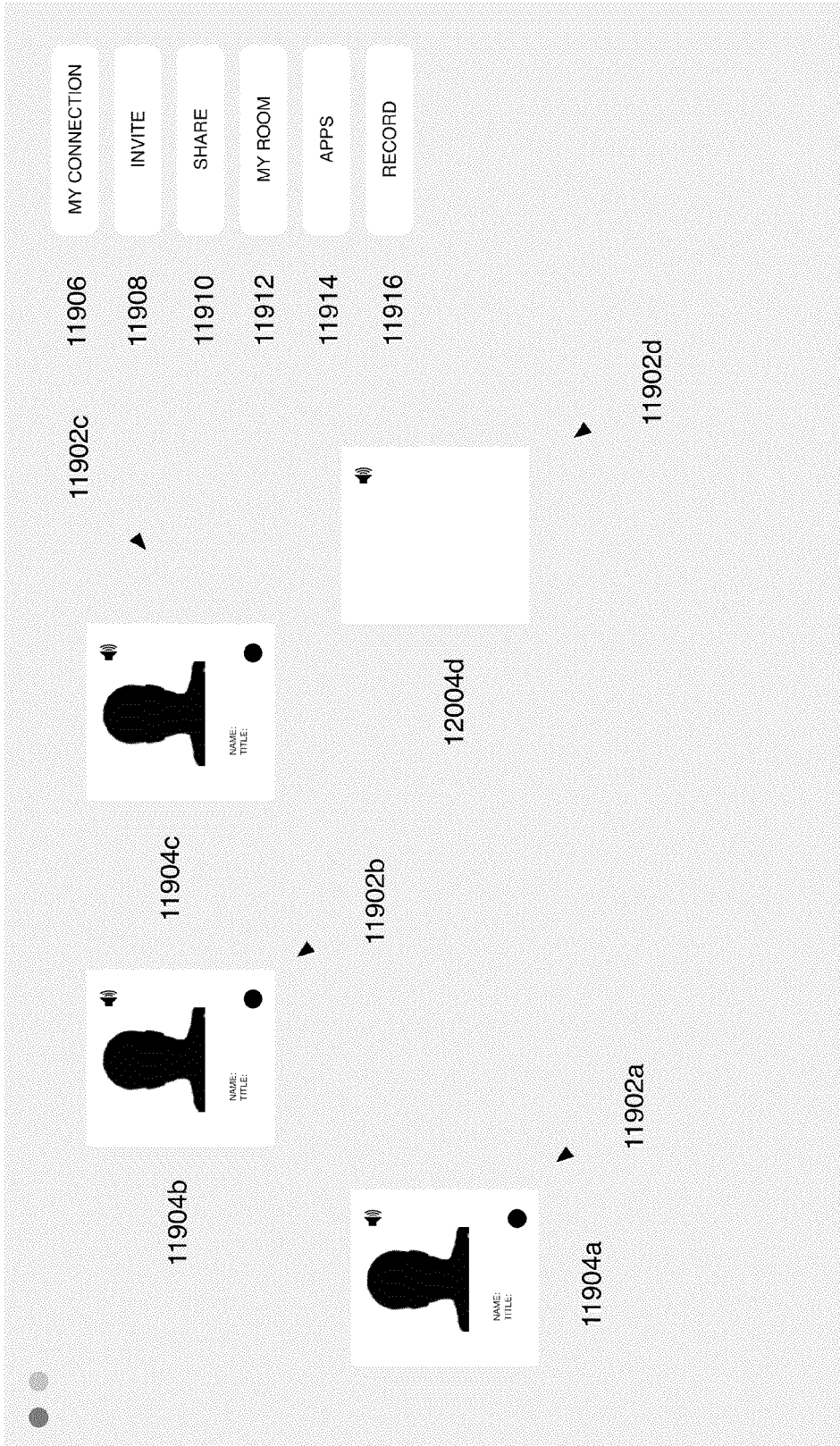

FIG. 119 illustrates the participant object 11902d after is has been selected by one of the participants. The user selection may trigger the display of cube faces 12002d, 12004d, and 12006d. Each face may display additional information about the participant. In an embodiment, the cube faces may be configurable by the participant and may display, for example, a social networking profile, updates to a social networking communication channel 3202, video, graphics, images, or any other content. The cube faces may be further selected to return to the original collapsed cube. In another embodiment, the participant object 11902 may be rotated (either automatically or via user selection) to display the respective cube faces 12002d, 12004d, and 12006d. FIG. 121 shows the participant object 11902 after it has been rotated to display cube face 12004d. It should be appreciated that the participant object 11902 may be configured with additional or alternative visual effects and/or interactive functionality.

The conference interface 11900 may comprise one or more selectable components for accessing various features. A my connection component 11906 may launch a display for enabling a participant 104 to configure the existing connection between the client device 102 and the conferencing system 106. The participant 104 may disconnect a connection to the audio conference 114, establish a new connection to the audio conference 114 (e.g., by dial-out), or reconfigure the existing connection to the audio conference 114. In addition to configuring the audio connection, the participant 104 may also configure the connection to the online conference via the conference interface 3110. In an embodiment, the connection to the online conference may be transferred to another client device 102 or another client 11502 on an existing client device 102. This may enable the participant 104 to seamlessly maintain a presence in the online conference during the transfer.

Figure 122:
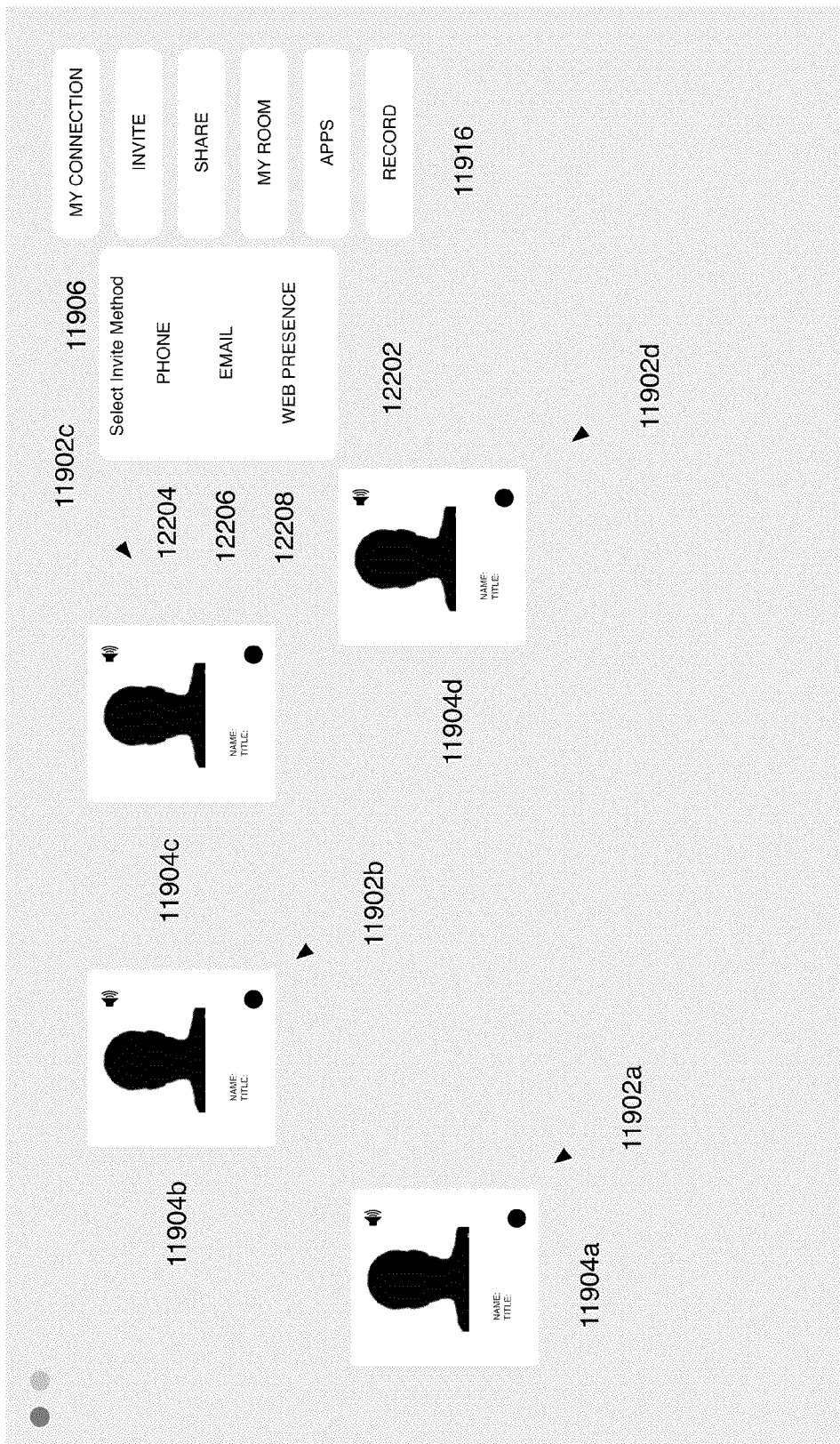

An invite component 11908 may launch a menu 12202 (FIG. 122) for enabling a participant 104 to invite additional participants 104 to the online conference. As illustrated in FIG. 122, additional participants may be invited by, for example, dialing out to a telephone number (phone component 13704), sending an email including information for accessing the conferencing system 106 (email component 12206), or sending a message to a web service (web presence component 12208), such as, for example, a social networking system 3102.

Figure 123:
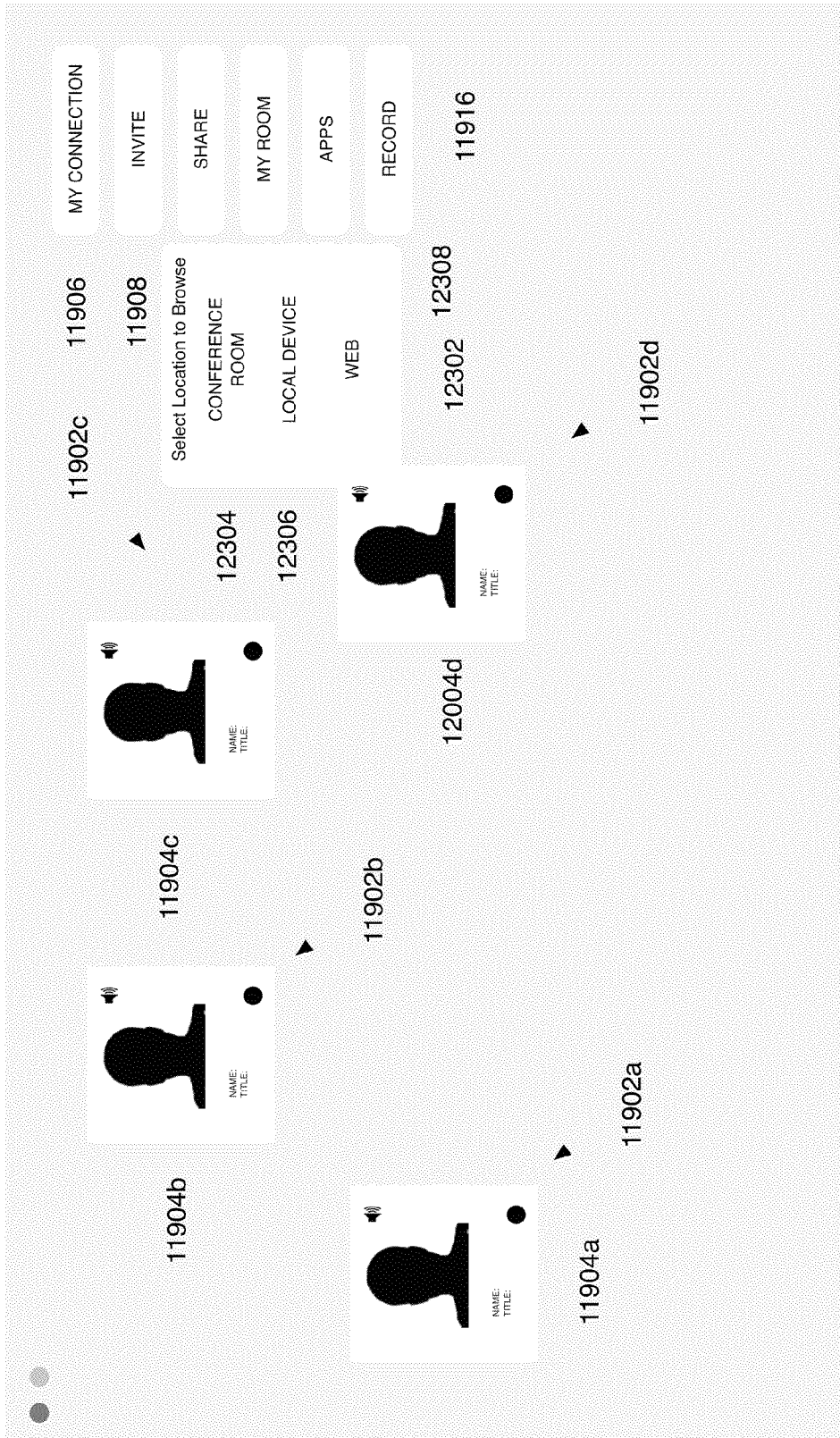
Figure 124:
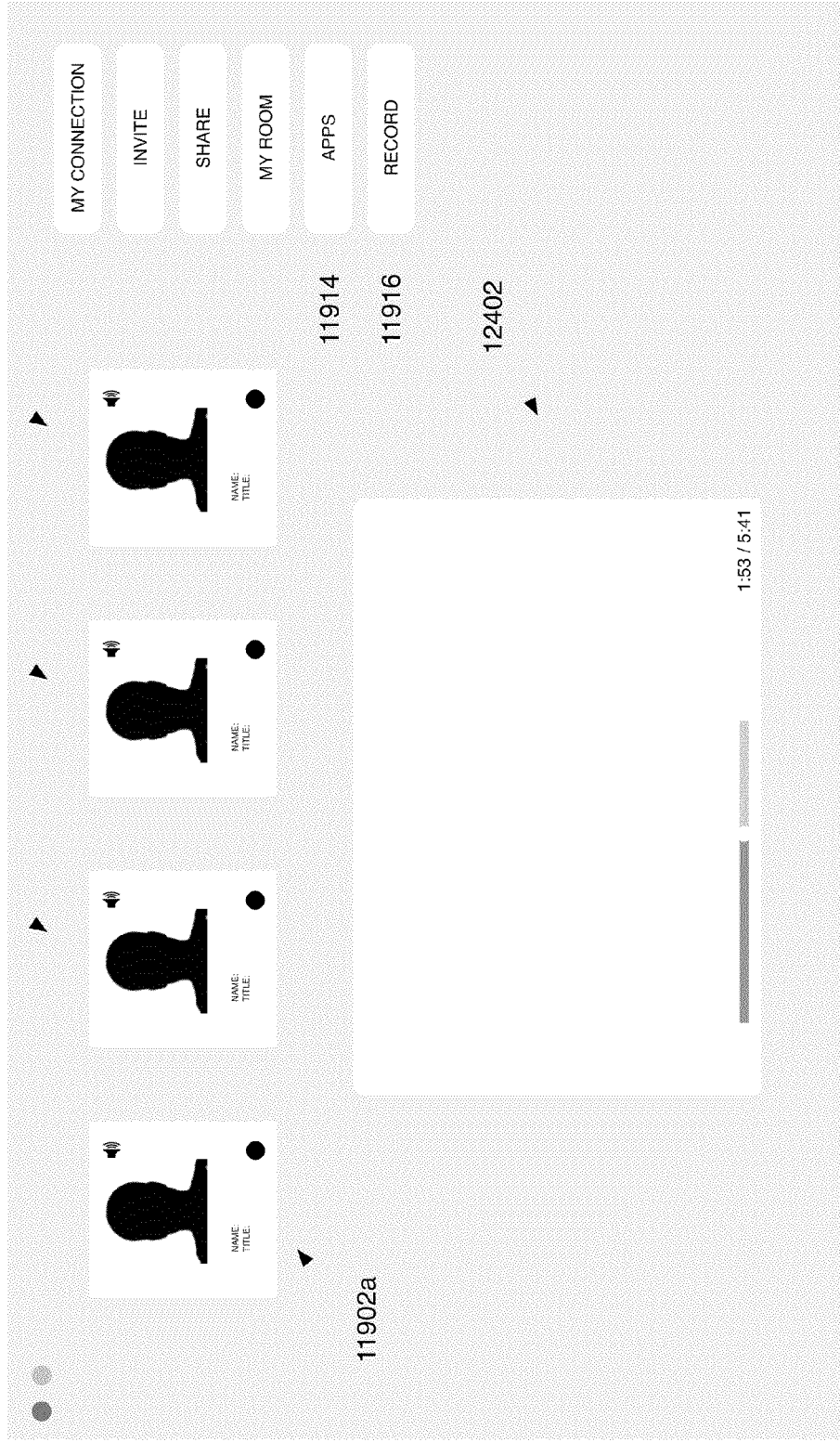

A share component 11910 may launch a menu 12302 (FIG. 123) for enabling a participant 104 to insert and share media with other participants in the online conference. The menu 12302 may prompt the participant 104 to specify a browse location for selecting the media. A conference room component 12304 may display media stored by the conferencing system 106. A local device component 12306 may display a file browser for enabling the participant 104 to select files located on the client device 102. A web component 12308 may display available media hosted by a web service, such as, for example a third party video, audio, or document hosting service. FIG. 124 illustrates the conference interface 11900 after a participant 104 has identified a web-based video 13902. The client device 102 may launch the web-based video 12402 and the conferencing system 106 shares it with all of the participants 104 via the conference interface 3110.

In an embodiment, when the participant launches the web-based video 12402 (or other user interface component, presentation display, etc.), the component may be introduced in the conference interface 11900 as a "fly-in" component to provide a more visually engaging experience. For instance, the component may appear to be raised from a bottom portion of the conference interface 11900 and the participant objects 11902 may be automatically rearranged in the remaining available screen space (or hidden) to accommodate the component. The movement of the component may originate from any portion of the screen and may implement any desirable animation or effects. In one implementation, the "fly-in" component is configured to simulate the motion of a physical screen being raised from the "floor" of the screen, with the participant objects 11902 being "pushed aside" by the display or otherwise rearranged or hidden. In another embodiment, the participant objects 11902 may be displayed in the background with the "fly-in" component being raised in the foreground.

When the web-based video 12402 (or other presentation display) is completed or otherwise deactivated manually or automatically, the animation or effects may be reversed and the participant objects 11902 returned to an original or other layout and the "fly-in" component moved to the original or other state. It should be appreciated that the "fly-in" component animation and/or effects may be used with any desirable presentation content and/or functionality (e.g., a display, pane, window, etc.).

A my room component 11912 may launch a display for enabling a participant 104 to configure the appearance of the conference interface 3110. The participant 104 may configure the arrangement of the participant objects 11902, specify a location view 124, or configure any other presentation parameter.

Figure 125:
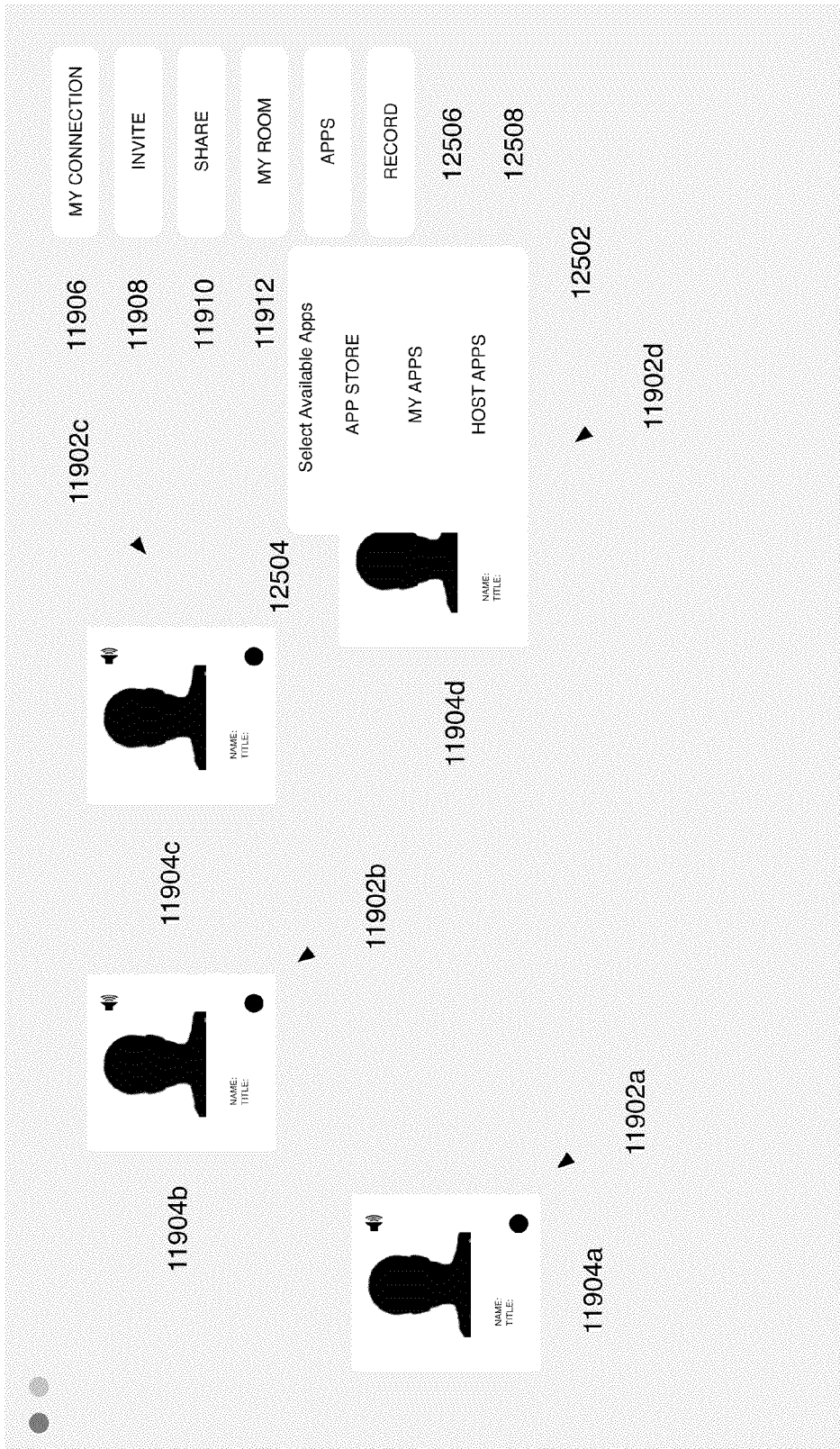

An apps component 11914 may launch a menu 12502 (FIG. 125) for enabling a participant 104 to launch conference applications. As described above, the conferencing system 106 may host a conference apps store for purchasing various conference applications. An app store component 12504 may launch the app store where the participant 104 may purchase conference applications. A my apps component 12506 may launch a display for enabling the participant 104 to select from applications that have already been purchased or are otherwise available to the participant 104. A host apps component 12508 may display conferencing applications that have been made available by the host of the online conference.

Figure 126:
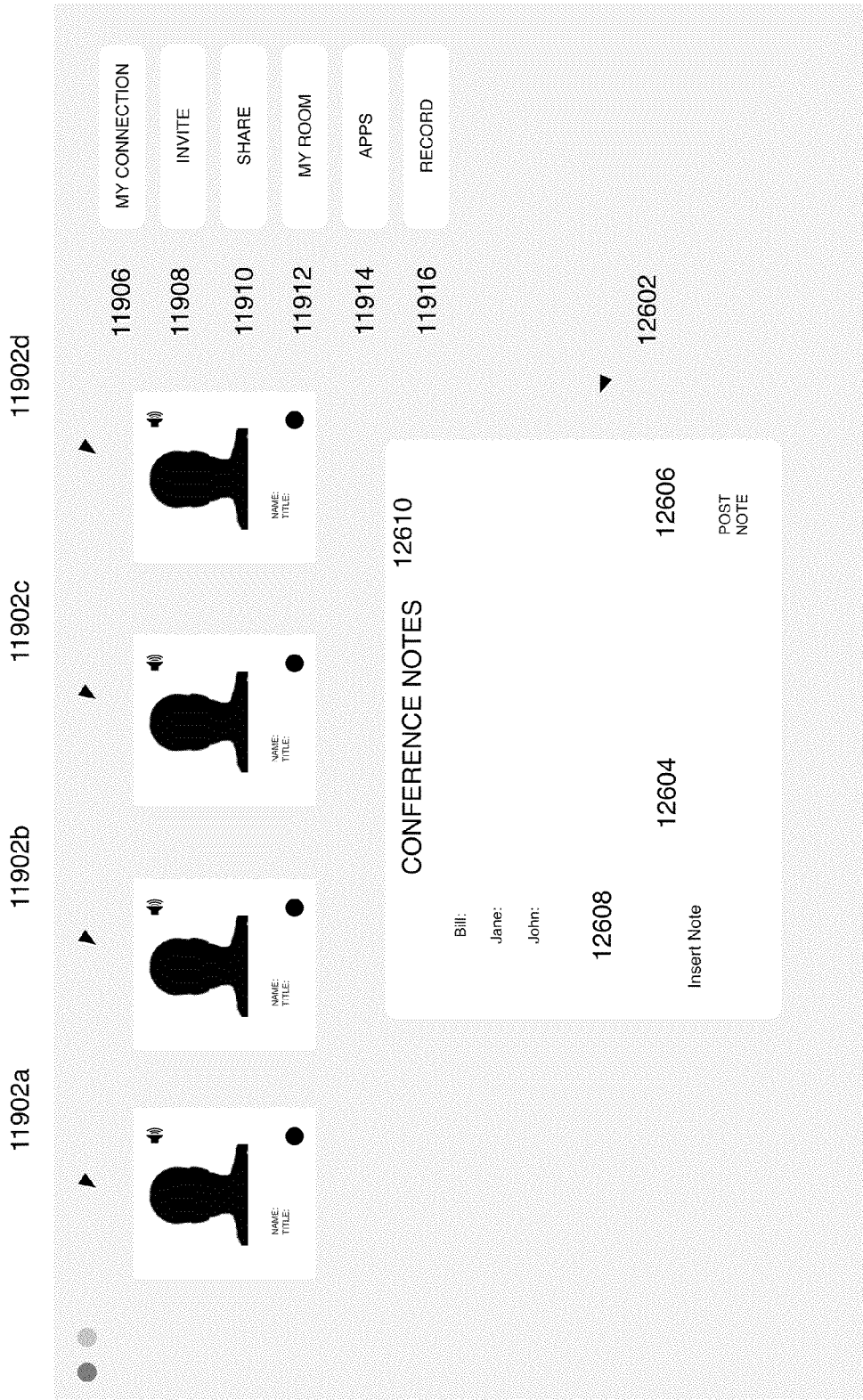

FIG. 126 illustrates the conference interface 11900 after the participant 104 has launched a conference notes application 12602. The notes application 12602 displays a text insertion component 12604 for enabling participants 104 to insert notes to a notes section. A participant 104 may insert a note and select the post note component 14106, which adds as a group note 12610 with an indication 12608 of the participant 104.

Figure 127:
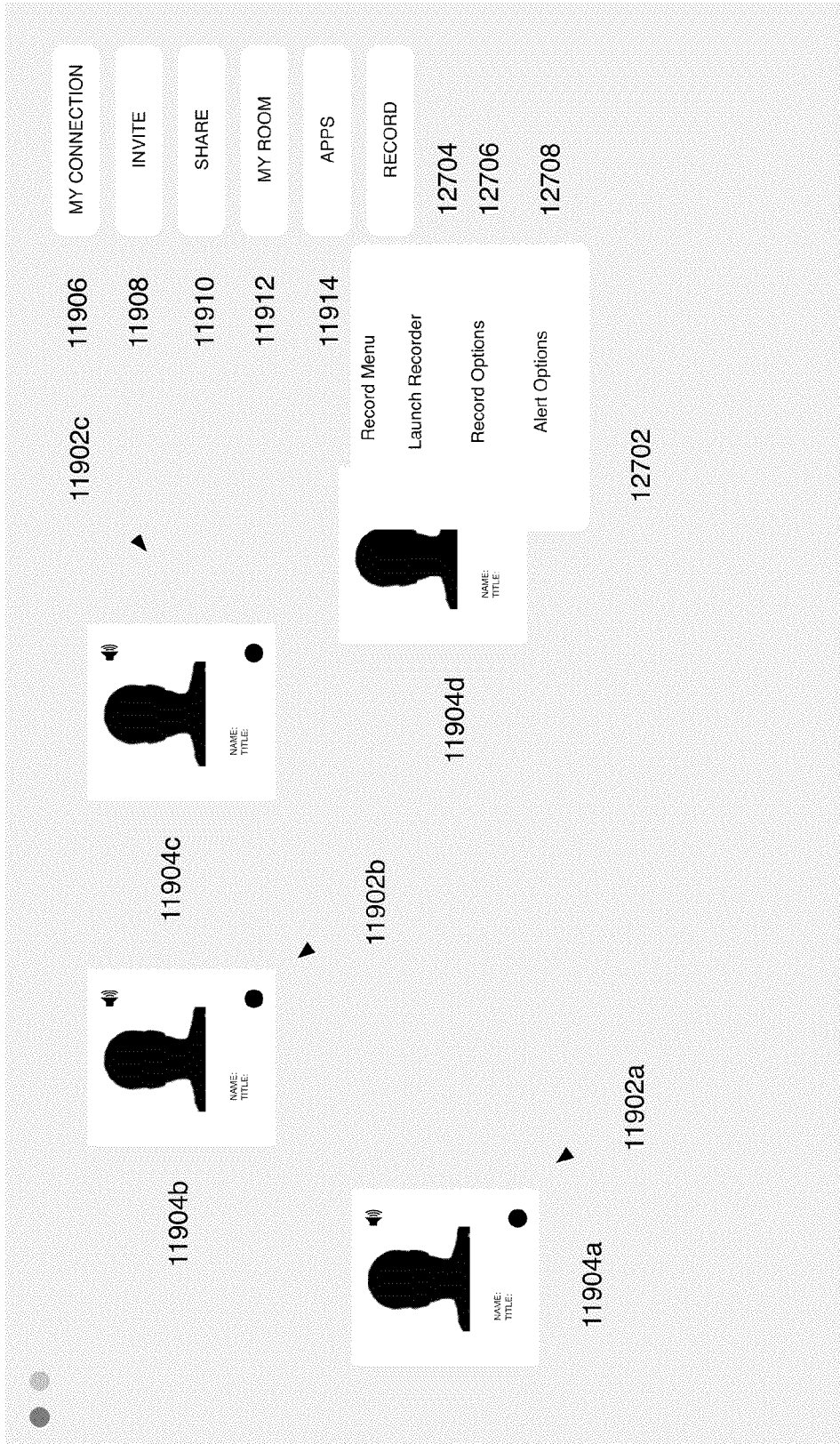
Figure 128:
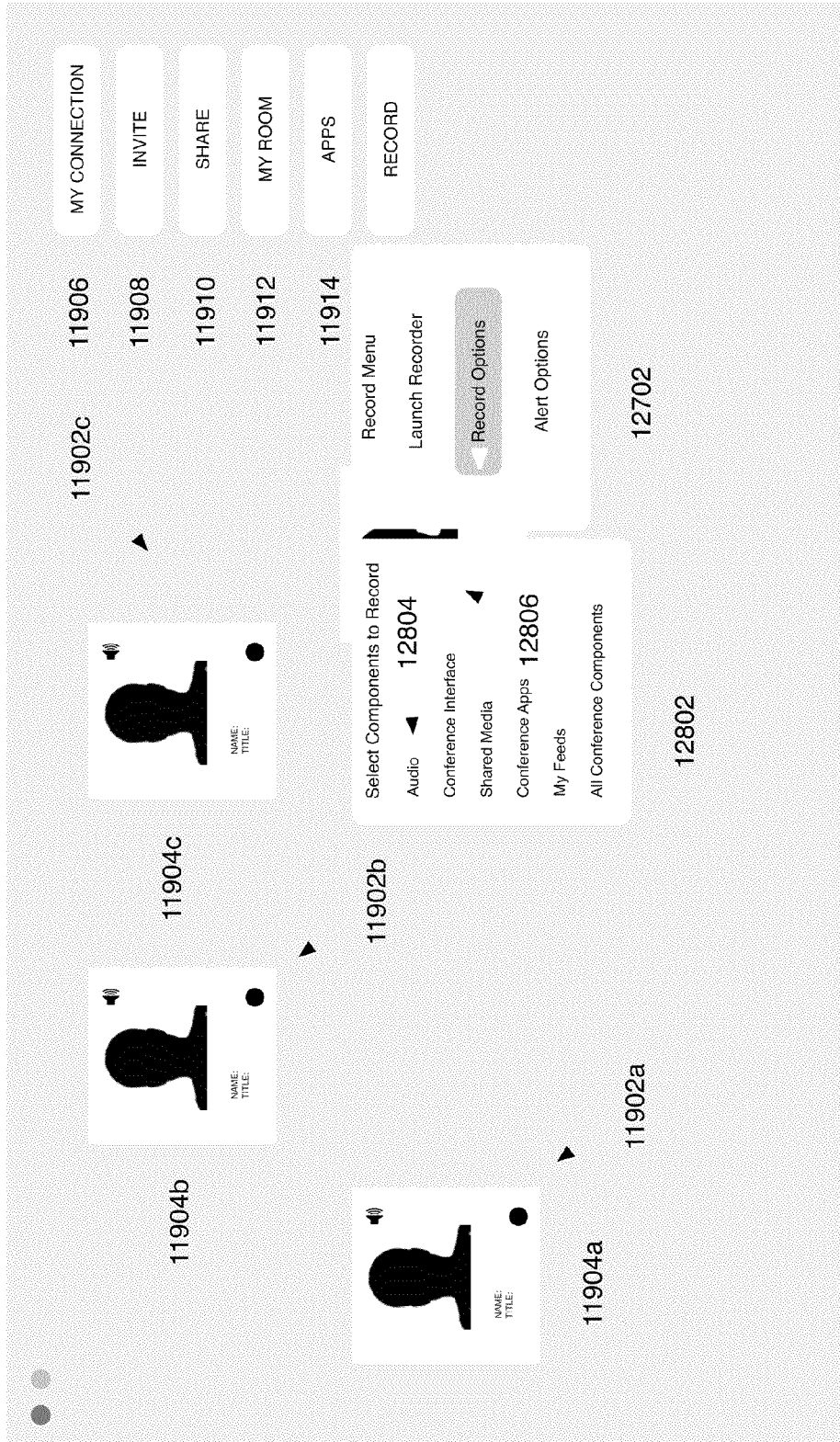

A record component 11916 may launch a display 12702 (FIG. 127) for enabling a participant 104 to launch a conference recorder (component 12704) or configure record options (component 12706) or alert options (12708). The record options component 12706 may launch a display 12802 for enabling participants 104 to select (e.g., via check boxes 12806) which components 12804 to record. In the embodiment illustrated in FIG. 128, the participant 104 may select to record according to one or more of the following parameters: audio, conference interface, shared media, conference apps, my feeds, or all conference components. When activated, the record module 11504 will record and store the selected components.

As illustrated in FIG. 129, the alert options component 12702 may launch an alerts manager 12902 for enabling the participants 104 to configure the conference interface 3110 for various in-conference alerts. For example, the conference interface 3110 may be configured to alert the participant when certain events occur in the conference (component 12906) such as, for example, when a video is shared, a conference application is launched, etc. Other types of participant-based alerts may be generated (component 12904). The participant 104 may wish to be alerted via the conference interface 3110 when a particular participant 104 is speaking or when the participant takes a certain action in the conference.

When the conference recorder is launched and the record module 11504 is recording the conference, the conference interface 3110 may present a record/playback navigation controller 13002 (FIG. 130) for facilitating various record and playback features. The record/navigation controller 13002 comprises the user interface associated with the control module 11510. The controller 13002 comprises a navigation controller 13102 comprising a pause/play input 13106, a rewind input 13104, and a forward input 13108 for initiating the respective playback functions. The pause/play input 13106 toggles between the functions of pausing the conference and playing the conference. The rewind input 13106 and the forward input 13104 enable the participant 104 to navigate to earlier and later locations along the master timeline of the conference during playback. During the playback function, a participant 104 may select the live input 14612 to automatically return the live conference. The mute input 13114 mutes the audio conference 114.

The record/playback navigation controller 13002 may further comprise an insert marker portion 13114 for enabling participants 104 to insert comments, tags, etc. (markers 11802—FIG. 118) into the master timeline 11702. The comment may be added to a text insertion component 13118 and specified as a private or public comment. When the insert component 13120 is selected, a timestamp 11704 comprising the comment is generated.

FIG. 132 is a flowchart illustrating the architecture, operation, and/or functionality of an embodiment of the conference record/playback system of FIG. 115 described above. At block 13202, the conferencing system 106 establishes the audio conference 114 between a plurality of participants 104.

At block 13204, the conference interface 3110 and audio conference 114 are presented to the respective client devices 102. At block 13206, one or more of the client devices 102 synchronously record the audio conference 114 and the conference interface 3110. As mentioned above, one or more of the conference channels 11512 may be recorded. At block 13208, the synchronized audio and video are stored and played back (block 13210).

FIG. 133 illustrates an embodiment of a computer system 13300 for enabling a participant 104 in an online conference to seamlessly transfer a conference session from a first participant client device 102a to a second participant client device 102b. The seamless transfer is provided during the conference in such a way that the other participants 104 in the conference are unaware of the transfer. The computer system 14800 generally comprises a conferencing system 106 and a plurality of client devices 102 connected via one or more communication networks 110 (FIG. 1). The conferencing system 106 is configured to establish an audio conference 114 between the participants 104. One or more servers(s) 108 associated with the conferencing system 106 are configured to present the audio conference 114 and a conference interface 3110 to the client device(s) 102 via a client (e.g., a client 13002, a browser, one or more browser plug-ins, and/or any other general or special purpose client). The conference interface 3110 may be presented to and displayed via a graphical user interface 132 and an associated display (e.g., touchscreen display device 5004 or other display device). Each client device 102 may access the conference interface 3110 via a session with the conferencing system 106 (i.e., a conference session).

As illustrated in the embodiment of FIG. 133, to facilitate the transfer of a conference session from one client device to another, a client device 102 may comprise participant inter-device conference transfer module(s) 13302. The module(s) 13302 generally comprise the logic or functionality for initiating, controlling, or implementing one or more aspects of the transfer process. The module(s) 13302 may be embodied in memory (e.g., memory 404) and executed by one or more processor(s) 402. One or more portions of the module(s) 13302 may reside at the first client device 102a (i.e., an initial or primary client device), the second client device 102b (i.e., a subsequent or secondary client device), the server(s) 108, or other components in the conferencing system 106.

In this regard, it should be appreciated that the first participant client device 102a refers to a client device 102 that establishes an initial or earlier conference session (i.e., first conference session) with the conferencing system 106. The second participant client device 102b refers to a target client device 102 to which the participant 104 wishes to transfer the first conference session. The first and second participant client devices 102 may comprise any computing device (as described above) capable of communicating with the conferencing system 106 via the communication network(s) 110. The transfer process may be implemented in any situation in which it is desirable for a participant 104 to transfer a session with the conferencing system 106 from one device to another.

For example, consider the situation in which a participant 104 initially joins the conference via a personal computer, such as, a desktop computer or a laptop or notebook computer at the participant's work area. During the conference, the participant 104 may be required to leave the work area. While many participants 104 may have a mobile computing device capable of accessing the conference, conventional conference solutions may require the participant to disconnect from the personal computer and establish a new connection via the mobile computing device. During this period, the participant 104 may be conspicuously absent from the conference. One solution to this problem is for the participant 104 to establish the new session with the mobile computing device prior to disconnecting the personal computer. However, in this scenario, until the second session is established and the first session is terminated, the participant 104 may appear in the conference as two separate participants. Although this may be preferable to appearing absent, it may still confuse other participants 104 or undesirably highlight the fact that the participant is no longer at the work area or accessing the conference via a mobile computing device.

The participant 104 may experience a similar problem when the first conference session is established via a mobile computing device. For a variety of reasons, the participant 104 may desire to access the conference from a device other than the original mobile computing device. For instance, the mobile computing device may be losing battery power or the connection to a carrier network or other wireless network may become problematic. Another reason may be that the participant 104 desires to experience the conference on a computing device with a larger display or other preferred performance characteristics. As mentioned above, during the conference, one of the participants 104 may share a video or introduce an audio clip or other content or functionality via the conference interface 3110. The mobile computing device (or other computing device) may not have compatible software to view the video, or perhaps the display size, processing power, other hardware and/or software specifications, or other performance characteristics make it problematic to view the content or functionality presented in the conference interface 3110. The participant 104 may desire to experience the conference from a more suitable computing device or platform. In this situation, the participant 104 would have the same problems described above.

The computing system 13300 may provide a solution to one or more of these or other problems by enabling the participant 104 to seamlessly change devices during the conference in an inconspicuous manner without interrupting the participant's presence in the conference. FIG. 134 illustrates an embodiment of a method for transferring a conference session from the first client device 102a to the second client device 102b while maintaining the corresponding participant's presence in the conference interface 3110. It should be appreciated that the method illustrates functionality, steps, or logic that may occur or reside at the first client device 102a, the second client device 102b, or the conferencing system 106.

At block 13402, a participant 104 joins an online conference via the first client device 102a. The first client device 102a establishes a first conference session with the conferencing system 106. The online conference may include an audio conference 114. At block 13404, the conferencing system 106 presents a conference interface, such as, for example, the conference interface 3100 to the client device 102a, as well as the other client devices 102 in the conference. As mentioned above, the conference interface 3110 may display a participant object (e.g., objects 4004, 11902) identifying each participant in the conference, including the participant 104 operating the first client device 102a (FIG. 148). The conferencing system 106 may reference each participant object by a unique participant identifier 3802 (FIG. 38) corresponding to the participant.

At block 13406, the participant 104 initiates the transfer of the conference session to the second client device 102b. In an embodiment, the participant 104 may initiate the transfer via the conference interface 3100 by, for example, the my connection component 13406 (FIG. 119) or other user interface component(s) or input device(s). At block 13408, the first client device 102a generates a transfer request 13502 (FIG. 135), which may include the participant identifier 3802 corresponding to participant 104. The transfer request 13502 is sent to the second client device 102b. It should be appreciated that the transfer request 13502 may be configured in, and delivered to the second client device 102b, in various ways. In the embodiment illustrated in FIG. 135, the transfer request 13502 is sent to the second client device 102b via a local communication network, such as, for example, a short-range wireless network using any desirable protocol. This delivery method may be desirable in situations in which the client devices 102a and 102b are located in proximity to each other.

As illustrated in FIG. 136, the transfer request 13502 may be sent to the second client device 102b via one or more of the communication networks 110. The first client device 102a may send a message (e.g., an email, social networking message, short message service (SMS) message, etc.) that may be received or otherwise retrieved by the second client device 102b. The message may comprise a uniform resource locator (URL), as a link or otherwise, which directs the participant to the conferencing system 106. The message may further comprise the participant identifier 3802. In a further embodiment, the transfer request 13502 may be sent to the conferencing system 106 with or without the participant identifier 3802, and the conferencing system 106 may configure a new request or forward the original request to the second client device 102b.

Regardless the delivery method, at block 13410, the second client device 102b may acknowledge the request by sending a response or message 13702 to the first client device 102a (FIG. 137) and/or the conferencing system 106 (FIG. 138). As illustrated in FIG. 139, at block 13412, the second client device 102b establishes a second conference session 13902 with the conferencing system 106 via any of the methods described above. The first conference session may be terminated. With knowledge of the participant identifier 3802, the conferencing system 106 may continuously display in the conference interface 3110 the participant object corresponding to the participant 104 during and after the transfer process. The conferencing system 106 may logically associate the second conference session (second client device 102b) with the first conference session (first client device 102b) based on the participant identifier 3802. In this manner, the conferencing system 106 may maintain the identity of the participant 104 in the conference interface 3110 during both sessions and, thereby, enable the participant 104 to inconspicuously change devices without being perceived as having disconnected from the conference or as having changed devices or connections.

It should be appreciated that one or more of the process or method descriptions associated with the flow charts or block diagrams above may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory or non-volatile memory and that is executed by hardware (e.g., microcontroller) or any other processor(s) or suitable instruction execution system associated with the multi-platform virtual conference location system. Furthermore, the logical functions may be embodied in any computer readable medium for use by or in connection with an instruction execution system, apparatus, or device, such as a computer-based system, processor-containing system, or other system associated with the multi-platform virtual conference location system that can fetch the instructions from the instruction execution system, apparatus, or device and execute the instructions.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for incorporating a social networking feature in a conferencing system, the method comprising:
    a conferencing server establishing an audio conference between a plurality of participants in an online conference via computing devices connected via a communication network;
    the conferencing server presenting to the computing devices a conference user interface during and associated with the audio conference, the conference user interface displaying an interactive participant object uniquely identifying only each of the participants in the audio conference, each of the interactive participant objects comprising a first display mode and a second display mode, the first display mode for displaying a unique graphical representation and participant profile information associated with the corresponding participant in a first display face, the second display mode being triggered by selection of the interactive participant object by one or more of the other participants during the audio conference and comprising one or more additional display faces simultaneously displayed adjacent the first display face and for displaying social networking content from one or more social networking accounts linked to the corresponding participant, wherein the interactive participant objects further comprise a user interface control for enabling the corresponding participant identified by the associated interactive participant object to configure the social networking content displayed in the one or more additional display faces to the one or more of the other participants upon selection of the interactive participant object;
    a social networking server authenticating the social networking accounts;
    during the audio conference, the conferencing user interface presenting the interactive participant objects in the first display mode in which the first display faces are displayed and the second display faces are not displayed; and
    the conferencing server enabling a first participant to select the interactive participant object associated with a second participant and, in response to the selection by the first participant, the conferencing server modifying only the conference user interface presented to the first participant by presenting the selected interactive participant object associated with the second participant in the second display mode.

2. The method of claim 1, wherein the second display mode comprises displaying the second display face as an expandable display face.

3. The method of claim 1, further comprising:
    returning the selected interactive participant object to the first display mode in response to a further selection of the interactive participant object.

4. The method of claim 1, wherein the social networking content displayed in the one or more additional display faces further comprises a social networking communication channel for enabling the selecting participant to send a message comprising one or more of a chat, a wall post, and a comment to an item in a news feed.

5. The method of claim 1, wherein the conference user interface further comprises a virtual conference location based on a simulated location view, the virtual conference location comprising: a first graphical representation of a conference location according to the simulated location view; and a second graphical representation of each of the participants with corresponding contact information displayed in the conference location.

6. The method of claim 5, further comprising the participant specifying the simulated location view.

7. The method of claim 5, further comprising the conferencing server determining the simulated location view based on information related to at least one of the participants.

8. The method of claim 5, further comprising:
    the conferencing server receiving, from a first participant, a first selection for the simulated location view;
    the conferencing server receiving, from a second participant, a second selection for the simulated location view, wherein the second selection is different than the first selection;
    the conferencing server presenting the virtual conference location to the first participant according to the first selection; and
    the conferencing server presenting the virtual conference location to the second participant according to the second selection.

9. The method of claim 1, wherein the interactive participant objects comprise a cube object and the second display mode comprises expanding the one or more additional display faces from the first display face.

10. A method for sharing social networking content in an audio conference, the method comprising:
    a conferencing server establishing an audio conference between a plurality of participants in an online conference via computing devices connected via a communication network;
    the conferencing server presenting to the computing devices a conference user interface during and associated with the audio conference, the conference user interface displaying an interactive participant object uniquely identifying only each of the participants in the audio conference, each of the interactive participant objects comprising a first display mode and a second display mode, the first display mode for displaying a unique graphical representation and participant profile information associated with the corresponding participant in a first display face, the second display mode being triggered by selection of the interactive participant object by one or more of the other participants during the audio conference and comprising one or more additional display faces simultaneously displayed adjacent the first display face and for displaying social networking content from one or more social networking accounts associated with the corresponding participant, wherein the interactive participant objects further comprise a user interface control for enabling the corresponding participant identified by the associated interactive participant object to configure the social networking content to be displayed in the one or more additional display faces to the one or more of the other participants upon selection of the interactive participant object; and during the audio conference, the conferencing server:
- presenting the interactive participant objects in the first display mode in which the first display faces are displayed and the second display faces are not displayed; and
- receiving a user selection from a first participant of the interactive participant object associated with a second participant and, in response to the user selection by the first participant, the conferencing server presenting the selected interactive participant object associated with the second participant to the first participant in the second display mode.

11. The method of claim 10, wherein the social networking content comprises one or more of a user profile and a social networking communication channel.

12. The method of claim 10, wherein the interactive participant objects comprises a cube object and the second display mode comprises expanding the one or more additional display faces from the first display face.

13. The method of claim 10, further comprising:
- returning the selected interactive participant object to the first display mode in response to a further selection of the interactive participant object.

14. The method of claim 10, wherein the second display mode comprises expanding the one or more additional display faces from the first display face.

15. A method for incorporating social networking content in an audio conference, the method comprising:
- a conferencing server establishing an audio conference between a plurality of participants in an online conference via computing devices connected via a communication network;
- the conferencing server presenting to the computing devices a conference user interface associated with the audio conference, the conference user interface displaying an interactive participant object uniquely identifying only each of the participants in the audio conference, the interactive participant objects comprising a first display mode and a second display mode, the first display mode configured to display participant profile information associated with the corresponding participant in a first display face and the second display mode being triggered by selection of the interactive participant object by one or more of the other participants during the audio conference and configured to display social networking content associated with the corresponding participant in one or more additional display faces, wherein the interactive participant objects comprise a user interface control for enabling the corresponding participant identified by the associated interactive participant object to configure the social networking content displayed in the one or more additional to the one or more of the other participants upon selection of the interactive participant object;
- during the audio conference, the conferencing server presenting the interactive participant objects in the first display mode;
- receiving via the conference user interface a selection of one of the interactive participant objects by one of the participants in the audio conference;
- if the selection is by the corresponding participant associated with the selected interactive participant object, the conferencing server enabling the selecting participant to input and provide new content to their social networking account via the selected interactive participant object; and
- if the selection is by one of the participants other than the corresponding participant, the conferencing server presenting the selected interactive participant object in the second display mode.

16. The method of claim 15, wherein the conferencing server enabling the selecting participant to input and provide new content to their social networking account comprises one or more of changing a profile, commenting on an item in a news feed, and posting to a news feed.

* * * * *